US011630815B2

(12) United States Patent
Ares et al.

(10) Patent No.: US 11,630,815 B2
(45) Date of Patent: Apr. 18, 2023

(54) DATA ANALYSIS AND VISUALIZATION USING STRUCTURED DATA TABLES AND NODAL NETWORKS

(71) Applicant: Choral Systems, LLC, Milton, GA (US)

(72) Inventors: Jean-Michel Ares, Milton, GA (US); Dick Sharadchandra Amin, Duluth, GA (US)

(73) Assignee: CHORAL SYSTEMS, LLC, Milton, GA (US)

( * ) Notice: Subject to any disclaimer, the term of this patent is extended or adjusted under 35 U.S.C. 154(b) by 64 days.

(21) Appl. No.: 16/838,927

(22) Filed: Apr. 2, 2020

(65) Prior Publication Data

US 2020/0234154 A1 Jul. 23, 2020

Related U.S. Application Data

(63) Continuation-in-part of application No. 16/383,122, filed on Apr. 12, 2019, which is a continuation of (Continued)

(51) Int. Cl.

*G06F 16/21* (2019.01)
*G06F 16/2455* (2019.01)

(52) U.S. Cl.

CPC ...... *G06F 16/217* (2019.01); *G06F 16/24553* (2019.01)

(58) Field of Classification Search

CPC ...... G06F 16/26; G06F 16/287; G06F 16/954; G06F 40/205; G06F 16/285;

(Continued)

(56) References Cited

U.S. PATENT DOCUMENTS 6,292,715 B1 9/2001 Rongo
9,436,760 B1 9/2016 Tacchi et al.

(Continued)

OTHER PUBLICATIONS

International Preliminary Report on Patentability, Ch. I, for PCT/US2020/026511 dated Oct. 14, 2021 (17 pages).

(Continued)

*Primary Examiner* — Yuk Ting Choi
(74) *Attorney, Agent, or Firm* — Foley & Lardner LLP

(57) ABSTRACT

Disclosed methods and systems describe an analytics server that generates an inter-related nodal data structure. The analytics server receives an electronic template having a set of input fields, the electronic template identifying at least a portion of data stored within a database and its corresponding domain data table and a display attribute, the electronic template further identifying a database storing the data; retrieves the data from the database; parses the data into a set of unique domain data tables having a first criterion and a set of unique dimension tables having a second criterion; generates a nodal network comprising a set of nodes where each node represents at least a portion of the retrieved data, each node having metadata comprising a unique identifier corresponding to a unique domain table and a unique dimension table corresponding to data associated with each node; links one or more nodes based their respective metadata.

18 Claims, 136 Drawing Sheets

Related U.S. Application Data application No. 15/925,995, filed on Mar. 20, 2018, now Pat. No. 10,311,360.

(60) Provisional application No. 62/474,168, filed on Mar. 21, 2017, provisional application No. 62/829,961, filed on Apr. 5, 2019.

(58) Field of Classification Search
CPC ............... G06F 16/444; G06F 16/9024; G06F 3/04842; G06F 16/217; G06F 16/24553; G06N 20/00; G06N 5/022; G06N 20/10; G06N 3/08; G06N 5/02
See application file for complete search history.

(56) References Cited

U.S. PATENT DOCUMENTS

| | | | | |
|---|---|---|---|---|
| 9,558,265 | B1 | 1/2017 | Tacchi et al. | |
| 2005/0060647 | A1 | 3/2005 | Doan et al. | |
| 2006/0282443 | A1 | 12/2006 | Hanagata | |
| 2007/0011146 | A1 | 1/2007 | Holbrook | |
| 2007/0198564 | A1 | 8/2007 | Blackstone et al. | |
| 2008/0319947 | A1 | 12/2008 | Latzina et al. | |
| 2009/0265299 | A1 | 10/2009 | Hadad et al. | |
| 2009/0319930 | A1 | 12/2009 | Groh et al. | |
| 2012/0166425 | A1 | 6/2012 | Sharma et al. | |
| 2012/0180133 | A1* | 7/2012 | Al-Harbi | H04L 63/1433 726/25 |
| 2013/0151417 | A1 | 6/2013 | Gupta | |
| 2014/0090056 | A1* | 3/2014 | Manadhata | H04L 63/14 726/23 |
| 2014/0304214 | A1 | 10/2014 | Sakunkoo et al. | |
| 2014/0379697 | A1 | 12/2014 | Martin et al. | |
| 2015/0026260 | A1 | 1/2015 | Worthley | |
| 2015/0100543 | A1* | 4/2015 | Tsuchida | G06F 16/283 707/603 |
| 2015/0199405 | A1 | 7/2015 | Redlich et al. | |
| 2015/0229664 | A1* | 8/2015 | Hawthorn | H04L 63/1433 726/25 |
| 2016/0350834 | A1 | 12/2016 | Wilson et al. | |
| 2017/0046127 | A1* | 2/2017 | Fletcher | H04L 41/069 707/603 |
| 2017/0063911 | A1 | 3/2017 | Muddu et al. | |
| 2017/0063912 | A1* | 3/2017 | Muddu | H04L 43/045 707/603 |
| 2017/0126843 | A1 | 5/2017 | Pantea et al. | |
| 2017/0293840 | A1 | 10/2017 | Ceugniet et al. | |
| 2017/0346839 | A1* | 11/2017 | Peppe | H04L 63/1433 707/603 |
| 2018/0025035 | A1 | 1/2018 | Xia et al. | |
| 2018/0113950 | A1 | 4/2018 | Blanchflower | |
| 2018/0357298 | A1* | 12/2018 | Andrei | G06F 16/27 707/603 |
| 2020/0097609 | A1 | 3/2020 | Randhawa et al. | |

OTHER PUBLICATIONS

International Search Report and the Written Opinion of the International Searching Authority, or the Declaration issued in corresponding International Application No. PCT/US2020/026511 dated Aug. 14, 2020.

Foreign Office Action on CA App. Ser. 3135186 dated Nov. 21, 2022 (3 pages).

Foreign Search Report on EPO Appl. Ser. 20782277.6 dated Nov. 29, 2022 (9 pages).

* cited by examiner

300

400

1000

1500

1600

2000

2100

2200

2400

2800

2900

3001

4900

| Data | Collection Method | File content |
| --- | --- | --- |
| File 1 | Uploaded by user | Account receivables |
| File 2 | Scanned by the analytics server | Visualization of attacks on company website |
| File 3 | Collected via crawling | Organizational chart |
| File 4 | Uploaded by user | Cyber security attacks on website |
| File 5 | Uploaded by user | Online transaction |
| File 6 | Uploaded by user | Security breach data |
| File 7 | Scanned by the analytics server | ATM transactions |
| File 8 | Uploaded by user | ATM transaction |
| File 9 | Uploaded by user | Security breach data |
| File 10 | Uploaded by user | Customer satisfaction survey |
| File 11 | Scanned by the server | Online transaction |
| File 12 | Uploaded automatically by branch server | Gross spend on cyber security |
| File 13 | Scanned by the analytics server | Customer satisfaction survey |
| File 14 | Uploaded by user | ATM transactions |
| File 15 | Uploaded by user | Security breach data |
| File 16 | Collected via crawling | Fraudulent Login attempts logs |
| File 17 | Uploaded by user | DOS attack protocol |

Figure 54B:
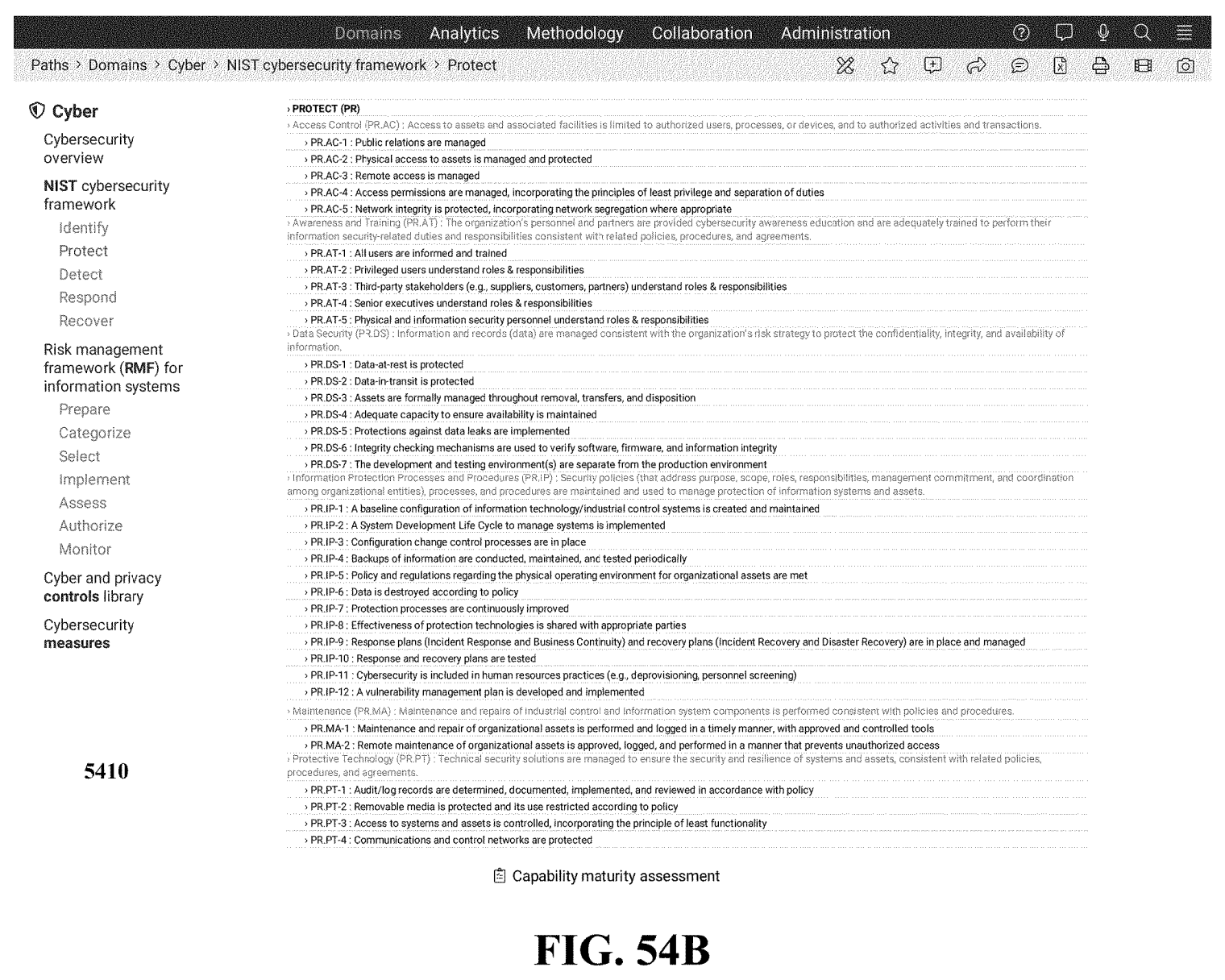

Domains Analytics Methodology Collaboration Administration

Paths › Domains › Cyber › NIST cybersecurity framework › Protect

Cyber

Cybersecurity overview

NIST cybersecurity framework

- Identify
- Protect
- Detect
- Respond
- Recover

Risk management framework (RMF) for information systems

- Prepare
- Categorize
- Select
- Implement
- Assess
- Authorize
- Monitor

Cyber and privacy controls library

Cybersecurity measures

5410

› PROTECT (PR)

› Access Control (PR.AC) : Access to assets and associated facilities is limited to authorized users, processes, or devices, and to authorized activities and transactions.

- › PR.AC-1 : Public relations are managed
- › PR.AC-2 : Physical access to assets is managed and protected
- › PR.AC-3 : Remote access is managed
- › PR.AC-4 : Access permissions are managed, incorporating the principles of least privilege and separation of duties
- › PR.AC-5 : Network integrity is protected, incorporating network segregation where appropriate › Awareness and Training (PR.AT) : The organization's personnel and partners are provided cybersecurity awareness education and are adequately trained to perform their information security-related duties and responsibilities consistent with related policies, procedures, and agreements.

- › PR.AT-1 : All users are informed and trained
- › PR.AT-2 : Privileged users understand roles & responsibilities
- › PR.AT-3 : Third-party stakeholders (e.g., suppliers, customers, partners) understand roles & responsibilities
- › PR.AT-4 : Senior executives understand roles & responsibilities
- › PR.AT-5 : Physical and information security personnel understand roles & responsibilities › Data Security (PR.DS) : Information and records (data) are managed consistent with the organization's risk strategy to protect the confidentiality, integrity, and availability of information.

- › PR.DS-1 : Data-at-rest is protected
- › PR.DS-2 : Data-in-transit is protected
- › PR.DS-3 : Assets are formally managed throughout removal, transfers, and disposition
- › PR.DS-4 : Adequate capacity to ensure availability is maintained
- › PR.DS-5 : Protections against data leaks are implemented
- › PR.DS-6 : Integrity checking mechanisms are used to verify software, firmware, and information integrity
- › PR.DS-7 : The development and testing environment(s) are separate from the production environment › Information Protection Processes and Procedures (PR.IP) : Security policies (that address purpose, scope, roles, responsibilities, management commitment, and coordination among organizational entities), processes, and procedures are maintained and used to manage protection of information systems and assets.

- › PR.IP-1 : A baseline configuration of information technology/industrial control systems is created and maintained
- › PR.IP-2 : A System Development Life Cycle to manage systems is implemented
- › PR.IP-3 : Configuration change control processes are in place
- › PR.IP-4 : Backups of information are conducted, maintained, and tested periodically
- › PR.IP-5 : Policy and regulations regarding the physical operating environment for organizational assets are met
- › PR.IP-6 : Data is destroyed according to policy
- › PR.IP-7 : Protection processes are continuously improved
- › PR.IP-8 : Effectiveness of protection technologies is shared with appropriate parties
- › PR.IP-9 : Response plans (Incident Response and Business Continuity) and recovery plans (Incident Recovery and Disaster Recovery) are in place and managed
- › PR.IP-10 : Response and recovery plans are tested
- › PR.IP-11 : Cybersecurity is included in human resources practices (e.g., deprovisioning, personnel screening)
- › PR.IP-12 : A vulnerability management plan is developed and implemented › Maintenance (PR.MA) : Maintenance and repairs of industrial control and information system components is performed consistent with policies and procedures.

- › PR.MA-1 : Maintenance and repair of organizational assets is performed and logged in a timely manner, with approved and controlled tools
- › PR.MA-2 : Remote maintenance of organizational assets is approved, logged, and performed in a manner that prevents unauthorized access › Protective Technology (PR.PT) : Technical security solutions are managed to ensure the security and resilience of systems and assets, consistent with related policies, procedures, and agreements.

- › PR.PT-1 : Audit/log records are determined, documented, implemented, and reviewed in accordance with policy
- › PR.PT-2 : Removable media is protected and its use restricted according to policy
- › PR.PT-3 : Access to systems and assets is controlled, incorporating the principle of least functionality
- › PR.PT-4 : Communications and control networks are protected Capability maturity assessment

Figure 54D:
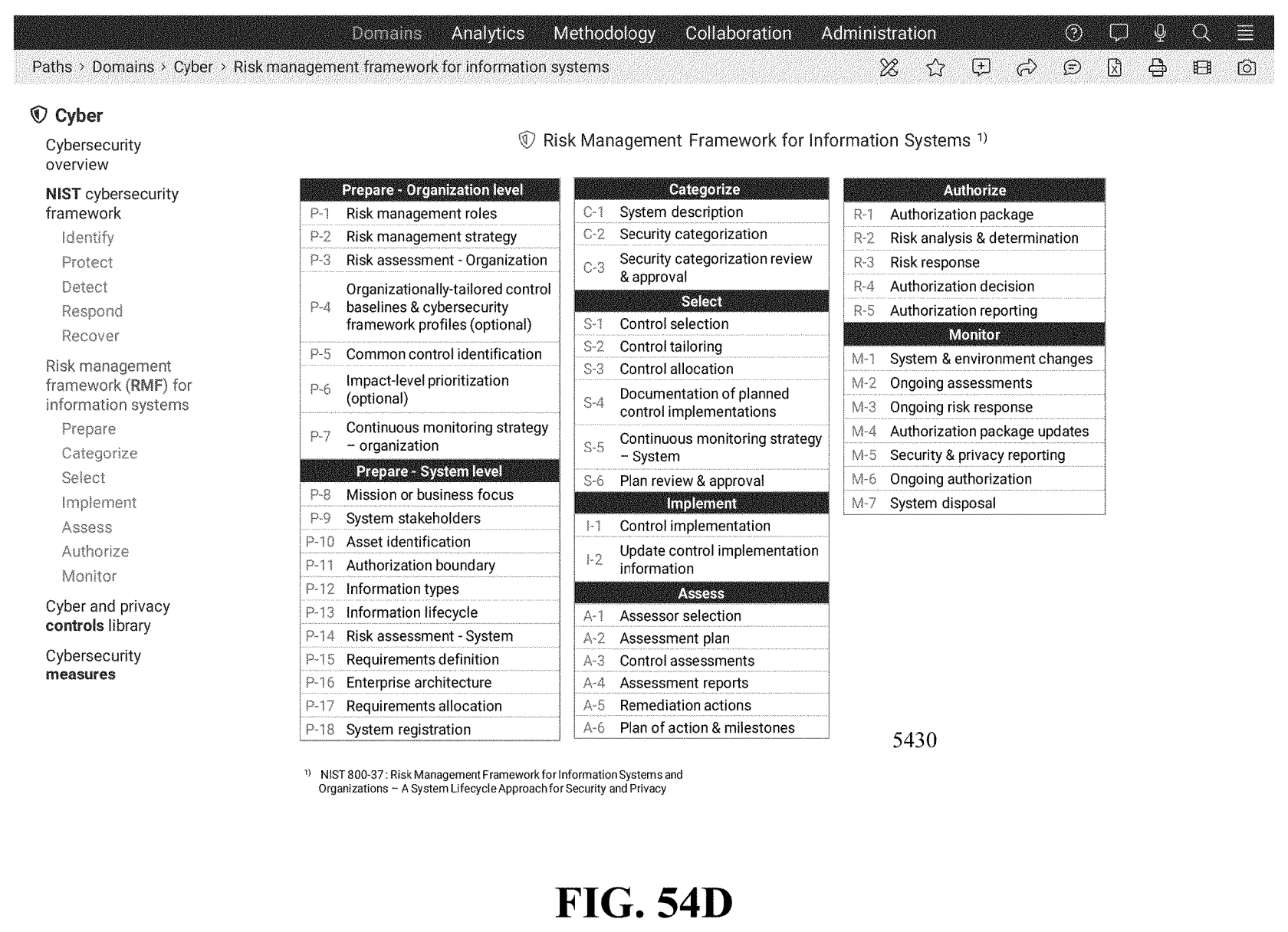

Domains Analytics Methodology Collaboration Administration

Paths › Domains › Cyber › Risk management framework for information systems

Cyber

Cybersecurity overview

NIST cybersecurity framework
- Identify
- Protect
- Detect
- Respond
- Recover Risk management framework (RMF) for information systems
- Prepare
- Categorize
- Select
- Implement
- Assess
- Authorize
- Monitor Cyber and privacy controls library Cybersecurity measures

Risk Management Framework for Information Systems [1]

| Prepare - Organization level | |
|---|---|
| P-1 | Risk management roles |
| P-2 | Risk management strategy |
| P-3 | Risk assessment - Organization |
| P-4 | Organizationally-tailored control baselines & cybersecurity framework profiles (optional) |
| P-5 | Common control identification |
| P-6 | Impact-level prioritization (optional) |
| P-7 | Continuous monitoring strategy – organization |
| **Prepare - System level** | |
| P-8 | Mission or business focus |
| P-9 | System stakeholders |
| P-10 | Asset identification |
| P-11 | Authorization boundary |
| P-12 | Information types |
| P-13 | Information lifecycle |
| P-14 | Risk assessment - System |
| P-15 | Requirements definition |
| P-16 | Enterprise architecture |
| P-17 | Requirements allocation |
| P-18 | System registration |

| Categorize | |
|---|---|
| C-1 | System description |
| C-2 | Security categorization |
| C-3 | Security categorization review & approval |
| **Select** | |
| S-1 | Control selection |
| S-2 | Control tailoring |
| S-3 | Control allocation |
| S-4 | Documentation of planned control implementations |
| S-5 | Continuous monitoring strategy – System |
| S-6 | Plan review & approval |
| **Implement** | |
| I-1 | Control implementation |
| I-2 | Update control implementation information |
| **Assess** | |
| A-1 | Assessor selection |
| A-2 | Assessment plan |
| A-3 | Control assessments |
| A-4 | Assessment reports |
| A-5 | Remediation actions |
| A-6 | Plan of action & milestones |

| Authorize | |
|---|---|
| R-1 | Authorization package |
| R-2 | Risk analysis & determination |
| R-3 | Risk response |
| R-4 | Authorization decision |
| R-5 | Authorization reporting |
| **Monitor** | |
| M-1 | System & environment changes |
| M-2 | Ongoing assessments |
| M-3 | Ongoing risk response |
| M-4 | Authorization package updates |
| M-5 | Security & privacy reporting |
| M-6 | Ongoing authorization |
| M-7 | System disposal |

5430

[1] NIST 800-37: Risk Management Framework for Information Systems and Organizations – A System Lifecycle Approach for Security and Privacy

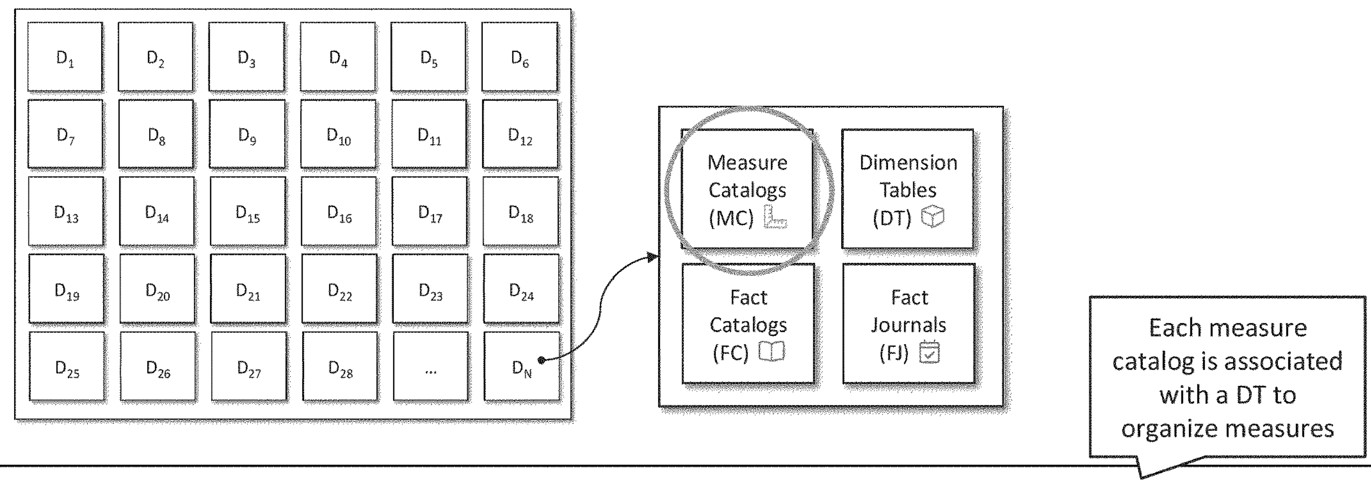

6500

CHORAL®

KNOWLEDGE GRID PART 2 = TABLES (TBL) + ATTRIBUTES(ATT) + RELATIONSHIPS (REL) + DATA SOURCE (SRC)

| Key | Domain | D_id | D_icon | T_icon | Table_Name | TBL_Type | TBL_id | Description | Attributes | Relationships |
|---|---|---|---|---|---|---|---|---|---|---|
| 1 | Financials | 1 | | | (MC_Financial_Measure) | MC | MC.1 | FINANCIAL DOMAIN MEASURES | (ID) (Name) (Overview) (Acronym) (Units) | (DT_Financial_Measure_Type) |
| 23 | Risk | 2 | | | (MC_Risk_Measure) | MC | MC.2 | RISK DOMAIN MEASURES | (ID) (Name) (Overview) (Acronym) (Units) | (DT_Risk_Measure_Type) |
| 37 | Organization | 3 | | | (MC_Organization_Measure) | MC | MC.3 | ORGANIZATION DOMAIN MEASURES | (ID) (Name) (Overview) (Acronym) (Units) | (DT_Organization_Measure_Type) |
| 54 | Objectives | 4 | | | (MC_Objective_Measure) | MC | MC.4 | OBJECTIVES DOMAIN MEASURES | (ID) (Name) (Overview) (Acronym) (Units) | (DT_Objective_Measure_Type) |
| 58 | Process | 5 | | | (MC_Process_Measure) | MC | MC.5 | PROCESS DOMAIN MEASURES | (ID) (Name) (Overview) (Acronym) (Units) | (DT_Process_Measure_Type) |
| 70 | Controls | 6 | | | (MC_Control_Measure) | MC | MC.6 | CONTROL DOMAIN MEASURES | (ID) (Name) (Overview) (Acronym) (Units) | (DT_Control_Mesure_Type) |
| 81 | Operations | 7 | | | (MC_Operations_Measure) | MC | MC.7 | OPERATIONS DOMAIN MEASURES | (ID) (Name) (Overview) (Acronym) (Units) | (DT_Operations_Measure_Type) |
| 83 | Customer | 8 | | | (MC_Customer_Measure) | MC | MC.8 | CUSTOMER DOMAIN MEASURES | (ID) (Name) (Overview) (Acronym) (Units) | (DT_Customer_Mesure_Type) |
| 101 | Brand | 9 | | | (MC_Brand_Measure) | MC | MC.9 | BRAND DOMAIN MEASURES | (ID) (Name) (Overview) (Acronym) (Units) | (DT_Brand_Measure_Type) |
| 114 | Product | 10 | | | (MC_Product_Measure) | MC | MC.10 | PRODUCT DOMAIN MEASURES | (ID) (Name) (Overview) (Acronym) (Units) | (DT_Product_Measure_Type) |
| 120 | Channel | 11 | | | (MC_Channel_Measure) | MC | MC.11 | CHANNEL DOMAIN MEASURES | (ID) (Name) (Overview) (Acronym) (Units) | (DT_Channel_Measure_Type) |
| 130 | Customer Journey | 12 | | | (MC_Customer_Journey_Measure) | MC | MC.12 | CUSTOMER JOURNEY DOMAIN MEASURES | (ID) (Name) (Overview) (Acronym) (Units) | (DT_Customer_Journey_Measure_Type) |
| 133 | Sales & Service | 13 | | | (MC_Sales_Measure) | MC | MC.13 | SALES & SERVICE DOMAIN MEASURES | (ID) (Name) (Overview) (Acronym) (Units) | (DT_Sales_&_Service_Measure_Type) |
| 136 | Technology | 14 | | | (MC_IT_Measure) | MC | MC.14 | IT DOMAIN MEASURES | (ID) (Name) (Overview) (Acronym) (Units) | (DT_IT_Measure_Type) |
| 162 | Data & Analytics | 15 | | | (MC_Data&Analytics_Measure) | MC | MC.15 | DATA & ANALYTICS DOMAIN MEASURES | (ID) (Name) (Overview) (Acronym) (Units) | (DT_Data&Analytics_Measure_Type) |
| 172 | Facilities | 16 | | | (MC_Facility_Measure) | MC | MC.16 | FACILITY DOMAIN MEASURES | (ID) (Name) (Overview) (Acronym) (Units) | (DT_Facility_Measure_Type) |
| 182 | ATM | 17 | | | (MC_ATM_Measure) | MC | MC.17 | ATM DOMAIN MEASURES | (ID) (Name) (Overview) (Acronym) (Units) | (DT_ATM_Measure_Type) |
| 189 | Supplier | 18 | | | (MC_Supplier_Measure) | MC | MC.18 | SUPPLIER DOMAIN MEASURES | (ID) (Name) (Overview) (Acronym) (Units) | (DT_Supplier_Measure_Type) |
| 202 | Cyber | 19 | | | (MC_Cyber_Measure) | MC | MC.19 | CYBER DOMAIN MEASURES | (ID) (Name) (Overview) (Acronym) (Units) | (DT_Cyber_Measure_Type) |
| 253 | Fraud | 20 | | | (MC_Fraud_Measure) | MC | MC.20 | FRAUD DOMAIN MEASURES | (ID) (Name) (Overview) (Acronym) (Units) | (DT_Fraud_Measure_Type) |
| 259 | AML | 21 | | | (MC_AML_Measure) | MC | MC.21 | AML DOMAIN MEASURES | (ID) (Name) (Overview) (Acronym) (Units) | (DT_AML_Measure_Type) |
| 277 | Audit | 22 | | | (MC_Audit_Measure) | MC | MC.22 | AUDIT DOMAIN MEASURES | (ID) (Name) (Overview) (Acronym) (Units) | (DT_Audit_Measure_Type) |
| 284 | Regulatory | 23 | | | (MC_Regulatory_Measure) | MC | MC.23 | REGULATORY DOMAIN MEASURES | (ID) (Name) (Overview) (Acronym) (Units) | (DT_Regulatory_Measure_Type) |
| 293 | Issue | 24 | | | (MC_Issue_Measure) | MC | MC.24 | ISSUE DOMAIN MEASURES | (ID) (Name) (Overview) (Acronym) (Units) | (DT_Issue_Measure_Type) |
| 298 | Initiative | 25 | | | (MC_Initiative_Measure) | MC | MC.25 | INITIATIVE DOMAIN MEASURES | (ID) (Name) (Overview) (Acronym) (Units) | (DT_Initiative_Measure_Type) |
| 307 | Innovation | 26 | | | (MC_Innovation_Measure) | MC | MC.26 | INNOVATION DOMAIN MEASURES | (ID) (Name) (Overview) (Acronym) (Units) | (DT_Innovation_Measure_Type) |
| 309 | M&A | 27 | | | (MC_M&A_Measure) | MC | MC.27 | M&A DOMAIN MEASURES | (ID) (Name) (Overview) (Acronym) (Units) | (DT_M&A_Measure_Type) |
| 320 | Economy | 28 | | | (MC_Economic_Measure) | MC | MC.28 | ECONOMIC DOMAIN MEASURES | (ID) (Name) (Overview) (Acronym) (Units) | (DT_Economic_Measure_Type) |
| 326 | Industry | 29 | | | (FC_Industry_Measure) | MC | MC.29 | INDUSTRY DOMAIN MEASURES | (ID) (Name) (Overview) (Acronym) (Units) | (DT_Industry_Measure_Type) |
| 328 | Competitor | 30 | | | (FC_Competitor_Measure) | MC | MC.30 | COMPETITOR DOMAIN MEASURES | (ID) (Name) (Overview) (Acronym) (Units) | (DT_Competitor_Measure_Type) |
| 337 | Location | 32 | | | (FC_Location_Measure) | MC | MC.31 | LOCATION DOMAIN MEASURES | (ID) (Name) (Overview) (Acronym) (Units) | (DT_Location_Measure_Type) |
| 343 | Unstructured data | 33 | | | (FC_Unstructured_Data_Measure) | MC | MC.32 | UNSTRUCTURED DATA DOMAIN MEASURES | (ID) (Name) (Overview) (Acronym) (Units) | (DT_Unstructured_Data_Measure_Type) |
| 352 | Platform | 34 | | | (FC_Platform_Measure) | MC | MC.33 | PLATFORM DOMAIN MEASURES | (ID) (Name) (Overview) (Acronym) (Units) | (DT_Platform_Measure_Type) |

FIG. 65

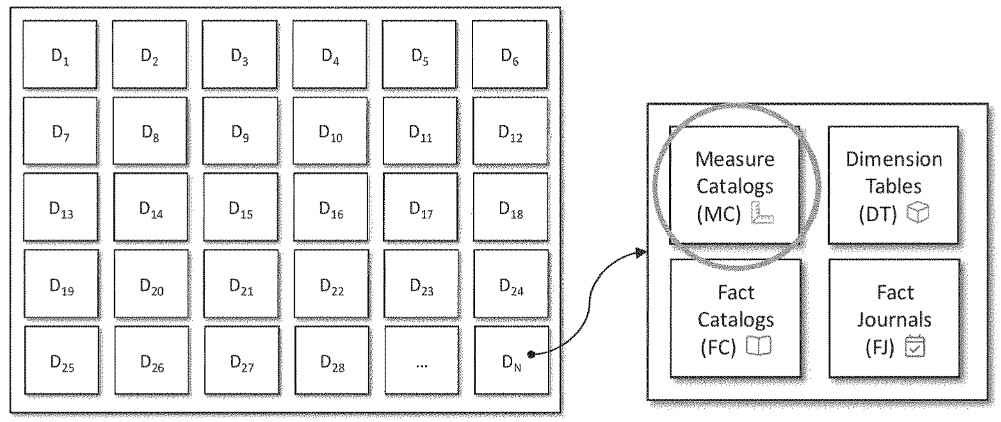

CHORAL

Example

KNOWLEDGE GRID PART 1 = MEASURES (ME)

| Key | Domain | D_id | Measure_Family | D_icon | Measure_Name | Acronym | Units | Table_Name(s) |
|---|---|---|---|---|---|---|---|---|
| 1 | Financials | 1 | Agency ratings | $ | DBRS rating | | Rating | (FJ_Other_Financial_Measure) |
| 2 | Financials | 1 | Agency ratings | $ | Fitch rating | | Rating | (FJ_Other_Financial_Measure) |
| 3 | Financials | 1 | Agency ratings | $ | Moody's rating | | Rating | (FJ_Other_Financial_Measure) |
| 4 | Financials | 1 | Agency ratings | $ | Standard & Poor's rating | | Rating | (FJ_Other_Financial_Measure) |
| 5 | Financials | 1 | AUA & AUM | $ | AUA & AUM ($CAD) | AUA/AUM | $CAD | (FJ_AUA-AUM) |
| 6 | Financials | 1 | Balance sheet | $ | # Deposit accounts | | # | (FJ_Enterprise_Financial_Ledger) |
| 7 | Financials | 1 | Balance sheet | $ | # Lending accounts | | # | (FJ_Enterprise_Financial_Ledger) |
| 8 | Financials | 1 | Balance sheet | $ | Acceptances ($CAD) | | $CAD | (FJ_Enterprise_Financial_Ledger) |
| 9 | Financials | 1 | Balance sheet | $ | Accumulated other comprehensive income ($CAD) | | $CAD | (FJ_Enterprise_Financial_Ledger) |
| 10 | Financials | 1 | Balance sheet | $ | Allowance for credit losses ($CAD) | | $CAD | (FJ_Enterprise_Financial_Ledger) |
| 11 | Financials | 1 | Balance sheet | $ | Average assets ($CAD) | | $CAD | (FJ_Enterprise_Financial_Ledger) |
| 12 | Financials | 1 | Balance sheet | $ | Average assets ($USD) | | $USD | (FJ_Enterprise_Financial_Ledger) |
| 13 | Financials | 1 | Balance sheet | $ | Average common shareholders' equity ($CAD) | | $CAD | (FJ_Enterprise_Financial_Ledger) |
| 14 | Financials | 1 | Balance sheet | $ | Average deposit account balance ($CAD) | | $CAD | (FJ_Enterprise_Financial_Ledger) |
| 15 | Financials | 1 | Balance sheet | $ | Average deposit account balance ($USD) | | $CAD | (FJ_Enterprise_Financial_Ledger) |
| 16 | Financials | 1 | Balance sheet | $ | Average deposits ($CAD) | | $CAD | (FJ_Enterprise_Financial_Ledger) |
| 17 | Financials | 1 | Balance sheet | $ | Average deposits ($USD) | | $USD | (FJ_Enterprise_Financial_Ledger) |
| 18 | Financials | 1 | Balance sheet | $ | Average earning assets ($CAD) | | $CAD | (FJ_Enterprise_Financial_Ledger) |
| 19 | Financials | 1 | Balance sheet | $ | Average earning assets ($USD) | | $USD | (FJ_Enterprise_Financial_Ledger) |
| 20 | Financials | 1 | Balance sheet | $ | Average gross loans & acceptances ($CAD) | GLA | $CAD | (FJ_Enterprise_Financial_Ledger) |
| 21 | Financials | 1 | Balance sheet | $ | Average gross loans & acceptances ($USD) | GLA | $USD | (FJ_Enterprise_Financial_Ledger) |
| 22 | Financials | 1 | Balance sheet | $ | Average lending account balance ($CAD) | | $CAD | (FJ_Enterprise_Financial_Ledger) |

FIG. 66A

Specify a measure catalog for each domain

Agency ratings
DBRS rating
Fitch rating
Moody's rating
Standard & Poor's rating
AUA & AUM
AUA & AUM ($CAD)
Balance sheet
Deposit accounts
Lending accounts
Acceptances ($CAD)
Accumulated other comprehensive income ($CAD)
Allowance for credit losses ($CAD)
Average assets ($CAD)
Average assets ($USD)
Average common shareholders' equity ($CAD)
Average deposit account balance ($CAD)
Average deposit account balance ($USD)
Average deposits ($CAD)
Average deposits ($USD)
Average earning assets ($CAD)
Average earning assets ($USD)
Average gross loans & acceptances ($CAD)
Average gross loans & acceptances ($USD)
Average lending account balance ($CAD)
Average lending account balance ($USD)
Average net loans & acceptances ($CAD)
Average net loans & acceptances ($USD)
Business & government loans ($CAD)
Cash & cash equivalents ($CAD)
Cash & securities to total assets ratio
Common shares ($CAD)
Consumer instalment and other personal loans ($CAD)
Contributed surplus ($CAD)

Interest & non-interest trading revenue
Other trading revenue ($CAD)
Total trading revenue ($CAD)
Total trading revenue, excluding teb offset ($CAD)
Trading revenue teb offset ($CAD)
Trading revenue, commodities ($CAD)
Trading revenue, equities ($CAD)
Trading revenue, foreign exchange ($CAD)
Trading revenue, interest rates ($CAD)
Trading revenue, net interest income ($CAD)
Trading revenue, non-interest revenue ($CAD)
Net income
Net income ($CAD)
Net income ($USD)
Net income attributable to Bank shareholders ($CAD)
Non-controlling interest in subsidiaries ($CAD)
Non-interest expense
Amortization of intangible assets ($CAD)
Business & capital taxes ($CAD)
Communications ($CAD)
Computer & equipment ($CAD)
Employee benefits ($CAD)
Employee compensation ($CAD)
Non-interest expense ($CAD)
Non-interest expense ($USD)
Other expenses ($CAD)
Performance based compensation ($CAD)
Premises & equipment ($CAD)
Premises, furniture & fixtures ($CAD)
Professional fees ($CAD)
Property taxes ($CAD)
Rental of real-estate ($CAD)
Salaries ($CAD)
Travel & business development ($CAD)

FIG. 66B

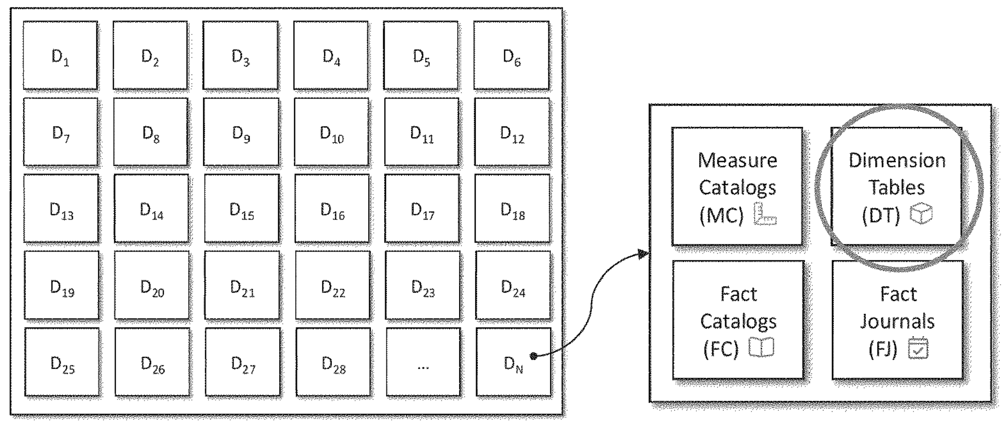

6700

CHORAL®

KNOWLEDGE GRID PART 2 = TABLES (TBL) + ATTRIBUTES(ATT) + RELATIONSHIPS (REL) + DATA SOURCE (SRC)

Example

| Key | Domain | D_id | D_icon | T_icon | Table_Name | TBL_Type | TBL_id | Description | Attributes | Relationships |
|---|---|---|---|---|---|---|---|---|---|---|
| 2 | Financials | 1 | $ | | (DT_Financial_Measure_Type) | DT | DT.1 | FINANCIAL MEASURE TYPES | (ID) (L1) (L2) (L3) (...) (Ln) (Overview) | (NIL) |
| 3 | Financials | 1 | $ | | (DT_Agency_Rating_Value) | DT | DT.2 | Credit agency rating values | (ID) (L1) (L2) (L3) (...) (Ln) (Overview) | (NIL) |
| 4 | Financials | 1 | $ | | (DT_AUA-AUM_Type) | DT | DT.3 | Type of AUA / AUM | (ID) (L1) (L2) (L3) (...) (Ln) (Overview) | (NIL) |
| 5 | Financials | 1 | $ | | (DT_Balance_Sheet_Hierarchy) | DT | DT.4 | Balance sheet structure | (ID) (L1) (L2) (L3) (...) (Ln) (Overview) | (NIL) |
| 6 | Financials | 1 | $ | | (DT_CCPB_Modifier) | DT | DT.5 | net of CCPB | (ID) (L1) (L2) (L3) (...) (Ln) (Overview) | (NIL) |
| 7 | Financials | 1 | $ | | (DT_Deparment_Node_Hierarchy) | DT | DT.6 | Department node hierarchy | (ID) (L1) (L2) (L3) (...) (Ln) (Overview) | (NIL) |
| 8 | Financials | 1 | $ | | (DT_Fin_Result_Type) | DT | DT.7 | Reported, adjusted, internal | (ID) (L1) (L2) (L3) (...) (Ln) (Overview) | (NIL) |
| 9 | Financials | 1 | $ | | (DT_Financial_Entry_Type) | DT | DT.8 | Plan, Actual, Forecast | (ID) (L1) (L2) (L3) (...) (Ln) (Overview) | (NIL) |
| 10 | Financials | 1 | $ | | (DT_G/L_Hierarchy) | DT | DT.9 | G/L structure | (ID) (L1) (L2) (L3) (...) (Ln) (Overview) | (NIL) |
| 11 | Financials | 1 | $ | | (DT_Legal_Entity_Hierarchy) | DT | DT.10 | Legal entities | (ID) (L1) (L2) (L3) (...) (Ln) (Overview) | (NIL) |
| 12 | Financials | 1 | $ | | (DT_Off_Balance_Item_Hierarchy) | DT | DT.11 | Off-balance sheet structure | (ID) (L1) (L2) (L3) (...) (Ln) (Overview) | (NIL) |
| 13 | Financials | 1 | $ | | (DT_Product_Category) | DT | DT.12 | Broad product categories | (ID) (L1) (L2) (L3) (...) (Ln) (Overview) | (NIL) |
| 14 | Financials | 1 | $ | | (DT_Products_&_Industries) | DT | DT.13 | Individual + Business/Gov segments | (ID) (L1) (L2) (L3) (...) (Ln) (Overview) | (NIL) |
| 15 | Financials | 1 | $ | | (DT_TEB_Modifier) | DT | DT.14 | Tax equivalent basis | (ID) (L1) (L2) (L3) (...) (Ln) (Overview) | (NIL) |
| 24 | Risk | 2 | ⚠ | | (DT_Risk_Measure_Type) | DT | DT.15 | RISK MEASURE TYPES | (ID) (L1) (L2) (L3) (...) (Ln) (Overview) | (NIL) |
| 25 | Risk | 2 | ⚠ | | (DT_Derivative_Market_Type) | DT | DT.16 | OTC, Exchange traded | (ID) (L1) (L2) (L3) (...) (Ln) (Overview) | (NIL) |
| 26 | Risk | 2 | ⚠ | | (DT_Derivative_Transaction_Type) | DT | DT.17 | Trading, Hedging | (ID) (L1) (L2) (L3) (...) (Ln) (Overview) | (NIL) |
| 27 | Risk | 2 | ⚠ | | (DT_Derivative_Type) | DT | DT.18 | Derivative product types | (ID) (L1) (L2) (L3) (...) (Ln) (Overview) | (NIL) |
| 28 | Risk | 2 | ⚠ | | (DT_Risk_Impact) | DT | DT.19 | Impact if occurs | (ID) (L1) (L2) (L3) (...) (Ln) (Overview) | (NIL) |
| 29 | Risk | 2 | ⚠ | | (DT_Risk_Likelihood) | DT | DT.20 | Likelihood of occurrence | (ID) (L1) (L2) (L3) (...) (Ln) (Overview) | (NIL) |
| 30 | Risk | 2 | ⚠ | | (DT_Risk_Type) | DT | DT.21 | Risk types | (ID) (L1) (L2) (L3) (...) (Ln) (Overview) | (NIL) |
| 38 | Organization | 3 | | | (DT_Organization_Measure_Type) | DT | DT.22 | ORGANIZATION MEASURE TYPES | (ID) (L1) (L2) (L3) (...) (Ln) (Overview) | (NIL) |
| 39 | Organization | 3 | | | (DT_Department_Tree) | DT | DT.23 | Department tree | (ID) (L1) (L2) (L3) (...) (Ln) (Overview) | (NIL) |

FIG. 67

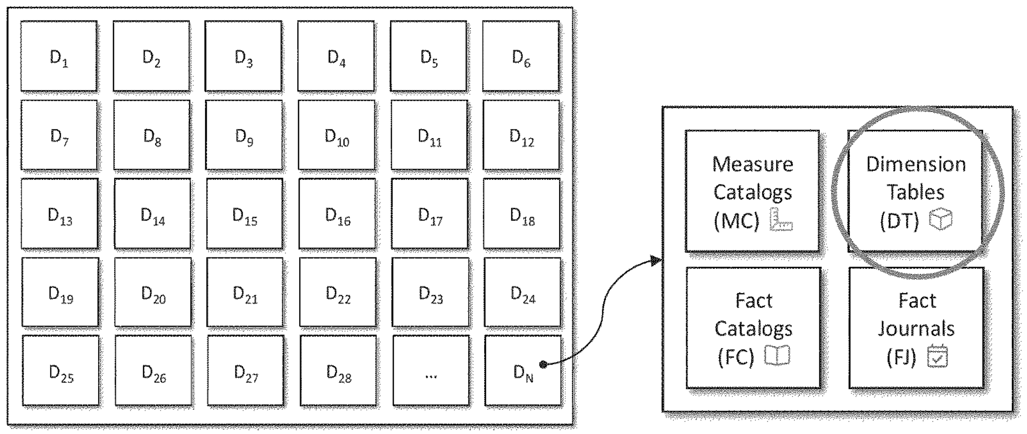

6800

CHORAL®

SELECTED DT SPECS

Example

| Key | Domain | id | Dimension Table (DT) | L1 | L2 | Overview |
|---|---|---|---|---|---|---|
| 35 | Risk | 2 | DT_Derivative_Tx_Type | Trading | | |
| 36 | Risk | 2 | DT_Derivative_Tx_Type | Hedging | | |
| 39 | Risk | 2 | DT_Derivative_Type | Interest rate contracts | Swaps | |
| 40 | Risk | 2 | DT_Derivative_Type | Interest rate contracts | Forward rate agreements | |
| 41 | Risk | 2 | DT_Derivative_Type | Interest rate contracts | Futures | |
| 42 | Risk | 2 | DT_Derivative_Type | Interest rate contracts | Purchased options | |
| 43 | Risk | 2 | DT_Derivative_Type | Interest rate contracts | Written options | |
| 44 | Risk | 2 | DT_Derivative_Type | Foreign exchange contracts | Cross-currency swaps | |
| 45 | Risk | 2 | DT_Derivative_Type | Foreign exchange contracts | Cross-currency interest rate swaps | |
| 46 | Risk | 2 | DT_Derivative_Type | Foreign exchange contracts | Forward foreign exchange contracts | |
| 47 | Risk | 2 | DT_Derivative_Type | Foreign exchange contracts | Purchased options | |
| 48 | Risk | 2 | DT_Derivative_Type | Foreign exchange contracts | Written options | |
| 49 | Risk | 2 | DT_Derivative_Type | Commodity contracts | Swaps | |
| 50 | Risk | 2 | DT_Derivative_Type | Commodity contracts | Futures | |
| 51 | Risk | 2 | DT_Derivative_Type | Commodity contracts | Purchased options | |
| 52 | Risk | 2 | DT_Derivative_Type | Commodity contracts | Written options | |
| 53 | Risk | 2 | DT_Derivative_Type | Equity contracts | | |
| 54 | Risk | 2 | DT_Derivative_Type | Credit default swaps | Purchased | |
| 55 | Risk | 2 | DT_Derivative_Type | Credit default swaps | Written | |

Brief description of each dimension

FIG. 68

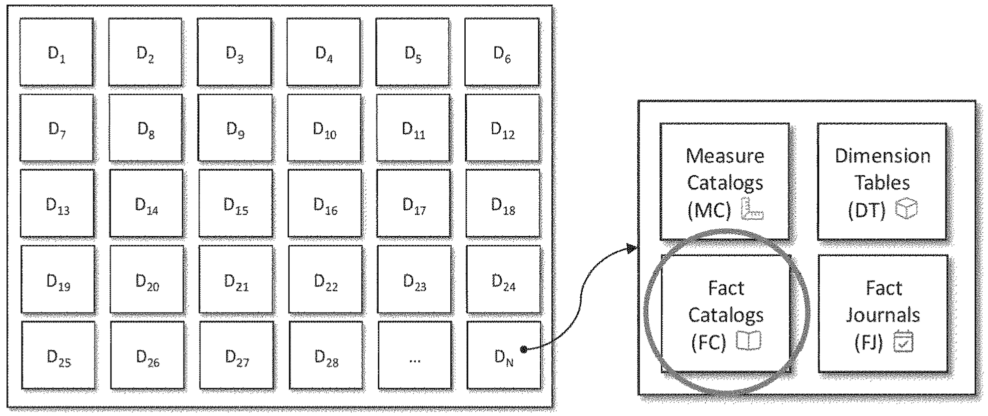

6900

Example

CHORAL®

KNOWLEDGE GRID PART 2 - TABLES (TBL) + ATTRIBUTES(ATT) + RELATIONSHIPS (REL) + DATA SOURCE (SRC)

| Key | Domain | D_id | D_icon | T_icon | Table_Name | TBL_Type | TBL_id | Description | Attributes | Relationships | Data_Source |
|---|---|---|---|---|---|---|---|---|---|---|---|
| 31 | Risk | 2 | | | (FC_Top_Line-Emerging_Risk) | FC | FC.1 | Catalog : Top line & emerging risks | (ID) (Name) (Overview) | (DT_Risk_Type) (DT_Risk_Likelihood) (DT_Risk_Impact) | |
| 48 | Organization | 3 | | | (FC_Contractor) | FC | FC.2 | Catalog : Contractors | (ID) (Name) (Overview) | (DT_Organization_Unit) (DT_Resource_Type) (DT_Job_Family) (DT_HR_Cost_Band) | |
| 49 | Organization | 3 | | | (FC_Employee) | FC | FC.3 | Catalog : Employees | (ID) (Name) (Overview) | (DT_Grade_Level) | |
| 50 | Organization | 3 | | | (FC_Global_Resource) | FC | FC.4 | Catalog : Global resources | (ID) (Name) (Overview) | (DT_Organization_Unit) (DT_Resource_Type) (DT_Job_Family) (DT_HR_Cost_Band) | |
| 57 | Objectives | 4 | | | (FC_Objective) | FC | FC.5 | Catalog : Objectives | (ID) (Name) (Overview) | (DT_Organization_Unit) | |
| 65 | Process | 5 | | | (FC_Bank_Process_Leader) | FC | FC.6 | Catalog : Business process leaders | (ID) | (FC_Employee) (DT_Process_Type) | |
| 66 | Process | 5 | | | (FC_Process) | FC | FC.7 | Catalog : Business processes | (ID) (Name) (Overview) | (DT_Organization_Unit) (DT_Process_Type) | |
| 67 | Process | 5 | | | (FC_Process_Workflow) | FC | FC.8 | Catalog : Process workflow diagrams | (ID) (Name) (Overview) | (FC_Process) | |
| 78 | Controls | 6 | | | (FC_Bank_Control_Leader) | FC | FC.9 | Catalog : Control leaders | (ID) | (FC_Employee) (FC_Control) | |
| 79 | Controls | 6 | | | (FC_Control) | FC | FC.10 | Catalog : Controls | (ID) (Name) (Overview) | (DT_Organization_Unit) (DT_Control_Strata) (Control_Automation) | |
| 87 | Customer | 8 | | | (FC_Account_Biz-Gov_Deposit) | FC | FC.11 | Catalog : Business/government deposit accounts | (ID) | (DT_Organization_Unit) (DT_Account_Type) (DT_Product_Type) (FC_Customer_Entity) | |
| 88 | Customer | 8 | | | (FC_Account_Biz-Gov_Loan) | FC | FC.12 | Catalog : Business/government loand accounts | (ID) | (DT_Organization_Unit) (DT_Account_Type) (DT_Product_Type) (FC_Customer_Entity) | |
| 89 | Customer | 8 | | | (FC_Account_Consumer_Loan) | FC | FC.13 | Catalog : Consumer loand accounts | (ID) | (DT_Organization_Unit) (DT_Account_Type) (DT_Product_Type) (FC_Customer_Individual) | |
| 90 | Customer | 8 | | | (FC_Account_Credit-Card) | FC | FC.14 | Catalog : Credit card accounts | (ID) | (FC_Customer_Entity) | |
| 91 | Customer | 8 | | | (FC_Account_Individual_Deposit) | FC | FC.15 | Catalog : Personal deposit accounts | (ID) | (DT_Organization_Unit) (DT_Account_Type) (DT_Product_Type) (FC_Customer_Individual) | |
| 92 | Customer | 8 | | | (FC_Account_Mortgage) | FC | FC.16 | Catalog : Mortage accounts | (ID) | (DT_Organization_Unit) (DT_Account_Type) (DT_Product_Type) (FC_Customer_Individual) | |
| 93 | Customer | 8 | | | (FC_Account) | FC | FC.17 | Catalog : All accounts | (ID) | (FC_Customer_Individual) (FC_Customer_Entity) | |
| 94 | Customer | 8 | | | (FC_Customer_Entity) | FC | FC.18 | Catalog : Entity customers | (ID) (Name) (Overview) | (DT_Customer_Segment) | |
| 95 | Customer | 8 | | | (FC_Customer_Individual) | FC | FC.19 | Catalog : Individual customer | (ID) (Name) (Overview) | (DT_Customer_Segment) | |
| 105 | Brand | 9 | | | (FC_Advertising_Campaign) | FC | FC.20 | Catalog : Selected advertising campaigns | (ID) (Name) (Overview) | (FC_Competitor) | |
| 106 | Brand | 9 | | | (FC_Brand) | FC | FC.21 | Catalog : Selected brands, internal / external | (ID) (Name) (Overview) | (FC_Competitor) | |
| 107 | Brand | 9 | | | (FC_Marketing_Asset) | FC | FC.22 | Catalog : Marketing assets (e.g. basketball, ...) | (ID) (Name) (Overview) | (FC_Competitor) | |
| 117 | Product | 10 | | | (FC_Bank_Product_Leader) | FC | FC.23 | Catalog : Product leaders | (ID) | (FC_Employee) (DT_Product_Type) | |
| 118 | Product | 10 | | | (FC_Product) | FC | FC.24 | Catalog : Products | (ID) (Name) (Overview) | (DT_Product_Type) (DT_Organization_Unit) | |
| 142 | Technology | 14 | | | (FC_Application_BMA) | FC | FC.25 | Catalog : Applications, business managed | (ID) (Name) (Overview) | (DT_Organization_Unit) (DT_IT_Asset_Type) | |
| 143 | Technology | 14 | | | (FC_Application_TMA) | FC | FC.26 | Catalog : Applications, technology managed | (ID) (Name) (Overview) | (DT_Organization_Unit) (DT_IT_Asset_Type) | |
| 144 | Technology | 14 | | | (FC_Bank_IT_Asset_Leader) | FC | FC.27 | Catalog : IT asset leaders | (ID) | (FC_Employee) (DT_IT_Asset_Type) | |
| 145 | Technology | 14 | | | (FC_Computing_Asset) | FC | FC.28 | Catalog : Computing assets | (ID) | (DT_IT_Asset_Type) (DT_Organization_Unit) (FC_Harware_Supplier-Version) | |
| 146 | Technology | 14 | | | (FC_Database_Asset) | FC | FC.29 | Catalog : Databases | (ID) | (DT_IT_Asset_Type) (DT_Organization_Unit) (FC_Software_Supplier-Version) | |
| 147 | Technology | 14 | | | (FC_Endpoint_Device) | FC | FC.30 | Catalog : Endpoint devices | (ID) | (DT_IT_Asset_Type) (DT_Organization_Unit) (FC_Hardware_Supplier-Version) | |
| 148 | Technology | 14 | | | (FC_Facility) | FC | FC.31 | Catalog : Facilities | (ID) (Name) (Overview) | (DT_Facility_Type) (DT_Organization_Unit) | |
| 149 | Technology | 14 | | | (FC_Hardware_Supplier-Version) | FC | FC.32 | Catalog : hardware suppliers & versions | (ID) (Version) | (FC_Supplier_Entity) | |

FIG. 69

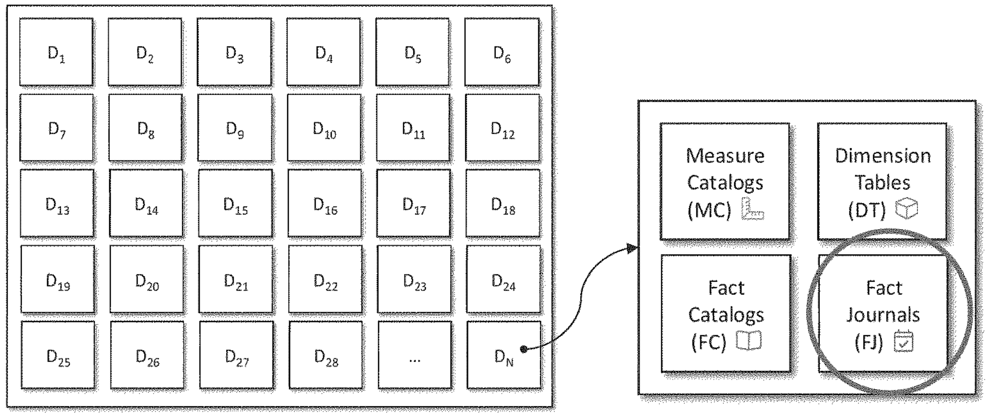

Example

7000

CHORAL®

KNOWLEDGE GRID PART 2 = TABLES (TBL) + ATTRIBUTES(ATT) + RELATIONSHIPS (REL) + DATA SOURCE (SRC)

| Key | Domain | D_id | D_icon | T_icon | Table_Name | TBL_Type | TBL_id | Description | Attributes | Relationships | Data_Source |
|---|---|---|---|---|---|---|---|---|---|---|---|
| 16 | Financials | 1 | $ | | (FJ_AUA-AUM) | FJ | FJ.1 | Data : AUA & AUM | (ID) (Value) | (DT_AUA-AUM_Type) (FC_Financial_Measure) (DT_Period) | |
| 17 | Financials | 1 | $ | | (FJ_Enterprise_Financial_Ledger) | FJ | FJ.2 | Data : Income statement & balance sheet | (ID) (Value) | (DT_CCPB_Modifier) (DT_Financial_Entry_Type) (DT_G/L_Hierarchy) (DT_Product_Category) | |
| 18 | Financials | 1 | $ | | (FJ_Financial_Growth-Profitability) | FJ | FJ.3 | Data : Growth & profitability | (ID) (Value) | (FC_Financial_Measure) (DT_Period) | |
| 19 | Financials | 1 | $ | | (FJ_Fixed_Asset_Ledger) | FJ | FJ.4 | Data : Depreciation & fixed assets | (ID) (Value) | (FC_Financial_Measure) (DT_Off_Balance_Item_Hierarchy) (DT_Period) | |
| 20 | Financials | 1 | $ | | (FJ_Off-Balance-Sheet) | FJ | FJ.5 | Data : Off-balance sheet | (ID) (Value) | (FC_Financial_Measure) (DT_Period) | |
| 21 | Financials | 1 | $ | | (FJ_Other_Financial_Measure) | FJ | FJ.6 | Data : Other financial measures | (ID) (Value) | (FC_Financial_Measure) (DT_Period) | |
| 22 | Financials | 1 | $ | | (FJ_Shares-Dividend) | FJ | FJ.7 | Data : Shares & dividend | (ID) (Value) | (FC_Financial_Measure) (DT_Period) | |
| 32 | Risk | 2 | ⚠ | | (FJ_Capital-Liquidity) | FJ | FJ.8 | Data : Capital & liquidity | (ID) (Value) | (FC_Risk_Measure) (DT_Period) | |
| 33 | Risk | 2 | ⚠ | | (FJ_Credit-Risk) | FJ | FJ.9 | Data : Credit risk | (ID) (Value) | (FC_Risk_Measure) (DT_Period) | |
| 34 | Risk | 2 | ⚠ | | (FJ_Derivative) | FJ | FJ.10 | Data : Derivatives | (ID) (Value) | (FC_Risk_Measure) (DT_Period) | |
| 35 | Risk | 2 | ⚠ | | (FJ_Top_Line-Emerging_Risk) | FJ | FJ.11 | Data : Top-line & emerging risks | (ID) (Value) | (FC_Top_Line-Emerging_Risk) (DT_Period) | |
| 36 | Risk | 2 | ⚠ | | (FJ_Value_At_Risk) | FJ | FJ.12 | Data : Value at Risk | (ID) (Value) | (FC_Risk_Measure) (DT_Period) | |
| 51 | Organization | 3 | | | (FJ_Contractor) | FJ | FJ.13 | Data : Contractors | (ID) (Value) | (FC_Contractor) | |
| 52 | Organization | 3 | | | (FJ_Employee) | FJ | FJ.14 | Data : Employees | (ID) (Value) | (DT_Period) | |
| 53 | Organization | 3 | | | (FJ_Global_Resource) | FJ | FJ.15 | Data : Global resources | (ID) (Value) | (DT_Period) | |
| 68 | Process | 5 | | | (FJ_Process-FTE-Cost) | FJ | FJ.16 | Data : FTE and cost by process | (ID) (Value) | (DT_Period) | |
| 69 | Process | 5 | | | (FJ_Process-Transaction) | FJ | FJ.17 | Data : Process transactions | (ID) (Value) | (DT_Period) | |
| 80 | Controls | 6 | | | (FJ_Control_Status) | FJ | FJ.18 | Data : Control Effectiveness | (ID) (Value) | (DT_Period) | |
| 96 | Customer | 8 | | | (FJ_Account-Biz-Gov-Deposit) | FJ | FJ.19 | Data : Business/government deposit accounts | (ID) (Value) | (DT_Period) | |
| 97 | Customer | 8 | | | (FJ_Account-Consumer-Loan) | FJ | FJ.20 | Data : Consumer loan accounts | (ID) (Value) | (DT_Period) | |
| 98 | Customer | 8 | | | (FJ_Account-Credit_Card) | FJ | FJ.21 | Data : Credit card accounts | (ID) (Value) | (DT_Period) | |
| 99 | Customer | 8 | | | (FJ_Account-Individual-Deposit) | FJ | FJ.22 | Data : Personal deposit accounts | (ID) (Value) | (DT_Period) | |
| 100 | Customer | 8 | | | (FJ_Account-Mortgage) | FJ | FJ.23 | Data : Mortgage accounts | (ID) (Value) | (DT_Period) | |
| 108 | Brand | 9 | ® | | (FJ_Brand_Impressions) | FJ | FJ.24 | Data : Brand impressions | (ID) (Value) | (DT_Period) | |
| 109 | Brand | 9 | ® | | (FJ_Cost_Per_Lead-Action) | FJ | FJ.25 | Data : Cost per lead, Cost per action | (ID) (Value) | (DT_Period) | |
| 110 | Brand | 9 | ® | | (FJ_Marketing_Spend) | FJ | FJ.26 | Data : Marketing spend | (ID) (DT_Period) (Value) | (DT_Marketing_Spend_Type) | |
| 111 | Brand | 9 | ® | | (FJ_Share_of_Media&Voice) | FJ | FJ.27 | Data : Share of media/voice vs competitors | (ID) (DT_Period) (Value) | (DT_Media_Type) | |
| 112 | Brand | 9 | ® | | (FJ_Social_Media_Ranking) | FJ | FJ.28 | Data : Social media ranking (Facebook, ...) | (ID) (DT_Period) (Value) | (FC_Competitor) | |
| 113 | Brand | 9 | ® | | (FJ_Unique_Clicks) | FJ | FJ.29 | Data : Unique clicks | (ID) (Value) | (DT_Period) | |

```
/*
 * TABLE: Account
 */

CREATE TABLE Account(
   [Account ID]      char(10)    NOT NULL,
   [Account Number]  char(10)    NULL,
   [Account Type ID] char(10)    NOT NULL,
   [Product ID]      char(10)    NOT NULL,
   [User Account ID] char(10)    NOT NULL,
   CONSTRAINT PK282 PRIMARY KEY NONCLUSTERED ([Account ID])
)
go


IF OBJECT_ID('Account') IS NOT NULL
   PRINT '<<< CREATED TABLE Account >>>'
ELSE
   PRINT '<<< FAILED CREATING TABLE Account >>>'
go

/*
 * TABLE: [Account Type]
 */

CREATE TABLE [Account Type](
   [Account Type ID] char(10)    NOT NULL,
   L1            char(10)    NULL,
   L2            char(10)    NULL,
   L3            char(10)    NULL,
   L4            char(10)    NULL,
   Ln            char(10)    NULL,
   Overview      char(10)    NULL,
   CONSTRAINT PK297 PRIMARY KEY NONCLUSTERED ([Account Type ID])
)
go
```

```
: [Acquisition Target Digital Channel]
 */

CREATE TABLE [Acquisition Target Digital Channel](
   [Acquisition Target Digital Channel ID]  char(10)    NOT NULL,
   [Acquisition Target ID]                  char(10)    NOT NULL,
   Name                                     char(10)    NULL,
   Overview                                 char(10)    NULL,
   CONSTRAINT PK381 PRIMARY KEY NONCLUSTERED ([Acquisition Target Digital Channel ID])
)
go


IF OBJECT_ID('Acquisition Target Digital Channel') IS NOT NULL
   PRINT '<<< CREATED TABLE Acquisition Target Digital Channel >>>'
ELSE
   PRINT '<<< FAILED CREATING TABLE Acquisition Target Digital Channel >>>'
go

/*
 * TABLE: Address
 */

CREATE TABLE Address(
   [Address ID]              char(10)    NOT NULL,
   [Location ID]             char(10)    NOT NULL,
   [Facility ID]             char(10)    NOT NULL,
   [ATM ID]                  char(10)    NOT NULL,
   [Competitor Branch ID]    char(10)    NOT NULL,
   [Competitor ATM ID]       char(10)    NOT NULL,
   [Building Number]         char(10)    NULL,
   [Street Name]             char(10)    NULL,
   Neighborhood              char(10)    NULL,
   City                      char(10)    NULL,
   [Postal Code / Zip Code]  char(10)    NULL,
   [Additional Numbers]      char(10)    NULL,
   Longitude                 char(10)    NULL,
   Latitude                  char(10)    NULL,
   CONSTRAINT PK241 PRIMARY KEY NONCLUSTERED ([Address ID])
)
go
```

FIG. 71

Configuration method

| Step | Description |
|---|---|
| UC-1 | Disaggregate the in-scope knowledge into a set of **domains** |
| UC-2 | Specify **use cases** along with the required relationships across domains |
| KG-1 | Specify a **measure catalog** for each domain |
| KG-2 | Specify **dimension tables** for each domain |
| KG-3 | Specify **fact catalogs** for each domain |
| KG-4 | Specify an **unstructured data catalog** for each domain |
| KG-5 | Specify **fact journals** for each domain |
| KG-6 | Build an **entity relationship model** |
| KG-7 | Translate the entity relationship model into a **physical data model** |
| DA-1 | **One-time data load** to enable teams to configure the system |
| DA-2 | Build the **data pipeline** |
| UC-3 | Configure the **Choral user interface**: navigation, visualization, collaboration |
| UC-4 | Build **analytic features** using the knowledge grid & platform features |
| UC-5 | **Iterate** & **refine** the system by repeating steps in the Choral method |

Prototype then scale

The platform

A solution library
Detailed information & analysis solution examples with components for rapid assembly.

User interface components
UI components for search, exploration, analysis, visualization and collaboration.

Data grid components
Data model components to organize information.

A rapid implementation methodology & authoring tools
Configuration files and tools to create: use-cases, domains, the data grid and user interfaces.

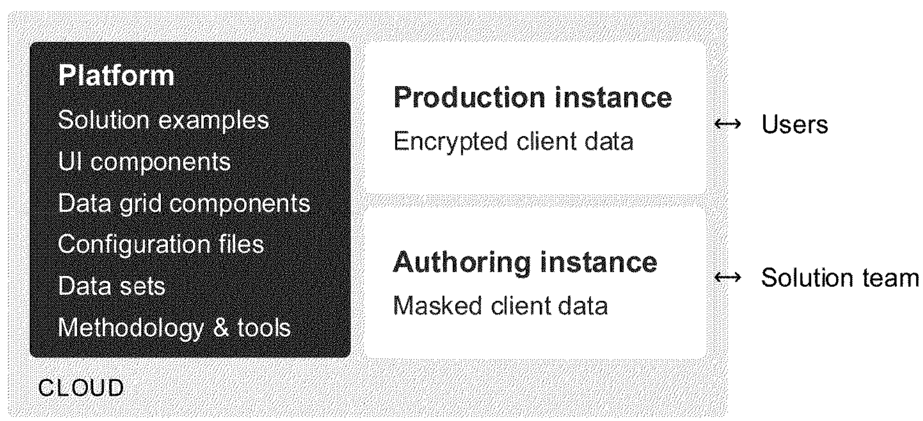

FIG. 81A

Solution library

Use cases
Use cases combine information, logic and analysis from two or more domains to solve a problem.

Domains
Domains contain information and analysis related to an area of expertise.

Elements
Elements are standard data structures used to assemble domains.

FIG. 81B

Domains (1 of 2)

Domains contain information and analysis related to an area of expertise.

| | |
|---|---|
| $ **Financials** | Income statement, growth, profitability, non-interest revenue, non-interest expense, balance sheet, credit risk financial measures, derivative instruments, shares, dividends, bank information, statistical information |
| **Risk** | Top-line risks, emerging risks, key risk indicators & tolerances, market risk, credit risk, liquidity & funding risk, operational risk, other risks |
| **Economy** | Population, GDP, interest rates, inflation, employment, housing, consumer spending, business investment, foreign trade, financial markets, resource prices |
| **Competitors** | Total assets, income statement, balance sheet, credit quality, shares & dividend, branch network, ATM network |
| **Customers** | Number of customers, number of accounts, net promoter score, customer segments |
| **Sales** | Unit sales, sales revenue gross, sales revenue adjusted, opening balances |
| ® **Brands** | Marketing spend, media share, share of voice, social media, clicks & impressions |
| **Products** | Spreads, number of accounts, income statement, balance sheet |
| **Channels** | Channel types, count, costs, transactions, efficiency |
| **Locations** | Geographic-based information › population, economic indicators, customers, competitors, organization, branches, ATMs, offices, financials, risk |
| **Organization** | Structure, headcount, costs, cost/FTE, skills, organization units, job families |

FIG. 81C

Domains (2 of 2)

Domains contain information and analysis related to an area of expertise.

| | |
|---|---|
| **Technology** | Financials, organization, applications, infrastructure, operations, initiatives, cybersecurity, audit & regulatory, strategy |
| **Cybersecurity** | Background, NIST, IT assets ( applications, infrastructure, accounts, ATMs), enterprise ( organization, suppliers, facilities ), CISO ( financials, threat landscape, operational measures, controls ), risk assessment, improvement method |
| **Processes** | Process catalog, process KPIs ( FTEs, costs, efficiency, quality, cycle-time ) |
| **Suppliers** | Supplier spend, employee discretionary spend, managed supplier relationships |
| **Facilities** | Number of facilities, costs, area, number of occupants, facility types ( branch, office, critical facilities ) |
| **Operations** | Operational performance measures › channels, technology, product operations, financial crimes, suppliers, facilities |
| **Initiatives** | Count, investments, benefits, execution status, initiative types ( technology, cybersecurity, transformation, other ) |
| **M&A** | Market information, M&A projects by phase, acquisition integration projects ( investments, benefits, execution status ), M&A project archive, competitor M&A |
| **Audit & regulatory** | Regulators, regulations, ratings ( audit, regulatory ), issues ( audit, regulatory ) |
| **Financial crimes** | Fraud ( compromised cards, fraud events, fraud loss incidents, fraud losses ), AML ( enterprise KPIs, know your customer, transaction monitoring, watch list management, mandatory reporting & monitoring ) |
| **Objectives** | Enterprise objectives, performance versus objectives |

FIG. 81D

ⓘ Elements

Elements are standard data structures used to assemble domains.

| | |
|---|---|
| **Views** | Views are containers for all types of information: structured and unstructured. Structured information may be displayed using charts and graphs while unstructured information may be displayed in a document or media reader. |
| **Measures** | Measures quantify the size, amount or degree of something using standard units. |
| **Dimensions** | Dimensions describe the attributes of: measures, items, transactions & events. |
| **Catalogs** | Catalogs are lists of people, things or abstract concepts. |
| **Transactions** | Transactions and events describe something that happens at a point in time. |
| **Relationships** | Relationships exist between elements. For example: catalog to dimension; transaction to catalog; transaction to dimension. |
| **Unstructured data** | Unstructured data includes: documents, photos, videos, diagrams and audio files. |
| **Navigation data** | Navigation data describes paths to reach items in the data grid. |
| **Glossary** | A glossary includes definition of terms from across all domains. |

FIG. 81E

User interface components

Search & exploration
Unstructured search and voice interface along with menus, paths, visual indices, reader and other widgets to explore the data grid.

Visualization
Table, charts ( pie, bar, line ), geomap, matrix, media viewer and other widgets to visualize data and information

Analysis
Pivot, filter, drilldown along with mental models for conceptual analysis, methods to describe problem solving steps and algorithms for automatic analysis.

Collaboration
Share views, threaded discussions, create summaries with views and narrative, export data to Excel and summaries to Power Point.

FIG. 81F

Data grid

Description

The Data Grid is a standardized data model.

Conceptually, the Data Grid consists of: Domains, Elements and Use Cases.

Domains contain information and analysis related to an area of expertise.

A team of experts governs the information in each Domain across the enterprise.

Each Domain is assembled using standard Elements.

Domains may be assembled sequentially or in parallel.

The information in each Domain is extensible and may be refined as requirements evolve.

Use cases are assembled by combining information and analysis from multiple Domains.

Benefits

Data model standardization results in several benefits:

A common language for the enterprise: measures, dimensions, views, mental models, methods.

Ability to create a unified view of information across the enterprise.

Ability to solve problems requiring information from across multiple Domains.

Faster implementation and simplified maintenance.

Ability to automate analysis.

Components

| Use cases | Domains | | Elements |
|---|---|---|---|
| Bank productivity | Financials | Technology | Views |
| Transformation | Risk | Cybersecurity | Measures |
| Technology | Economy | Processes | Dimensions |
| Cybersecurity | Competitors | Suppliers | Catalogs |
| Customer experience | Customers | Facilities | Transactions |
| Operational excellence | Sales | Operations | Relationships |
| Risk management | Brands | Initiatives | Unstructured data |
| | Products | M&A | Navigation data |
| | Channels | Audit & regulatory | Glossary |
| | Locations | Financial crimes | |
| | Organization | Objectives | |

FIG. 81G

Methodology

Overview

The Platform is implemented in two phases:

First, a base solution is rapidly assembled. The following features help teams accelerate phase 1 implementation:

- Detailed solution examples.
- Excel configuration files: menus, views.
- Excel solution data sets: dimensions, catalogs, transactions & events, unstructured data.

The following features help teams accelerate phase 1 implementation:

- A configurator to create views of data sets.
- Using Excel enables domain experts to directly specify the solution.

Second, an extended solution is assembled by adding a data pipeline (adapters, ETL, APIs).

The phase 1 solution provides clear specifications for IT/data teams who build the data pipeline.

Base solution configuration

A base solution is configured by adapting the examples & templates in the library.

Examples include: menus, views and sample data sets for Domains and Use cases.

Configuration files and sample data sets are tailored using Excel.

Additional views may be created using the view configurator.

Extended solution configuration

Once the base solution is refined by the solution team, an extended solution may be configured.

A data pipeline is created with adapters, ETL and APIs.

Data refresh rates are adapted to enterprise needs using batch and/or streaming methods.

Platform

The platform is available in the cloud.

Two instances are created for the client: authoring and production.

The authoring instance enables a broader solution team to configure and refine a solution using masked client data.

The solution configuration is refined iteratively to systematically deliver improvements.

Once a configuration update is completed and tested, it is moved to the production instance.

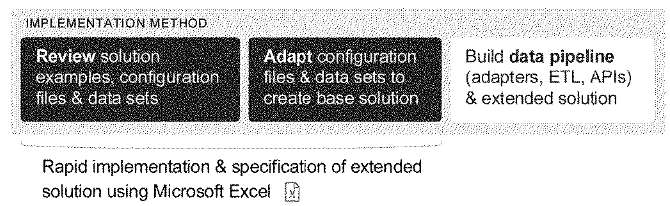

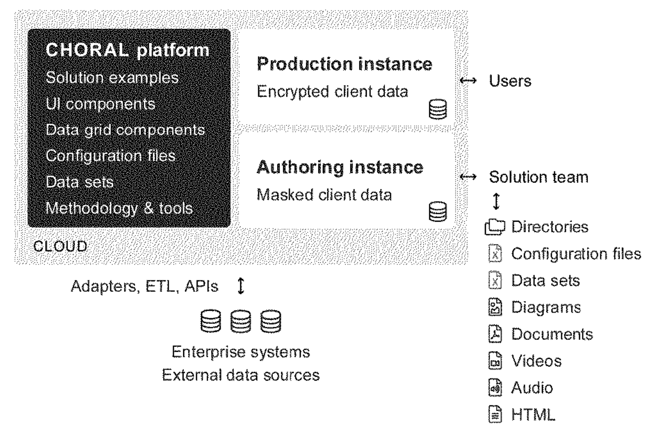

FIG. 81H

The first step in assembling a solution is to select one or a set of Domains.

Each domain may be assembled separately. A domain may be assembled gradually by adding measures, dimensions, transactions and unstructured in phases.

Domains information may be combined in use-cases to solve problems.

$ Financials Domain

Description

The financial domain contains information and analysis to understand and manage bank financial performance.
Information is available for the total bank, operating groups, lines of business, technology & operations and corporate functions.

Information
- Income statement ( Adjusted )
- Growth
- Profitability
- Non-interest revenue
- Non-interest expense ( Adjusted )
- Balance sheet
- Credit risk financial measures
- Derivatives
- Shares
- Dividend
- Bank information
- Statistical information

Organization Units
- Total Bank
- Personal & Commercial ( LOB $_{1\text{-}n}$ )
- Wealth Management ( LOB $_{1\text{-}n}$ )
- Capital Markets ( LOB $_{1\text{-}n}$ )
- Corporate ( Function $_{1\text{-}n}$ )
- T&O ( Function $_{1\text{-}n}$ )

Configuration & data files
- Menus
- Views
- f(x) Analysis
- Measures
- Dimensions
- Catalogs
- Transactions
- Relationships
- Unstructured data
- Navigation data
- Glossary

| | 2017 | | 2018 | | | | | 2019 | | | | |
|---|---|---|---|---|---|---|---|---|---|---|---|---|
| | Q4 | Fiscal | Q1 | Q2 | Q3 | Q4 | Fiscal | Q1 | Q2 | Q3 | Q4 | Fiscal |
| · Total bank consolidated | | | | | | | | | | | | |
| Net interest income | 2,865 | 11,275 | 2,875 | 2,666 | 2,882 | 3,015 | 11,438 | 3,172 | 3,135 | 3,217 | 3,364 | 12,888 |
| Non-interest revenue | 2,749 | 10,832 | 2,763 | 2,914 | 2,912 | 2,878 | 11,467 | 3,345 | 3,078 | 3,449 | 2,723 | 12,595 |
| Total revenue | 5,614 | 22,107 | 5,638 | 5,580 | 5,794 | 5,893 | 22,905 | 6,517 | 6,213 | 6,666 | 6,087 | 25,483 |
| · Total PCL | 202 | 746 | 141 | 160 | 186 | 175 | 662 | 137 | 176 | 306 | 253 | 872 |
| PCL on impaired loans | | | 174 | 172 | 177 | 177 | 700 | 127 | 150 | 243 | 231 | 751 |
| PCL on performing loans | | | (33) | (12) | 9 | (2) | (38) | 10 | 26 | 63 | 22 | 121 |
| NII & NIR, net of PCL | 5,412 | 21,361 | 5,497 | 5,420 | 5,608 | 5,718 | 22,243 | 6,380 | 6,037 | 6,360 | 5,834 | 24,611 |
| · Insurance claims, commissions & changes | | | | | | | | | | | | |
| in policy benefit liabilities (CCPB) | 573 | 1,538 | 361 | 332 | 269 | 390 | 1,352 | 926 | 561 | 887 | 335 | 2,709 |
| Non-interest expense | 3,339 | 13,192 | 3,400 | 3,525 | 3,359 | 3,193 | 13,477 | 3,557 | 3,595 | 3,491 | 3,987 | 14,630 |
| Income before taxes | 1,500 | 6,631 | 1,736 | 1,563 | 1,980 | 2,135 | 7,414 | 1,897 | 1,881 | 1,982 | 1,512 | 7,272 |
| Provision for income taxes | 276 | 1,292 | 763 | 317 | 443 | 438 | 1,961 | 387 | 384 | 425 | 318 | 1,514 |
| Net income | 1,224 | 5,339 | 973 | 1,246 | 1,537 | 1,697 | 5,453 | 1,510 | 1,497 | 1,557 | 1,194 | 5,758 |
| Non-controlling interest in subsidiaries | - | 2 | - | - | - | - | - | - | - | - | - | - |
| Net income attributable to equity holders | 1,224 | 5,337 | 973 | 1,246 | 1,537 | 1,697 | 5,453 | 1,510 | 1,497 | 1,557 | 1,194 | 5,758 |
| Adjusted net income | 1,306 | 5,497 | 1,422 | 1,463 | 1,566 | 1,531 | 5,982 | 1,538 | 1,522 | 1,582 | 1,607 | 6,249 |
| Revenue, net of CCPB | 5,041 | 20,569 | 5,277 | 5,248 | 5,525 | 5,503 | 21,553 | 5,591 | 5,652 | 5,779 | 5,752 | 22,774 |
| Adjusted revenue | 5,614 | 22,107 | 5,638 | 5,580 | 5,794 | 5,893 | 22,905 | 6,517 | 6,213 | 6,666 | 6,087 | 25,483 |

| | 2017 | 2018 | | | | | 2019 | | | | |
|---|---|---|---|---|---|---|---|---|---|---|---|
| | Q4 | Q1 | Q2 | Q3 | Q4 | Fiscal | Q1 | Q2 | Q3 | Q4 | Fiscal |
| · Balance sheet: average daily balances | | | | | | | | | | | |
| Cash Resources | 42,196 | 43,276 | 49,752 | 48,505 | 53,556 | 48,765 | 54,657 | 45,998 | 44,832 | 51,448 | 49,260 |
| Securities | 159,842 | 169,563 | 165,185 | 169,390 | 177,234 | 170,385 | 190,032 | 191,671 | 191,946 | 194,793 | 192,114 |
| · Securities borrowed or | | | | | | | | | | | |
| purchased under resale agreements | 81,735 | 81,713 | 88,793 | 98,138 | 99,140 | 91,972 | 102,106 | 104,636 | 108,543 | 104,770 | 105,017 |
| · Loans | | | | | | | | | | | |
| Residential mortgages | 114,558 | 117,067 | 117,427 | 118,153 | 118,965 | 117,904 | 119,862 | 119,977 | 121,014 | 122,777 | 120,915 |
| Non-residential mortgages | 11,372 | 11,622 | 12,132 | 12,914 | 13,615 | 12,574 | 14,243 | 14,835 | 15,476 | 15,726 | 15,072 |
| Consumer instalment and other personal | 61,652 | 61,565 | 61,507 | 62,117 | 62,710 | 61,978 | 63,368 | 63,681 | 65,063 | 66,905 | 64,763 |
| Credit cards | 8,093 | 8,248 | 8,010 | 8,281 | 8,314 | 8,215 | 8,455 | 8,257 | 8,748 | 8,871 | 8,586 |
| Business and government | 162,870 | 162,385 | 168,882 | 174,305 | 178,094 | 170,934 | 191,373 | 199,945 | 206,728 | 211,566 | 202,423 |
| Subtotal | 358,545 | 360,887 | 367,958 | 375,770 | 381,688 | 371,605 | 397,301 | 406,695 | 417,029 | 425,845 | 411,759 |
| Allowance for credit losses | (1,798) | (1,608) | (1,652) | (1,680) | (1,677) | (1,654) | (1,663) | (1,689) | (1,743) | (1,827) | (1,731) |
| Total net loans | 356,747 | 359,279 | 366,306 | 374,090 | 380,011 | 369,951 | 395,638 | 405,006 | 415,286 | 424,018 | 410,028 |
| - Other Assets | | | | | | | | | | | |
| Derivative instruments | 30,782 | 29,684 | 28,278 | 27,032 | 23,867 | 27,181 | 25,926 | 21,463 | 22,606 | 24,179 | 23,561 |
| Customers' liability under acceptances | 16,314 | 15,733 | 16,630 | 17,232 | 18,424 | 17,008 | 19,651 | 22,881 | 23,431 | 24,485 | 22,610 |
| Other | 28,220 | 28,315 | 28,694 | 30,003 | 29,108 | 29,033 | 32,196 | 29,321 | 30,319 | 30,771 | 30,662 |
| Total Assets | 715,806 | 727,463 | 743,638 | 764,390 | 781,340 | 754,295 | 820,206 | 820,976 | 836,963 | 854,464 | 833,252 |

FIG. 82B

Risk Domain

Description

The risk domain contains information and analysis to understand and manage risks across the bank.
Information is available for the total bank, operating groups, lines of business, technology & operations and corporate functions.

Information
- Top-line risks
- Emerging risks
- Key risk measures & tolerances
- Value relative to risk profile
- Capital
- Credit risk
- Market risk
- Derivative instruments
- Liquidity & funding risk
- Risk transparency
- Risk / return
- Operational risk
- Other risks

Organization Units
- Total Bank
- Personal & Commercial ( LOB $_{1\text{-}n}$ )
- Wealth Management ( LOB $_{1\text{-}n}$ )
- Capital Markets ( LOB $_{1\text{-}n}$ )
- Corporate ( Function $_{1\text{-}n}$ )
- T&O ( Function $_{1\text{-}n}$ )

Other risk types
- Business
- Environmental & social
- Insurance
- Pension
- Strategic

Operational risk types
- HR
- Accounting & financial mgmt
- Technology
- Information mgmt & security
- Privacy
- Model
- Process
- Project mgmt
- Outsourcing & supplier
- Business continuity
- Physical security
- Property
- Fraud / criminal
- Legal
- Regulatory
- Money laundering & terrorist financing
- Tax

Configuration & data files
- Menus
- Views
- f(x) Analysis
- Measures
- Dimensions
- Catalogs
- Transactions
- Relationships
- Unstructured data
- Navigation data
- Glossary

| Risk | Description | Timeframe |
|---|---|---|
| China Economic Crisis | Slowing economic growth, weakness in multiple sectors, deteriorating credit conditions and/or turmoil in Chinese stock market cause an economic crisis in China, shaking confidence, slowing demand for commodities, and slowing the global economy, possibly leading to a global recession Central government could curb outgoing capital flows, affecting Canadian real estate values Chinese Corporate debt servicing problems and/or a bursting of a real estate bubble could drive losses in banking and shadow banking, deepening the crisis | >12 and <36 Months |
| Geopolitical Risk | Arising from strained relations among many countries, including tensions between the United States and Russia, China and Iran Creates potential to increase investor anxiety & could harm global economy particularly in the event of a material conflict or action aimed at creating economic harm (i.e. closing of Strait of Hormuz) | <12 Months |
| High Canadian Household Debt | Canadian households are vulnerable to negative shocks as a result of high levels of household debt Some alternative lenders have been lowering their standards to increase lending activity Increasing rates may cause stress for many highly levered households However, households have tampered debt growth recently and the HH debt ratio has levelled off | >12 and <36 Months |
| Higher Inflation/Interest Rates | Low unemployment rate has the potential to increase inflation faster than expected, which in turn may lead to further tightening by the Fed. Steep rate increases will lead to a slowdown in the economy and potentially a recession Higher US interest rates also increase likelihood of migration of capital from developing countries (where capital is needed) to the US, which could result in a recession in those developing economies and subsequent feedback to North America. | >12 and <36 Months |
| Ongoing Concerns in Europe | Risk has increased recently given instability in Italy resulting from recent budget negotiations and investor concern, reflected in higher yields on Italian bonds The risk of a hard Brexit or a no-deal Brexit have also increased after rejection by the EU of the UK s Brexit plan in September These events and other uncertainties (continued popularity of nationalist parties, high levels of debt in certain countries) threaten to create additional turmoil and slow growth, investment and trade | <12 Months |
| US Policy Uncertainty | Uncertainty surrounding upcoming mid-term elections. A change in the majority in congress could lead to the halt and/or reversal of regulatory reforms implemented by the current administration. As well, a Democratic majority will increase the risk of impeachment, potentially causing political turmoil | <12 Months |

(F16 . F17 . F18) . (Q1 . Q2 . Q3 . Q4)

| | 2017 | | | 2018 | | | | | | 2019 | | | |
|---|---|---|---|---|---|---|---|---|---|---|---|---|---|
| | Q3 | Q4 | Fiscal | Q1 | Q2 | Q3 | Q4 | YTD | Fiscal | Q1 | Q2 | Q3 | YTD |
| - PCL information | | | | | | | | | | | | | |
| - PCL on impaired loans to avg net loans & acceptances | 0.22% | 0.22% | 0.22% | 0.19% | 0.18% | 0.18% | 0.18% | 0.18% | 0.18% | 0.12% | 0.14% | 0.22% | 0.16% |
| Consumer | 0.26% | 0.24% | 0.26% | 0.24% | 0.28% | 0.23% | 0.24% | 0.25% | 0.25% | 0.18% | 0.33% | 0.29% | 0.23% |
| Business & Government | 0.16% | 0.20% | 0.18% | 0.13% | 0.08% | 0.13% | 0.12% | 0.12% | 0.12% | 0.08% | 0.07% | 0.17% | 0.11% |
| Canada | 0.19% | 0.21% | 0.20% | 0.15% | 0.21% | 0.19% | 0.18% | 0.19% | 0.18% | 0.17% | 0.18% | 0.21% | 0.19% |
| United States | 0.29% | 0.24% | 0.27% | 0.27% | 0.18% | 0.19% | 0.20% | 0.21% | 0.21% | 0.05% | 0.08% | 0.25% | 0.13% |
| Other Countries | 0.00% | 0.04% | 0.18% | 0.00% | (0.47%) | (0.12%) | (0.29%) | (0.20%) | (0.22%) | (0.04%) | 0.00% | 0.00% | (0.01%) |
| Total PCL to average net loans and acceptances | 0.14% | 0.22% | 0.20% | 0.15% | 0.17% | 0.19% | 0.18% | 0.17% | 0.17% | 0.13% | 0.16% | 0.26% | 0.19% |
| - PCL on impaired loans by country | | | | | | | | | | | | | |
| Canada | 118 | 132 | 481 | 95 | 132 | 121 | 117 | 348 | 465 | 110 | 121 | 146 | 377 |
| United States | 84 | 69 | 320 | 79 | 53 | 59 | 67 | 191 | 258 | 18 | 19 | 97 | 144 |
| Other Countries | - | 1 | 21 | - | (13) | (3) | (7) | (16) | (23) | (1) | - | - | (1) |
| Total PCL on impaired loans | 202 | 202 | 822 | 174 | 172 | 177 | 177 | 523 | 700 | 127 | 150 | 243 | 520 |
| - PCL on performing loans by country | | | | | | | | | | | | | |
| Canada | | | | (3) | (2) | 3 | (20) | (2) | (22) | 6 | 19 | 19 | 44 |
| United States | | | | (31) | (9) | 5 | 15 | (35) | (20) | 7 | 7 | 38 | 52 |
| Other Countries | | | | 1 | (1) | 1 | 3 | 1 | 4 | (3) | - | 6 | 3 |
| Total PCL on performing loans | | | | (33) | (12) | 9 | (2) | (36) | (38) | 10 | 26 | 63 | 99 |

FIG. 82C

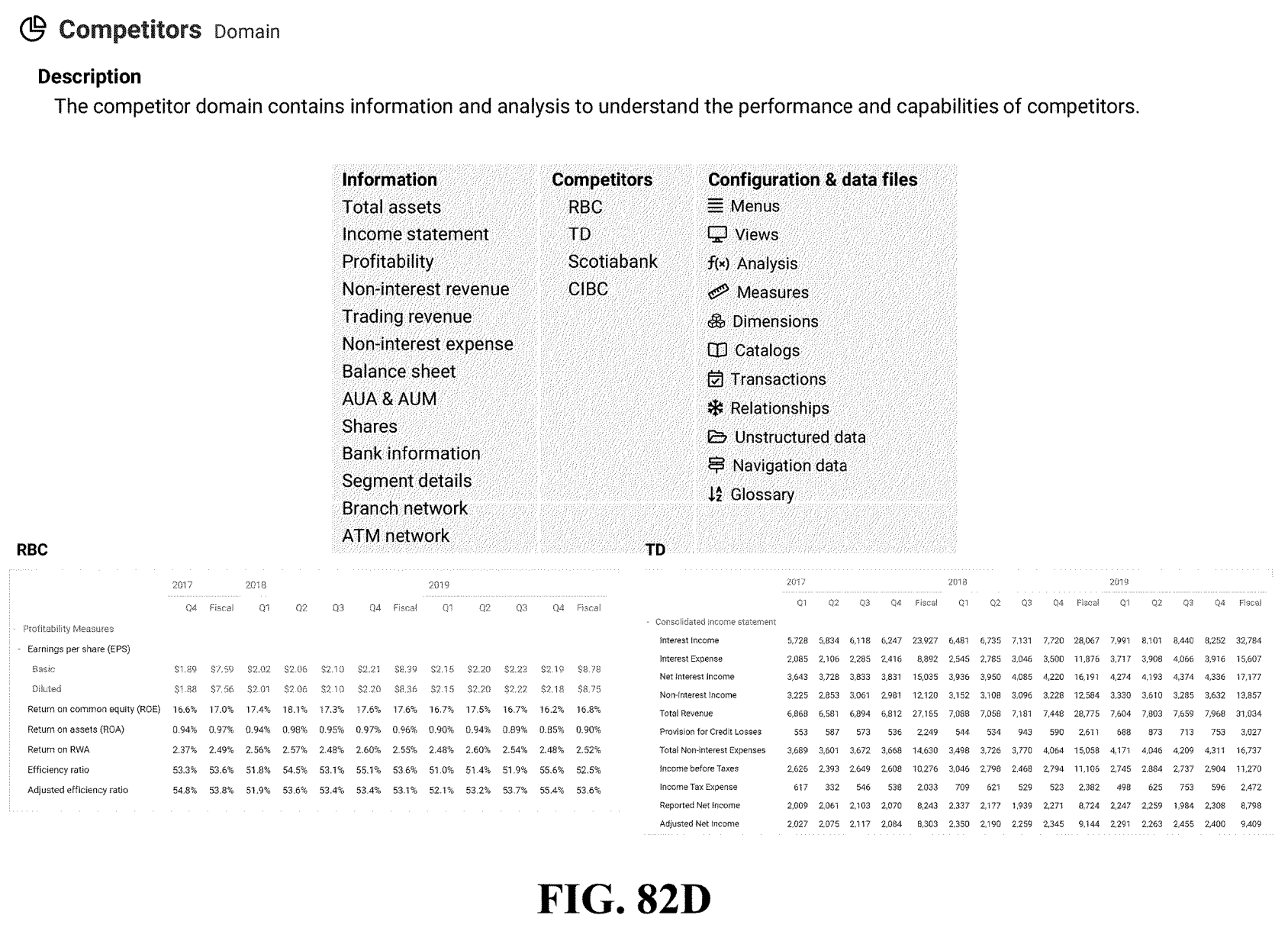

Competitors Domain

Description

The competitor domain contains information and analysis to understand the performance and capabilities of competitors.

| Information | Competitors | Configuration & data files |
|---|---|---|
| Total assets | RBC | Menus |
| Income statement | TD | Views |
| Profitability | Scotiabank | f(x) Analysis |
| Non-interest revenue | CIBC | Measures |
| Trading revenue | | Dimensions |
| Non-interest expense | | Catalogs |
| Balance sheet | | Transactions |
| AUA & AUM | | Relationships |
| Shares | | Unstructured data |
| Bank information | | Navigation data |
| Segment details | | Glossary |
| Branch network | | |
| ATM network | | |

RBC

| | 2017 | | 2018 | | | | | 2019 | | | | |
|---|---|---|---|---|---|---|---|---|---|---|---|---|
| | Q4 | Fiscal | Q1 | Q2 | Q3 | Q4 | Fiscal | Q1 | Q2 | Q3 | Q4 | Fiscal |
| - Profitability Measures | | | | | | | | | | | | |
| - Earnings per share (EPS) | | | | | | | | | | | | |
| Basic | $1.89 | $7.59 | $2.02 | $2.06 | $2.10 | $2.21 | $8.39 | $2.15 | $2.20 | $2.23 | $2.19 | $8.78 |
| Diluted | $1.88 | $7.56 | $2.01 | $2.06 | $2.10 | $2.20 | $8.36 | $2.15 | $2.20 | $2.22 | $2.18 | $8.75 |
| Return on common equity (ROE) | 16.6% | 17.0% | 17.4% | 18.1% | 17.3% | 17.6% | 17.6% | 16.7% | 17.5% | 16.7% | 16.2% | 16.8% |
| Return on assets (ROA) | 0.94% | 0.97% | 0.94% | 0.98% | 0.95% | 0.97% | 0.96% | 0.90% | 0.94% | 0.89% | 0.85% | 0.90% |
| Return on RWA | 2.37% | 2.49% | 2.56% | 2.57% | 2.48% | 2.60% | 2.55% | 2.48% | 2.60% | 2.54% | 2.48% | 2.52% |
| Efficiency ratio | 53.3% | 53.6% | 51.8% | 54.5% | 53.1% | 55.1% | 53.6% | 51.0% | 51.4% | 51.9% | 55.6% | 52.5% |
| Adjusted efficiency ratio | 54.8% | 53.8% | 51.9% | 53.6% | 53.4% | 53.4% | 53.1% | 52.1% | 53.2% | 53.7% | 55.4% | 53.6% |

TD

| | 2017 | | | | | 2018 | | | | | 2019 | | | | |
|---|---|---|---|---|---|---|---|---|---|---|---|---|---|---|---|
| | Q1 | Q2 | Q3 | Q4 | Fiscal | Q1 | Q2 | Q3 | Q4 | Fiscal | Q1 | Q2 | Q3 | Q4 | Fiscal |
| - Consolidated income statement | | | | | | | | | | | | | | | |
| Interest Income | 5,728 | 5,834 | 6,118 | 6,247 | 23,927 | 6,481 | 6,735 | 7,131 | 7,720 | 28,067 | 7,991 | 8,101 | 8,440 | 8,252 | 32,784 |
| Interest Expense | 2,085 | 2,106 | 2,285 | 2,416 | 8,892 | 2,545 | 2,785 | 3,046 | 3,500 | 11,876 | 3,717 | 3,908 | 4,066 | 3,916 | 15,607 |
| Net Interest Income | 3,643 | 3,728 | 3,833 | 3,831 | 15,035 | 3,936 | 3,950 | 4,085 | 4,220 | 16,191 | 4,274 | 4,193 | 4,374 | 4,336 | 17,177 |
| Non-Interest Income | 3,225 | 2,853 | 3,061 | 2,981 | 12,120 | 3,152 | 3,108 | 3,096 | 3,228 | 12,584 | 3,330 | 3,610 | 3,285 | 3,632 | 13,857 |
| Total Revenue | 6,868 | 6,581 | 6,894 | 6,812 | 27,155 | 7,088 | 7,058 | 7,181 | 7,448 | 28,775 | 7,604 | 7,803 | 7,659 | 7,968 | 31,034 |
| Provision for Credit Losses | 553 | 587 | 573 | 536 | 2,249 | 544 | 534 | 943 | 590 | 2,611 | 688 | 873 | 713 | 753 | 3,027 |
| Total Non-interest Expenses | 3,689 | 3,601 | 3,672 | 3,668 | 14,630 | 3,498 | 3,726 | 3,770 | 4,064 | 15,058 | 4,171 | 4,046 | 4,209 | 4,311 | 16,737 |
| Income before Taxes | 2,626 | 2,393 | 2,649 | 2,608 | 10,276 | 3,046 | 2,798 | 2,468 | 2,794 | 11,106 | 2,745 | 2,884 | 2,737 | 2,904 | 11,270 |
| Income Tax Expense | 617 | 332 | 546 | 538 | 2,033 | 709 | 621 | 529 | 523 | 2,382 | 498 | 625 | 753 | 596 | 2,472 |
| Reported Net Income | 2,009 | 2,061 | 2,103 | 2,070 | 8,243 | 2,337 | 2,177 | 1,939 | 2,271 | 8,724 | 2,247 | 2,259 | 1,984 | 2,308 | 8,798 |
| Adjusted Net Income | 2,027 | 2,075 | 2,117 | 2,084 | 8,303 | 2,350 | 2,190 | 2,259 | 2,345 | 9,144 | 2,291 | 2,263 | 2,455 | 2,400 | 9,409 |

FIG. 82D

Customers Domain

Description

The customer domain contains information and analysis to understand customers, accounts and loyalty.

Information
- Number of customers
- Number of accounts
- Net promoter score

Organization Units
- Total Bank
- Personal & Commercial ( LOB $_{1\text{-}n}$ )
- Wealth Management ( LOB $_{1\text{-}n}$ )
- Capital Markets ( LOB $_{1\text{-}n}$ )
- Corporate ( Function $_{1\text{-}n}$ )
- T&O ( Function $_{1\text{-}n}$ )

Product types
- Retail banking
  - Product $_{1\text{-}n}$
- Wealth management
  - Product $_{1\text{-}n}$
- Asset management
  - Product $_{1\text{-}n}$
- Commercial banking
  - Product $_{1\text{-}n}$
- Investment & corporate banking
  - Product $_{1\text{-}n}$

Customer segments
- Consumers
  - Segment $_{1\text{-}n}$
- Businesses & governments
  - Segment $_{1\text{-}n}$
- Capital markets
  - Segment $_{1\text{-}n}$
- Asset management
  - Segment $_{1\text{-}n}$

Customer journeys
- Everyday banking
- Borrow
- Save & invest
- Wealth
- Treasury & payments
- Trade finance
- Business advisory
- Protect

Configuration & data files
- Menus
- Views
- $f(x)$ Analysis
- Measures
- Dimensions
- Catalogs
- Transactions
- Relationships
- Unstructured data
- Navigation data
- Glossary

Number of customers

| | F18 | | | | F19 | | | |
|---|---|---|---|---|---|---|---|---|
| | Q1 | Q2 | Q3 | Q4 | Q1 | Q2 | Q3 | Q4 |
| - P&BB Canada | 15,084,854 | 13,541,377 | 14,858,851 | 13,905,401 | 15,752,340 | 16,162,963 | 15,827,821 | 16,086,723 |
| + ALBERTA & NW TERRITORIES DIV | 1,764,958 | 1,367,454 | 1,623,635 | 1,923,998 | 2,004,166 | 1,802,838 | 2,199,485 | 1,888,913 |
| + ATLANTIC DIVISION | 1,095,772 | 908,767 | 1,059,990 | 923,172 | 1,153,222 | 921,454 | 1,223,040 | 1,440,162 |
| + GREATER TORONTO DIVISION | 2,381,806 | 2,334,442 | 2,675,403 | 2,425,165 | 2,549,180 | 3,006,520 | 2,561,627 | 3,032,175 |
| + PRAIRIES CENTRAL CANADA DIV | 1,421,029 | 1,203,675 | 1,384,687 | 1,076,912 | 1,172,591 | 1,008,078 | 1,337,735 | 1,069,414 |
| + SOUTHWESTERN ONTARIO DIVISION | 1,251,304 | 1,244,684 | 1,075,181 | 1,256,514 | 1,496,191 | 1,463,313 | 1,500,731 | 1,375,881 |
| + BRITISH COLUMBIA&YUKON DIV | 2,832,569 | 2,207,524 | 2,583,355 | 2,023,565 | 2,623,699 | 2,949,435 | 2,448,302 | 2,690,430 |
| + DIRECT BANKING DIVISION | 1,243 | 3,162 | 10,913 | 6,816 | 2,668 | 1,527 | 7,432 | 12,104 |
| + DIRECTION DU QUEBEC | 3,139,961 | 2,673,194 | 3,095,252 | 2,811,345 | 3,266,752 | 3,290,961 | 3,055,521 | 3,109,256 |
| + EASTERN ONTARIO DIVISION | 1,196,212 | 1,598,475 | 1,360,435 | 1,457,914 | 1,483,871 | 1,718,837 | 1,493,948 | 1,468,388 |

Figure 82F:
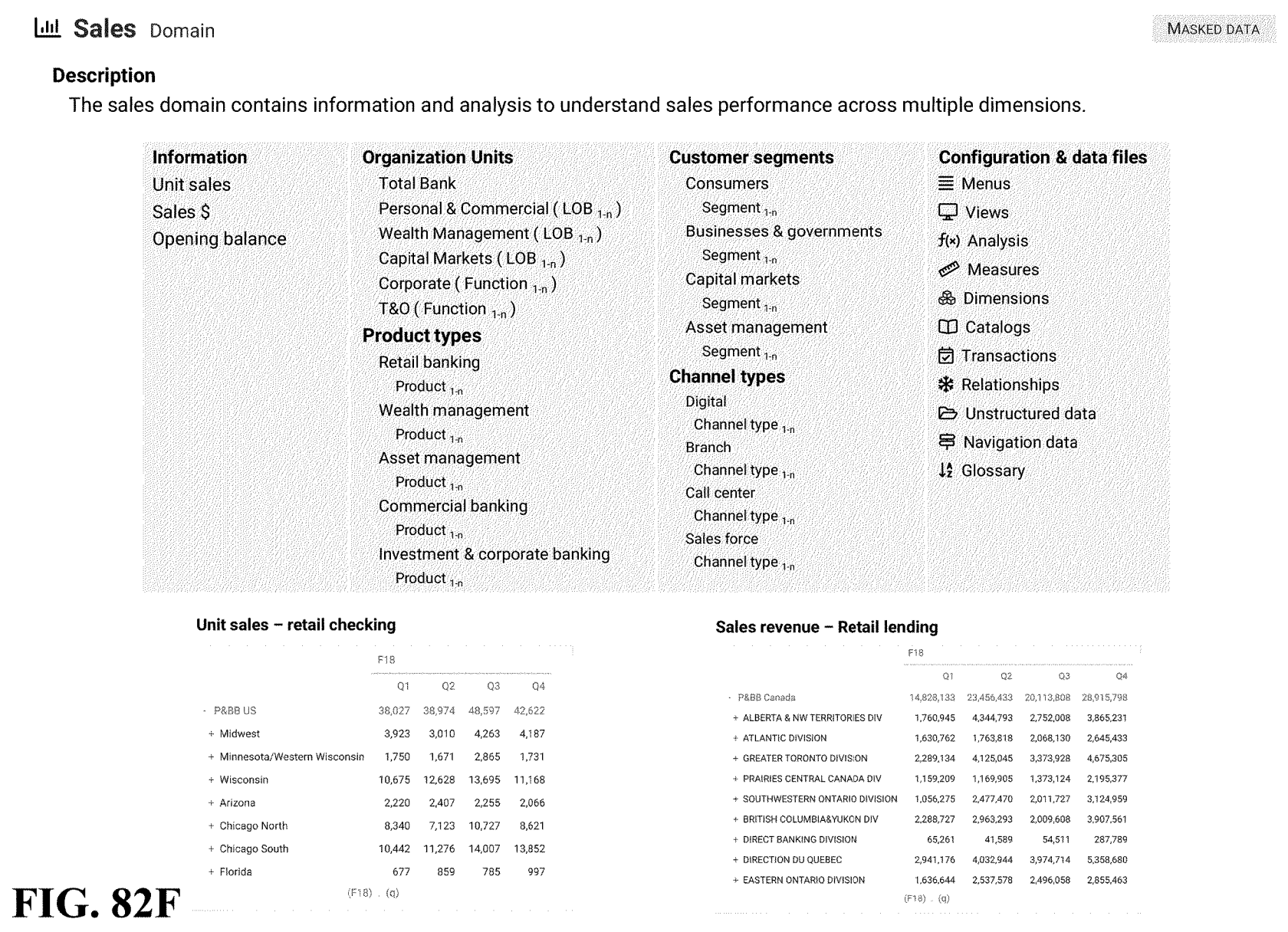

Sales Domain

MASKED DATA

Description

The sales domain contains information and analysis to understand sales performance across multiple dimensions.

| Information | Organization Units | Customer segments | Configuration & data files |
|---|---|---|---|
| Unit sales | Total Bank | Consumers | Menus |
| Sales $ | Personal & Commercial ( LOB $_{1\text{-}n}$ ) | Segment $_{1\text{-}n}$ | Views |
| Opening balance | Wealth Management ( LOB $_{1\text{-}n}$ ) | Businesses & governments | f(x) Analysis |
| | Capital Markets ( LOB $_{1\text{-}n}$ ) | Segment $_{1\text{-}n}$ | Measures |
| | Corporate ( Function $_{1\text{-}n}$ ) | Capital markets | Dimensions |
| | T&O ( Function $_{1\text{-}n}$ ) | Segment $_{1\text{-}n}$ | Catalogs |
| | **Product types** | Asset management | Transactions |
| | Retail banking | Segment $_{1\text{-}n}$ | Relationships |
| | Product $_{1\text{-}n}$ | **Channel types** | Unstructured data |
| | Wealth management | Digital | Navigation data |
| | Product $_{1\text{-}n}$ | Channel type $_{1\text{-}n}$ | Glossary |
| | Asset management | Branch | |
| | Product $_{1\text{-}n}$ | Channel type $_{1\text{-}n}$ | |
| | Commercial banking | Call center | |
| | Product $_{1\text{-}n}$ | Channel type $_{1\text{-}n}$ | |
| | Investment & corporate banking | Sales force | |
| | Product $_{1\text{-}n}$ | Channel type $_{1\text{-}n}$ | |

Unit sales – retail checking

| | F18 | | | |
|---|---|---|---|---|
| | Q1 | Q2 | Q3 | Q4 |
| - P&BB US | 38,027 | 38,974 | 48,597 | 42,622 |
| + Midwest | 3,923 | 3,010 | 4,263 | 4,187 |
| + Minnesota/Western Wisconsin | 1,750 | 1,671 | 2,865 | 1,731 |
| + Wisconsin | 10,675 | 12,628 | 13,695 | 11,168 |
| + Arizona | 2,220 | 2,407 | 2,255 | 2,066 |
| + Chicago North | 8,340 | 7,123 | 10,727 | 8,621 |
| + Chicago South | 10,442 | 11,276 | 14,007 | 13,852 |
| + Florida | 677 | 859 | 785 | 997 |

(F18) . (q)

Sales revenue – Retail lending

| | F18 | | | |
|---|---|---|---|---|
| | Q1 | Q2 | Q3 | Q4 |
| - P&BB Canada | 14,828,133 | 23,456,433 | 20,113,808 | 28,915,798 |
| + ALBERTA & NW TERRITORIES DIV | 1,760,945 | 4,344,793 | 2,752,008 | 3,865,231 |
| + ATLANTIC DIVISION | 1,630,762 | 1,763,818 | 2,068,130 | 2,645,433 |
| + GREATER TORONTO DIVISION | 2,289,134 | 4,125,045 | 3,373,928 | 4,675,305 |
| + PRAIRIES CENTRAL CANADA DIV | 1,159,209 | 1,169,905 | 1,373,124 | 2,195,377 |
| + SOUTHWESTERN ONTARIO DIVISION | 1,056,275 | 2,477,470 | 2,011,727 | 3,124,959 |
| + BRITISH COLUMBIA&YUKON DIV | 2,288,727 | 2,963,293 | 2,009,608 | 3,907,561 |
| + DIRECT BANKING DIVISION | 65,261 | 41,589 | 54,511 | 287,789 |
| + DIRECTION DU QUEBEC | 2,941,176 | 4,032,944 | 3,974,714 | 5,358,680 |
| + EASTERN ONTARIO DIVISION | 1,636,644 | 2,537,578 | 2,496,058 | 2,855,463 |

Products Domain

Description

The product domain contains information and analysis to understand product performance, catalog and attributes.

| Information | Organization Units | Customer segments | Configuration & data files |
|---|---|---|---|
| Spreads<br>Number of accounts<br>Balance sheet<br>Income statement | Total Bank<br>Personal & Commercial ( LOB $_{1-n}$ )<br>Wealth Management ( LOB $_{1-n}$ )<br>Capital Markets ( LOB $_{1-n}$ )<br>Corporate ( Function $_{1-n}$ )<br>T&O ( Function $_{1-n}$ )<br>**Product types**<br>Retail banking<br>Product $_{1-n}$<br>Wealth management<br>Product $_{1-n}$<br>Asset management<br>Product $_{1-n}$<br>Commercial banking<br>Product $_{1-n}$<br>Investment & corporate banking<br>Product $_{1-n}$ | Consumers<br>Segment $_{1-n}$<br>Businesses & governments<br>Segment $_{1-n}$<br>Capital markets<br>Segment $_{1-n}$<br>Asset management<br>Segment $_{1-n}$ | Menus<br>Views<br>f(x) Analysis<br>Measures<br>Dimensions<br>Catalogs<br>Transactions<br>Relationships<br>Unstructured data<br>Navigation data<br>Glossary |

Spreads

| | F19 | | | | F20 | |
|---|---|---|---|---|---|---|
| | Q1 | Q2 | Q3 | Q4 | Q1 | Q2 |
| - P&C Canada | 1.62% | 2.02% | 1.42% | 1.55% | 0.99% | 1.42% |
| + Business Banking | 1.20% | 1.16% | 1.31% | 2.80% | 0.91% | 0.63% |
| + Canadian Commercial Banking | 1.42% | 2.08% | 0.60% | 1.55% | 1.01% | 1.21% |
| + Residential Mortgages | 0.27% | 0.61% | 0.40% | 0.92% | 0.29% | 0.83% |
| + Term Deposits | 0.88% | 1.38% | 0.48% | 0.82% | 0.56% | 1.23% |
| + Cards | 18.91% | 31.76% | 19.67% | 25.57% | 34.94% | 15.18% |
| + Consumer Loans | 2.46% | 5.31% | 3.35% | 0.65% | 1.24% | 1.33% |
| + Moneris | 0.17% | 0.36% | 0.20% | 2.07% | 0.19% | 0.10% |
| + Mutual Funds | 0.17% | 0.36% | 0.20% | 2.07% | 0.19% | 0.10% |
| + Other LOB | 0.17% | 0.36% | 0.20% | 2.07% | 0.19% | 0.10% |
| + Personal Deposits | 5.41% | 2.66% | 1.23% | 2.59% | 1.91% | 1.48% |

(F18 . F19 . F20) . (y . q)

Number of accounts

| | F18 | | | | F19 | | | |
|---|---|---|---|---|---|---|---|---|
| | Q1 | Q2 | Q3 | Q4 | Q1 | Q2 | Q3 | Q4 |
| - P&BB Canada | 11,449,254 | 10,780,094 | 10,771,674 | 10,968,792 | 11,059,758 | 10,739,209 | 11,251,742 | 11,304,958 |
| + ALBERTA & NW TERRITORIES DIV | 2,365,412 | 2,259,022 | 2,188,978 | 2,192,742 | 2,209,476 | 1,953,846 | 2,343,457 | 2,264,825 |
| + ATLANTIC DIVISION | 668,744 | 584,499 | 615,485 | 677,764 | 615,181 | 664,027 | 645,480 | 672,381 |
| + GREATER TORONTO DIVISION | 2,111,931 | 2,002,582 | 2,140,909 | 2,149,887 | 2,189,259 | 2,073,038 | 2,029,861 | 2,145,460 |
| + PRAIRIES CENTRAL CANADA DIV | 671,701 | 579,127 | 560,857 | 652,513 | 695,440 | 647,511 | 650,099 | 624,384 |
| + SOUTHWESTERN ONTARIO DIVISION | 1,235,714 | 1,167,496 | 1,132,309 | 1,169,929 | 1,069,374 | 1,124,101 | 1,179,363 | 1,119,044 |
| + BRITISH COLUMBIA&YUKON DIV | 1,670,873 | 1,571,085 | 1,488,727 | 1,416,661 | 1,483,022 | 1,404,275 | 1,575,125 | 1,546,240 |
| + DIRECT BANKING DIVISION | 92,824 | 199,639 | 101,197 | 104,332 | 74,317 | 121,258 | 87,025 | 183,785 |
| + DIRECTION DU QUEBEC | 1,765,896 | 1,615,800 | 1,663,806 | 1,771,196 | 1,896,122 | 1,776,354 | 1,840,285 | 1,802,116 |
| + EASTERN ONTARIO DIVISION | 866,159 | 800,844 | 879,406 | 833,768 | 827,567 | 974,799 | 901,047 | 946,723 |

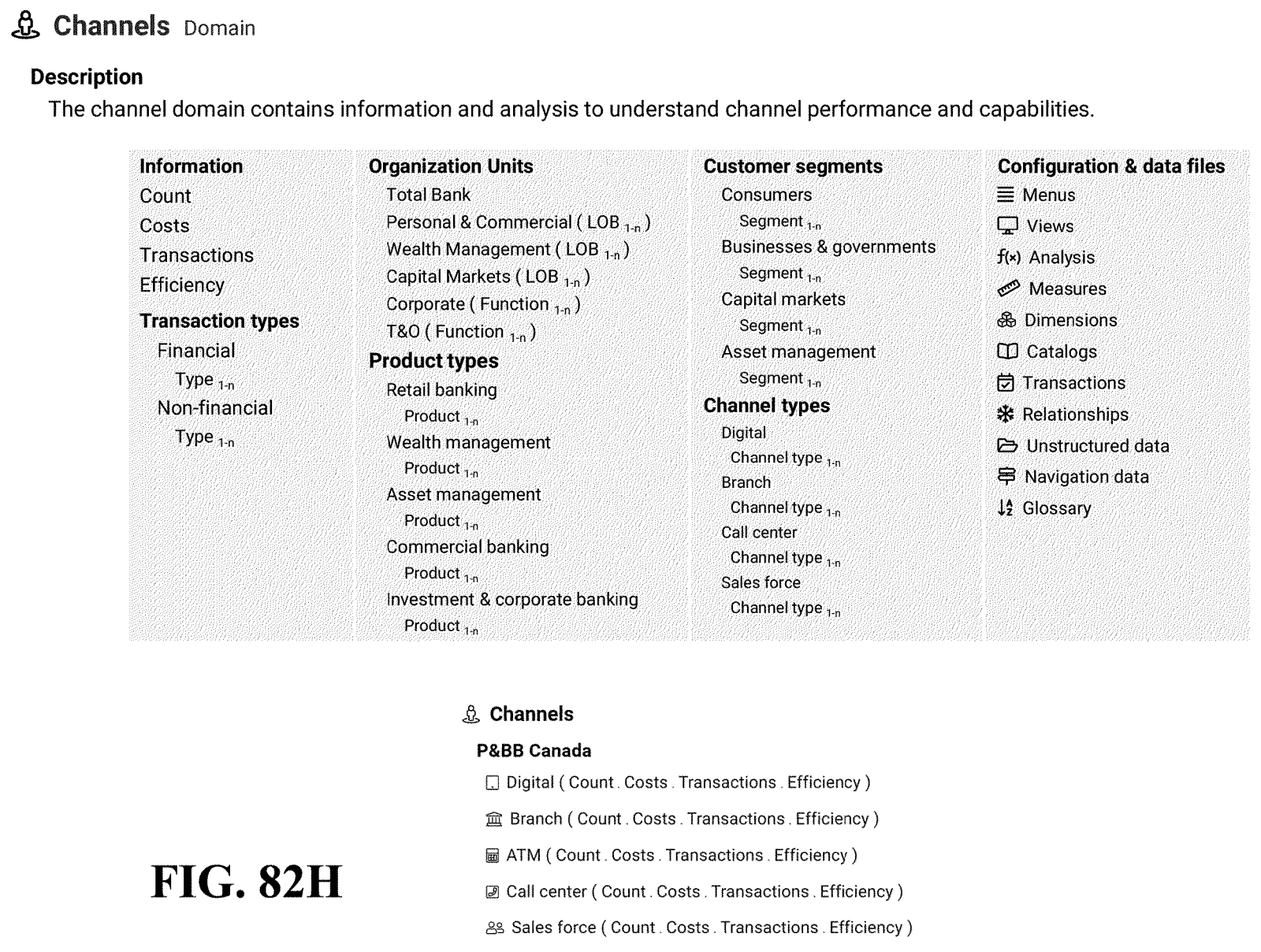

Channels Domain

Description

The channel domain contains information and analysis to understand channel performance and capabilities.

Information
- Count
- Costs
- Transactions
- Efficiency

Transaction types
- Financial
  - Type $_{1\text{-}n}$
- Non-financial
  - Type $_{1\text{-}n}$

Organization Units
- Total Bank
- Personal & Commercial ( LOB $_{1\text{-}n}$ )
- Wealth Management ( LOB $_{1\text{-}n}$ )
- Capital Markets ( LOB $_{1\text{-}n}$ )
- Corporate ( Function $_{1\text{-}n}$ )
- T&O ( Function $_{1\text{-}n}$ )

Product types
- Retail banking
  - Product $_{1\text{-}n}$
- Wealth management
  - Product $_{1\text{-}n}$
- Asset management
  - Product $_{1\text{-}n}$
- Commercial banking
  - Product $_{1\text{-}n}$
- Investment & corporate banking
  - Product $_{1\text{-}n}$

Customer segments
- Consumers
  - Segment $_{1\text{-}n}$
- Businesses & governments
  - Segment $_{1\text{-}n}$
- Capital markets
  - Segment $_{1\text{-}n}$
- Asset management
  - Segment $_{1\text{-}n}$

Channel types
- Digital
  - Channel type $_{1\text{-}n}$
- Branch
  - Channel type $_{1\text{-}n}$
- Call center
  - Channel type $_{1\text{-}n}$
- Sales force
  - Channel type $_{1\text{-}n}$

Configuration & data files
- Menus
- Views
- Analysis
- Measures
- Dimensions
- Catalogs
- Transactions
- Relationships
- Unstructured data
- Navigation data
- Glossary

Channels

P&BB Canada
- Digital ( Count . Costs . Transactions . Efficiency )
- Branch ( Count . Costs . Transactions . Efficiency )
- ATM ( Count . Costs . Transactions . Efficiency )
- Call center ( Count . Costs . Transactions . Efficiency )
- Sales force ( Count . Costs . Transactions . Efficiency )

FIG. 82H

Organization Domain

MASKED DATA

Description

The organization domain contains information and analysis to understand and manage organizational capabilities and performance including employees, contractors and global resources.

Information
- Structure
- Headcount
- Costs
- Cost / FTE
- Cost KPIs
- Skills

Automated analysis
- Cost drivers

Organization Units
- Total Bank
- Personal & Commercial ( $LOB_{1-n}$ )
- Wealth Management ( $LOB_{1-n}$ )
- Capital Markets ( $LOB_{1-n}$ )
- Corporate ( $Function_{1-n}$ )
- T&O ( $Function_{1-n}$ )

Resource types
- Employees
- Contractors
- Global resources

Grade levels
- G 07-09
- G 05-06
- G 01-04
- G 10-14
- G 99

Job families

Customer-facing
- Consumer banking sales & service
- Commercial sales & service
- Asset mgmt sales & service
- Capital markets sales & service
- Customer shared-services

Non customer-facing
- Finance & accounting
- Human resources
- Audit, risk & compliance
- Marketing
- Corporate affairs
- Customer solutions
- Technology
- Data analytics & reporting
- Procurement
- Real-estate
- Strategy & change
- Legal
- Business management

Configuration & data files
- Menus
- Views
- Analysis
- Measures
- Dimensions
- Catalogs
- Transactions
- Relationships
- Unstructured data
- Navigation data
- Glossary

| | Count | Cost | Cost/FTE |
|---|---|---|---|
| - Total bank | 61,500 | 11,529,205,491 | 626 |
| + Asset Management | 3,000 | 762,850,648 | 1,081 |
| + Capital Markets | 2,800 | 661,265,725 | 1,003 |
| + Commercial Banking | 6,100 | 1,195,814,835 | 833 |
| + Consumer Banking | 21,650 | 2,225,293,236 | 487 |
| + Corporate | 7,990 | 1,255,353,579 | 668 |
| + Technology & Operations | 19,960 | 3,256,085,435 | 694 |

(F17 . F18 . F19)

| | Title | Name | |
|---|---|---|---|
| - Total bank | Chief Executive Officer | J. Conley | > |
| + Consumer Banking | Group Head, Consumer Banking | P. Austin | > |
| + Commercial Banking | Group Head, Consumer Banking | B. Vang | > |
| + Asset Management | Group Head, Asset Management | C. Wu | > |
| + Capital Markets | Group Head, Capital Markets | N. Holden | > |
| + Technology & Operations | Group Head, Technology & Operations | P. Kim | > |
| - Corporate | | | |
| Finance | Chief Financial Officer | S. Gross | > |
| HR | Chief Human Resources Officer | M. Schmitt | > |
| Risk | Chief Risk Officer | D. George | > |
| Legal & Compliance | General Counsel | C. Brandt | > |
| Marketing | Chief Marketing Officer | J. Horne | > |
| Strategy | SVP, Enterprise Strategy | W. Pierce | > |
| Communication | SVP, Corporate Communications | C. Hoffman | > |
| Audit | Chief Auditor | B. Hardin | > |

FIG. 82I

Suppliers Domain

MASKED DATA

Description

The supplier domain contains information and analysis to understand and manage supplier capabilities, performance and risk.

Information
- Supplier spend
- Employee discretionary spend
- Savings
- Supplier count
- Supplier risk

Automated analysis
- Supplier spend
- Employee discretionary spend

Organization Units
- Total Bank
- Personal & Commercial ( LOB $_{1\text{-}n}$ )
- Wealth Management ( LOB $_{1\text{-}n}$ )
- Capital Markets ( LOB $_{1\text{-}n}$ )
- Corporate ( Function $_{1\text{-}n}$ )
- T&O ( Function $_{1\text{-}n}$ )

Spend categories
- Information technology
  - Spend categories $_{1\text{-}n}$
- Advertising & marketing
  - Spend categories $_{1\text{-}n}$
- Business operations
  - Spend categories $_{1\text{-}n}$
- HR & professional services
  - Spend categories $_{1\text{-}n}$
- Real-estate
  - Spend categories $_{1\text{-}n}$
- Non-sourceable
  - Categories $_{1\text{-}n}$
- Unclassified

Configuration & data files
- Menus
- Views
- f(x) Analysis
- Measures
- Dimensions
- Catalogs
- Transactions
- Relationships
- Unstructured data
- Navigation data
- Glossary

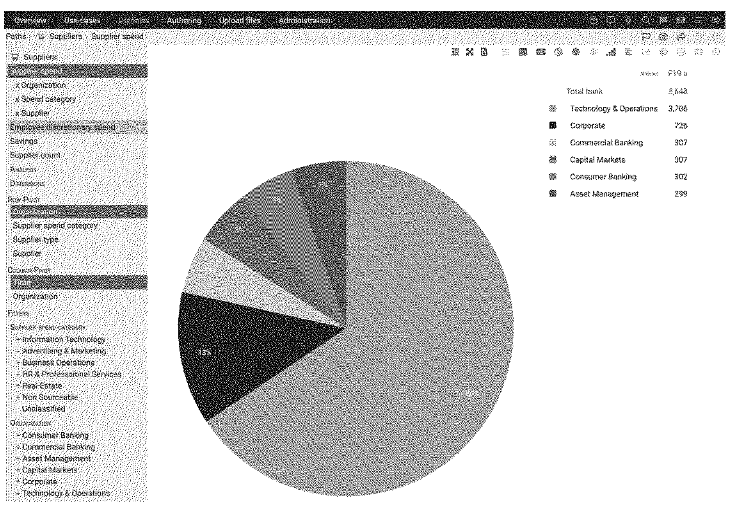

| | F19 a | F18 a | V | V% |
|---|---|---|---|---|
| - Total bank | 184,705,496 | 180,148,775 | 4,556,721 | 2.5 |
| + Commercial Banking | 93,372,901 | 91,059,733 | 2,313,168 | 2.5 |
| + Asset Management | 46,548,812 | 45,426,064 | 1,122,749 | 2.5 |
| + Capital Markets | 15,958,558 | 15,543,087 | 415,472 | 2.7 |
| + Corporate | 14,683,603 | 14,323,960 | 359,643 | 2.5 |
| + Technology & Operations | 14,141,622 | 13,795,932 | 345,690 | 2.5 |

(F17 . F18 . F19) . (y) . (Prior year)

FIG. 82J

Financial Crimes Domain

MASKED DATA

Description

The financial crimes domain contains information and analysis to understand and manage fraud, anti-money laundering (AML) and the linkages with cybersecurity.

Information

Fraud
- # Compromised cards
- # Fraud events
- # Fraud loss incidents
- Fraud losses

AML
- Enterprise AML KPIs
- Know your customer (KYC)
- Transaction monitoring
- Mandatory reporting & monitoring
- Training

Resources
- Headcount
- Costs
- Budget

Organization Units
- Total Bank
- Personal & Commercial ( LOB $_{1\text{-}n}$ )
- Wealth Management ( LOB $_{1\text{-}n}$ )
- Capital Markets ( LOB $_{1\text{-}n}$ )
- Corporate ( Function $_{1\text{-}n}$ )
- T&O ( Function $_{1\text{-}n}$ )

Mandatory reporting types
- Currency transaction reports (CTR)
- Electronic funds transfer reports (EFTR)
- Large cash transaction reports (LCTR)
- Suspicious activity reports (SAR)
- Suspicious transaction reports (STR)
- Unusual activity reports (UAR)

Fraud type

Internal fraud
- Internal theft & fraud
- System security internal / willful damage
- Unauthorized activity

External fraud
- Credit
- Account & cash mgmt
- Debit card fraud
- Theft & policy breach / defalcation
- Electronic channel fraud
- Other

Configuration & data files
- Menus
- Views
- Analysis
- Measures
- Dimensions
- Catalogs
- Transactions
- Relationships
- Unstructured data
- Navigation data
- Glossary

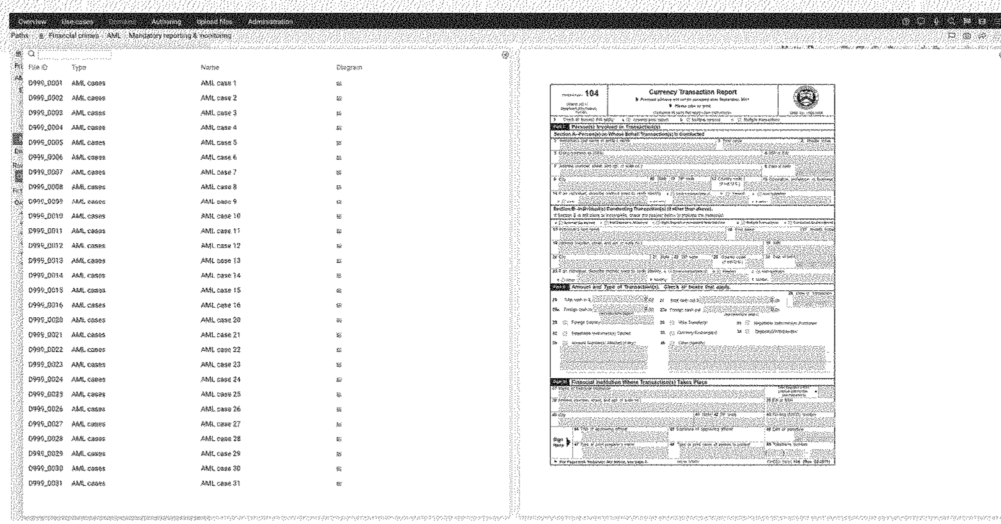

FIG. 82K

Initiatives Domain

Description

The initiatives domain contains information and analysis to understand initiatives costs, benefits, execution and risks.

Information
- Investments
- Benefits
- Execution status

Automated analysis
- Cost drivers
- Benefit drivers

Organization Units
- Total Bank
- Personal & Commercial ( LOB $_{1\text{-}n}$ )
- Wealth Management ( LOB $_{1\text{-}n}$ )
- Capital Markets ( LOB $_{1\text{-}n}$ )
- Corporate ( Function $_{1\text{-}n}$ )
- T&O ( Function $_{1\text{-}n}$ )

Benefit types
- Hard benefits
  - Cost reduction
  - Provision for credit losses
  - Revenue increase
- Soft benefits
  - Cost avoidance
  - Revenue retention

Initiative types
- Enterprise IT initiatives
  - Mandatory
  - Discretionary
  - Maintenance
- Cybersecurity
- Productivity
  - Organization
  - Suppliers
  - Facilities
  - Technology
- M&A
- Facilities

Configuration & data files
- Menus
- Views
- f(x) Analysis
- Measures
- Dimensions
- Catalogs
- Transactions
- Relationships
- Unstructured data
- Navigation data
- Glossary

Investments

| *Millions* | F18 | F19 |
|---|---|---|
| - Total Bank | 904 | 1,039 |
| - Technology & Operations | 821 | 937 |
| - Technology | 454 | 520 |
| + Consumer Banking Systems | 144 | 162 |
| Enterprise IT Architecture and Engineering | 64 | 84 |
| Enterprise infrastructure | 65 | 74 |
| Wealth & Asset Management Systems | 63 | 72 |
| Capital Markets Systems | 59 | 64 |
| IT Risk Management | 204 | 242 |
| Procurement | 96 | 102 |
| Data & Analytics | 67 | 73 |
| + Corporate | 83 | 102 |

Benefits

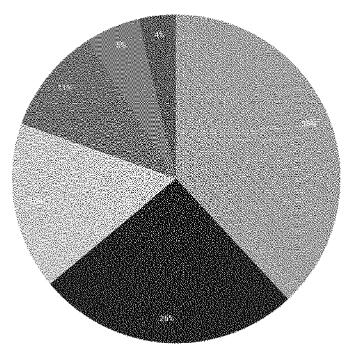

| *Millions* | F20 | F19 | F18 |
|---|---|---|---|
| Total Bank | 633 | 488 | 391 |
| IT applications | 241 | 185 | 156 |
| Cybersecurity | 164 | 126 | 103 |
| IT infrastructure | 104 | 81 | 57 |
| Procurement | 67 | 51 | 39 |
| M&A | 34 | 26 | 20 |
| Restructuring | 23 | 18 | 16 |

Execution

| | Q1 | Q2 |
|---|---|---|
| - Total Bank | | |
| Initiative - Cybersecurity - #1 | Y | R |
| Initiative - Cybersecurity - #10 | Y | G |
| Initiative - Cybersecurity - #19 | G | G |
| Initiative - IT application - #39 | R | G |
| Initiative - IT application - #4 | G | G |
| Initiative - IT application - #40 | G | Y |
| Initiative - IT application - #41 | G | G |
| Initiative - IT application - #42 | G | G |
| Initiative - IT application - #43 | G | G |
| Initiative - IT application - #44 | G | G |
| Initiative - IT application - #45 | Y | G |

FIG. 82L

Authoring features

The implementation methodology is enabled by a set of authoring features. The result is speed and agility in developing and systematically improving data & analytic solutions. Authoring features include:

Load Data

The ability to load Excel data sets including: Fact Journals (FJs) for transactions and events, Fact Catalogs (FCs), and Dimension Tables (DTs)

Build view

The ability to select a table in the database, configure views and create a micro-service to generate this view in a solution

DTVs

DTVs or Dimension Tables for Views instantiate the menu system in a solution.

SVGs

SVGs or Scalable Vector Graphics files are used to display images and diagrams in a solution.

HTML

HTML files may be included as part of a solution.

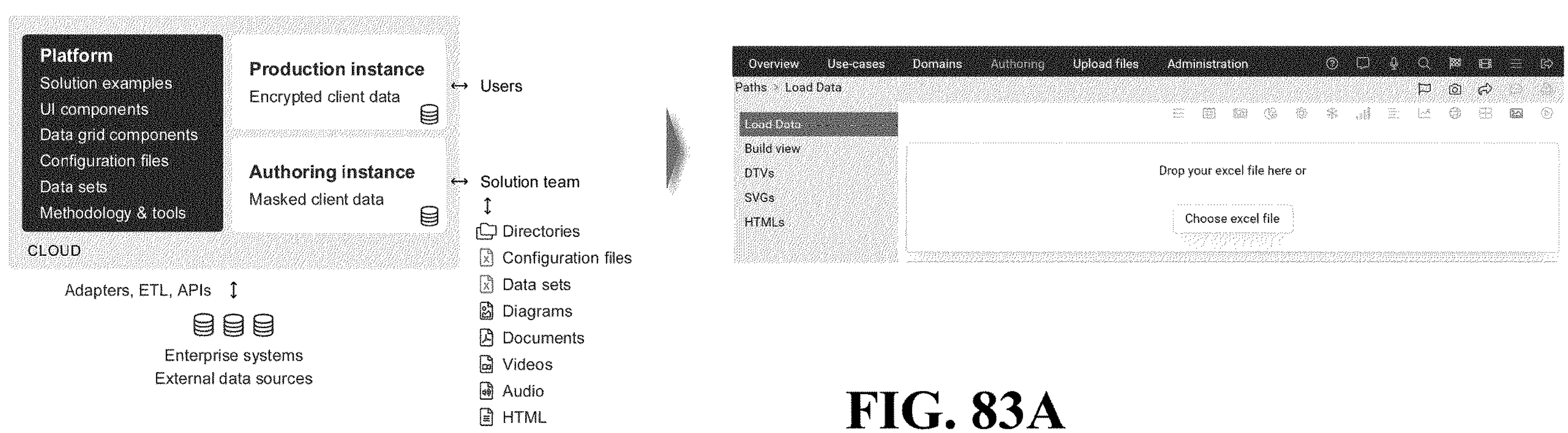

FIG. 83A

Authoring features › View Builder

The view builder enables the solution team to select a table in the database, configure views and create a micro-service to generate this view in a solution. The author may select measures, specify row and column filters, filters, units of measure as well as multiple formatting options.

Views may be created with data from any source ( e.g. loaded using Excel files as well as data loaded using adapters, ETL and APIs)

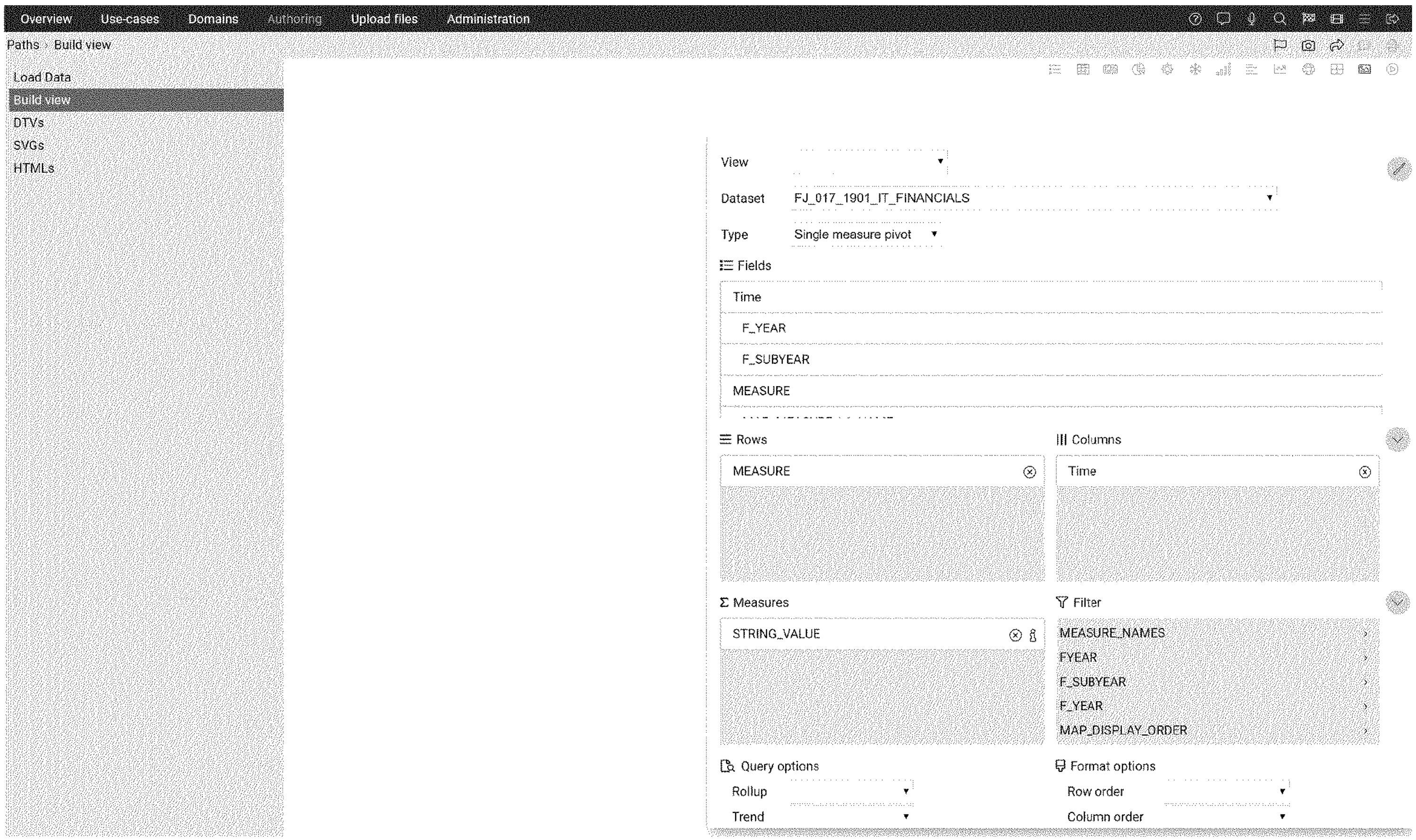

FIG. 83B

Authoring features › DTVs

A DTV (Dimension Table for Views) specifies the menu structure in section of a solution. The demo solution is delivered with a set of base DTVs which provide examples of menu systems and assembly method. The author may download and edit DTVs using Excel and then load updated DTVs to modify the menu system in a solution.

Authoring features › SVGs

Scalable Vector Graphic files are used to incorporate diagrams and images in solutions. SVG files may be created using multiple software packages or downloaded from image libraries. SVG files may be ingested in and then included in a solution by invoking them in the menu system configuration.

Authoring features › HTML

HTML files may be included in a solution. This gives the solution team significant flexibility in building extensions to a solution. HTML files are ingested in and may be invoked by the menu system (DTVs).

8400

8410

| | A | B | C | D | E | F | G | H | I | J | K | L | M | N | O |
|---|---|---|---|---|---|---|---|---|---|---|---|---|---|---|---|
| 1 | DOMAIN | Financials | | | | | | | | | | | | | |
| 2 | TABLE_NAME | FJ_004_1400_BMO_SUPP_PC | | | | | | | | | | | | | |
| 3 | DATA_TYPE | | | | | | | | | | | | | | |
| 4 | T | | | | | | | | | | 2019-Q4 | 2019-Q3 | 2019-Q2 | 2019-Q1 | 2018-Q4 |
| 5 | ST | | | | | | | | | | Actual | Actual | Actual | Actual | Actual |
| 6 | C | | MAP_DISPLAY_ ORDER | NOTES | MAP_MEASURE_L1_NAME | MAP_MEASURE_L2_NAME | MAP_MEASURE_L3_NAME | | | | | | | | |
| 7 | | | | | | | | | | | | | | | |
| 8 | | | | | | | | | | | | | | | |
| 9 | | | 1 | | | | | FINANCIAL HIGHLIGHTS | | | | | | | |
| 10 | | | 2 | | | | | | | LINE | 2019 | 2019 | 2019 | 2019 | 2018 |
| 11 | | | 3 | | | | | ($ millions except as noted) | | # | Q4 | Q3 | Q2 | Q1 | Q4 |
| 12 | | | 4 | | | | | | | | | | | | |
| 13 | | | 5 | | | | | Income Statement Information | | | | | | | |
| 14 | D | | 6 | | Income statement information | Total revenue | | Total revenue | | 1 | 6,087 | 6,666 | 6,213 | 6,517 | 5,893 |
| 15 | D | | 7 | | Income statement information | Total provision for credit losses | | Total provision for credit losses (PCL) | | 2 | 253 | 306 | 176 | 137 | 175 |
| 16 | D | | 8 | | Income statement information | CCPB | | Insurance claims, commissions and changes in policy | | 3 | 335 | 887 | 561 | 926 | 390 |
| 17 | D | | 9 | | Income statement information | Non-interest expense | | Non-interest expense | | 4 | 3,987 | 3,491 | 3,595 | 3,557 | 3,193 |
| 18 | D | | 10 | | Income statement information | Provision for income taxes | | Provision for income taxes | | 5 | 318 | 425 | 384 | 387 | 438 |
| 19 | D | | 11 | | Income statement information | Net income | | Net income | | 6 | 1,194 | 1,557 | 1,497 | 1,510 | 1,697 |
| 20 | D | | 12 | | Income statement information | Adjusted net income | | Adjusted net income | | 7 | 1,607 | 1,582 | 1,522 | 1,538 | 1,531 |
| 21 | D | | 13 | | Income statement information | Non-controlling interest in subsidiaries | | Non-controlling interest in subsidiaries | | 8 | - | - | - | - | - |
| 22 | D | | 14 | | Income statement information | Net income attributable to equity | holders of the Bank | Net income attributable to equity holders of the Bank | | 9 | 1,194 | 1,557 | 1,497 | 1,510 | 1,697 |
| 23 | | | 15 | | | | | | | | | | | | |
| 24 | | | 16 | | | | | Reported Profitability Measures | | | | | | | |
| 25 | N | | | a1 | (1) Prior periods have been reclassified to conform with the current period's presentation. | | | (1) Adjusted Results are non-GAAP financial measures. See "Accounting Framework" section on page 1 for further information | | | | | | | |
| 26 | N | | | a2 | (2) Adjusted Results are non-GAAP financial measures. See "Accounting Framework" section on page 1 for further | | | (2) Prior periods have been reclassified to conform with the current period's presentation. | | | | | | | |
| 27 | N | | | a3 | (3) Gross Impaired Loans excludes Purchased Credit Impaired Loans. | | | (3) Gross Impaired Loans excludes Purchased Credit Impaired Loans. | | | | | | | |
| 28 | | | | | | | | | | | | | | | |

| | 2017 | | 2018 | | | | | 2019 | | | | |
|---|---|---|---|---|---|---|---|---|---|---|---|---|
| | Fiscal | Q4 | Fiscal | Q1 | Q2 | Q3 | Q4 | Fiscal | Q1 | Q2 | Q3 | Q4 |
| - Income statement information | | | | | | | | | | | | |
| Adjusted net income | 5,497 | 1,306 | 5,982 | 1,422 | 1,463 | 1,566 | 1,531 | 6,249 | 1,538 | 1,522 | 1,582 | 1,607 |
| Net income | 5,339 | 1,224 | 5,453 | 973 | 1,246 | 1,537 | 1,697 | 5,758 | 1,510 | 1,497 | 1,557 | 1,194 |
| - Net income attributable to equity | | | | | | | | | | | | |
| holders of the Bank | 5,337 | 1,224 | 5,453 | 973 | 1,246 | 1,537 | 1,697 | 5,758 | 1,510 | 1,497 | 1,557 | 1,194 |
| Non-controlling interest in subsidiaries | 2 | - | - | - | - | - | - | - | - | - | - | - |
| Non-interest expense | 13,192 | 3,339 | 13,477 | 3,400 | 3,525 | 3,359 | 3,193 | 14,630 | 3,557 | 3,595 | 3,491 | 3,987 |
| Provision for income taxes | 1,292 | 276 | 1,961 | 763 | 317 | 443 | 438 | 1,514 | 387 | 384 | 425 | 318 |
| Total provision for credit losses | 746 | 202 | 662 | 141 | 160 | 186 | 175 | 872 | 137 | 176 | 306 | 253 |
| Total revenue | 22,107 | 5,614 | 22,905 | 5,638 | 5,580 | 5,794 | 5,893 | 25,483 | 6,517 | 6,213 | 6,666 | 6,087 |
| CCPB | 1,538 | 573 | 1,352 | 361 | 332 | 269 | 390 | 2,709 | 926 | 561 | 887 | 335 |

(F20)

8528

%7B%22serviceId%22%3A%22%22%2C%22filter%22%3A%22%22%2C%22pivot_row%22%3A%22%22%2C%22pivot_col%22%3A%22%22%2C%22type%22%3A%22svc%22%2C%22dynSpec%22%3A%7B%22ID%22%3A%22%22%2C%22name%22%3A%22%22%2C%22drilldown_service%22%3A%22%22%2C%22unit%22%3A%22%22%2C%22Domain%22%3A%22%22%2C%22dataset_type%22%3A%22%22%2C%22dataset_api%22%3A%22FJ_004_1400_BMO_SUPP_PC%22%2C%22field%22%3A%22STRING_VALUE%22%2C%22aggregate%22%3A%22first_element%22%2C%22unique%22%3A%22%22%2C%22unique_dictionary%22%3A%22%22%2C%22last_period_only%22%3A%22%22%2C%22value_fn%22%3A%22first_element%22%2C%22render_fn%22%3A%22%22%2C%22rollup%22%3A%22stock%22%2C%22filter%22%3A%22%20(%20MAP_MEASURE_L1_NAME%20%3D%3D%20%27Income%20statement%20information%27%20)%20%22%2C%22default_filter%22%3A%22%22%2C%22filter_unspecified%22%3A%22%22%2C%22query_type%22%3A%22matrix%22%2C%22display%22%3A%22JsonTree%22%2C%22popup%22%3A%22%22%2C%22pivot_row_hdr%22%3A%22%22%2C%22pivot_row%22%3A%22MAP_MEASURE_L1_NAME%2CMAP_MEASURE_L2_NAME%2CMAP_MEASURE_L3_NAME%2CMAP_MEASURE_L4_NAME%22%2C%22pivot_col_hdr%22%3A%22%22%2C%22pivot_col%22%3A%22F_YEAR%2CF_SUBYEAR%22%2C%22trend%22%3A%22%22%2C%22address%22%3A%22%22%2C%22display_settings%22%3A%22expandAllLevels%22%2C%22columns%22%3A%22%22%2C%22column_filters%22%3A%22%22%2C%22hide_time_option%22%3A%22%22%2C%22calc_spec%22%3A%22%22%2C%22format%22%3A%22%22%2C%22expandLevel%22%3A%22All%22%7D%7D

| | 2017 | 2018 | | | | 2019 | | | |
|---|---|---|---|---|---|---|---|---|---|
| | Q4 | Q1 | Q2 | Q3 | Q4 | Q1 | Q2 | Q3 | Q4 |
| Balance sheet: as-at balances | | | | | | | | | |
| Interest Bearing Deposits with Banks | 6,490 | 6,740 | 7,637 | 7,637 | 8,305 | 7,609 | 7,518 | 6,899 | 7,987 |
| Loans | | | | | | | | | |
| Subtotal | 360,340 | 358,286 | 370,548 | 377,421 | 385,630 | 399,232 | 414,952 | 419,649 | 427,944 |
| Business and government | 163,323 | 160,380 | 170,342 | 174,747 | 180,439 | 193,310 | 205,966 | 207,316 | 211,878 |
| Consumer instalment and other personal | 61,944 | 61,118 | 61,733 | 62,485 | 63,225 | 63,241 | 64,454 | 65,989 | 67,736 |
| Credit cards | 8,071 | 7,994 | 8,175 | 8,236 | 8,329 | 8,187 | 8,467 | 8,749 | 8,859 |
| Allowance for credit losses | (1,833) | (1,624) | (1,647) | (1,660) | (1,639) | (1,628) | (1,710) | (1,802) | (1,850) |
| Non-residential mortgages | 11,744 | 11,608 | 12,528 | 13,217 | 14,017 | 14,455 | 15,287 | 15,541 | 15,731 |
| Residential mortgages | 115,258 | 117,186 | 117,770 | 118,736 | 119,620 | 120,039 | 120,778 | 122,054 | 123,740 |
| Other Assets | | | | | | | | | |
| Customers' liability under acceptances | 16,546 | 16,705 | 16,385 | 17,874 | 18,585 | 21,529 | 21,702 | 24,741 | 23,593 |
| Derivative instruments | 28,951 | 31,756 | 26,588 | 24,810 | 25,422 | 21,633 | 20,627 | 22,200 | 22,144 |
| Goodwill | 6,244 | 6,056 | 6,263 | 6,275 | 6,373 | 6,388 | 6,500 | 6,329 | 6,340 |
| Intangible assets | 2,159 | 2,144 | 2,190 | 2,207 | 2,272 | 2,285 | 2,331 | 2,319 | 2,424 |
| Other | 17,830 | 18,001 | 17,680 | 18,787 | 18,231 | 17,933 | 19,097 | 19,581 | 19,313 |
| Premises and equipment | 2,033 | 1,965 | 1,966 | 1,924 | 1,986 | 1,971 | 1,983 | 1,989 | 2,055 |
| Other Liabilities | | | | | | | | | |
| Acceptances | 16,546 | 16,705 | 16,385 | 17,874 | 18,585 | 21,529 | 21,702 | 24,741 | 23,593 |
| Derivative instruments | 27,804 | 31,079 | 24,770 | 24,480 | 23,629 | 23,188 | 21,549 | 23,613 | 23,598 |
| Other | 32,752 | 33,172 | 34,115 | 34,283 | 37,109 | 33,353 | 37,351 | 37,176 | 38,722 |
| Securities lent or sold under repurchase agreements | 55,119 | 72,260 | 78,782 | 83,471 | 66,684 | 87,783 | 87,039 | 89,829 | 86,656 |
| Securities sold but not yet purchased | 25,163 | 26,367 | 25,414 | 24,409 | 28,804 | 30,407 | 32,023 | 27,375 | 26,253 |
| Securitization and structured entities' liabilities | 23,054 | 23,503 | 23,565 | 23,545 | 25,051 | 23,969 | 25,621 | 25,544 | 27,159 |
| Preferred shares | | | | | | | | | |
| & other equity instruments | 4,240 | 4,240 | 4,240 | 4,240 | 4,340 | 4,340 | 4,690 | 5,348 | 5,348 |
| Retained earnings | 23,700 | 23,893 | 24,110 | 24,901 | 25,850 | 26,599 | 27,405 | 28,241 | 28,725 |
| Securities | 163,198 | 163,551 | 165,380 | 167,318 | 180,935 | 188,476 | 191,226 | 191,725 | 189,438 |
| Securities borrowed or purchased | | | | | | | | | |
| under resale agreements | 75,047 | 83,194 | 94,681 | 101,679 | 85,051 | 100,699 | 110,405 | 106,612 | 104,004 |
| Subordinated Debt | 5,029 | 6,463 | 5,627 | 5,618 | 6,782 | 6,820 | 6,953 | 6,876 | 6,995 |
| Total Assets | 709,604 | 727,933 | 743,593 | 765,344 | 773,293 | 806,597 | 830,470 | 839,180 | 852,195 |
| Total Liabilities and Equity | 709,604 | 727,933 | 743,593 | 765,344 | 773,293 | 806,597 | 830,470 | 839,180 | 852,195 |
| Total deposits | 479,792 | 475,565 | 491,198 | 506,916 | 520,928 | 532,199 | 548,837 | 553,383 | 568,143 |
| Total equity | 44,345 | 42,819 | 43,737 | 44,748 | 45,721 | 47,349 | 49,395 | 50,643 | 51,076 |
| Total net loans | 358,507 | 356,662 | 368,901 | 375,761 | 383,991 | 397,604 | 413,242 | 417,847 | 426,094 |
| Accumulated other | | | | | | | | | |
| comprehensive income | 3,066 | 1,360 | 2,157 | 2,381 | 2,302 | 3,188 | 4,054 | 3,793 | 3,729 |
| Cash and Cash Equivalents | 32,599 | 41,159 | 35,922 | 41,072 | 42,142 | 40,470 | 35,839 | 38,938 | 48,803 |
| Common shares | 13,032 | 13,020 | 12,926 | 12,924 | 12,929 | 12,914 | 12,939 | 12,958 | 12,971 |
| Contributed surplus | 307 | 306 | 304 | 302 | 300 | 308 | 307 | 303 | 303 |

DATA ANALYSIS AND VISUALIZATION USING STRUCTURED DATA TABLES AND NODAL NETWORKS

CROSS REFERENCE TO RELATED APPLICATIONS

This application is a continuation-in-part application of U.S. patent application Ser. No. 16/383,122, filed Apr. 12, 2019, which is a continuation application of U.S. patent application Ser. No. 15/925,995, filed Mar. 20, 2018, which claims priority to U.S. Provisional Application No. 62/474,168, filed Mar. 21, 2017, each of which is incorporated herein by reference in its entirety.

This application also claims priority to U.S. Provisional Patent Application No. 62/829,961, filed Apr. 5, 2019, which is also incorporated herein by reference in its entirety.

TECHNICAL FIELD

This application relates generally to data retrieval, storage, and display techniques using data tables and nodal networks. More specifically, this application is directed towards structuring data.

BACKGROUND

As the processing power of computers allow for greater computer functionality and the Internet technology era allows for interconnectivity between computing systems, many organizations collect large volumes of data. The wide range of data collected may include in-person customer transaction data, online transaction data, internal communication data, and the like. Many organizations analyze the data in order to have a better understanding of their organization, such as customer relations, organizational efficiency, and the like. For instance, an organization may analyze existing customer transactions in order to provide better services to customers and/or to perform more efficiently.

"Big data" includes datasets that are too large for traditional data-processing application software. The datasets may be structured, semi-structured, and unstructured data. Because of the volume and variety of data within these datasets, conventional solutions are not able to navigate the datasets efficiently, thereby delaying decision-making and precluding solutions that rely on comprehending the information.

Conventional and existing methods analyze large volumes of data by executing various queries using different thresholds to identify insights. For instance, an administrator can access an online tool and identify unsatisfied customers or inefficient procedures performed at an organization. However, since the implementation of these online tools, several technical shortcomings have been identified and have created a new set of challenges. For instance, existing and conventional methods require high processing power and computing resources due to the high volume of data existing on different networks and computing infrastructures. Managing such information on different platforms is difficult due to number, size, content, or relationships of the structured and/or unstructured data associated with the customers.

Moreover, conventional visualization tools do not provide an efficient method of navigating large volumes of data. Conventional and existing visualization techniques only focus on filtering data. For instance, users must define various thresholds and filters in order to create a more granular view. These methods are inefficient for two reasons. First, these methods shift the burden of data navigation to users. Second, these methods do not provide a systematic and consistent approach to visualizing large volumes of data.

SUMMARY

For the aforementioned reasons, there is a need to develop an intelligent method to uniquely structure data and generate computer models based on the structured data in order to analyze data more efficiently. There is also a need to visualize data using a systematic and consistent approach. For instance, there is a need to visualize data in a manner that is consistent with nodal networks or other structured data modeled after large volumes of data.

In an embodiment, a method of navigating structured and unstructured data using a relational computer model, the method comprises receiving, by a server, an electronic template having a set of input fields, the electronic template identifying at least a portion of data stored within a database and its corresponding domain and a display attribute, the electronic template further identifying a database storing the data; parsing, by the server, the data into a set of unique domain data tables, each domain data table corresponding to the domain having a first criterion received from the electronic template; parsing, by the server, each unique data table into a set of unique dimension tables, each dimension data table corresponding to a predetermined dimension having a second criterion received from the electronic template; generating, by the server in accordance with the electronic template, a nodal network comprising a set of nodes where each node represents at least a portion of the retrieved data, each node having metadata comprising a unique identifier corresponding to a unique domain table and a unique dimension table corresponding to data associated with each node; linking, by the server, one or more nodes based their respective metadata; and upon receiving a request from a user computing device parsing, by the server, the request to identify a node associated with the request, and displaying, by the server on a graphical user interface of the user computing device, data associated with the identified node, wherein the data is displayed in accordance with the display attribute received from the electronic template.

In another embodiment, a computer system for navigating structured and unstructured data using a relational computer model, the system comprises a user computing device configured to display a graphical user interface; and a server in communication with the user computing device, wherein the server is configured to receive an electronic template having a set of input fields, the electronic template identifying at least a portion of data stored within a database and its corresponding domain and a display attribute, the electronic template further identifying a database storing the data; parse the data into a set of unique domain data tables, each domain data table corresponding to the domain having a first criterion received from the electronic template; parse each unique data table into a set of unique dimension tables, each dimension data table corresponding to a predetermined dimension having a second criterion received from the electronic template; generate, in accordance with the electronic template, a nodal network comprising a set of nodes where each node represents at least a portion of the retrieved data, each node having metadata comprising a unique identifier corresponding to a unique domain table and a unique dimension table corresponding to data associated with each node; link one or more nodes based their respective metadata; and upon receiving a request from the user computing device parse the request to identify a node associated with the request, and display, on the graphical user interface of the user computing device, data associated with the identified node, wherein the data is displayed in accordance with the display attribute received from the electronic template.

In another embodiment, a method of visualizing data corresponding to a nodal network, the method comprises presenting, by a server, a display screen having a first graphical component and a second graphical component; dynamically populating, by the server, the first graphical component with data corresponding to a node where the server displays a first set of hyperlinks corresponding to one or more child nodes of the node; upon receiving an indication that a user has interacted with a first hyperlink of the first set of hyperlinks, identifying, by the server, a child node corresponding to the first hyperlink; dynamically populating, by the server, the second graphical component with data corresponding to the child node where the server displays a second set of hyperlinks corresponding to one or more subsequent child nodes of the child node; upon receiving an indication that a user has interacted with a second hyperlink of the second set of hyperlinks, identifying, by the server, a subsequent child node corresponding to the second hyperlink; and dynamically populating, by the server, the second graphical component with data corresponding to the subsequent child node.

In another embodiment, a computer system for visualizing data corresponding to a nodal network, the system comprises a user computing device having a display screen; and a server in communication with the user computing device, the server configured to present on the display screen having a first graphical component and a second graphical component; dynamically populate the first graphical component with data corresponding to a node where the server displays a first set of hyperlinks corresponding to one or more child nodes of the node; upon receiving an indication that a user operating the user computing device has interacted with a first hyperlink of the first set of hyperlinks, identify a child node corresponding to the first hyperlink; dynamically populate the second graphical component with data corresponding to the child node where the server displays a second set of hyperlinks corresponding to one or more subsequent child nodes of the child node; upon receiving an indication that a user has interacted with a second hyperlink of the second set of hyperlinks, identify a subsequent child node corresponding to the second hyperlink; and dynamically populate the second graphical component with data corresponding to the subsequent child node.

In another embodiment, a method comprises parsing, by the server, data into a set of unique domain data tables, each domain data table corresponding to a predetermined domain having a first criterion, wherein the server identifies data associated with cybersecurity activity and generates a unique data table for a cybersecurity domain; parsing, by the server, each unique data table into a set of unique dimension tables, each dimension data table corresponding to a predetermined dimension having a second criterion; generating, by a server, a nodal network comprising a set of nodes where each node represents at least a portion of the collected data, each node having metadata comprising a unique identifier corresponding to a unique domain table and a unique dimension table corresponding to the data associated with each node; linking, by the server, one or more nodes based their respective metadata; upon receiving an instruction from a user computing device to display cybersecurity data: parsing, by the server, the request to identify one or more linked nodes associated with the request; identifying, by the server, a likelihood of occurrence of a cyber-attack based and an impact value of the cyber-attack based on the data corresponding to the one or more linked nodes; displaying, by the server on a graphical user interface of the user computing device, a multi-dimensional cybersecurity matrix indicating the likelihood of a cyber-attack and the impact value of the cyber-attack.

In another embodiment, a computer system comprises a user computing device having a display screen; and a server in communication with the user computing device, the server configured to: parse data into a set of unique domain data tables, each domain data table corresponding to a predetermined domain having a first criterion, wherein the server identifies data associated with cybersecurity activity and generates a unique data table for a cybersecurity domain; parse each unique data table into a set of unique dimension tables, each dimension data table corresponding to a predetermined dimension having a second criterion; generate a nodal network comprising a set of nodes where each node represents at least a portion of the collected data, each node having metadata comprising a unique identifier corresponding to a unique domain table and a unique dimension table corresponding to the data associated with each node; link one or more nodes based their respective metadata; upon receiving an instruction from a user computing device to display cybersecurity data parse the request to identify one or more linked nodes associated with the request; identify a likelihood of occurrence of a cyber-attack based and an impact value of the cyber-attack based on data corresponding to the one or more linked nodes; display, on a graphical user interface of the user computing device, a multi-dimensional cybersecurity matrix indicating the likelihood of a cyber-attack and the impact value of the cyber-attack.

In another embodiment, a method of navigating structured and unstructured data using a relational computer model, the method comprises receiving, by a server, an electronic template having a set of input fields, the electronic template identifying at least a portion of data stored within a database and its corresponding domain and a display attribute, the electronic template further identifying a database storing the data; parsing, by the server, the data into a set of unique domain data tables, each domain data table corresponding to the domain having a first criterion received from the electronic template; parsing, by the server, each unique data table into a set of unique dimension tables, each dimension data table corresponding to a predetermined dimension having a second criterion received from the electronic template; generating, by the server in accordance with the electronic template, a nodal network comprising a set of nodes where each node represents at least a portion of the retrieved data, each node having metadata comprising a unique identifier corresponding to a unique domain table and a unique dimension table corresponding to data associated with each node; linking, by the server, one or more nodes based their respective metadata; and upon receiving a request from a user computing device parsing, by the server, the request to identify a nodal network associated with the request; iteratively executing, by the server, an analysis protocol on the data corresponding to the nodes within the identified nodal network; and displaying, by the server on a graphical user interface of the user computing device, data associated with the execution of the analysis protocol.

In another embodiment, a computer system for navigating structured and unstructured data using a relational computer model, the system comprises a user computing device configured to display a graphical user interface; and a server in communication with the user computing device, wherein the server is configured to: receive an electronic template having a set of input fields, the electronic template identifying at least a portion of data stored within a database and its corresponding domain and a display attribute, the electronic template further identifying a database storing the data; parse the data into a set of unique domain data tables, each domain data table corresponding to the domain having a first criterion received from the electronic template; parse each unique data table into a set of unique dimension tables, each dimension data table corresponding to a predetermined dimension having a second criterion received from the electronic template; generate, in accordance with the electronic template, a nodal network comprising a set of nodes where each node represents at least a portion of the retrieved data, each node having metadata comprising a unique identifier corresponding to a unique domain table and a unique dimension table corresponding to data associated with each node; link one or more nodes based their respective metadata; and upon receiving a request from the user computing device: parse the request to identify a nodal network associated with the request; iteratively execute an analysis protocol on the data corresponding to the nodes within the identified nodal network; and display, on the graphical user interface of the user computing device, data associated with the execution of the analysis protocol.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

FIGS. 49-51 illustrate examples of data tables generated by an intelligent data analysis system, according to an embodiment.

FIGS. 54A-G illustrate a cybersecurity protocol used by the analytics server, according to an embodiment.

FIG. 65 illustrates a graphical representation of different data tables within a nodal network, according to an embodiment.

FIGS. 66A-B illustrates a graphical representation of different data tables within a nodal network, according to an embodiment.

FIG. 67 illustrates a graphical representation of different data tables within a nodal network, according to an embodiment.

FIG. 68 illustrates a graphical representation of different data tables within a nodal network, according to an embodiment.

FIG. 69 illustrates a graphical representation of different data tables within a nodal network, according to an embodiment.

FIG. 70 illustrates a graphical representation of different data tables within a nodal network, according to an embodiment.

FIG. 71 illustrates a data table representing interrelationships between other data tables, according to an embodiment.

FIGS. 73A-D illustrates a visual representation of iterative execution of an analysis protocol, according to an embodiment.

FIGS. 81A-H illustrate components of a platform generated by the intelligent data analysis system, according to an embodiment.

FIGS. 82A-L illustrate various domains used by the intelligent data analysis system, according to different embodiments.

FIGS. 83A-E illustrate components of authorship component of a platform generated by the intelligent data analysis system, according to an embodiment.

FIG. 84 illustrates an electronic template, according to an embodiment.

FIGS. 85A-G illustrate different graphical user interface displayed by the intelligent data analysis system, according to an embodiment.

DETAILED DESCRIPTION

Figure 1:
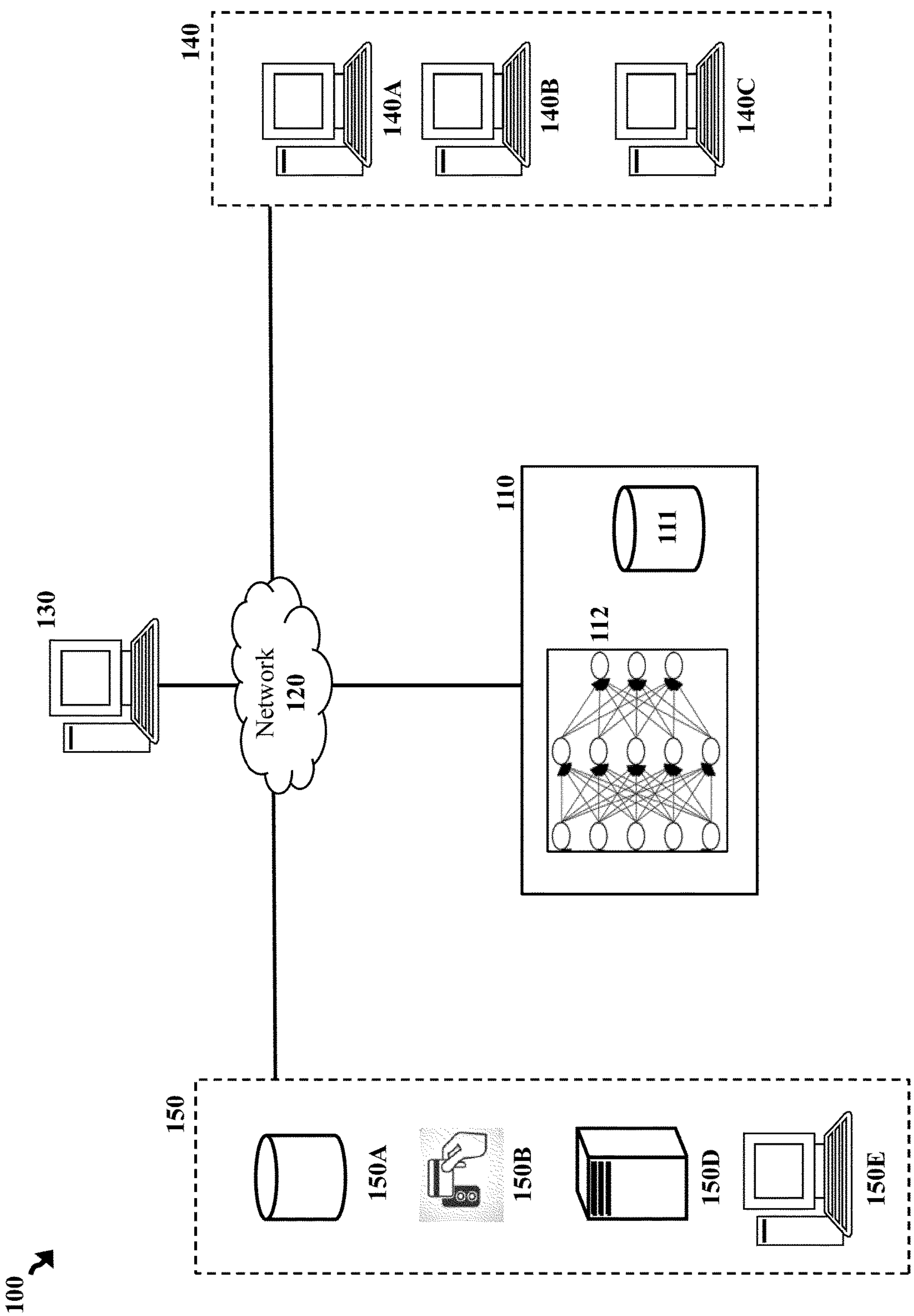
FIG. 1 illustrates components of an intelligent data analysis system, according to an embodiment.

References will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 is a block diagram illustrating an intelligent data analysis system 100 that includes an analytics server 110 (having a database 111 and a nodal network 112), administrative computer 130, user computing devices 140, and electronic data sources 150. The above-mentioned components may be connected to each other through a network 120. Non-limiting examples of the network 120 may include private or public LAN, WLAN, MAN, WAN, and the Internet.

The network 120 may include both wired and wireless communications according to one or more standards and/or via one or more transport mediums. The communication over the network 120 may be performed in accordance with various communication protocols such as Transmission Control Protocol and Internet Protocol (TCP/IP), User Datagram Protocol (UDP), and IEEE communication protocols. In one example, the network 120 may include wireless communications according to Bluetooth specification sets, or another standard or proprietary wireless communication protocol. In another example, the network 120 may also include communications over a cellular network, including, e.g., a GSM (Global System for Mobile Communications), CDMA (Code Division Multiple Access), and EDGE (Enhanced Data for Global Evolution) network.

The analytics server 110 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single analytics server 110, in some configurations, the analytics server 110 may include any number of computing devices operating in a distributed computing environment to achieve the functionalities described herein. Furthermore, even though the database 111 is shown as an in memory database, in some configurations, the database 111 may be a remote database, cloud computing data storage, and/or data storage operationally controlled by a third party.

In an embodiment, the analytics server 110 may be configured to continuously and/or periodically retrieve data from different electronic sources 150, structure the retrieved data by generating various domain and dimension tables, and generate/revise the nodal network 112 accordingly. The analytics server 110 may also store all relevant data into the database 111. The analytics server 110 is also program to parse and unify data collected from the electronic data sources 150. For instance, data collected from the electronic data sources 150 may be in different formats. As a result, the analytics server may unify and/or normalize the data before generating and/or revising the nodal network 112.

As will be described below, the nodal network 112 (also referred to herein as the data grid, knowledge grid, or the nodal data structure) is a computer model that uniquely structures the retrieve data. Different electronic sources, user interfaces, user-computing devices, and the like may consume the data uniquely structured. Therefore, the data structured by the analytics server 110 is uniform and unified, thereby avoiding the need to configure data to different computing systems. For instance, different computing devices belonging to different computing infrastructures may consume data structured by the analytics server 110 without needing to modify or revise their system architecture or configurations.

As will be described below, upon retrieving data, the analytics server 110 may first generate multiple data structures/tables by disaggregating data based on identifying a domains and dimensions for the retrieve data. The analytics server 110 may then generate the nodal network 112 based on the data tables (e.g., domain data tables and dimension data tables).

Upon generating the nodal network 112, the analytics server 110 may display a graphical user interface (GUI) on the user computing devices 140 and/or administrative computer 130. An example of the GUI generated and hosted by the analytics server 110 may be a web-based application or a website, as depicted in FIGS. 5-47. The analytics server 110 may also host a website accessible to end-users (e.g., an employee operating computer 140A-C), where the content presented via the various webpages may be controlled based upon each particular user's role.

The analytics server 110 may execute software applications configured to display the GUI (e.g., host a website), which may generate and serve various webpages to each user computing devices 140 and/or the administrative computer 130. Different users operating the user computing devices 140 may use the website to generate, upload, access, and store data (e.g., files) stored on database 111 and the nodal network 112.

The analytics server 110 may be configured to require user authentication based upon a set of user authorization credentials (e.g., username, password, biometrics, cryptographic certificate, and the like). In such implementations, the analytics server 110 may access the database 111 configured to store user credentials, which the analytics server 110 may be configured to reference in order to determine whether a set of entered credentials (purportedly authenticating the user) match an appropriate set of credentials that identify and authenticate the user. In some implementations, the analytics server 110 may incorporate the GUI into a third-party application, such as an internal customer relation management application, third-party email application, and/or organization management application while preserving the "look and feel" of the third-party application.

The analytics server 110 may generate and host webpages (displaying the GUIs) based upon a particular user's role within the system 100 (e.g., administrator, employee, or the employer). In such implementations, the user's role may be defined by data fields and input fields in user records stored in the database 111. The analytics server 110 may authenticate each user and may identify the user's role by executing an access directory protocol (e.g., LDAP). The analytics server 110 may generate webpage content, access, or generate data stored onto the nodal network 112, according to the user's role defined by the user record in the database 111. For instance, a user may be defined as a lower level employee who may not be authorized to view all related content to a particular sensitive file. Therefore, the analytics server 110 may customize the GUI according to the user's authentication level. Furthermore, the analytics server 110 may customize the GUI according to a user's role (e.g., function type). For instance, the analytics server 110 may customize the GUI based on whether a user is a designer or an account manager.

User computing devices 140 may be any computing device comprising a processor and a non-transitory machine-readable storage medium capable of performing the various tasks and processes described herein. Non-limiting examples of a user-computing device 140 may be a workstation computer, laptop computer, tablet computer, and server computer. As depicted in FIG. 1, the user computing devices 140 may each be operated by a user within an organizational network. For instance, user-computing devices 140 may represent all computing devices operated by all employees of an organization. User computing devices 140 may be internally interconnected via an internal and/or private network (not shown). For instance, a company's intranet or any other private network may connect all the company's computing devices 140.

Electronic data sources 150 may represent any electronic data storage 150A (e.g., local database, computing devices within an organization, cloud computing systems, third-party data storage systems, and homegrown data repositories). These storages may store customer interaction, system configuration, and interactions and other information related to all computing systems utilized via an organization. For instance, electronic data storage 150A may store data associated with monetary transfers between different branches and/or all teller transactions at a bank.

The electronic data sources 150 may also include various devices configured to transmit data to the analytics server. For instance, the electronic data sources 150 may include ATM machines or other point-of-sale terminals 150B. The ATMS or point-of-sale terminals may include local databases and/or may directly transmit transaction data (e.g., customer information, transaction amount, transaction time) to the analytics server 110. The transmission of transaction data may be done in real-time or in batches on periodic basis. In some configurations, the analytics server 110 may retrieve transaction data at any time from one or more ATMS or point-of-sale terminals.

The electronic data sources may also include a webserver 150D configured to store online interactions or other customer facing websites. In some configurations, a webserver may be configured to store all interactions between a website (whether internal or customer facing). For instance, the webserver 150D may store all information associated with the website or any other electronic application of an organization within a database. Non-limiting examples of data stored within the database may include data associated with cyber-attacks, website maintenance data, data associated with updating the website, and the like.

The electronic data sources 150 may also include a computer 150E which represents an employee computer. As described throughout this disclosure, the analytics server 110 may actively monitor interactions between an organization and its customers/users. Furthermore, the analytics server 110 may also monitor internal interactions between employees. Computer 150E represents an employee computer.

When retrieving data from different electronic sources 150, the analytics server 110 may execute various scanning and crawling protocols to identify and map data stored onto each electronic data source 150.

As discussed above, upon collecting data from different electronic data sources 150, the analytics server 110 may generate different data tables and a computer model comprising a nodal network 112 (or nodal data structure) where each node represents an identified file or relevant data. The analytics server 110 may store the nodal network 112 in the database 111 or any other electronic data repository, such as a cloud bases storage, local/internal data storage, distributed storage, blockchain, and the like.

The nodal network 112 may be a complete map of all data identified as a result of scanning and crawling different electronic data sources 150. Each node may also contain metadata further comprising historical (e.g., context) data associated with the collected/retrieved data. For instance, if the analytics server 110 identifies a file stored on to an employee computer, the analytics server 110 may designate a node to the identified file wherein the node comprises metadata corresponding to the file, such as title, mime type, file permissions, comments, date/time of creation, and the like. The metadata may also include a unique identifier (e.g., user ID, IP address, MAC address and the like) of the user and/or the computing device who created/revised/and or accessed the file. The unique identifier may identify the user and/or the user's computer. The unique identifier may identify all computers and/or users within a certain department of an organization (e.g., accounting, IT, or bank tellers).

As will be described below, the metadata may also include an identification of one or more data structures/tables (e.g., domain tables and dimension tables). The analytics server 110 may parse and disaggregate the data and generate different data structures/tables. The nodes within the nodal network 112 may correspond to the hierarchical structure of the data. For instance, the analytics server 110 may model the nodal network 112 in accordance with how data is distributed within different data structures/tables (e.g., domain tables and dimension tables). Moreover, as will be described below, when the analytics server 110 identifies that data represented by two node are related, the analytics server 110 may link the related nodes.

In operation, the analytics server 110 may continuously or periodically retrieve data from the electronic data sources 150 and may continuously or periodically revise the data structures/tables and the nodal network 112. Therefore, the knowledge obtained via the nodal network 112 may never be complete and is continuously updated by the analytics server 110.

To efficiently access a node and to retrieve all related data, the analytics server 110 may index each node based on its associated metadata and/or links. The analytics server 110 may also make each node searchable based on its metadata and/or links. To identify a node and/or to traverse the nodal network 112, the analytics server may utilize one or more existing methodologies (e.g., Solr®). Indexing the nodes within the nodal network 112 allows the nodes to be searchable by their associated metadata and/or links. In this way, as opposed to all files stored in a central data repository, the analytics server 110 can identify nodes and retrieve related metadata in real-time or near real-time using less computing power and resources.

Figure 2:
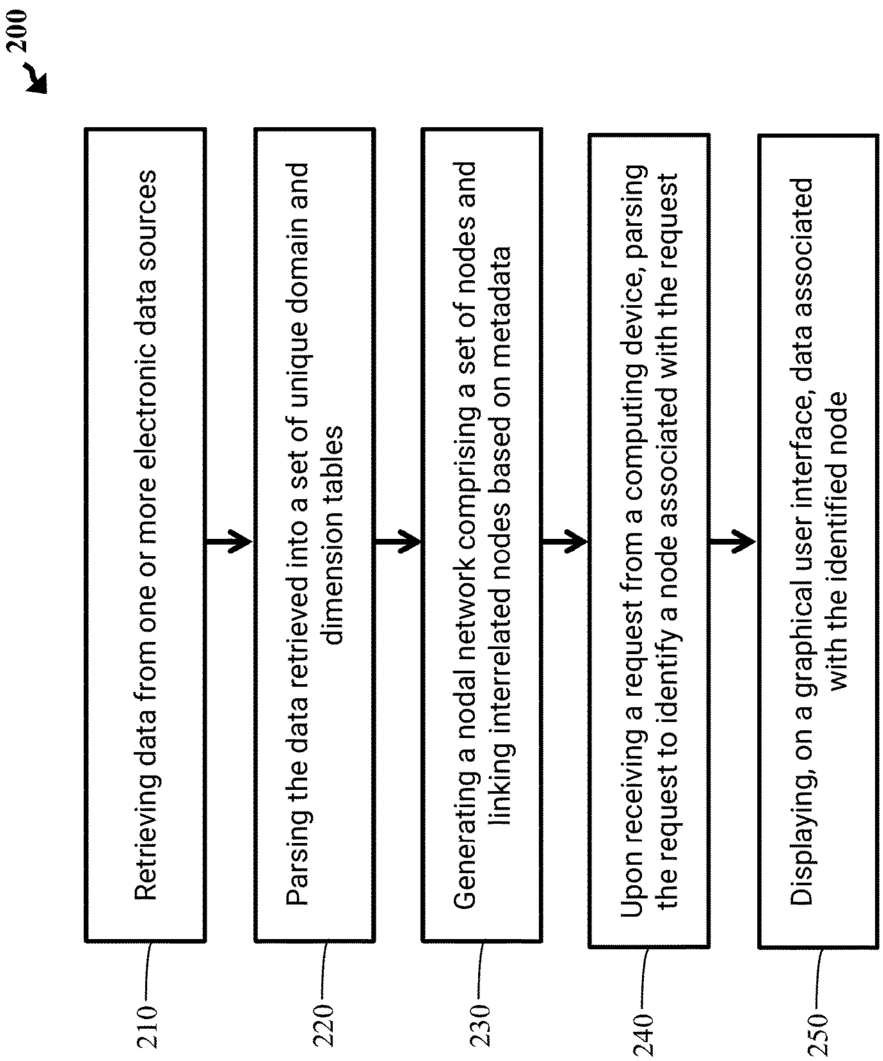
FIG. 2 is a flow diagram of a process executed by an intelligent data analysis system, according to an embodiment.

FIG. 2 is flow diagram of a process executed by the intelligent data analysis system, according to an embodiment. The method 200 includes steps 210-250. However, other embodiments may include additional or alternative execution steps, or may omit one or more steps altogether. The method 200 is described as being executed by a server, similar to the analytics server described in FIG. 1. However, in some embodiments, steps may be executed by any number of computing devices operating in the distributed computing system described in FIG. 1. For instance, part or all the steps described in FIG. 2 may be locally performed by one or more user computing devices or an administrative computing device. Furthermore, even though some aspects of the method 200 are described in the context of collecting data associated with banking computing systems, it is expressly understood that method 200 is applicable to collecting, structuring, and analyzing any data.

At step 210, the analytics server may retrieve data from one or more electronic data sources. The analytics server may continuously/periodically scan the electronic data sources and/or crawl electronic data repositories accessible to the electronic data sources to collect data. The analytics server may scan and/or crawl the electronic data sources to identify and collect all files stored onto the electronic data sources and/or data repositories accessible to the electronic data sources. For instance, the analytics server may transmit an instruction to one or more ATMS where the instruction is configured to cause a local database of the ATMS to transmit all transaction data to the analytics server. In another example, the analytics server may transmit an instruction to a database associated with a customer-facing website where the instruction is configured to cause the database to transmit all customer interactions with the website, such as all online transactions or purchases. In another example, the analytic server may crawl one or more employee computers to identify all files accessible/stored onto the employee computers and/or data repositories accessible to such computers (e.g., third party database or a cloud storage system accessible to the employee computers).

In some configurations, the analytics server may require all users to create accounts and grant permission to the analytics server to periodically monitor files and other data accessible to each user. The analytics server may provide a web-based application displaying various prompts allowing each user to grant the analytics server permission to periodically monitor all data (e.g., files) accessible and/or stored onto each user's computer. During the account registration process, the web-based application may display one or more prompts allowing each user to connect his or her email accounts, messaging tools, task management tools, project management tools, calendars, organizational or knowledge management tools, other collaborative tools and/or electronic repository systems (e.g., local database, cloud storage systems, and the like) to the analytics server.

The prompt may also include one or more text input fields where each user can input identification and authentication credentials for his email accounts, messaging tools, electronic repository systems, and/or third party applications, such as project management tool, time tracking applications, billing, issue tracking, web accounts, and other online applications. For example, a user may enter his email address and password in the input fields displayed by the analytics server. Upon receipt, the analytics server may use the authentication credentials to remotely login the above-described portals and monitor all files accessible and/or revised by each user and/or all files saved on the electronic data repositories.

Upon receiving permission from users, the analytics server may scan the one or more electronic data sources including electronic data repositories accessible to each user. The analytics server may execute a scanning or crawling protocol where the analytics server crawls different databases to identify all files accessible to each user (e.g., collecting data).

As discussed above, an electronic repository may represent any electronic repository storing files that are accessible to one or more computers within an organization. Non-limiting examples of an electronic repository may include a database, cloud storage system, third-party shared drives, third-party application as described above, internal file transfer protocol (FTP), and internal or external database operated by the analytics server, email storage, HR systems, accounting systems, customer relationship management (CRM) systems, and the like. In some configurations, the data may be inputted by one or more users. For instance, an administrator operating the administrative computer (described in FIG. 1) may access a web-based application to input relevant data (e.g., account collectables, cybersecurity related data). In some embodiments, a user (e.g., an administrator) may upload various files/data onto an electronic repository (e.g., FTP) to be analyzed by the analytics server.

The analytics server may retrieve data using an application programming (API) interface in communication with the electronic data sources. The analytics server may use an API configured to communicate with the electronic data sources and/or electronic data repositories in communication with the electronic data sources to collect data.

At step 220, the analytics server may parse the data retrieved to generate a set of uniform data tables. The analytics server may parse and disaggregate the collected data into a set of unique domain data tables, each domain data table corresponding to a predetermined domain having a first criterion. Furthermore, the analytics server may also parse and disaggregate each unique domain table into a set of unique dimension tables, each dimension data table corresponding to a predetermined dimension having a second criterion.

Figure 3A:
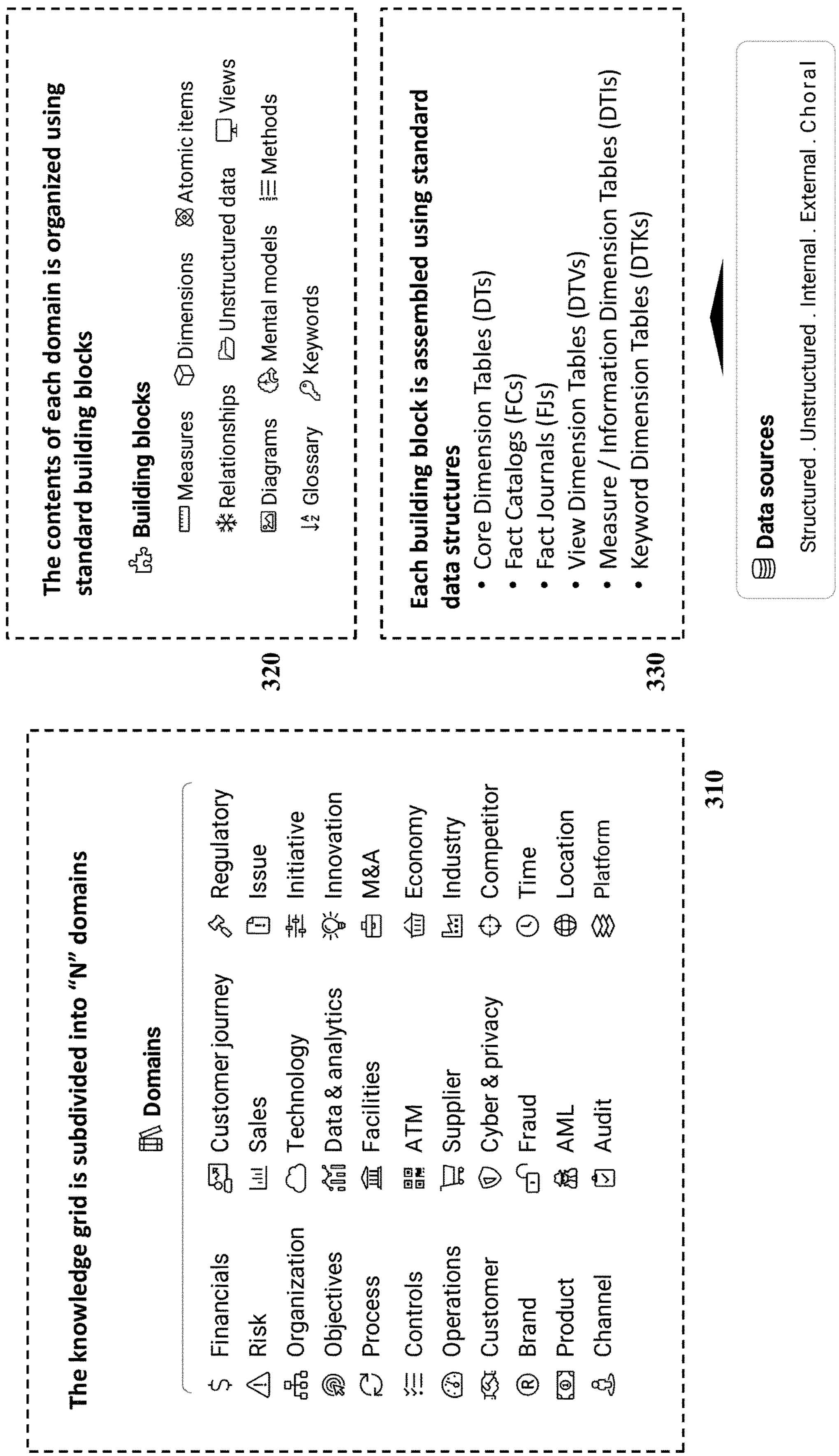
FIG. 3A-B illustrate different embodiments of data tables and nodal networks modeled based on data, according to an embodiment.

The analytics server may parse the collected data in accordance with the data tables described in FIG. 3A. For instance, the analytic server may first determine one or more domains applicable to the collected data. The domain table 310 illustrates different domains categories used to subdivide data into different domain tables. Once the data is distributed among one or more domain tables, the analytics server may further distribute the collected data among five building blocks. For instance, collected data that belong to ATM domain is further divided among information, dimensions, analytics, archive, and grid building blocks, as depicted in building blocks 320.

Different domains described in the domain table 310 may represent different categories of data satisfying a specific predetermined criterion. For instance, the customer journeys domain may refer to all data related to user experiences of customer-facing applications (e.g., customer-facing website and/or other electronic applications). Therefore, all data within the data table corresponding to the customer journey will satisfy this criterion. In another example, ATM domain may refer to all collected data relevant/associated with ATMS. Therefore, all collected data parsed, by the analytics server, into the ATM domain table, will share at least that one criterion.

The analytics server may then distribute the collected data into six different data structures, as depicted in data structure table 330. The data structure table 330 includes the following data tables, catalogs, and journals:

A dimension table for views (DTV) describes the format and content of views to present specific information to the user. One or more DTV files are created for each domain thereby creating a catalog of views that may be requested by the user. In a given domain, a DTV may point to core dimension tables (DTs) and/or dimension tables for information (DTIs).

A dimension table for information (DTI) specifies information, which may be a metric (e.g., FTE, NIX, NIX/FTE, gross spend) or any other information that is available in the given domain (e.g., name, address, photos, videos, documents). One or more DTI files are created for each Domain to specify a catalog of information that is available to create views. In a given domain, a DTI may point to dimension table(s) for keywords (DTK), fact catalog(s) (FCs), and/or fact journal(s) (FJs).

A dimension table for keywords (DTK) specifies keywords that may be combined to name metrics. Keywords are used as “clues” by the user command-processing algorithm (voice or search). For example, voice commands may include multiple keywords referring to information and dimensions.

Core dimension tables (core DT) specifies the structure of concepts. A concept is disaggregated into “N” levels using an L1, L2, L3, LN structure.

Meta-data for unstructured data (DTU) specifies the metadata for unstructured data items. Examples may include the type of file such as audio, video, spreadsheet as well as the specific type of file: Word®, Excel®, Power Point®, as well as the concepts and sub-concepts to which the unstructured data item belongs.

A fact catalog (FC) specifies the list of items corresponding to a concept along with their associated attributes. Examples may include facilities catalog, IT application catalog, and employee catalog. In a given domain, FCs may point to core DTs, other FCs, and unstructured data items (UDIs). DTs, FCs, UDIs may be in the current domain or another domain.

A fact journal (FJ) specifies time stamped event information. Examples may include financial transaction (revenue, expense), customer interactions (branch visit, digital transactions). In a given domain, FJs may point to core DTs, FCs, and unstructured data items (UDIs). DTs, FCs, and UDIs may be in the current domain or other domains.

Unstructured Data Items (UDIs) contain unstructured data items. Examples include photos, videos, audio files, documents, etc. In a given domain, UDIs may point to the DT describing the DTU, Core DTs, FCs, and DTIs. DTs, FCs, and DTIs may be in the current domain or other domains.

As described above, the analytics server may first parse and disaggregate the collected data and identify/generate one or more domain data tables corresponding to the collected data. Subsequently, the analytics server may further disaggregate each domain data table into one or more dimension data. As will be described below, the analytics server may use the identified data tables to generate a nodal network for the collected data. In some embodiments, the analytics server may generate multiple data tables where each data table is structured in accordance with one or a combination of the above-mentioned dimensions and/or domains. For instance, the analytics server may generate a data table for each domain illustrated in the domain table 310. Each data table may comprise sub data tables where the data is distributed in accordance with the dimensions and structures depicted in the data structure table 330.

By generating the above-described data tables (e.g., by dividing the data in accordance with the specific rules described above), the analytics server may generate multiple data tables unique to each set of collected data and/or each organization. The unique data tables and the or nodal network described herein (sometimes referred to as the knowledge grid) allow the analytics server to store, analyze, and retrieve data in a more efficient manner, when compared to conventional methods of data storage, such as storing the data onto one or more databases (e.g., data lake method).

In some configurations, the analytics server may receive an instruction from a user (or based on predetermined rules) to generate the above-described data tables for only a selection of the domains and/or dimensions. For instance, a user operating an administrative computer may select one or more domains and instruct the analytics server to generate data table in accordance with the selected domains only. Therefore, even though 33 different domains are described in the domain table 310, the analytics server may not always use all 33 domains.

The analytics server may use a variety of techniques to identify the domains and/or dimensions associated with the collected data. In some configurations, a team of experts (e.g., integration team) can designate an appropriate domain and/or dimension to the collected data. In another example, this task may be accomplished as a user inputs/uploads the data. For instance, when uploading data, the user can designate and/or tag a file with an appropriate domain or dimension. In another example, the analytics server may automatically identify an appropriate domain and/or dimension for the collected data. For instance, the analytics server may identify the source of the collected data and may designate a domain based on the source (e.g., ATM domain is identified when the data is retrieved from an ATM). In another example, the analytics server may identify an appropriate domain table in accordance with the context data associated with a file. For example, if the filename contains “sales,” the analytics server may assign the file to a sales domain data table.

Referring back to FIG. 2, at step 230, the analytics server may generate a nodal network based on the collected data. The analytics server may generate a nodal network comprising a set of nodes where each node represents at least a portion of the collected data (e.g., a file), each node having metadata comprising a unique identifier corresponding to a unique domain table and a unique dimension table corresponding to the data associated with each node.

The analytics server may generate a nodal network where each node represents at least a portion of collected data classified and identified as corresponding to a uniquely generated data table. The collected data may correspond to a wide range of categories and a wide range of electronic data sources. For instance, while one node may represent a file collected from an employee computer, another node may represent transaction data associated with a particular transaction conducted at a particular ATM, and a third node may represent data associated with cyber-attack activity detected at a customer-facing application. Organizing the collected data using the methodologies described herein allows the analytics server to retrieve, analyze, and visualize the data efficiently.

As described above, the analytics server may identify and store context information as metadata for each node. For instance, if a node represent a file retrieved from an employee computer, the node's metadata may include file information (e.g., timestamp of the file, different computers who access the file, and/or a department to which the computers belong). The analytics server may also use metadata to store an indication of whether the node is associated with one or more of the data tables described above. For instance, metadata associated with a node may indicate a domain table and/or dimension table corresponding to the data represented by that particular node.

Figure 3B:
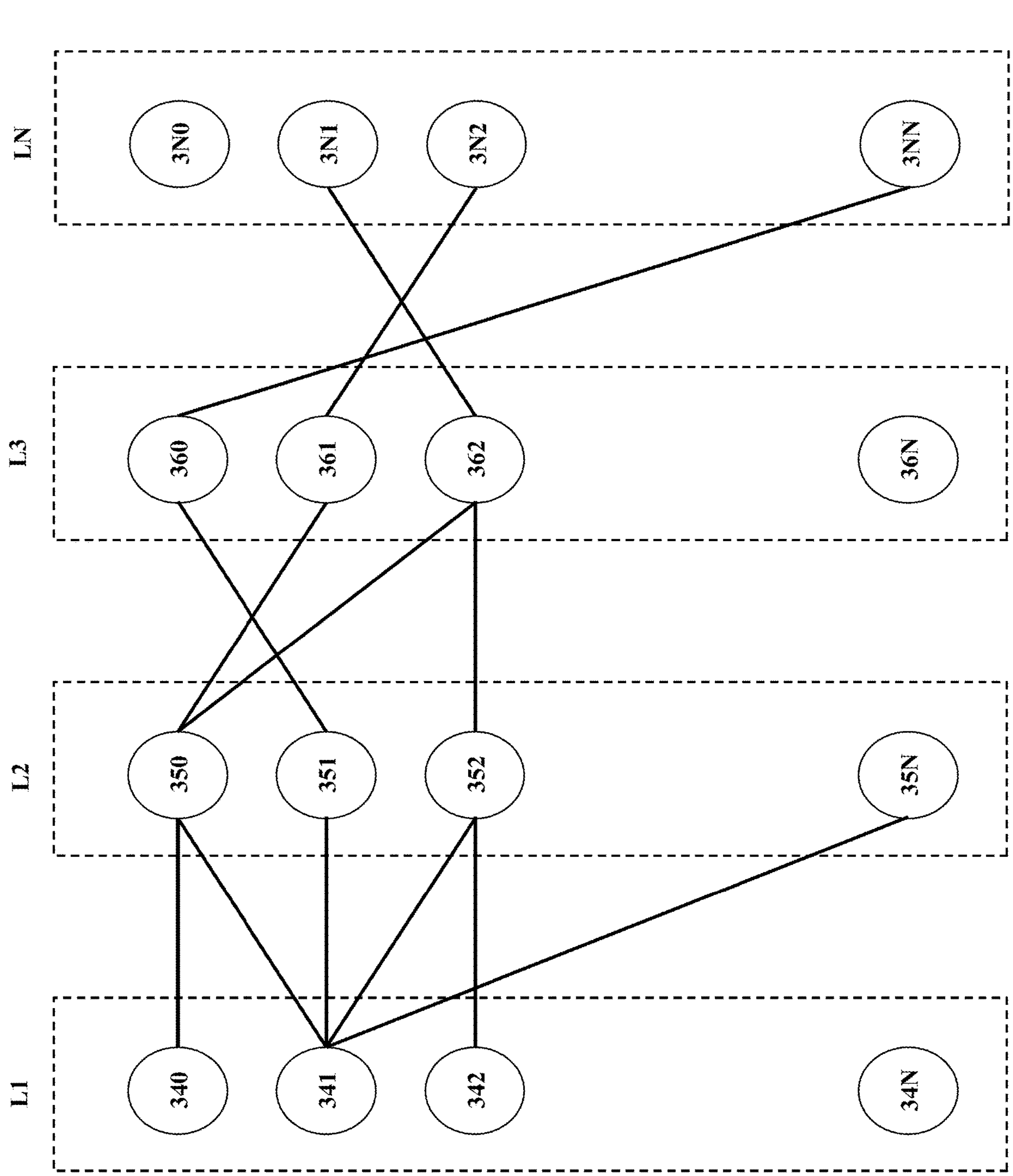

Referring now to FIG. 3B, an example of a nodal structure is illustrated, in accordance with an embodiment. The analytics server may also link one or more nodes based their respective metadata. As depicted, the nodal structure 300 includes multiple layers (L1-LN) where each layer includes multiple nodes. In some configurations, every layer may represent a domain table. For instance, L1 may represent a sales domain table, and L2 may represent an ATMs domain table. Therefore, the number of layers in the nodal network may depend on the number of domains identified or used by the analytics server.

The depicted nodes may each represent at least a portion of the collected data (e.g., each node may represent a file or an input by a user). For example, node 340 may represent a file retrieved from an employee computer where the file was generated because of a customer conducting a transaction. Also as depicted, the nodes are interconnected using various links. For instance, node 341 is connected to nodes 350-35N. A link (or edge) may connect similar or associated nodes within the nodal data structure, such as the nodal network. By linking different nodes, the analytics server may retrieve data corresponding to each node and the context metadata more efficiently. Edges can be directed, meaning they point from one node to the next, or undirected, in which case they are bidirectional. The analytics server may use different directed or undirected edges to link different nodes.

In one embodiment, the analytics server may designate a path/address for each link connecting multiple nodes in accordance with the following table:

| | |
|---|---|
| Name-path | <L1-name>.<L2-name>.<L3 -name> |
| ID-path | <TN> <ID> where <TN> is a unique number assigned to the dimension table and <ID> is a unique number within the table corresponding to the row for this node. |

The analytics server may use the character "." to delineate distinct names in a node path/address. Using different paths allows the analytics server to identify related nodes (and thereby related content) in a more efficient manner. The analytics server may also utilize a dimensional tree grammar to traverse the nodal network. Parameter values and corresponding tree scope, in one embodiment, are described below, in Table 2:

TABLE 2

| Parameter value | Scope |
|---|---|
| (blank) | Entire tree |
| Level = LN | Entire tree up to Level LN |
| Node = name.name | A specific node in the tree |
| Node + 1 = name.name | A specific node in the tree and 1 level below |
| Node + N = name.name | A specific node in the tree and N levels below |
| Node++ = name.name | A specific node in the tree and all levels below |

The analytics server may use different grammatical rules to identify different paths and addresses for one or more nodes. These grammatical rules may be domain-specific and/or dimension-specific. The grammatical rules are further described in U.S. patent application Ser. No. 15/925,995, which is incorporated herein in its entirety. As described above, each node within the nodal network may be enriched with metadata from multiple sources (internal, external) and of multiple types (structured, unstructured, and/or streaming).

Upon generating the nodal network and creating the edges and links, the analytics server may efficiently intake data. For instance, the analytics server may retrieve data where the data is automatically parsed and disaggregated (e.g., placed into a uniquely created data table) and then assigned to a node. The nodal network (loaded using various configurators) may define the structure of concepts and declared relationships between concepts.

Once the analytics server configures the nodal network, the analytics server may continuously update the nodal network to reflect the latest information/state of the collected data. As described above, this process may be an automated process using various data entry techniques, or automatic data feeds including RSS feeds or other feeds from internal, external, or homegrown book of record transaction systems, collaboration applications (e.g., mail, text, social), derived data systems (e.g., risk, or AML) as well as external data sources (paid services—e.g., financial data, government, etc.). As the nodal network is updated, the analytic server may continuously monitor state changes to detect issues that should be presented to the user. The detection of issues can be achieved using all analytic models and services. Once an issue is detected, it can be presented as an alert to the user in the alert panel of the graphical user interfaces described below.

Upon generating the nodal network, various analytic/heuristic algorithms may enrich the nodal network with additional facts attached to each node (e.g., metadata). The analytics server may use the nodal network to enable multiple types of analytic models and algorithms (e.g., arithmetic/statistical, computational, rule-based, and machine learning). These algorithms may also create new relationships, which are not pre-defined in the nodal network, or predict insights. Therefore, the methods and systems described above may autonomously and iteratively create new relationships and refine the nodal structure by refining the relationships and links between different nodes. As a result, with each iteration, the nodal network may improve, thereby having a better and more accurate representation of the data collected.

When data corresponding to a node is unstructured (not readily identifiable as associated with a certain data table), the analytics server may also use artificial intelligence and machine-learning techniques to revise the nodal network and identify a node for the collected data. For instance, the analytics server may use a random forest modeling techniques. Random forest modeling may include several nodal hierarchical structures (e.g., trees). In some configurations, the AI model may incorporate other machine learning techniques, such as gradient boosting, support vector machines, deep neural networks, and logistic regression.

By identifying and mapping relationships between different nodes, the analytics server may generate "knowledge" specific to a domain and/or a dimension. Knowledge may refer to an identification of previously unknown relationships between one or more nodes. The knowledge identified for a specific domain and/or a dimension, may be applied to other domains and/or dimensions. Furthermore, the knowledge can be applied to other organizations and/or different parts and groups within the same organization.

Figure 4:
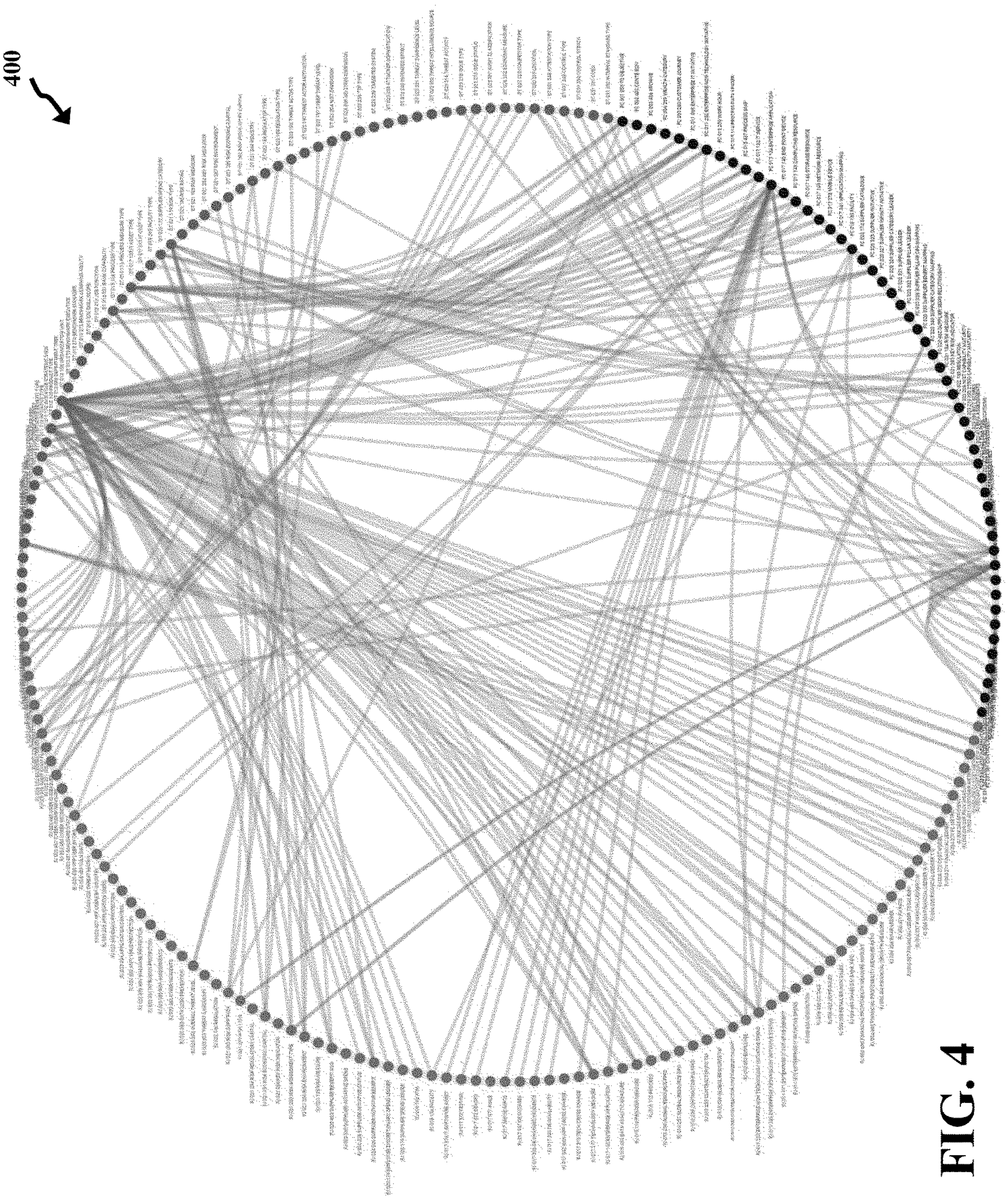
FIG. 4 illustrates a visual representation of the nodal network modeled based on data, according to an embodiment.

Referring now to FIG. 4, a visual representation of the nodal network is illustrated, according to an embodiment. For instance, each point within the circle 400 may represent a node or collected data. As depicted, the nodes within the nodal network are interrelated via links represented by lines inside the circle 400 connecting different points. Moreover, as depicted, some nodes may not be connected to other nodes and certain nodes may be connected to multiple other nodes.

Referring back to FIG. 2, at step 240, the analytics server may receive a request from a user. The analytics server, upon receiving a request from a user-computing device, may parse the request to identify a node associated with the request. The request may be an instruction to display collected data associated with a certain category, domain, or an event. The analytics server first parse the request to identify a node or a category of nodes to be displayed. The user request may inputted by a user accessing a graphical user interface provided by the analytics server. For instance, a user may execute a web application or access a webpage generated by the analytics server. The user may then input a request to view a category of data (e.g., cybersecurity for the organization website). Upon receiving the request from the user, the analytics server may identify one or more nodes related to the request using the methodologies described above.

At step 250, the analytics server may display, on a graphical user interface displayed on the user computer device, data associated with the identified node. Upon identifying one or more related nodes, the analytics server may retrieve data corresponding to the identified nodes and may display the data on a dynamic graphical user interface. The dynamic graphical user interface is further described in FIGS. 5-47.

Figure 5:
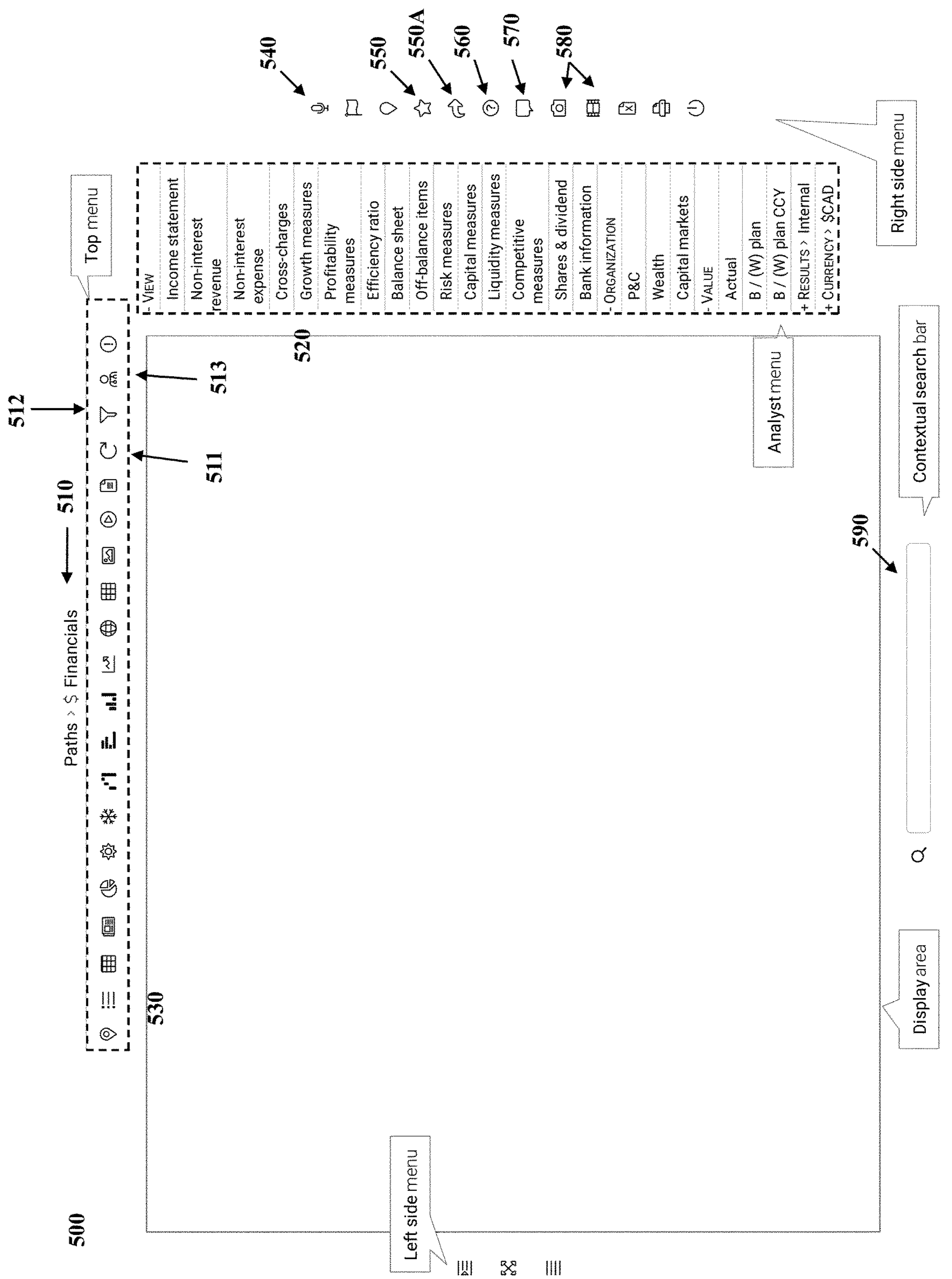
FIGS. 5-47 illustrate examples of different graphical user interfaces displayed by the intelligent data analysis system, according to an embodiment.
Figure 6:
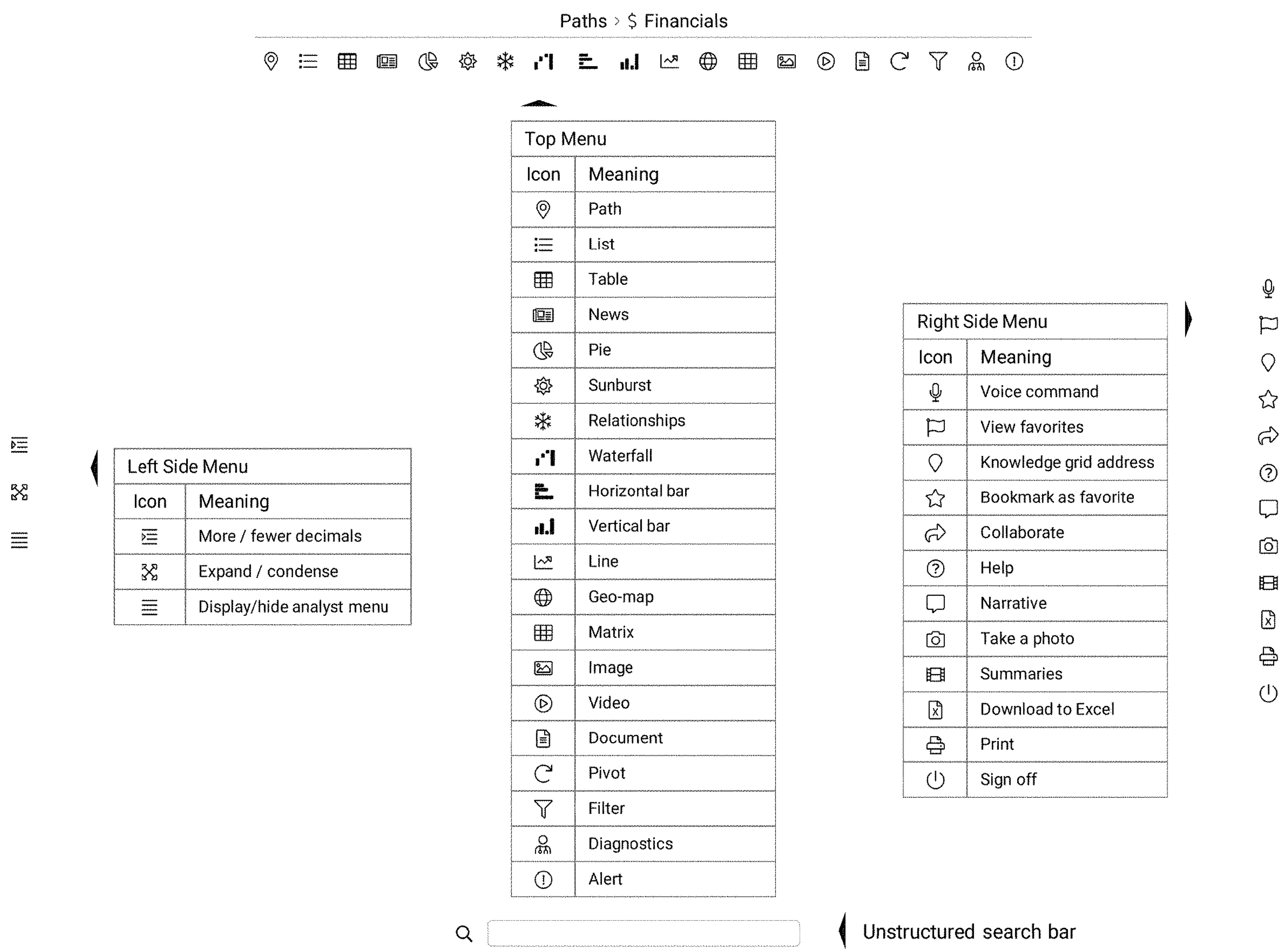

Referring now to FIGS. 5 and 6, an example of a GUI screenshot illustrates how a user can efficiently view content of the above-described nodal network. As depicted, GUI 500 includes multiple interactive icons and menu options positioned and designed to create a user experience that allows the user to have fast access and insight to the data uniquely structured, as described above. Using the GUIs described herein, the user may reach the desired information/insight using as few steps (e.g., clicking or otherwise activating a link) as possible. The GUIs described herein also provide simple and intuitive means of navigating the nodal network and reaching the desired information quickly.

Among other technical advantages provided, the GUIs described herein provide a navigation method that corresponds to the nodal network. Therefore, a user can navigate through data (e.g., moved from a broad view to a granular view or vice versa or move cross domains and dimensions) in a more efficient manner than provided by conventional and existing GUIs For instance, some conventional graphical user interfaces allow users to set multiple thresholds and filters in order to view data that are more granular. This method is undesirable because it shifts the burden of data navigation to the user. Furthermore, this method is also undesirable because it is not as efficient as the navigation methods described herein. The multiple navigation methods provided herein may work together in an integrated fashion. For instance, a user may use multiple navigation methods described below:

Paths navigation method: this provides a set of options for the "next step" when any part of the nodal network is displayed. The path navigation method suggests one or more answers to questions that the user may wish to inquire. This particular method of "drilling-down" the information is helpful because it allows the user to efficiently move along and traverse the nodal network. The path traversed by the user is displayed in the top menu (510). The path itself may represent the nodes (and their corresponding information) being displayed. The path (e.g., next step) options may be viewed and accessed via the path menu or analyst menu (520). As described below, a user may use the analyst menu 522 to view data associated with any particular section, dimension, or domain of the nodal network.

Interact with a view method: this method enables the user to interact directly with the widget (e.g., interactive graphical components) displayed in the view area. For instance, graphical component 530 may include the following options: List, Table, News, Pie, Sunburst, Relationship, Waterfall, Horizontal Bar, Vertical Bar, Line, Geo-Map, Matrix, Diagram, Video, Document, Diagnostic, Alert. This navigation method is efficient as the user simply interacts (e.g., clicks) with active areas of the widget (e.g., "+" to expand a table row or column) to view more information, zoom-in, or move to another address in the nodal network.

Voice command method: this method provides a very efficient way to get to a specific address in the nodal network. The user can click on (or otherwise activate) the voice command icon displayed as the interactive component 540 to issue a voice command. The analytics server may then parse the voice command using various voice recognition techniques and may display the specific view or a drill-down that corresponds to the given command. In some embodiments, if the command is a broad statement that results in multiple valid answers, the analytics server may display a list of views that correspond to the voice command.

The GUI 500 also provide an interactive component 550 where the user can bookmark the path and/or viewed information. The analytics server may store the bookmarked (e.g., favorite) paths for each user thereby allowing each user to quickly access a specific address within the knowledge grid via a few clicks.

The GUI 500 also displays interactive component 550A. When the user interacts with the interactive component 550A, the analytics server stores the path and generates an interactive address representing the path. The interactive address may be a hyperlink or a uniform resource locator (URL). As will be described below, the interactive address may be shared with other users where, upon the second user interacting with the interactive address, the analytics server displays data corresponding to the stored path. This feature is particularly useful when collaborating with other users. For example, an address may be copied and then sent to another user for his or her review.

Furthermore, interactive component 560 (e.g., help icon) and interactive component 570 (narrative icon) are also available to further explain the meaning of each item as needed. For instance, when a user interacts with the interactive component 570, the analytics server displays a pop-up text window describing the path and/or the view displayed on GUI 500.

The GUI 500 also displays interactive components 580. When the user interacts with the interactive components 580, the analytics server enables the user to record and replay a sequence of views displayed along the path. For instance, the analytics server may generate a screenshot of the view. The analytics server may also generate a movie-like or animation like file where the sequence of views (e.g., a progression of different paths viewed by the user) is digitally recorded and stored onto a file. The analytics server further provides the user with the option of storing and/or sharing the file with another user.

As discussed above, the top menu displayed in the graphical component 530 allows the user access to visualization, analytics (widgets or interactive components, such as pivot 511, filter icon 512, and diagnostics 513) and alert features. In addition, the top menu 510 specifies the path traversed to reach the current view and enables the user to move back to a specific location in the path. Visualization widgets that are accessible at the given location in the path may be highlighted (icon color). The user may access the widgets by clicking on the corresponding icon.

The GUI 500 may also include an analyst menu 520. The analyst menu 520 (similar to the top menu displayed in the graphical component 530) enables the user to select, pivot (e.g., go to a previous view) and filter the information displayed in the viewing area. The Analyst menu 520 allows the user to visually navigate the nodal network. The analyst menu 520 further enables the user to select a view to display in the view area (e.g., all or a portion of the GUI 500). For example, GUI 500 provides a list of different views under the "view" header where a user may interact with each sub-header to see specific information relating to that sub-header. The "value" header displayed on the GUI 500 displays a set of sub-options for the given view. Under the "currency" header, the GUI 500 displays a set of sub-options for currency (e.g., US$ or Canadian $).

Filter icon 512 filters the information displayed in a particular customizable manner. In addition, the user may use the analyst menu to filter certain information. Selecting an item under this heading may result in narrowing the scope of the information displayed in the view to a specific organization unit. Filtering, as described herein, is implemented using DTs and follows the above-described L1-LN data structure format (e.g., moving from a parent node to a related child node).

Because of this specific filtering technique, the user may filter a view by a specific nodal address or path (not by thresholds, as performed by conventional graphical user interfaces). Using the filtering options provided by the GUI 500, a user might set a specific filter by navigating the L1-LN hierarchy and selecting a specific item (e.g., a specific line of business in the Canadian organization hierarchy). The GUI 500 may also include a contextual search bar 590 enabling the user to search for specific content using unstructured search methods. Referring now to FIG. 6, a list of all the icons displayed on GUI 500 is illustrated. Filtering based on the nodal network is further illustrated in FIGS. 25-29.

Figure 7:
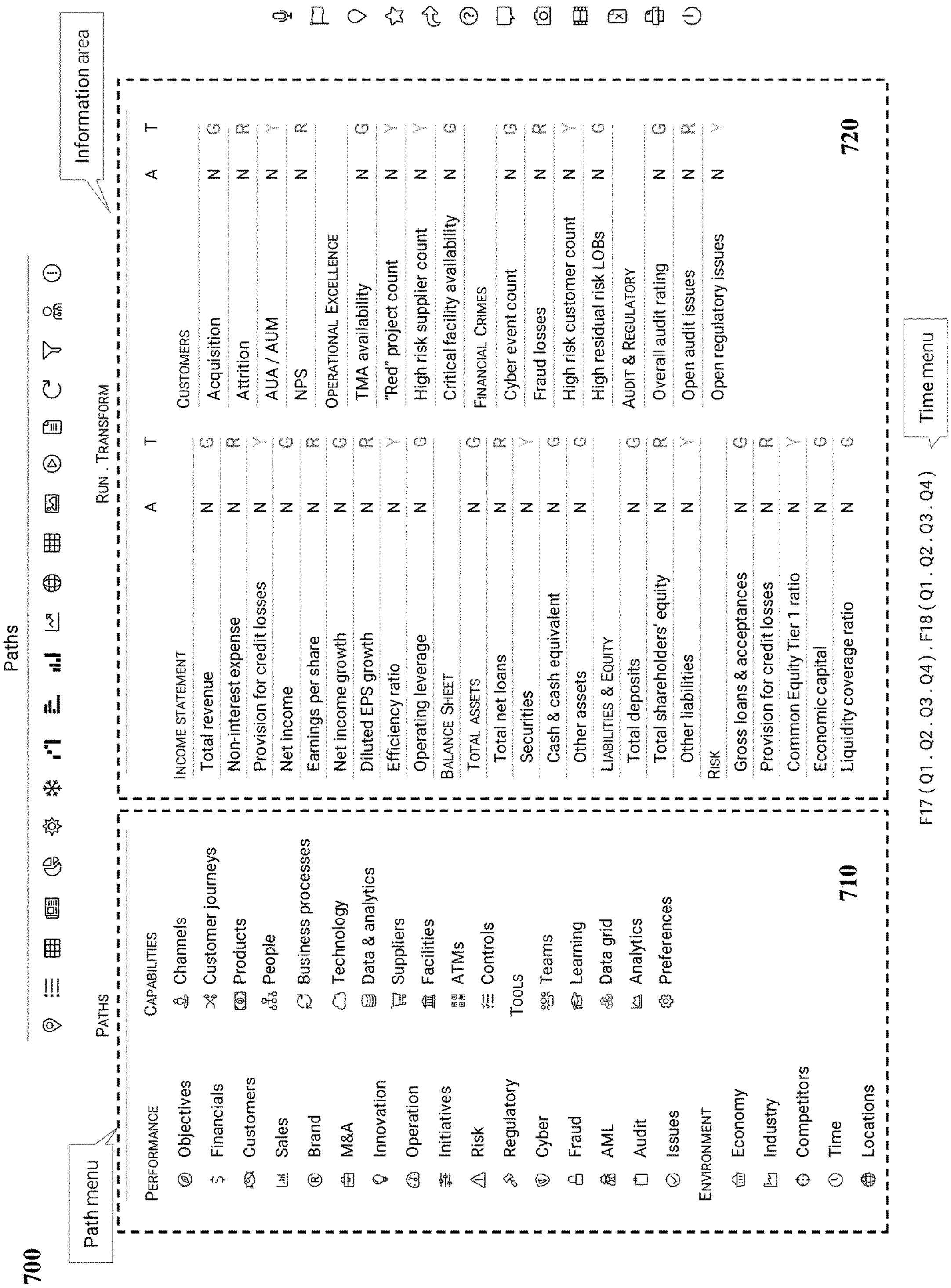
Figure 8:
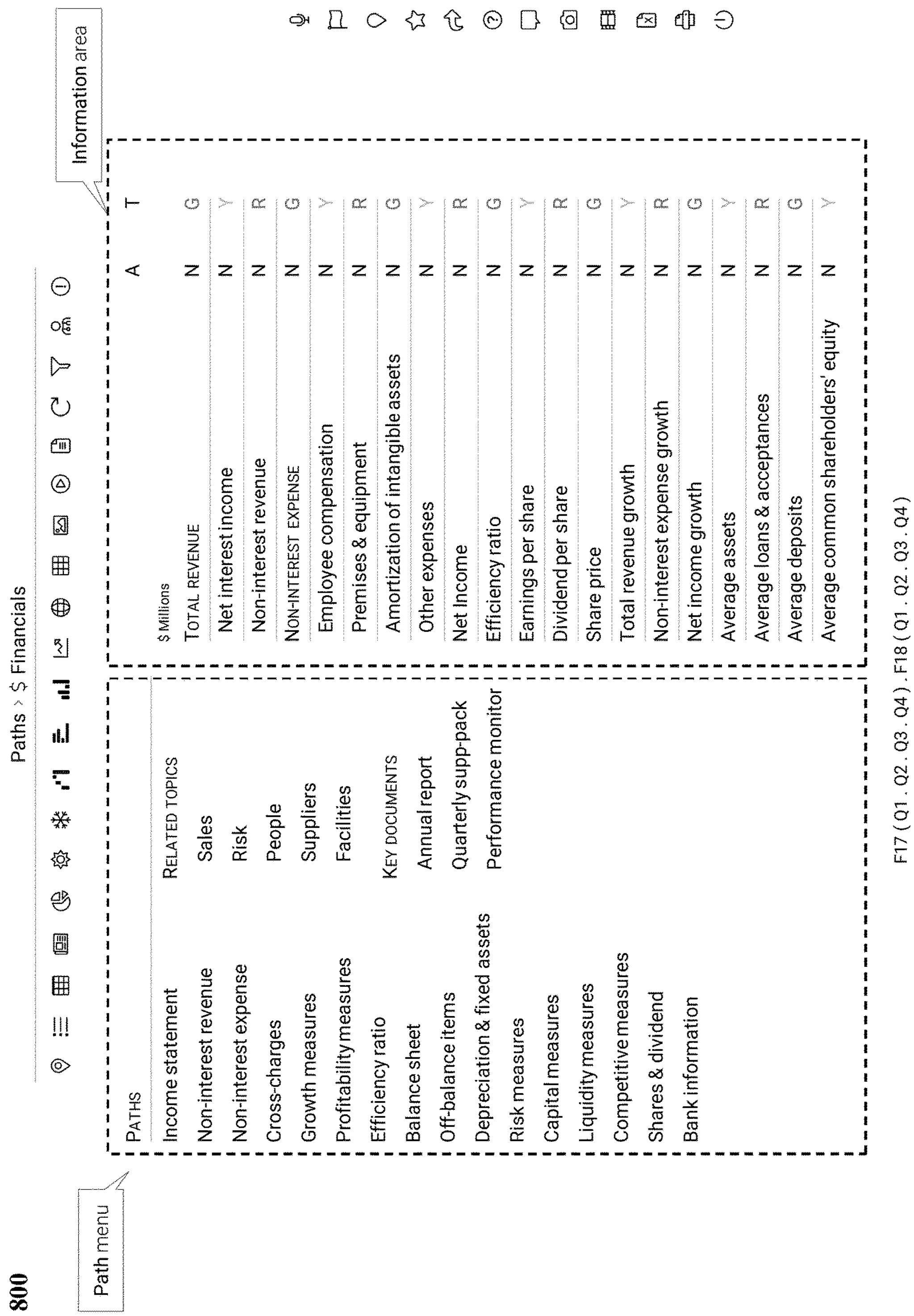
Figure 9:
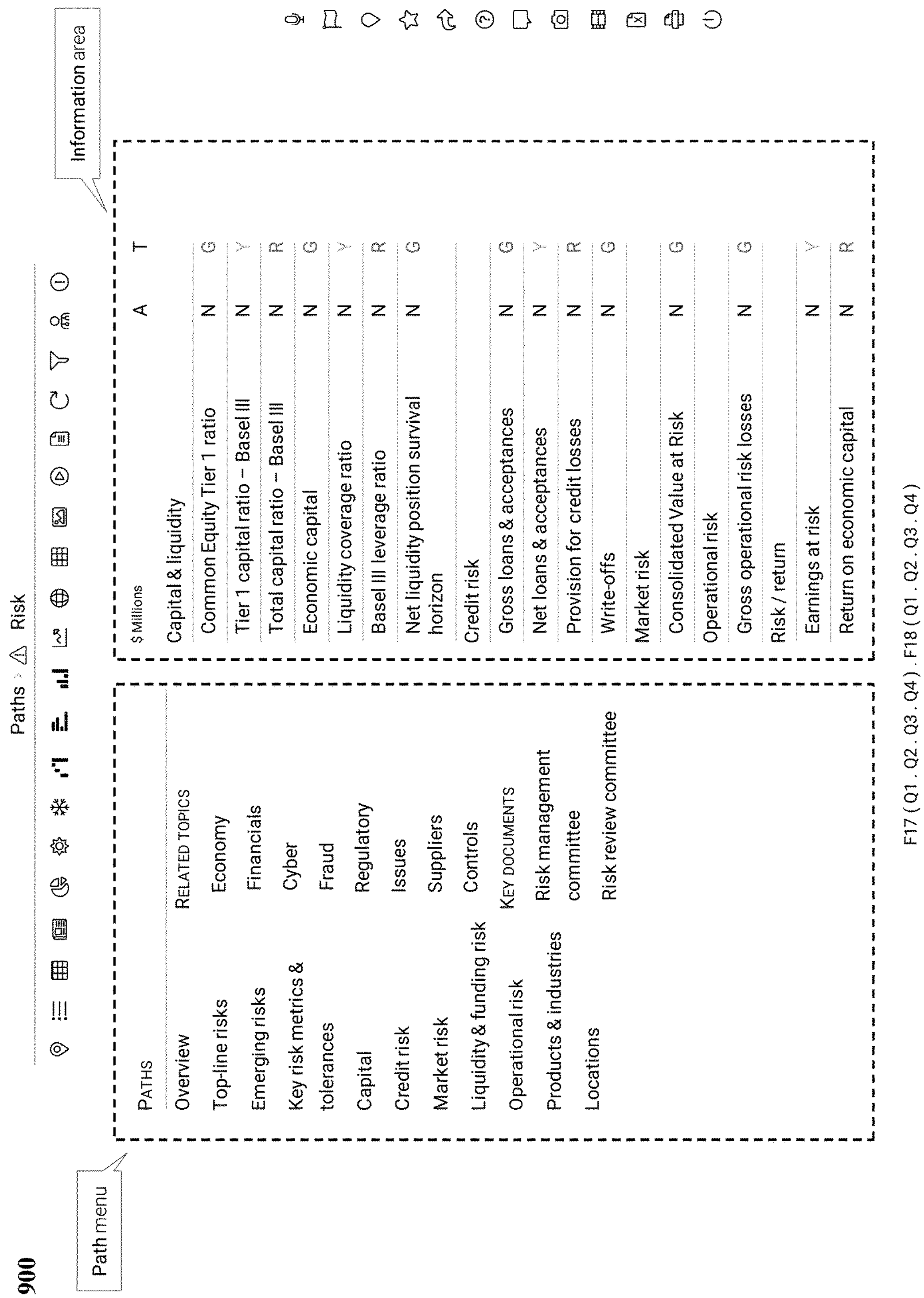
Figure 10:
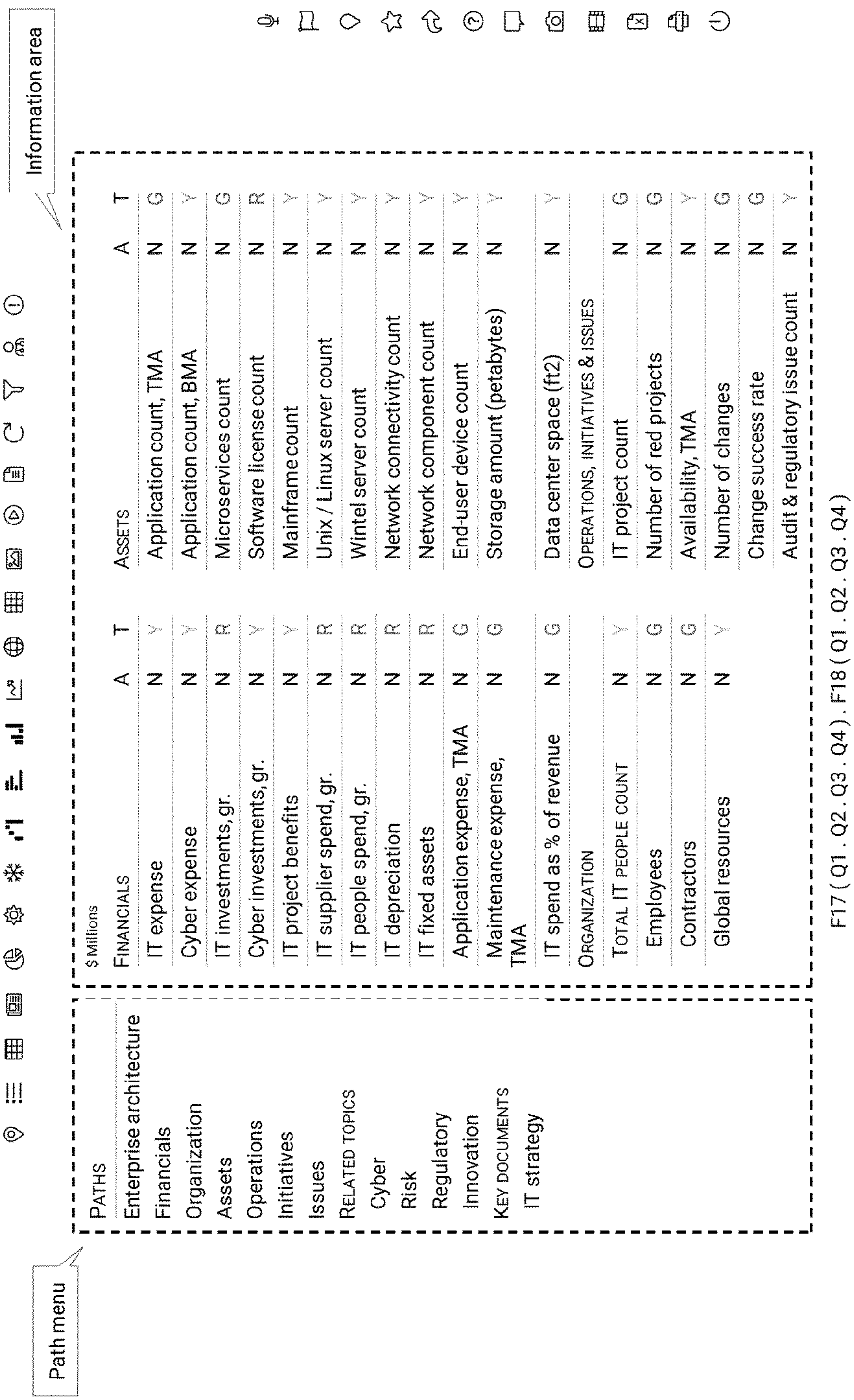
Figure 11:
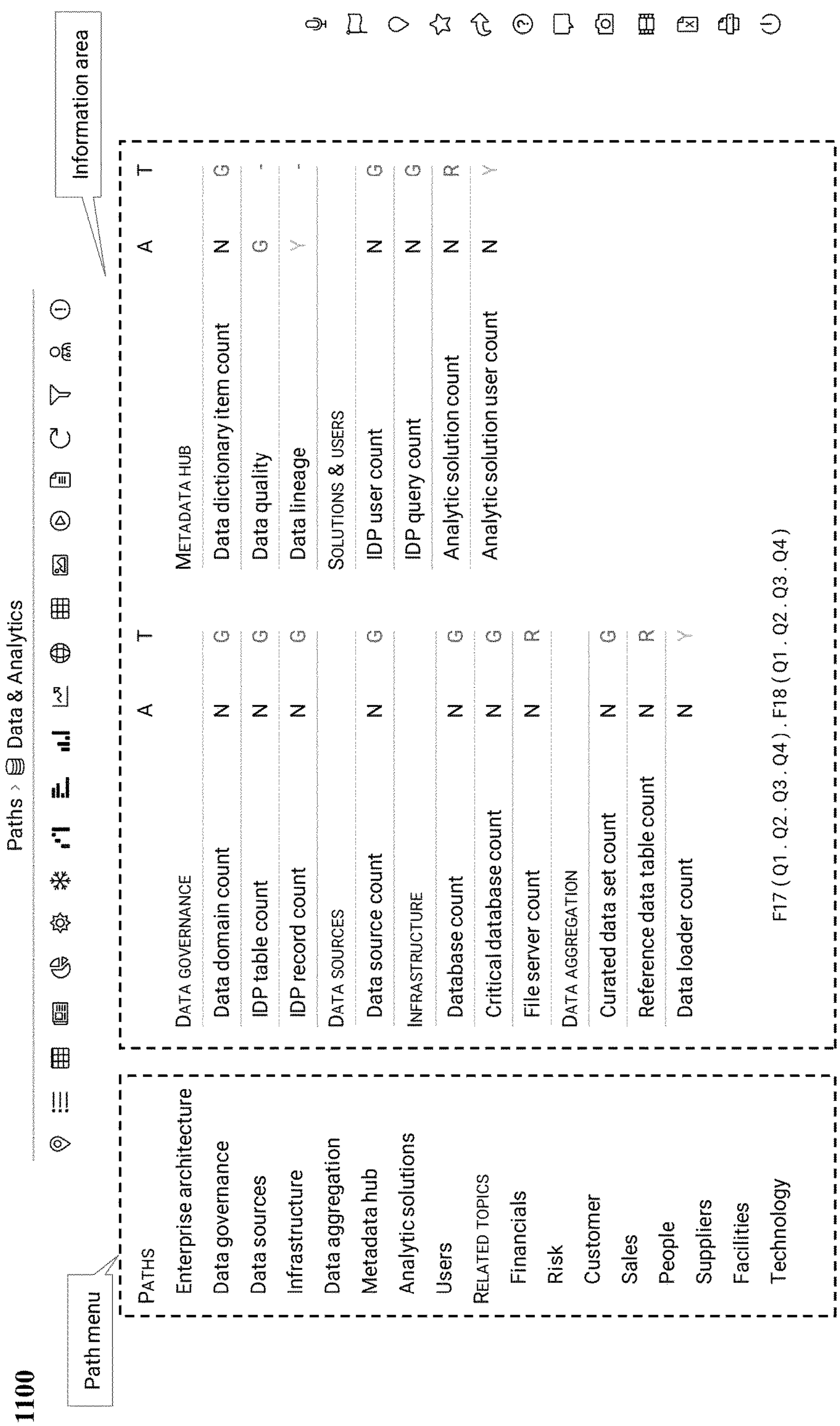
Figure 12:
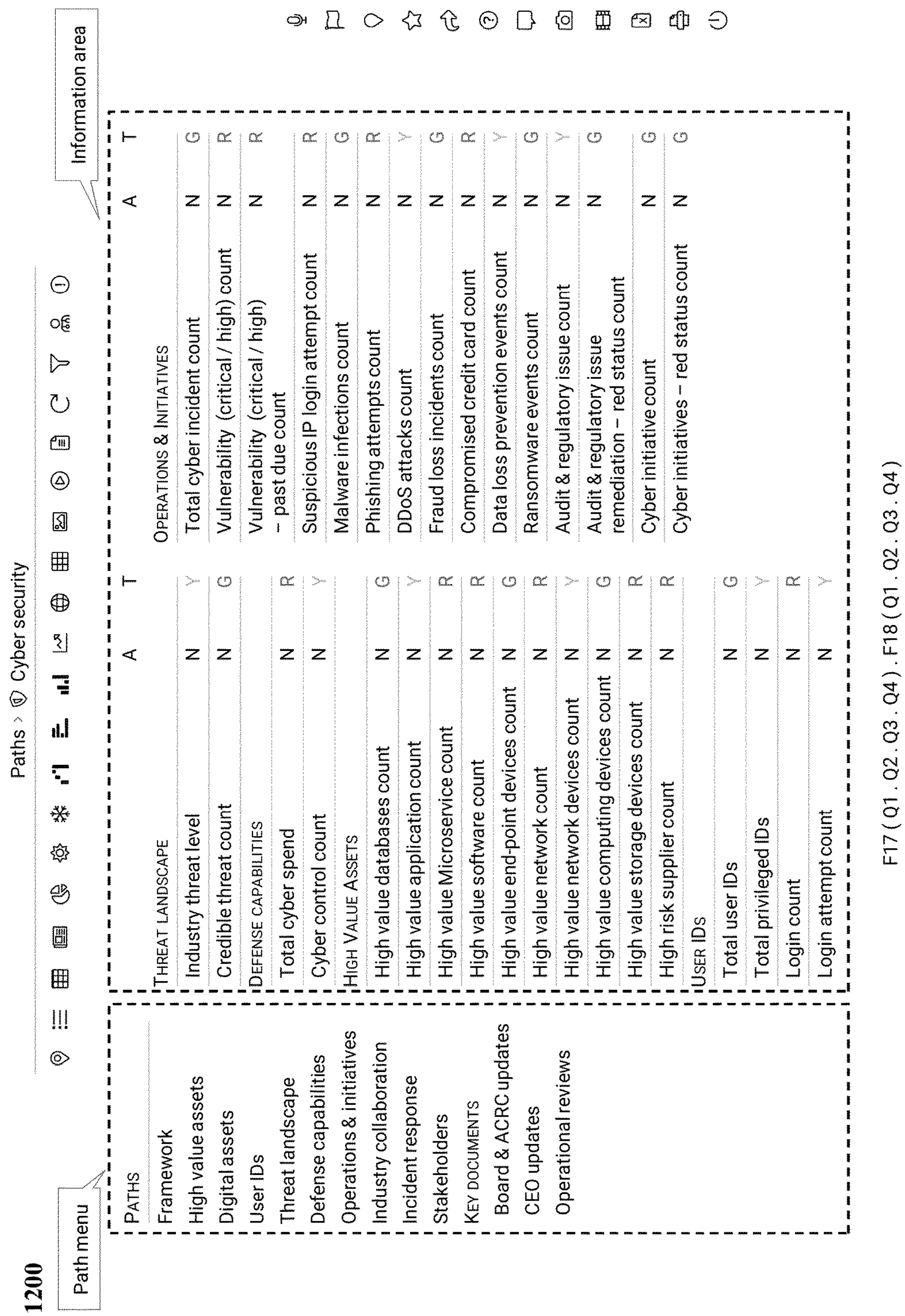
Figure 13:
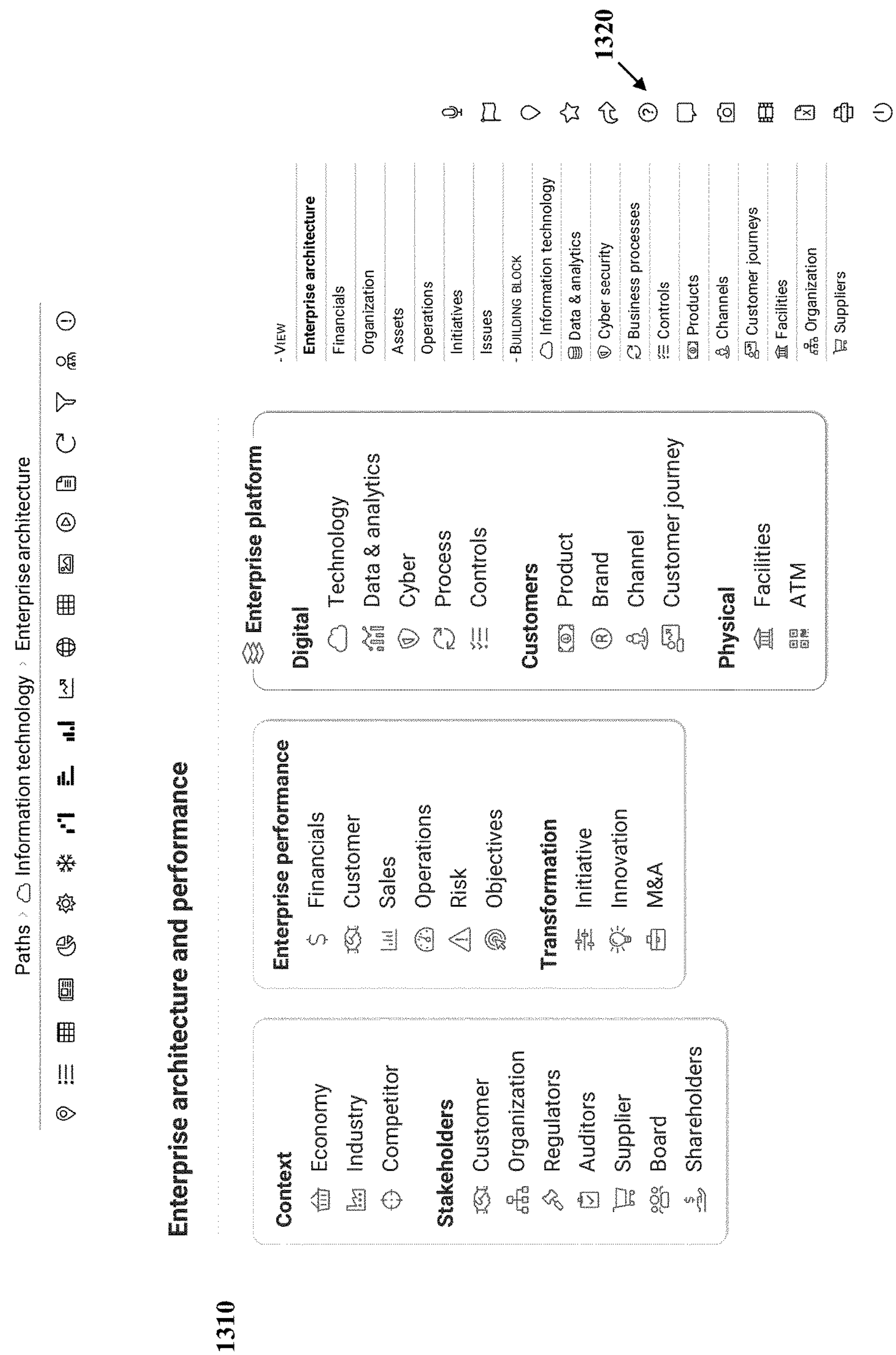
Figure 14:
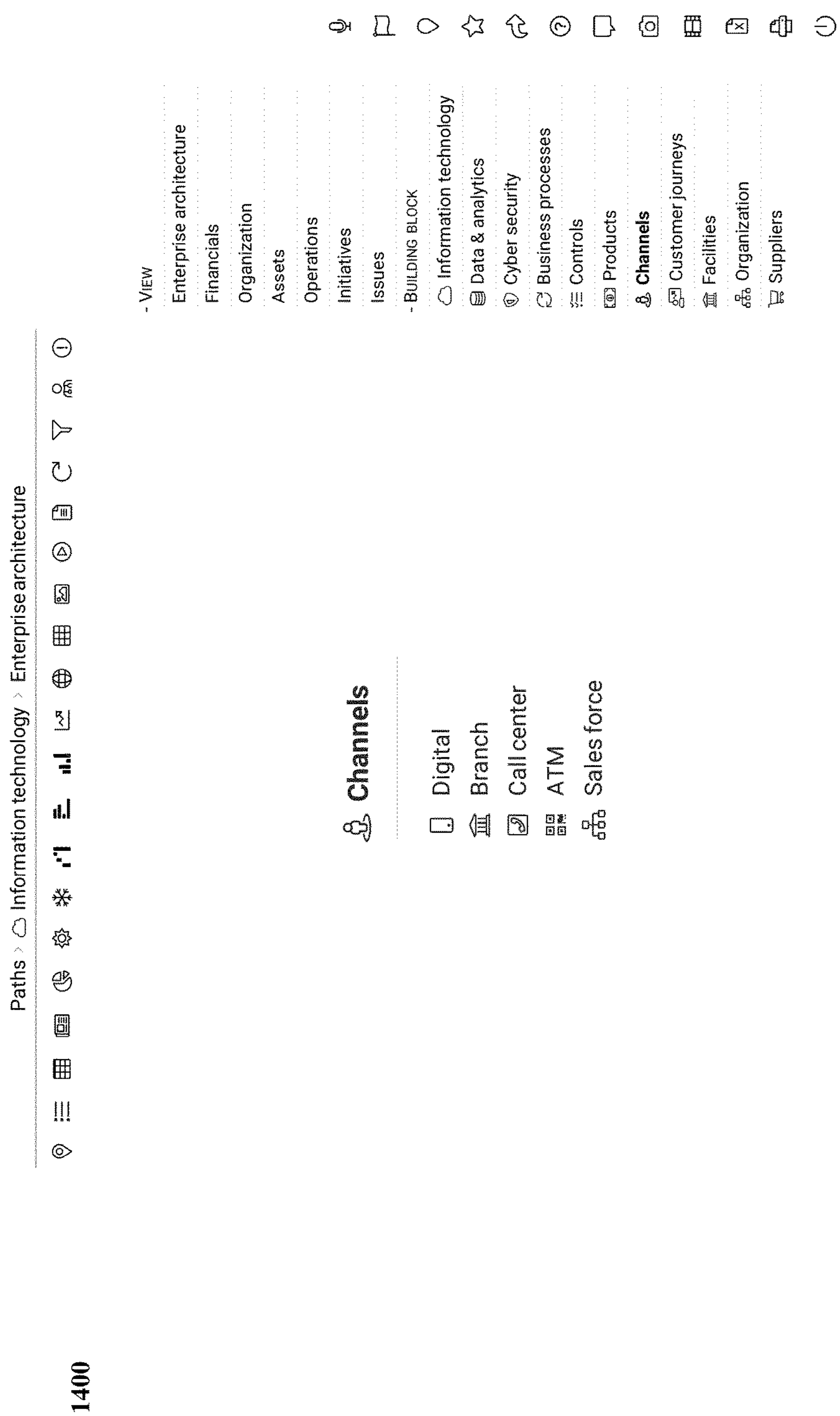
Figure 15:
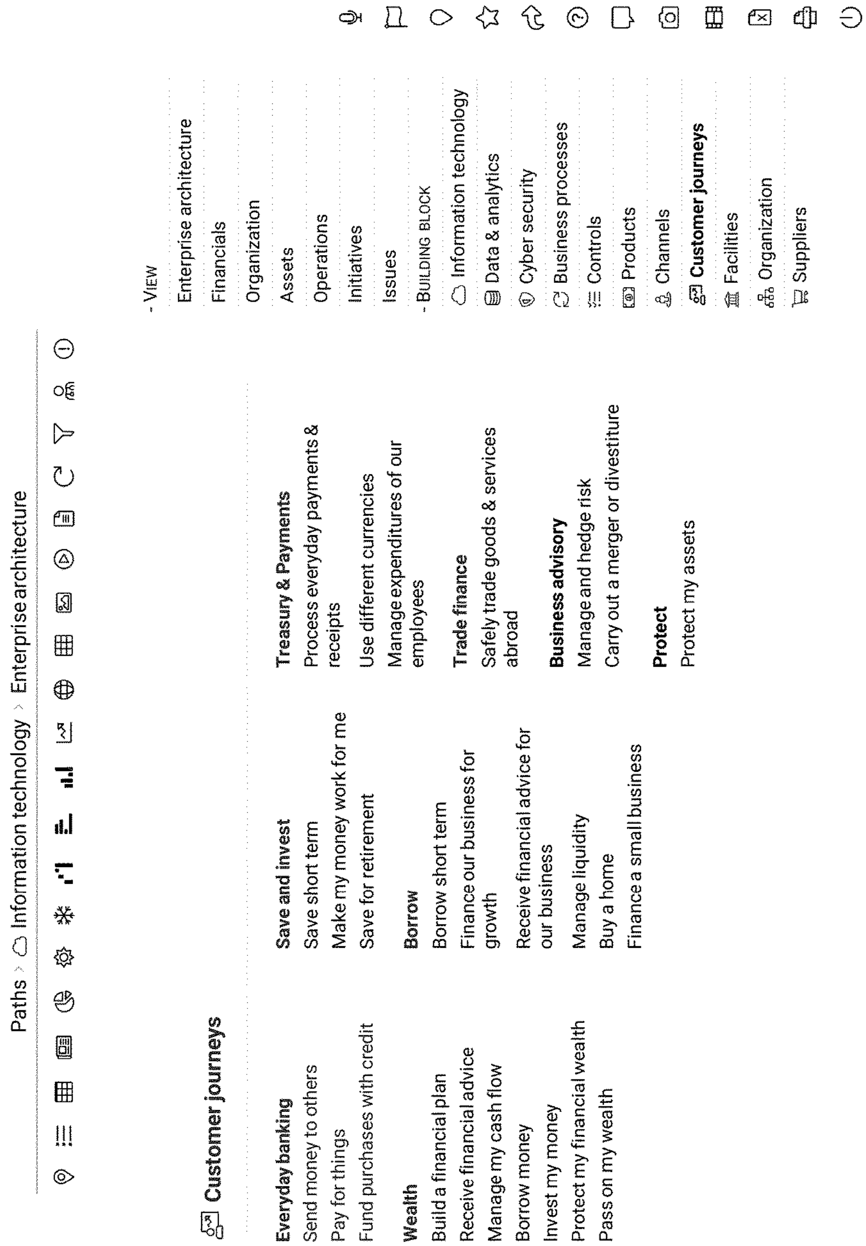
Figure 16:
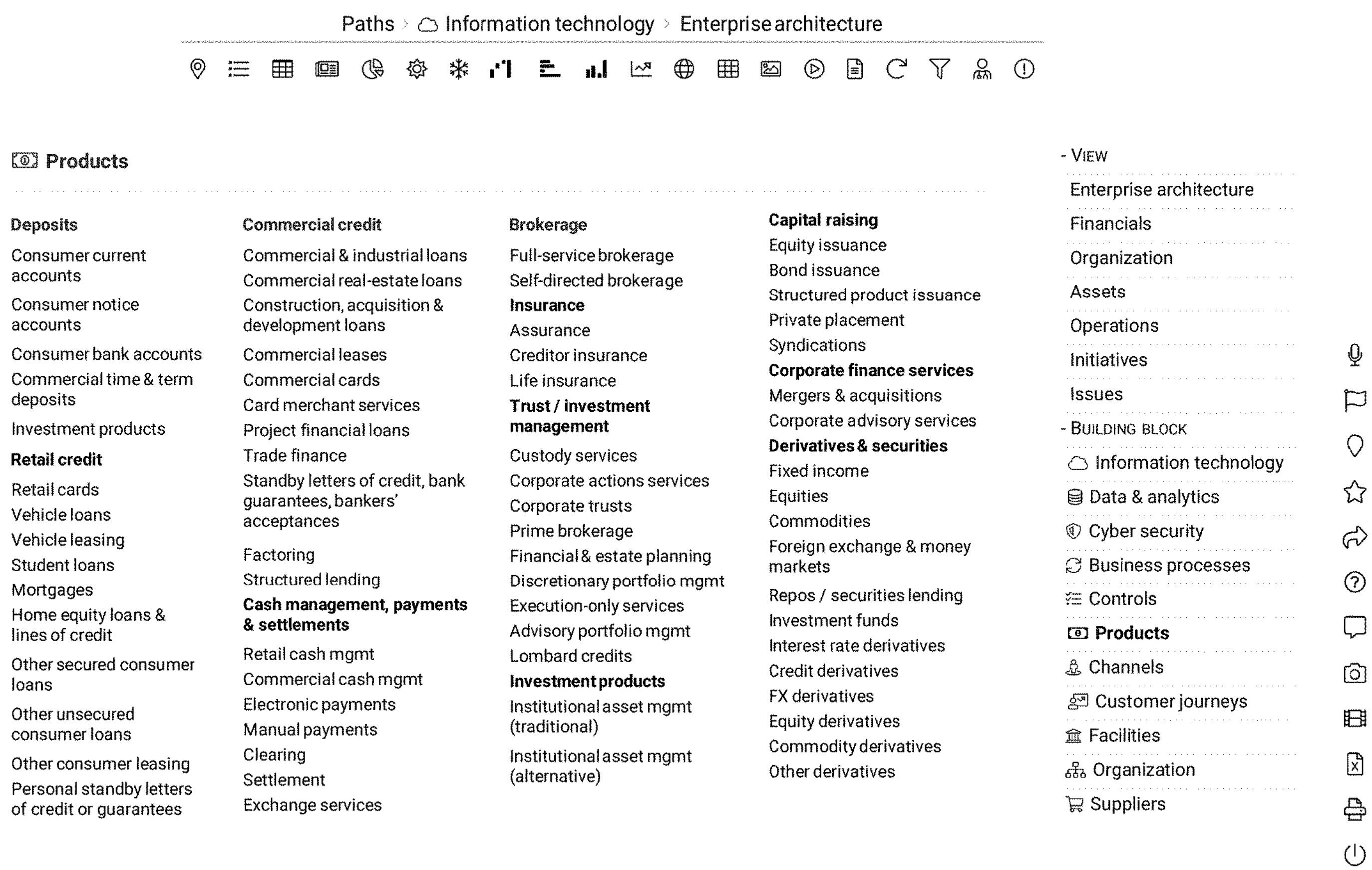
Figure 17:
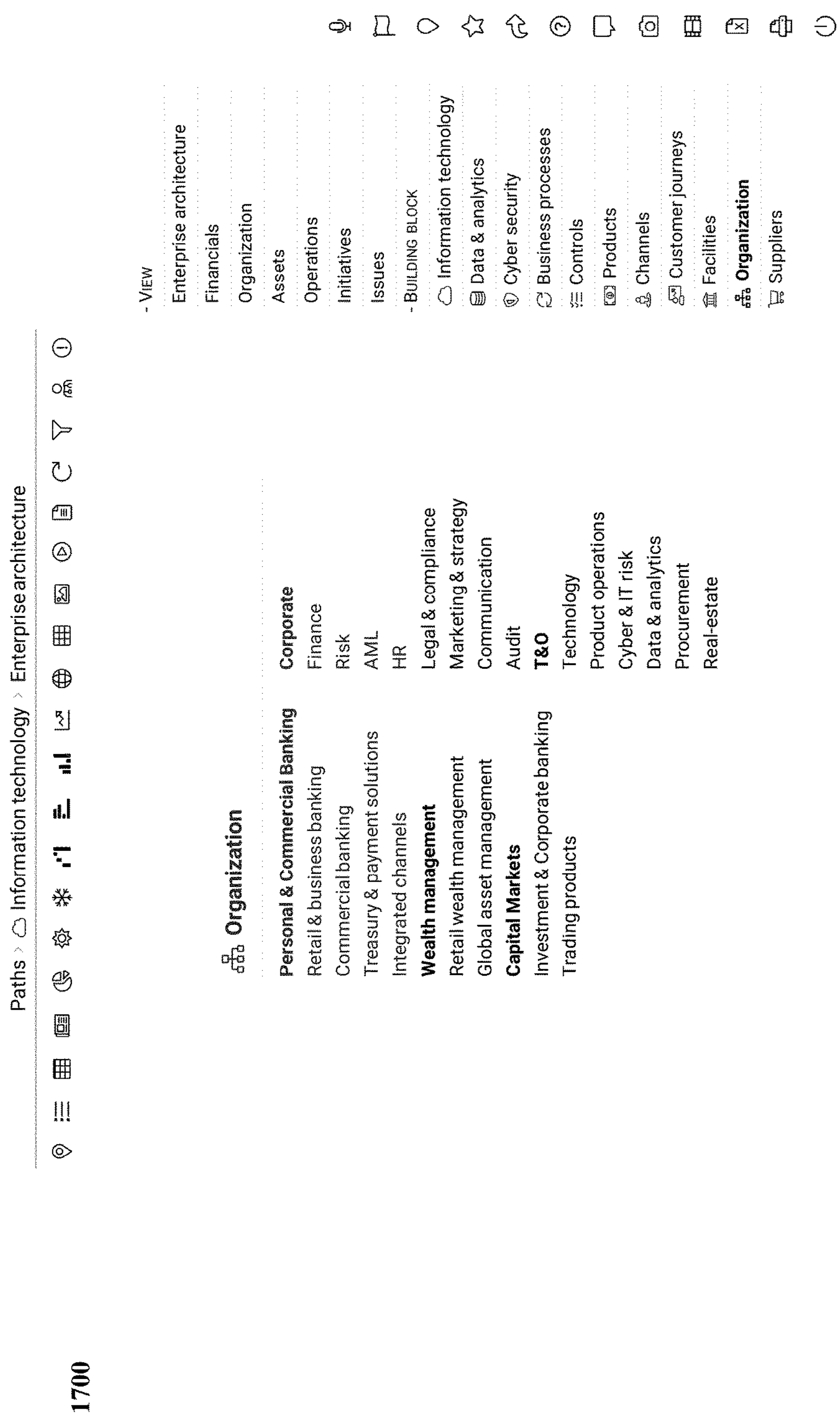
Figure 18:
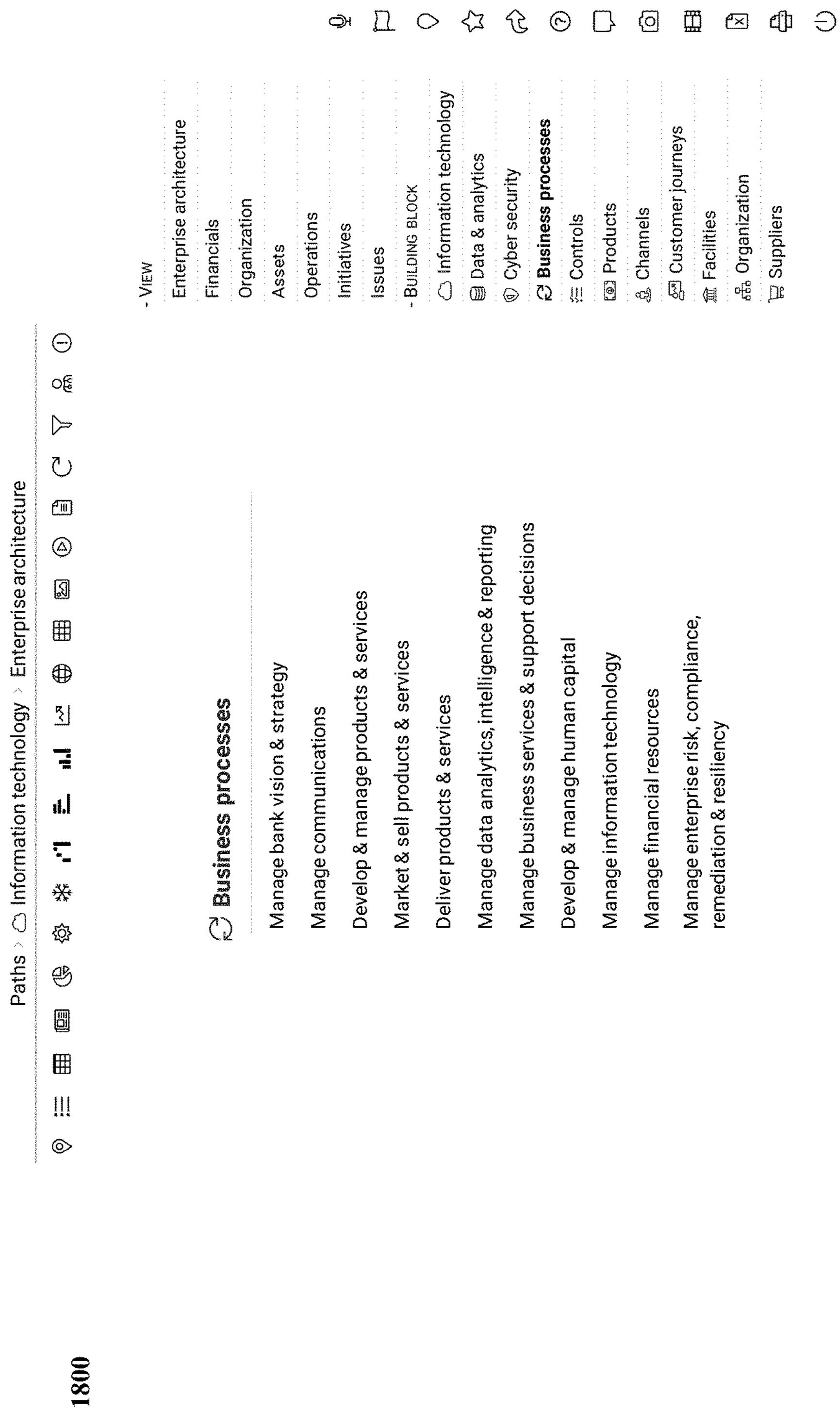
Figure 19:
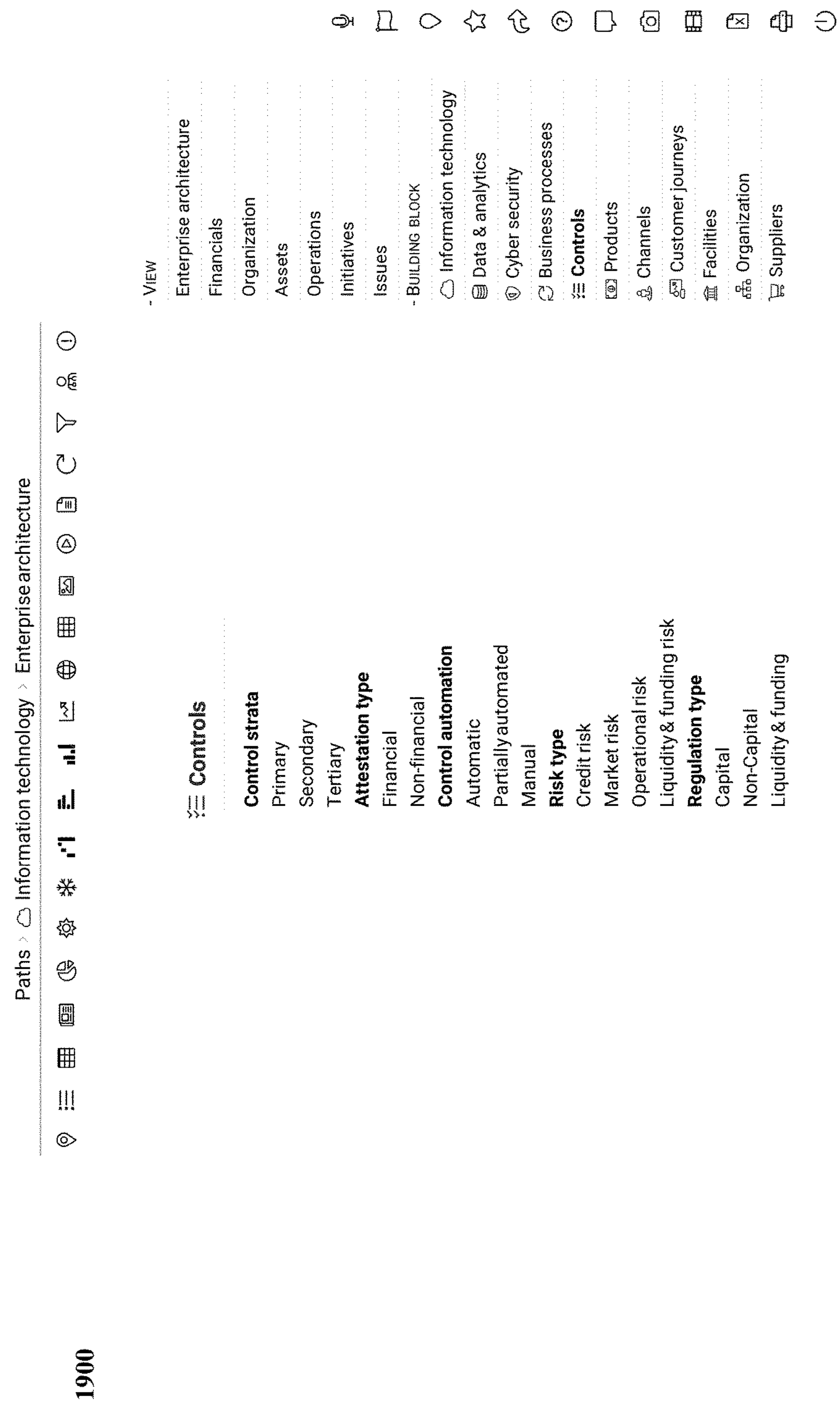
Figure 20:
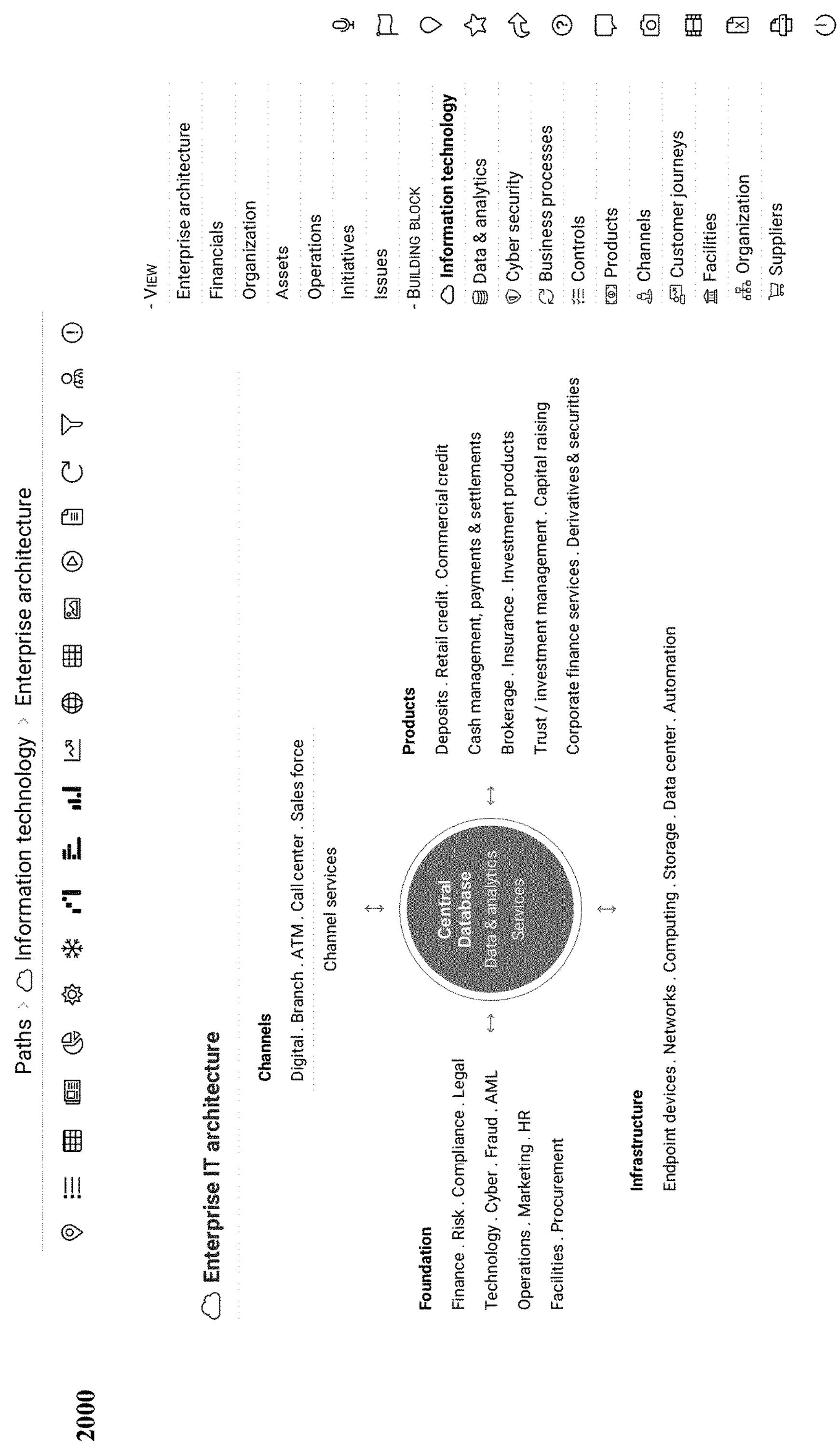
Figure 21:
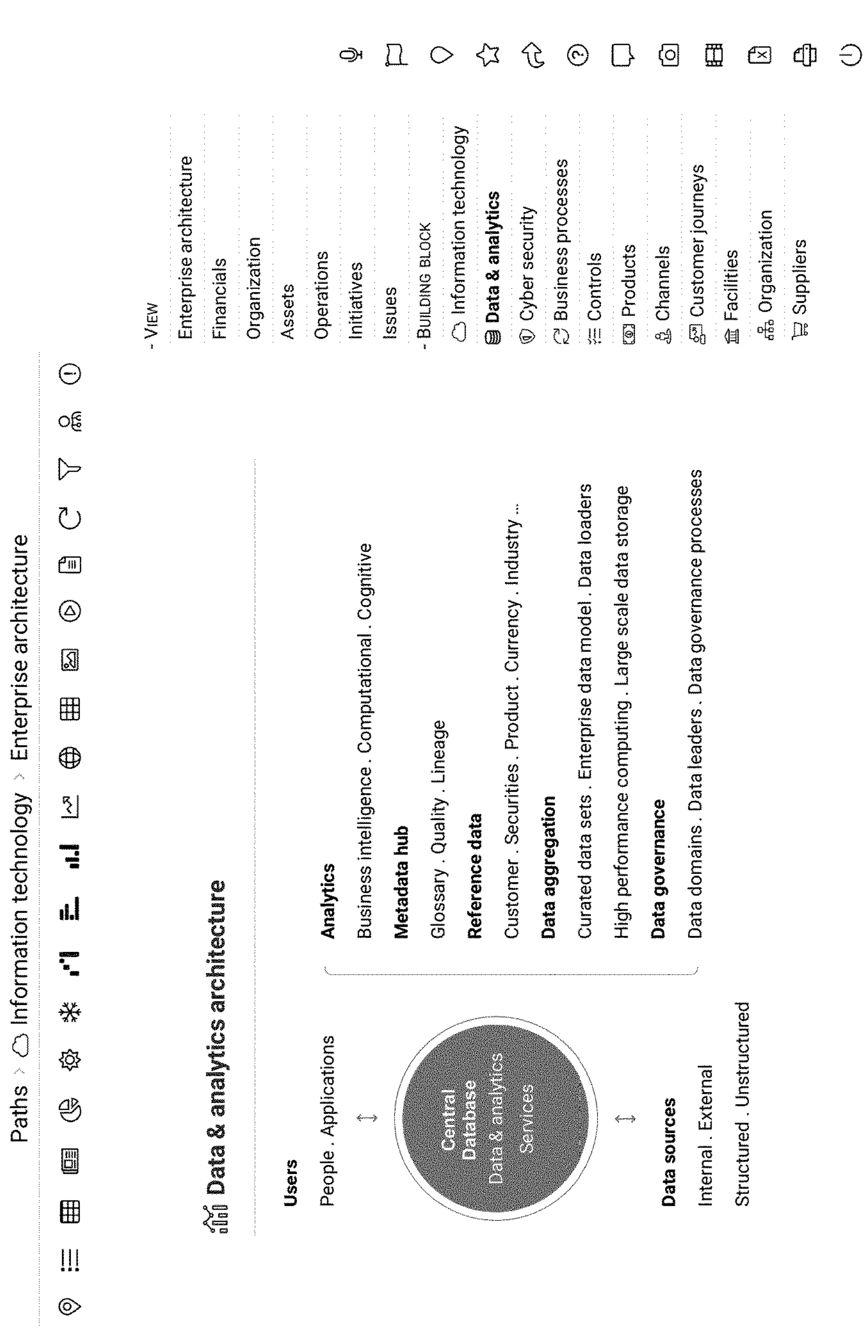
Figure 22:
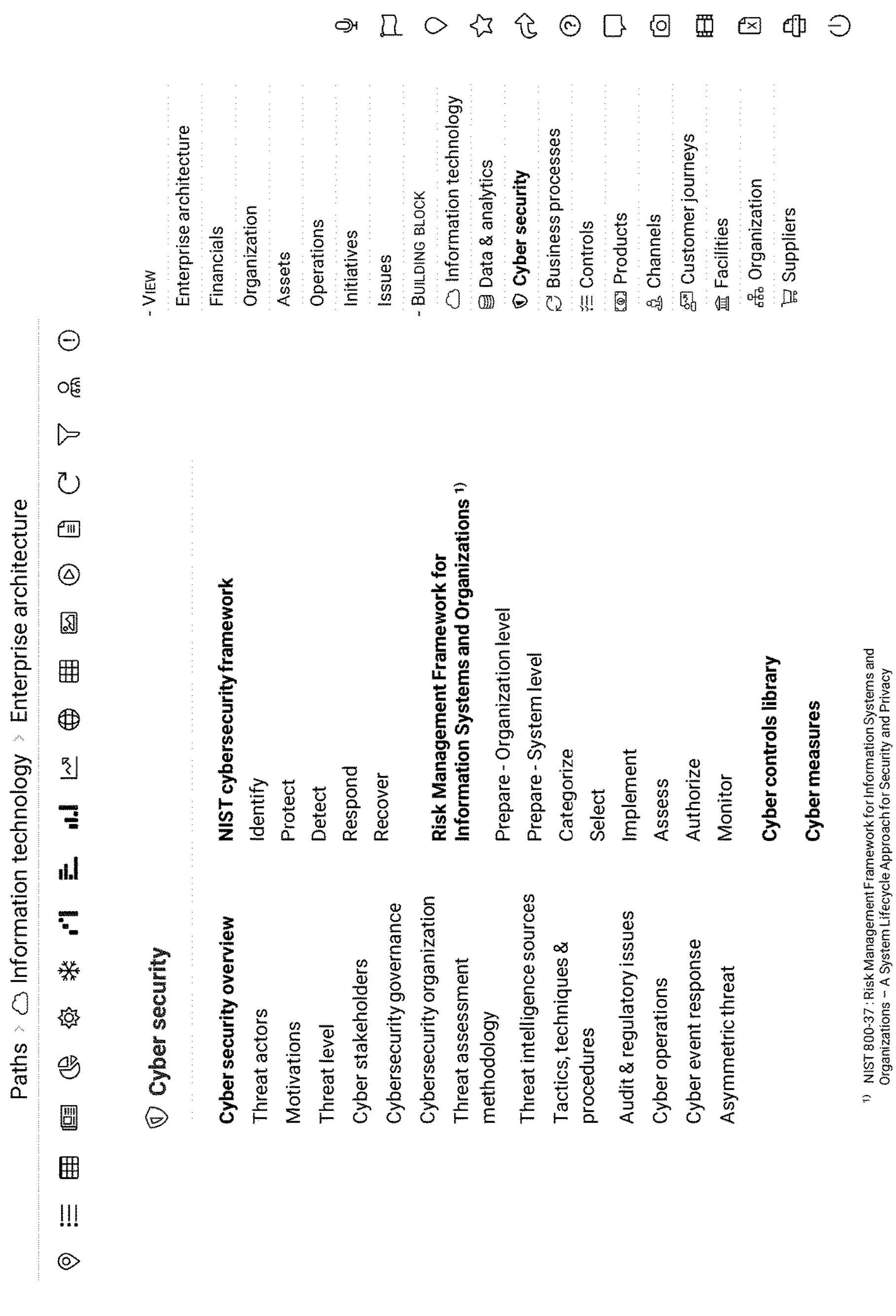
Figure 23:
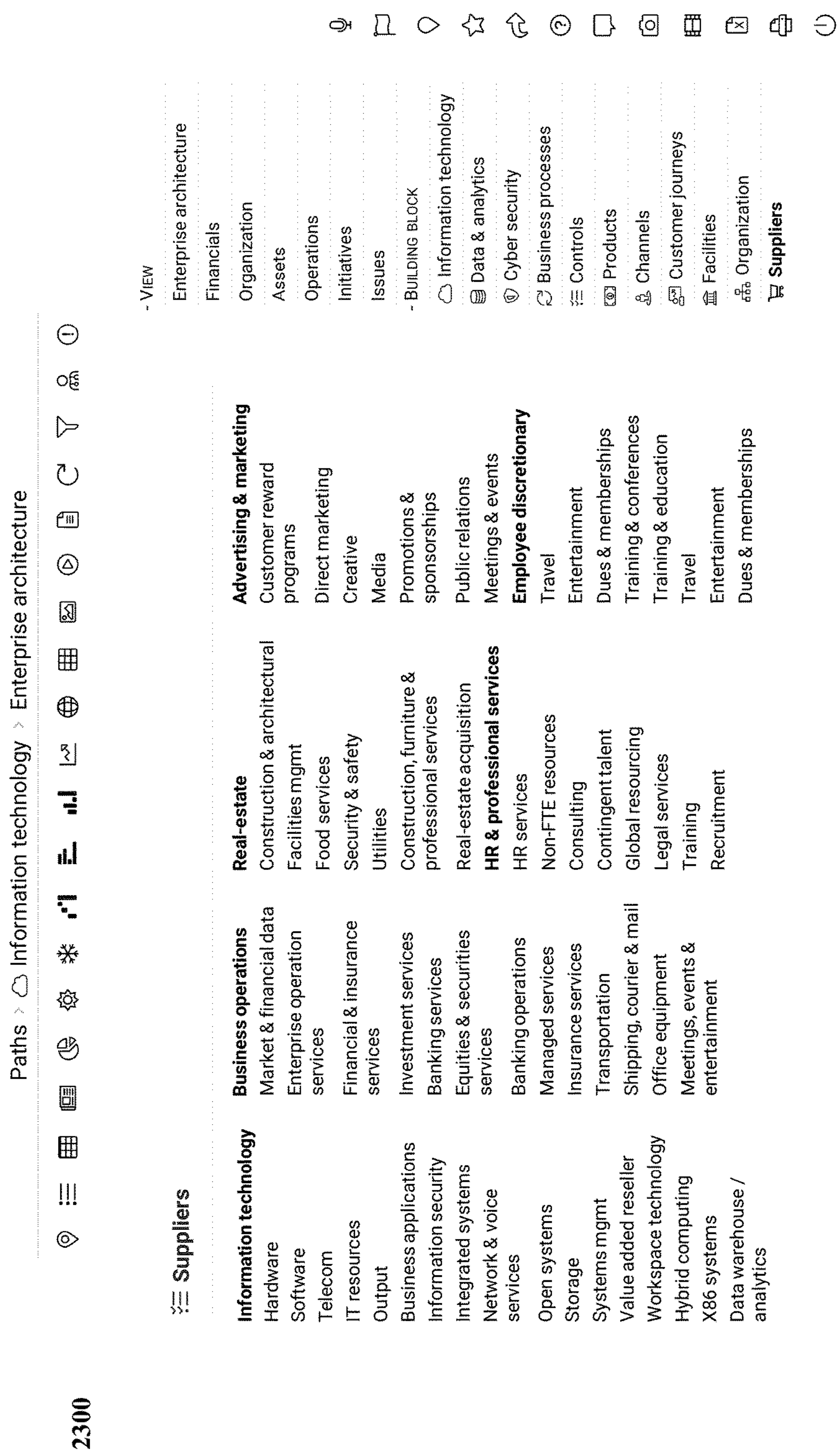
Figure 24:
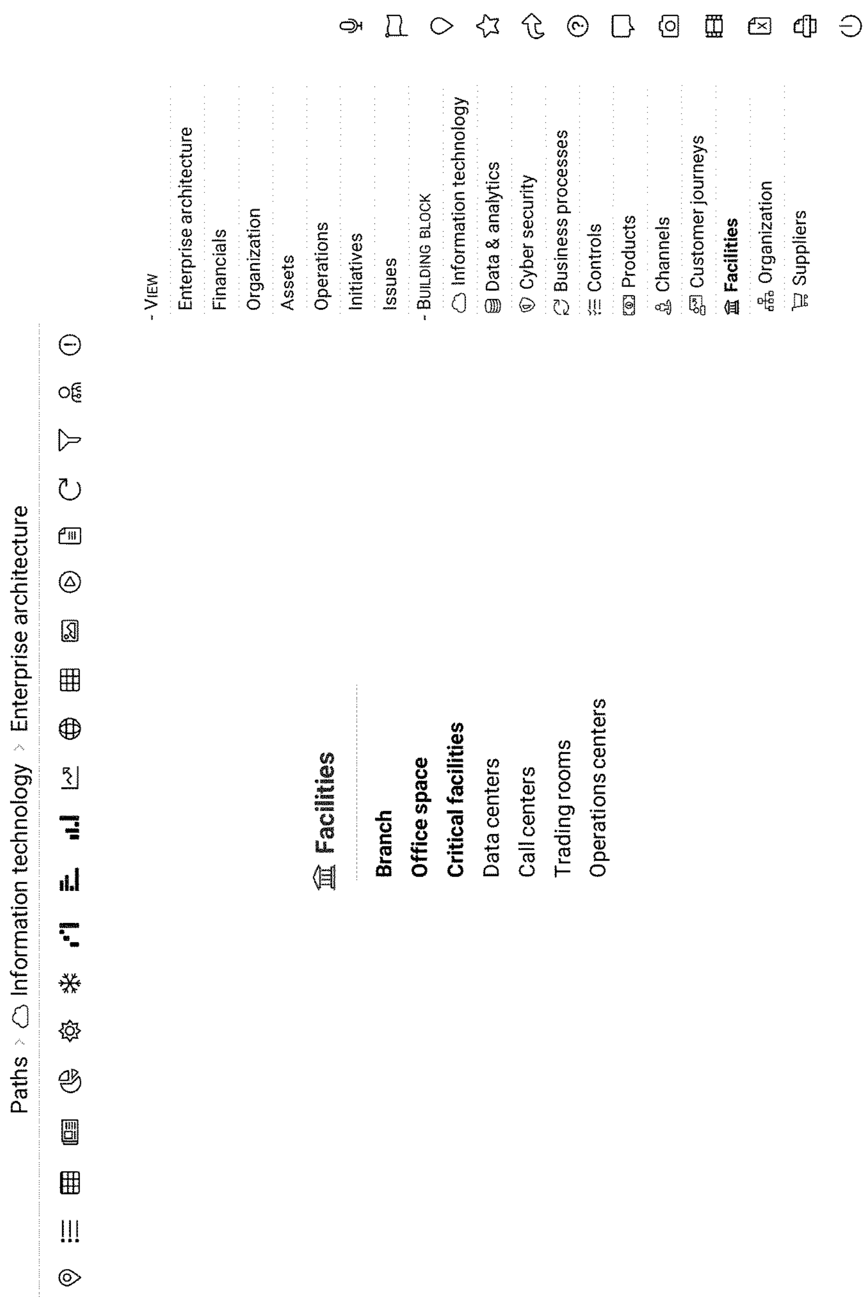
Figure 25:
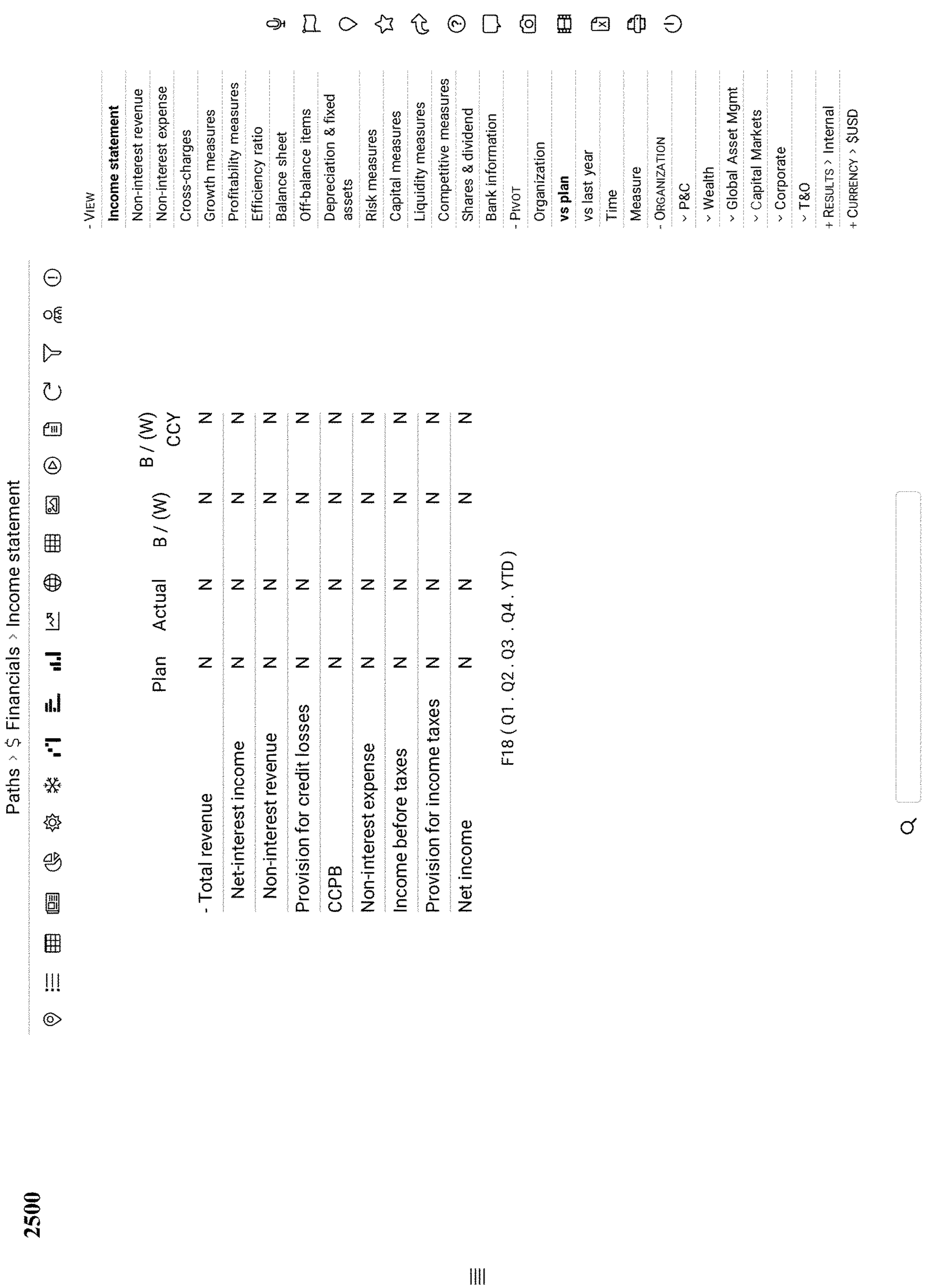
Figure 26:
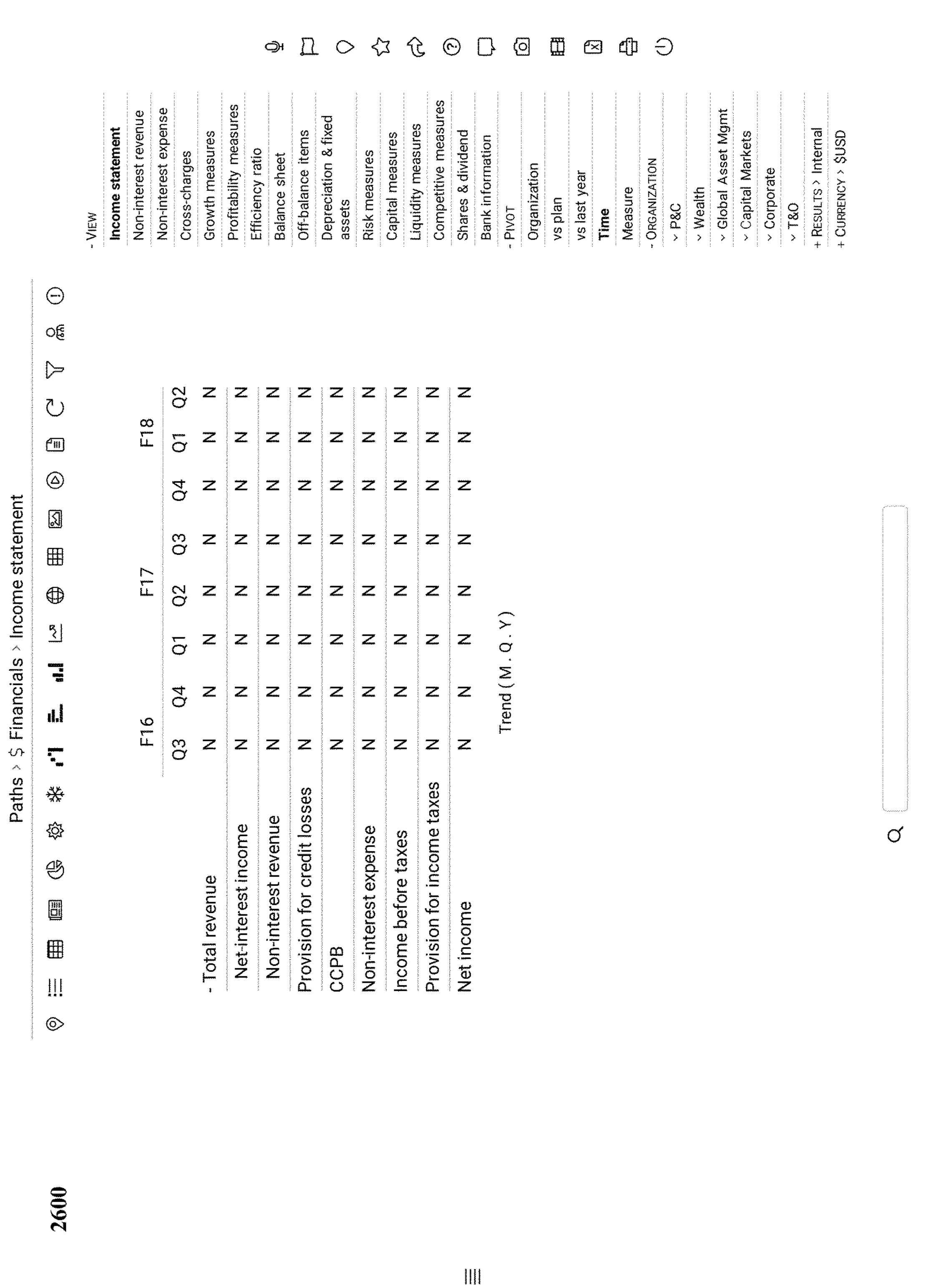
Figure 27:
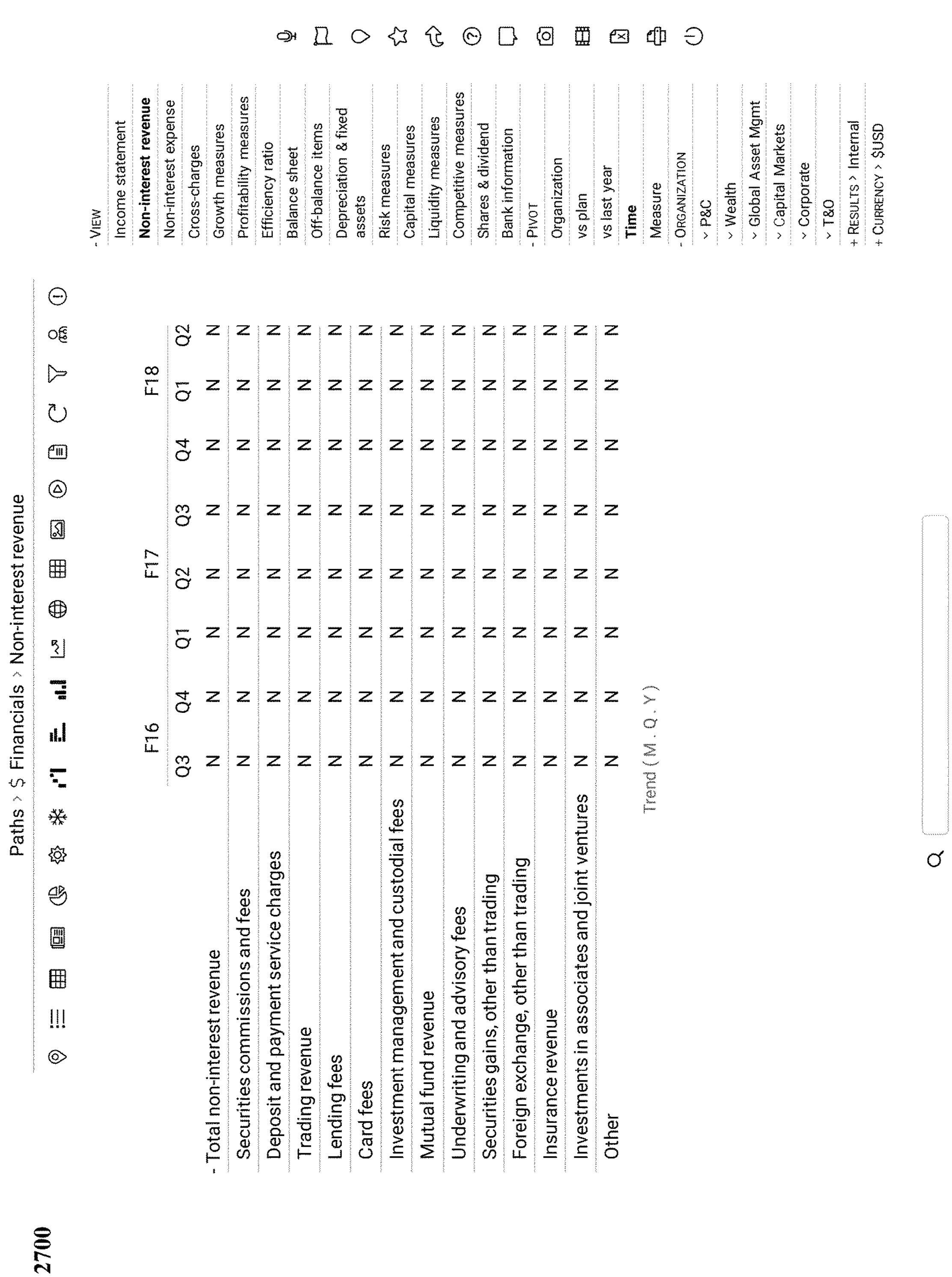
Figure 28:
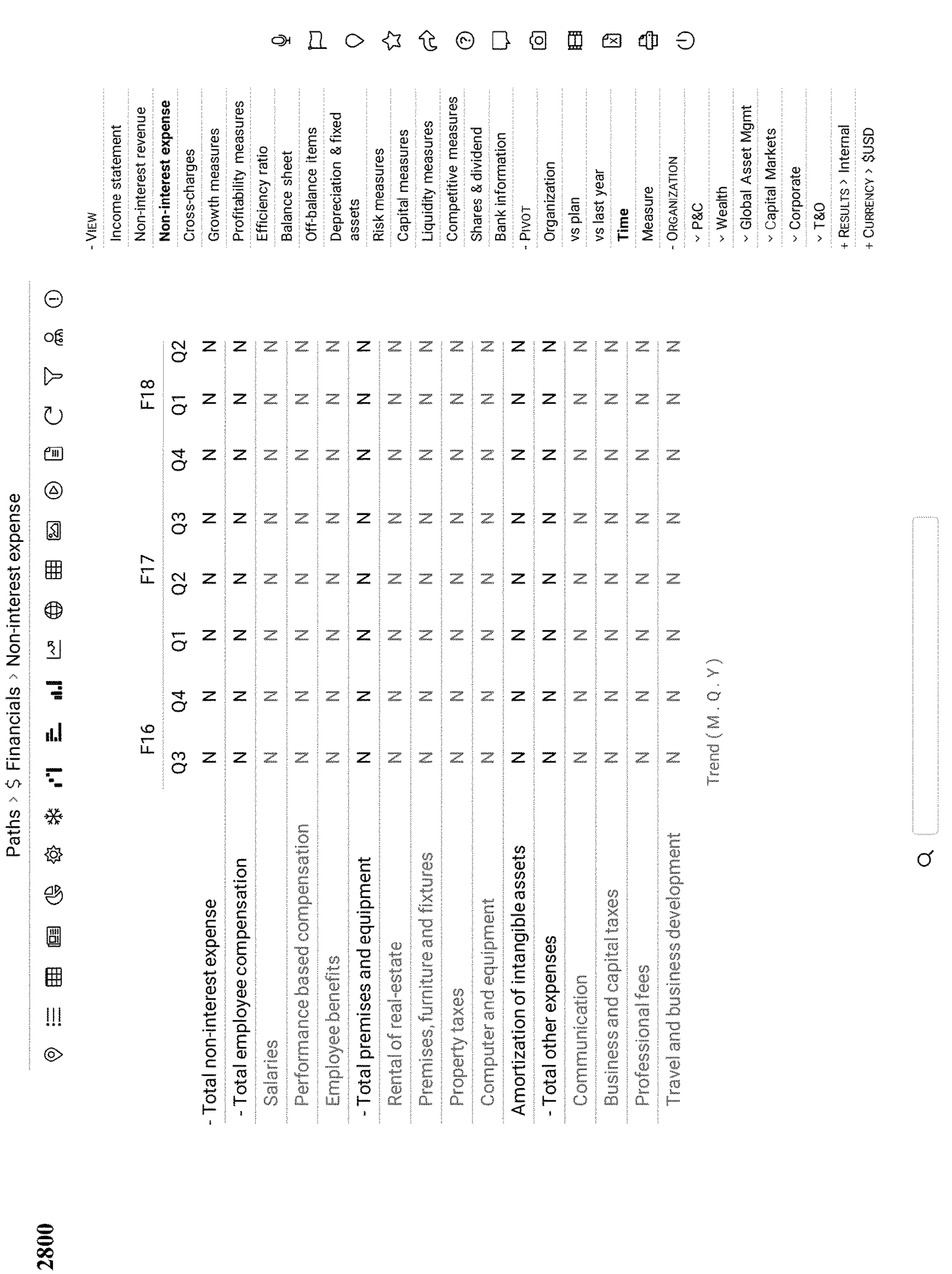
Figure 29:
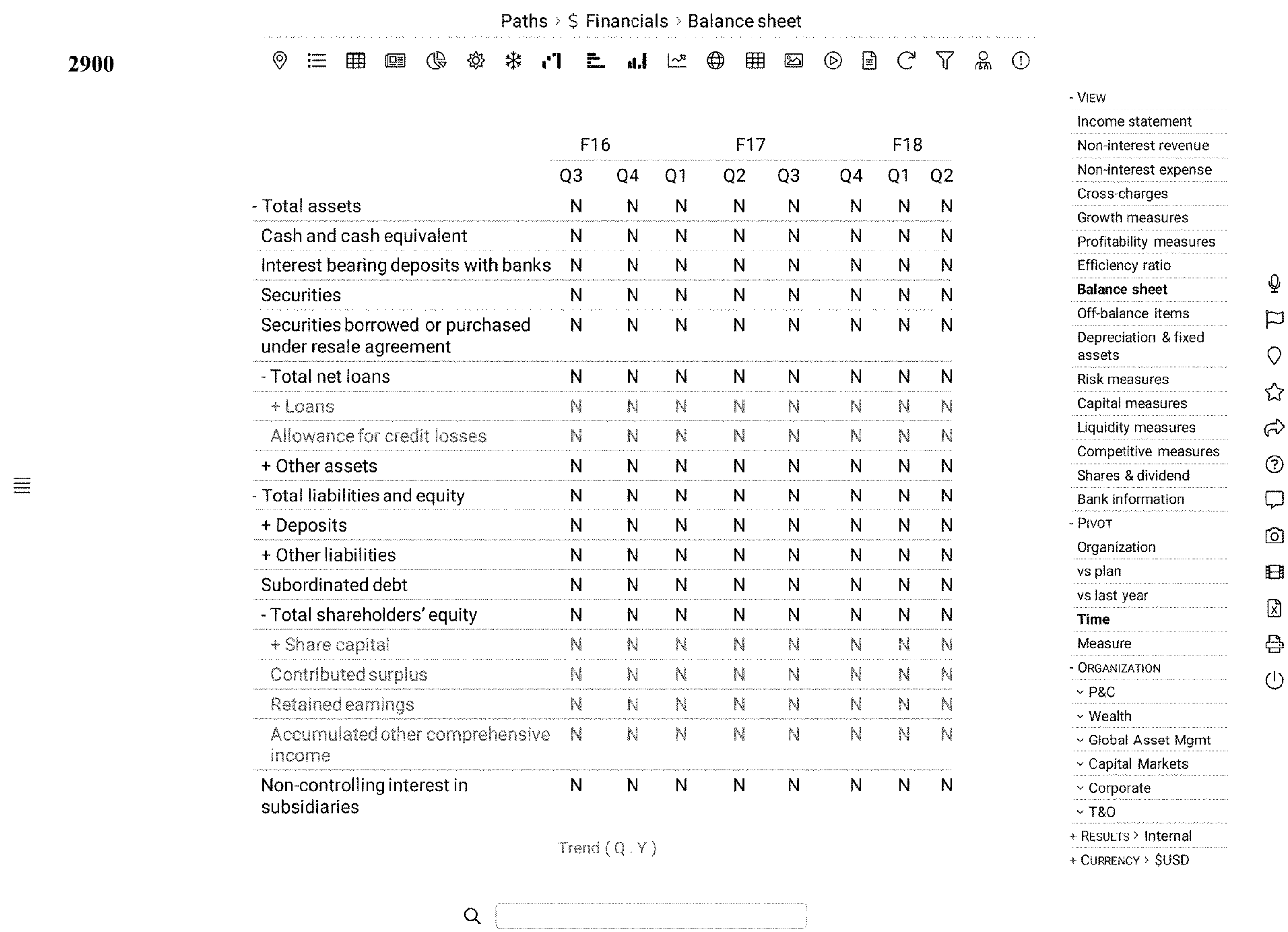

Referring now to FIG. 7, a graphical user interface start page is illustrated, according to an embodiment. The GUI 700 is divided into two sections of path graphical component 710 and information graphical component 720. The path graphical component 710 may display multiple interactive hyperlinks each configured to direct the user to domains and tools available. The paths graphical component 710 may be organized by categories. For instance, in the depicted embodiment, the path graphical component 710 is divided into four categories: performance, capabilities, environment, and tools. When a user interacts with a path hyperlink, the analytics server may display the start page for the given domain or tool.

The GUI 700 also displays information graphical component 720, which displays metrics along with value and trend indicators. As illustrated, the metrics may be visually distinct based on one or more predefined thresholds (e.g., red, yellow, or green). The metrics can be customized for each user based on user preferences and/or user permissions. Each metric may be visually distinct and designed to engage the user in exploring the given domain by providing key facts along with the ability to instantly view information that is more detailed. For instance, in the displayed domain of the GUI 700, the user may instantly identify that "fraud losses" is in critical condition and needs to be addressed. The GUI 700 also displays two hyperlinks ("run" and "transform"). When the user interacts with "run" hyperlink, the analytics server pivots to view additional information (e.g., operations of the enterprise). When the user interacts with "transform" hyperlink, the analytics server displays a list of improvement opportunities and/or initiatives across the enterprise (e.g., in accordance with the knowledge and pre-mapped relationships identified using the nodal network). The user can also filter the information displayed. For instance, the user can implement a filter to only view metrics that satisfy a threshold (e.g., fraud losses, open audit issues, NPS, attrition, provision for credit losses, total shareholder equity, diluted EPS growth, and non-interest expenses).

FIGS. 8-12 illustrate an initial graphical user interface (start page) for different domains. Each GUI 800-1200 illustrates a domain and summarizes available paths and information. For instance, GUI 800 is a start page for a "financial" domain, GUI 900 is a start page for a "risk" domain, GUI 1000 is a start page for an "information technology" domain, GUI 1100 is a start page for data and analytics domains, and GUI 1200 is a start page for a cybersecurity domain. In each GUI 800-1200, a standard pattern is used with path graphical component on the left and information graphical component (selected metrics, value and trend indicator) on the right. This pattern is described in FIG. 7.

As depicted in FIGS. 8-12, each domain may have its unique path graphical component section that corresponds to a selected domain. For instance, path graphical component in GUI 900 has different components and hyperlinks than the path graphical component displayed on GUI 1000 because these GUIs are directed towards different domains and each domain may have its own sub-domains and categories. When considering the nodal network, each node representing a domain may have multiple child nodes representing different dimensions. In an embodiment, different components and hyperlinks may represent a child node relating to a node representing a domain.

The "related topics" category in each path graphical component may direct the user to a new GUI and provide the user access to domains that are closely related to the given domain. The "key documents" category may direct the user to a new GUI that displays additional information regarding the domain. The format used in GUIs 800-1200 provide a top down view of the key information/knowledge in a given domain.

Referring now to GUIs 13-24, illustrate the functionalities of the analyst menu, according to an embodiment. A distinctive characteristic of the graphical user interfaces disclosed herein is that they provide a multi-dimensional model of enterprise architecture. Understanding this architecture is critical to managing and transforming the enterprise. Furthermore, unlike in conventional graphical user interfaces, a user can view enterprise status efficiently and without needing to create multiple views and/or switching between multiple views. In the embodiments depicted in the GUIs shown in FIGS. 13-24, the enterprise architecture is disaggregated in 11 dimensions. For instance, graphical component 1310 comprises hyperlinks corresponding to channels, customer journeys, products, organization, business processes, controls, information technology, data & analytics, cybersecurity, and suppliers and facilities.

When the user interacts with a hyperlink representing each dimension, the analytics server may create a diagram in scalable vector graphics (SVG) to describe each of these dimensions. This diagram is intended to help the user quickly grasp the concepts of the given dimension. The diagrams may also be used to provide access to paths in the data grid. Furthermore, the user can click on (or otherwise interact with) "active" sections of the diagram to access related views. In order to help the user understand the diagram, the analytics server displays a dynamic help icon 1320. Activating the dynamic help icon 1320 results in a brief text description (e.g., pop up window) as the user hovers over different sections of the diagram.

As a non-limiting example, when a user clicks on (or otherwise interacts with) any of the dimension hyperlinks displayed on the graphical component 1310, the analytics server may direct the user to a new graphical user interface where the analytics server displays a diagram having more hyperlinks representing different dimensions and sub-dimensions (e.g., child nodes). For instance when the user clicks on "channels" hyperlink, the analytics server directs the user to GUI 1400; when the user clicks on "customer journeys" hyperlink, the analytics server directs the user to GUI 1500; when the user clicks on "products" hyperlink, the analytics server directs the user to GUI 1600; when the user clicks on "organization" hyperlink, the analytics server directs the user to GUI 1700; when the user clicks on "business processes" hyperlink, the analytics server directs the user to GUI 1800; when the user clicks on "controls" hyperlink, the analytics server directs the user to GUI 1900; when the user clicks on "information technology" hyperlink, the analytics server directs the user to GUI 2000; when the user clicks on "data & analytics" hyperlink, the analytics server directs the user to GUI 2100; when the user clicks on "cybersecurity" hyperlink, the analytics server directs the user to GUI 2200; when the user clicks on "suppliers" hyperlink, the analytics server directs the user to GUI 2300; and when the user clicks on "facilities" hyperlink, the analytics server directs the user to GUI 2400.

FIGS. 25-29 illustrate embodiments where a user interacts with the "financials" hyperlink on the analyst menu. FIGS. 25-29 illustrate how the analyst menu may be used to quickly and efficiently navigate the complete set of financials for a bank branch, which are composed of a very large dataset with multiple metrics and dimensions. Even though the depicted embodiment illustrates financial information of a bank, it is expressly understood that the methods, systems, and graphical user interfaces described herein can be used to efficiently visualize data corresponding to any other subject matter.

Using the graphical user interfaces illustrated in FIGS. 25-29, users may view the following: income statement (GUIs 2500 and 2600, non-interest revenue (GUI 2700), non-interest expense (GUI 2800), and balance sheets (GUI 2900). The above-mentioned GUIs may also display cross-charges, growth measures, profitability measures, efficiency ratio, balance sheet, off balance items, depreciation and fixed assets, risk measures, capital measures, liquidity measures, competitive measures, shares and dividends, and bank information (employees, branches, ATM, etc.), as depicted FIGS. 25-29. Dimensions used to produce the above-described graphical user interfaces may include organization units, location (e.g., country), currency, type of results (e.g., internal, reported, and/or adjusted). By identifying these dimensions, users may filter the data displayed. For instance, the user may filter bank branches, employees, or ATMS by selecting a location dimension (e.g., limiting the data to the United States).

In another example, FIGS. 75A-F illustrate how a user can efficiently explore/navigate the knowledge grid (nodal structure) and view customized data. As illustrated, the analytics server may display GUI 7500 where a user can select a "domain" to explore. The analytics server may also display various options allowing the user to visualize certain data, add data or a path to a favorites list for expedited access, send a specific view to another user, share data with other users, display the narrative associated with a view, print, display the library of summaries, or add data (e.g., photos) to the knowledge grid.

As illustrated in GUI 7510, the analytics server may also display different options for the user to input his or her request. For instance, the user may input a voice command or interact with a search bar. The analytics server may also provide an internal communication system allowing users to communicate with each other (e.g., messaging application). The analytics server may display a list of all domains (as illustrated in GUI 7520) where the user can select a domain to drill down or view customized data. The analytics server may allow users to generate customized visualizations. For instance, as depicted in GUI 7530, when a user interacts with the visualization menu 7532, the analytics server displays options 7531 allowing the user to customize the visualization 7533. For example, as depicted in GUI 7540, a user may select the column and row pivots for visualization 7533. The analytics server may also display the same data in different formats. For instance, the analytics server may display a chart visualizing the selected data or a pie chart visualizing a customized selection of data (e.g., visualization 7551 depicted in GUI 7550).

FIGS. 30A-41 illustrate a drill-down feature provided by the analytics server. More specifically, FIGS. 30A-41 illustrate drill-down features for the channel domain. However, it is expressly understood that the methods, systems, and graphical user interfaces described herein apply to any domain or other features. A distinctive feature of the graphical user interfaces described herein is the ability of the analytics server to provide drill-down information in an efficient and seamless manner. Using this feature, users may efficiently navigate through granular data. Users may gradually narrow data in an efficient manner without using multiple thresholds or filters or requiring multiple interfaces.

The graphical user interfaces depicted in FIGS. 30B-41 illustrate how a user may use the functionality of the analyst menu in conjunction with the drill-down features to navigate the nodal network. Using the drill-down feature, users may navigate within a given domain (e.g., from one metric or concept to another), move laterally across domains (e.g., from one domain to another domain), and/or move up/down in level of abstraction (e.g., from the macro view to the atomic view). These technical advantages over conventional graphical user interfaces allow users to visualize data efficiently.

Figure 30A:
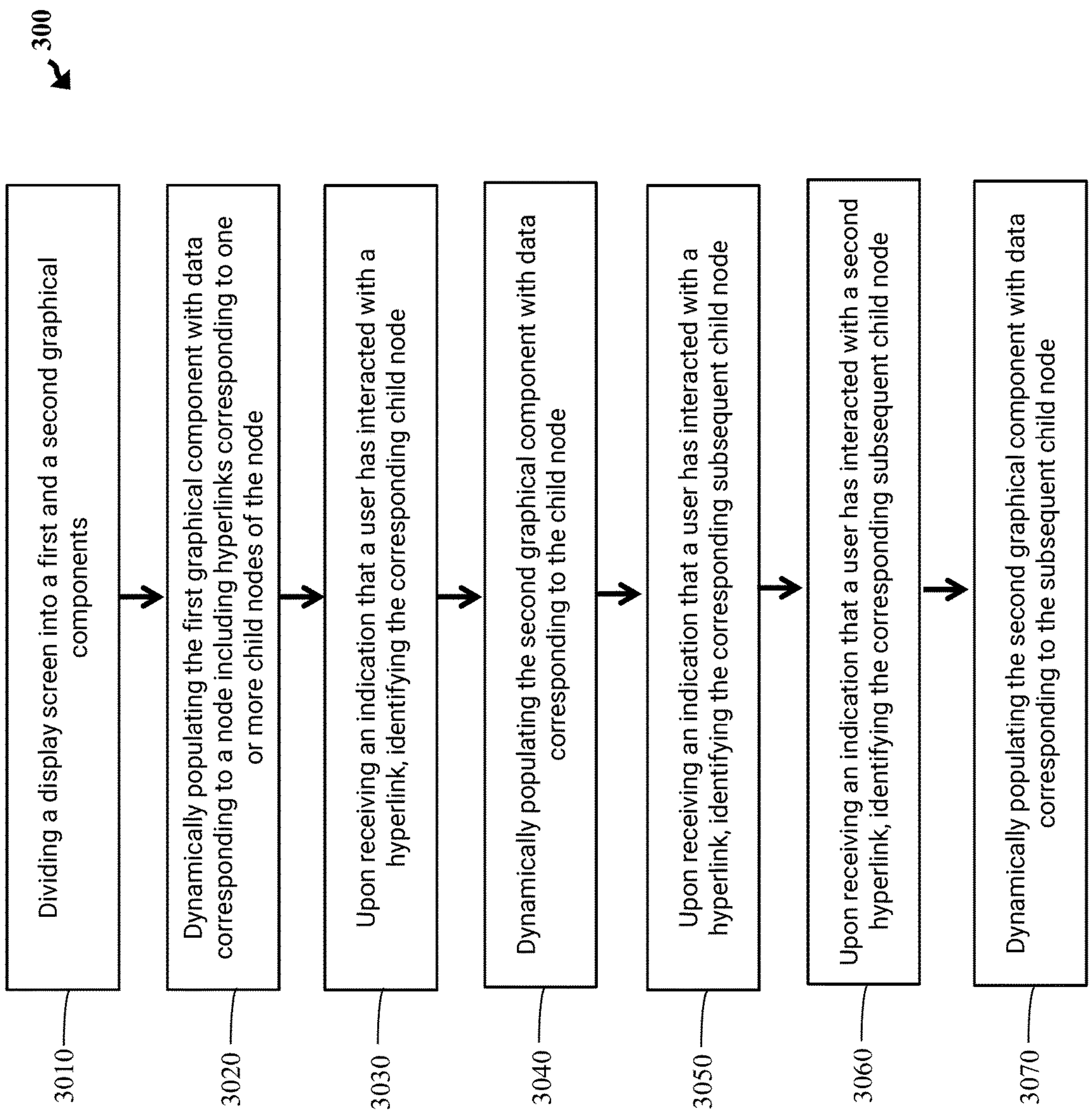
Figure 30B:
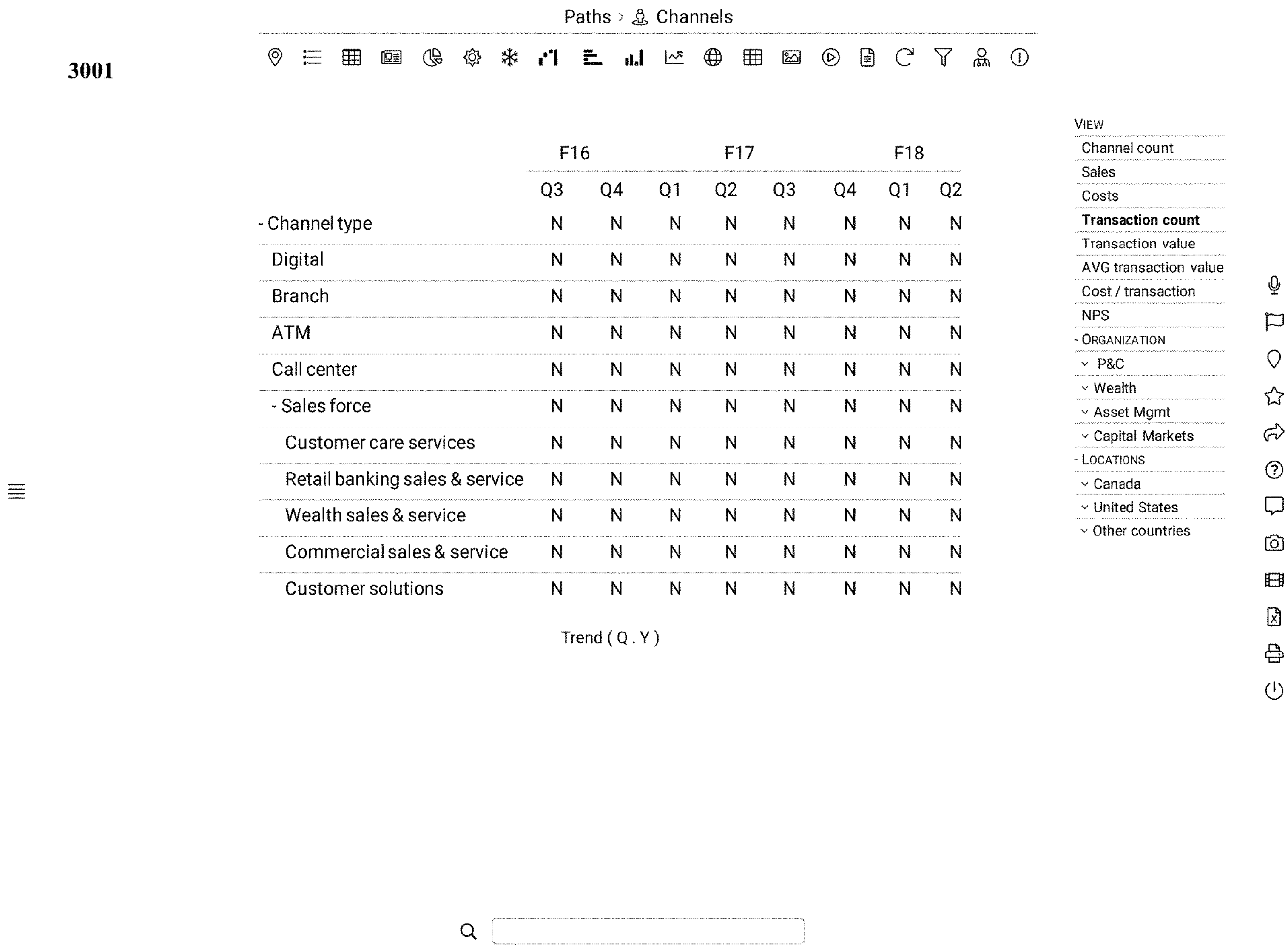
Figure 31:
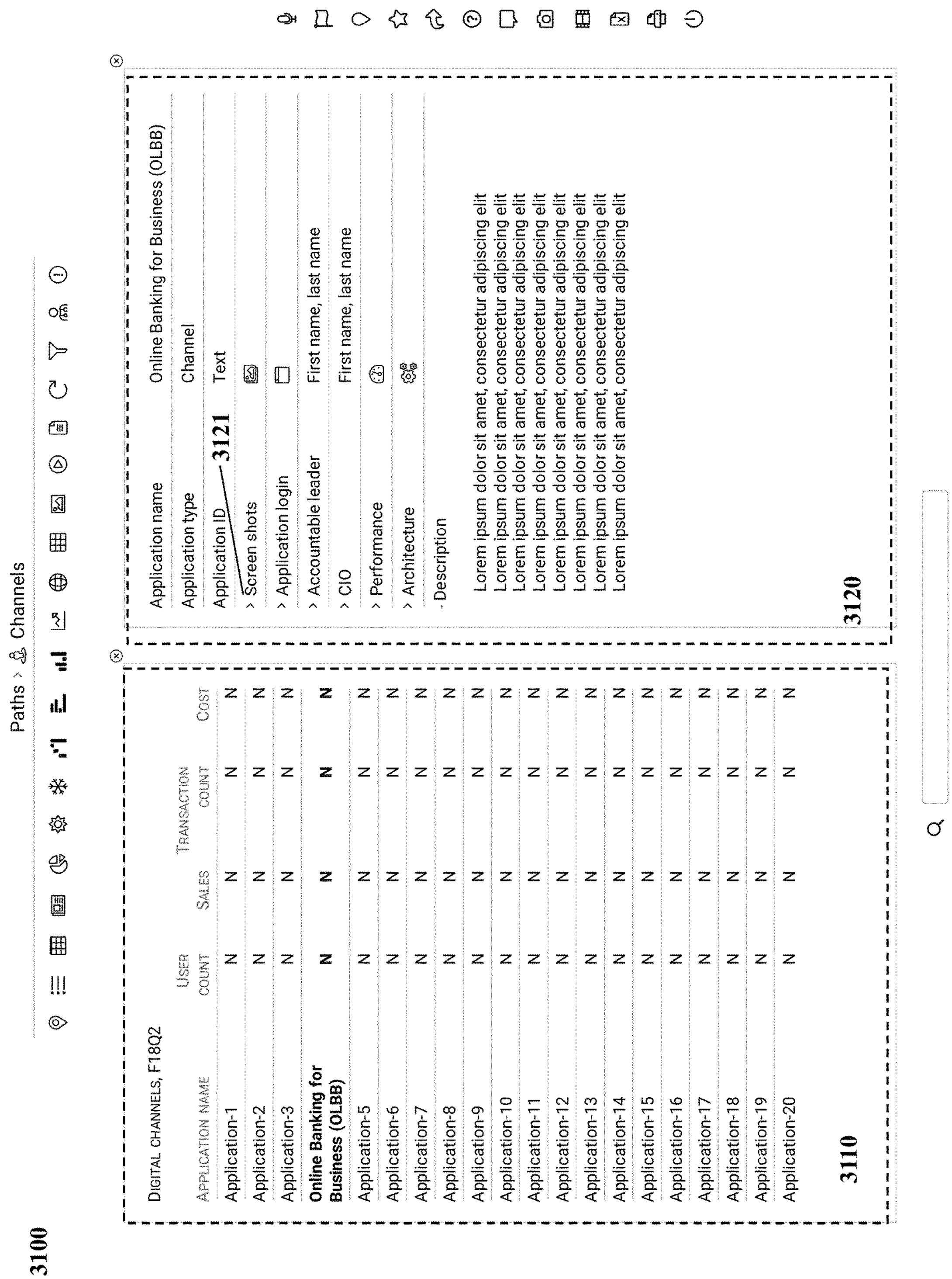
Figure 32:
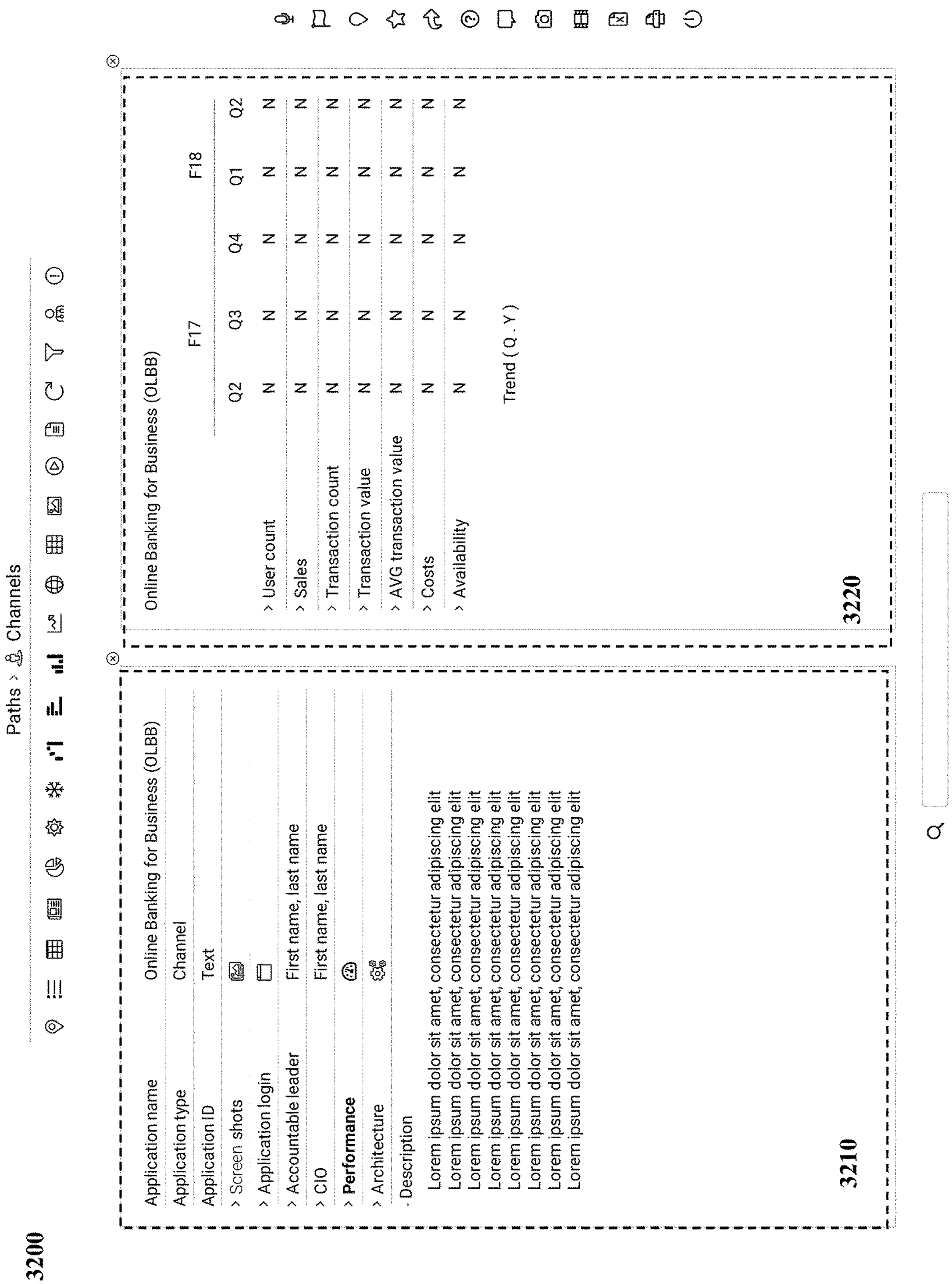
Figure 33:
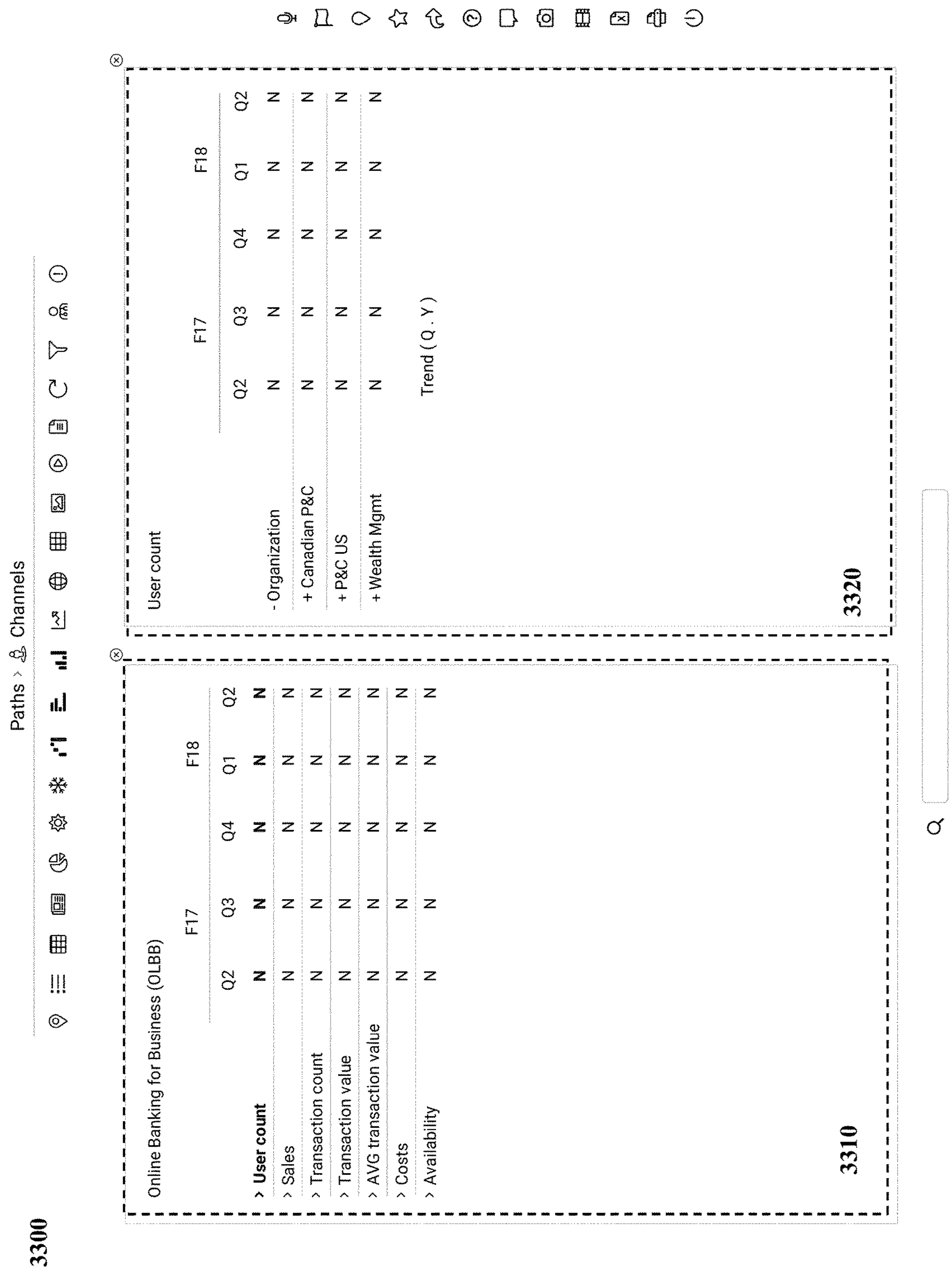

Referring now to FIG. 30A, a flow diagram of a process executed by the intelligent data analysis system is illustrated, in accordance with an embodiment. The method 3000, in conjunction with the graphical user interfaces illustrated in FIGS. 30B-33, illustrate the drilling-down techniques executed by the analytics server. The method 3000 includes steps 3010-3070. However, other embodiments may include additional or alternative execution steps, or may omit one or more steps altogether. The method 3000 is described as being executed by a server, similar to the analytics server described in FIG. 1. However, in some embodiments, steps may be executed by any number of computing devices operating in the distributed computing system described in FIG. 1. For instance, part or all the steps described in FIG. 30A may be locally performed by one or more user computing devices or an administrative computing device.

At step 3010, the analytics server may divide a display screen into a first and a second graphical component. Furthermore, at step 3020, the analytics server may dynamically populate the first graphical component with data corresponding to a node where the analytics server displays a first set of hyperlinks corresponding to one or more child nodes of the node. The GUI 3001 illustrates that users can simultaneously view multiple metrics (channel count, sales, transaction count, etc.) across channels. Users can activate the drill-down feature by clicking on a cell in the table displayed in GUI 3001.

The drill-down feature is implemented by dividing the display in two areas: left and right, each of which contains an information block dynamically populated by the analytics server. For example, in FIG. 31, the left area (graphical component 3110) displays a list of digital channels. Digital channel may represent a node within the nodal network generated by the analytics server. The digital channel node may have multiple child nodes. For instance, each hyperlink displayed within the graphical component 3110 may represent a child node of the digital channel node.

As depicted, the right area (graphical component 3120) displays detailed information related to a specific (selected) digital channel. When the user clicks on a specific feature (e.g., row or icon) in the graphical component 3110 to select a digital channel, the analytic server displays (dynamically populates) the related information on the graphical component 3120. The analytics server may display icon 3121 to indicate that further drill-down options is available. For example, in the graphical component 3120, the following items have available drill-down information:

Screen shots: drill-down option will display screen shots for the selected application;

Application login: drill-down option will display the login page for the selected application;

Accountable leader: drill-down option will display demographic data relating to the leader who is accountable for the selected application (e.g., name, address, or contact information);

CIO: drill-down option will display demographic data relating to the chief information officer who is accountable for the selected application (e.g., name, address, contact information, etc.);

Performance: drill-down option will display information related to the performance (e.g., user count, sales, or transaction count) of the selected application; and Architecture: drill-down option will display information related to the architecture (e.g., database, operating system, software package, or data center) of the selected application.

At step 3030, the analytics server may, upon receiving an indication that a user has interacted with a first hyperlink of the first set of hyperlinks, identify a child node corresponding to the first hyperlink. Furthermore, at step 3040, the analytics server may dynamically populate the second graphical component with data corresponding to the identified child node where the server displays a second set of hyperlinks corresponding to one or more subsequent child nodes of the identified child node. As illustrated in GUI 3200 (a subsequent graphical user interface displayed after GUI 3100), when a user selects an item for drill-down from the right information block, the analytics server dynamically moves the selected information block to left area of the subsequent graphical user interface. The analytics server further displays the subsequent drill-down information in the right area of the subsequent graphical user interface. This method enables a drill-down feature that is unconstrained by the number of levels.

For example, when the user clicks on online banking for business in GUI 3100, the analytics server, identifies a node associated with the OLBB in a nodal network (parent node). The analytics server also dynamically populates the graphical component 3120 with information related to OLBB. The information may include multiple hyperlinks where each hyperlink is associated with a related and/or child node of the parent node. For instance, graphical component 3120 includes hyperlinks corresponding to screenshots, application login, account leader, and other child nodes.

If the user clicks on a hyperlink associated with a child node (e.g., "performance" displayed on the graphical component 3120), the analytics server then directs the user to GUI 3200 where OLBB information is dynamically relocated from the graphical component 3120 to graphical component 3210 and the graphical component 3220 is dynamically populated by OLBB performance data. The analytics server may further remove data displayed in the graphical component 3110. Moreover, in the depicted embodiment, the analytics server may display data corresponding to one or more subsequent child nodes to the child node ("performance) in the graphical component 3220.

At step 3050, the analytics server may, upon receiving an indication that a user has interacted with a second hyperlink of the second set of hyperlinks, identify a subsequent child node corresponding to the second hyperlink. Furthermore, at step 3060, the analytics server may dynamically populate the second graphical component with data corresponding to the identified subsequent child node. For example, when the user clicks on "user count" displayed on the graphical component 3220 (subsequent child node), the analytics server first identifies the subsequent child node within the nodal network and retrieves data associated with the subsequent child node. The analytics server then directs the user to GUI 3300. As depicted in GUI 3300, the analytics server removes the data displayed within the graphical component 3210, dynamically populates the graphical component 3310 with data previously populated in the graphical component 3220. The analytics server also displays data corresponding to user account (subsequent child node) in the graphical component 3320.

Figure 34:
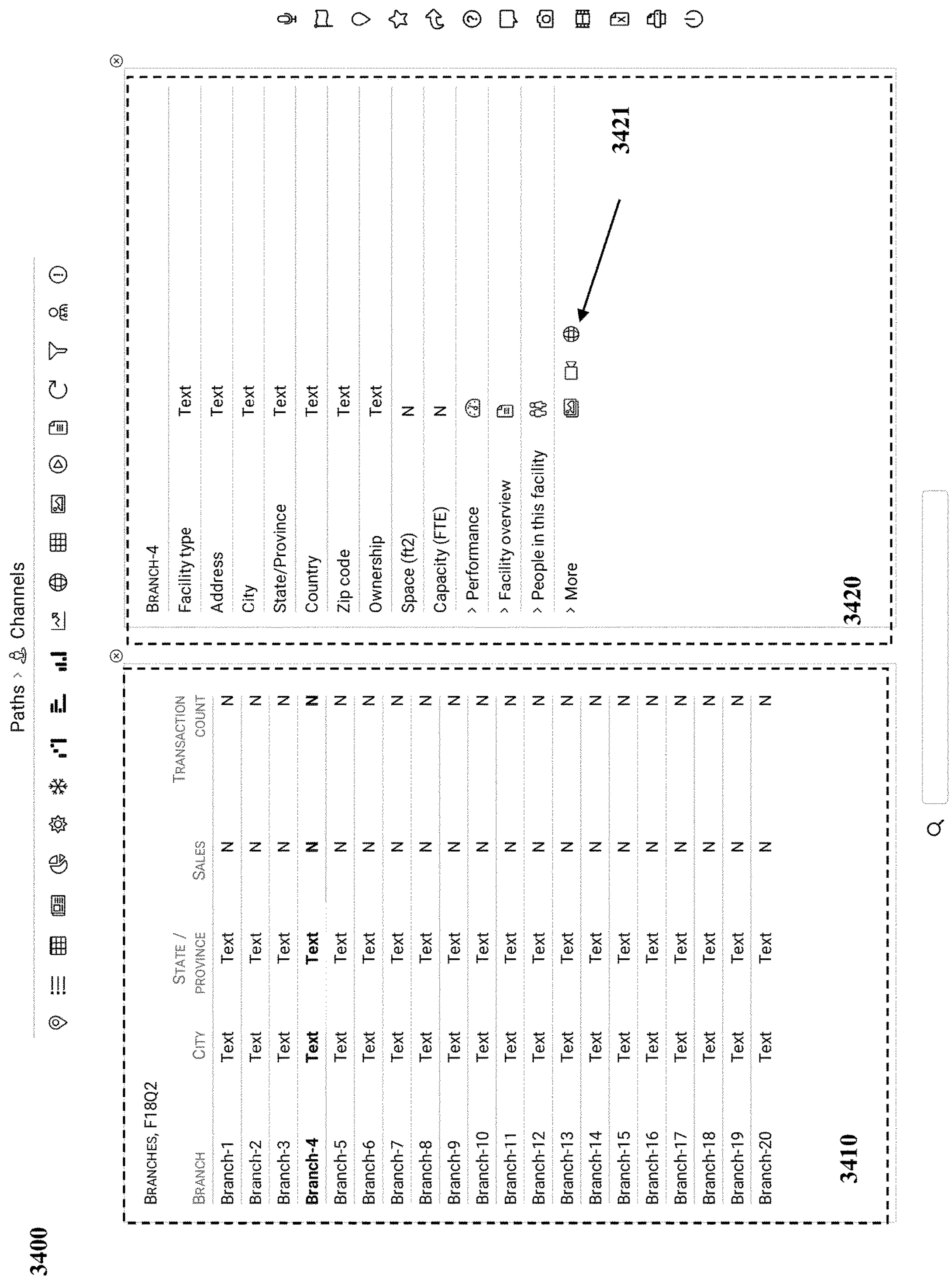
Figure 35:
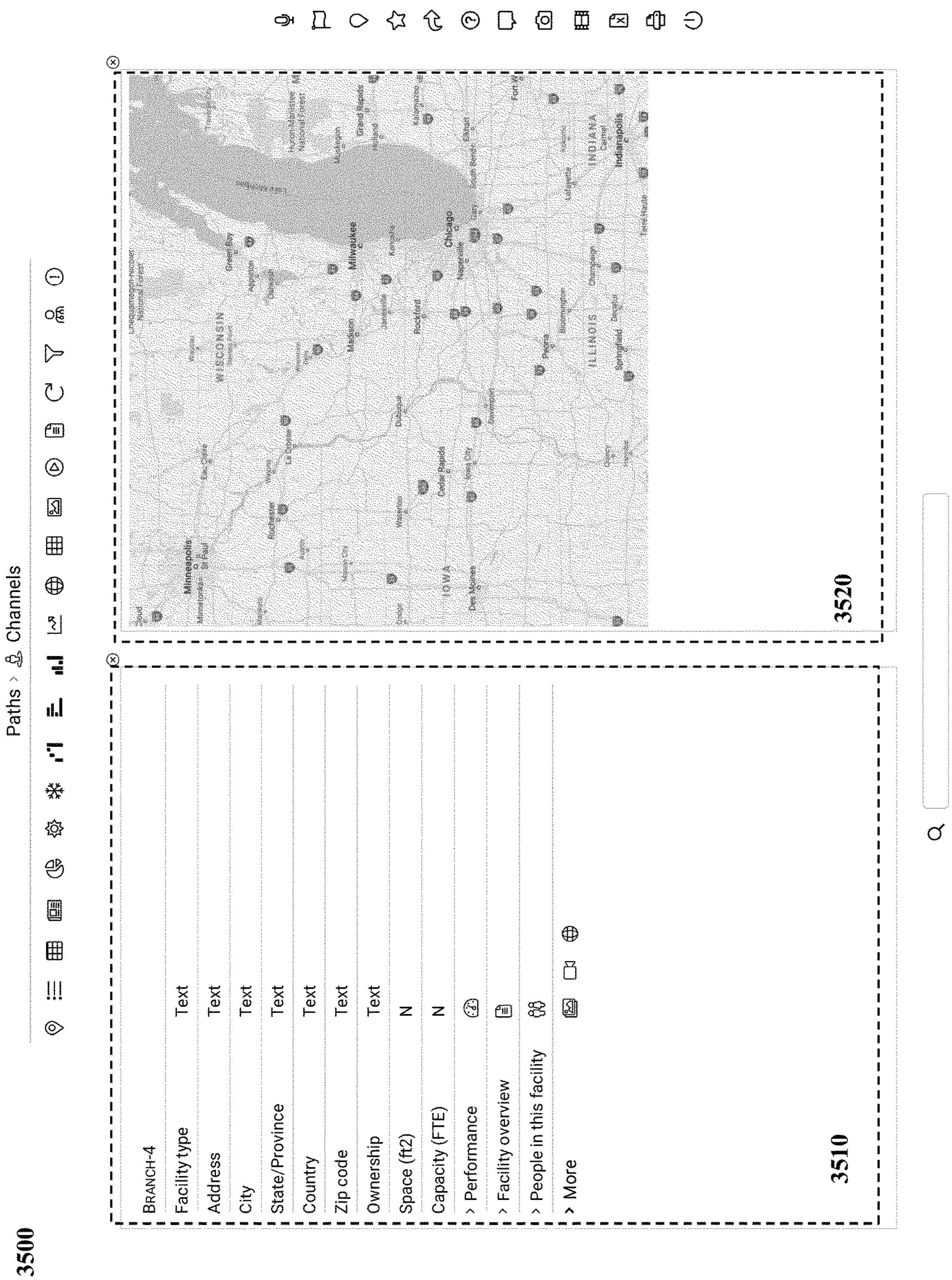
Figure 36:
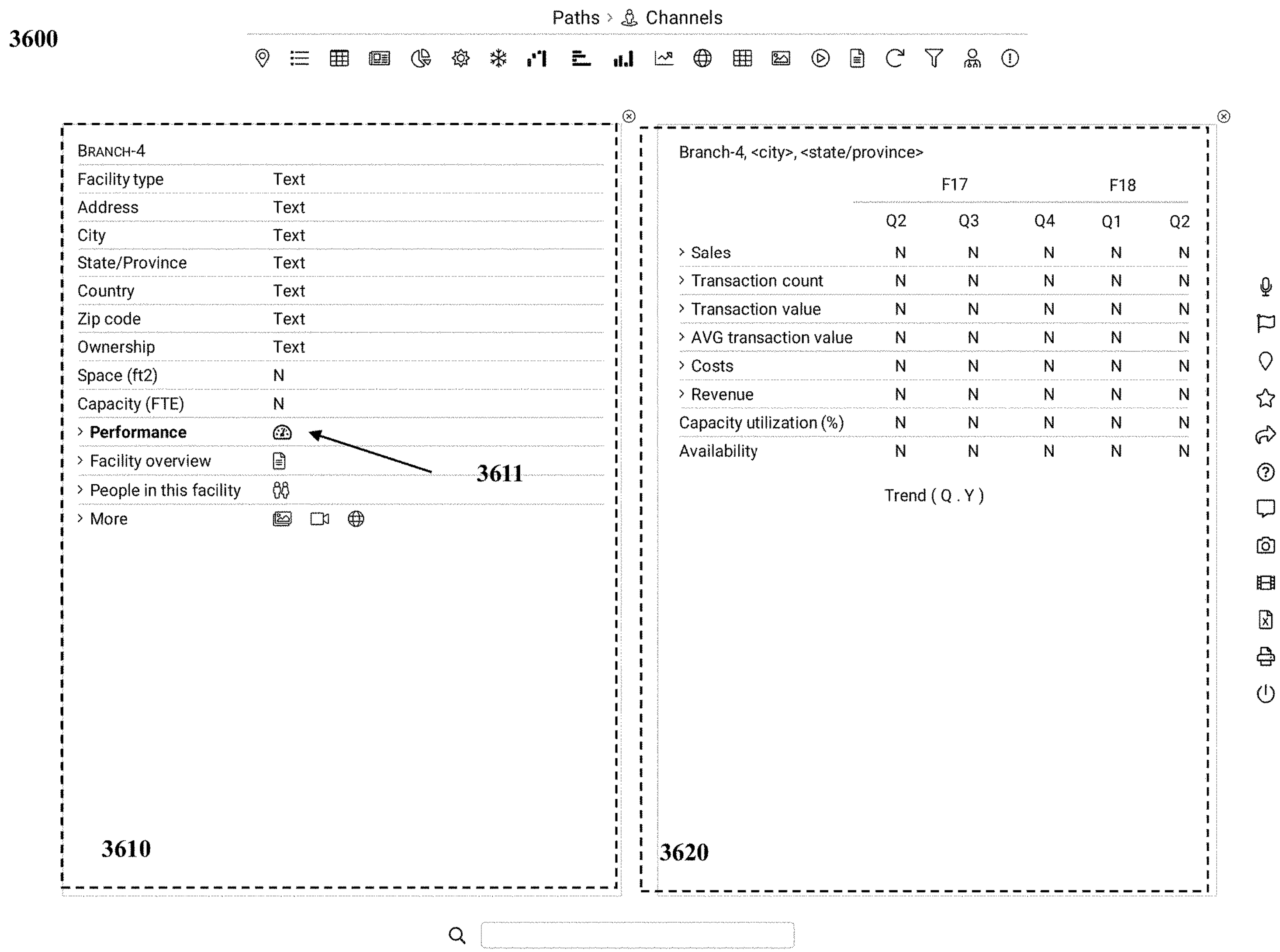
Figure 37:
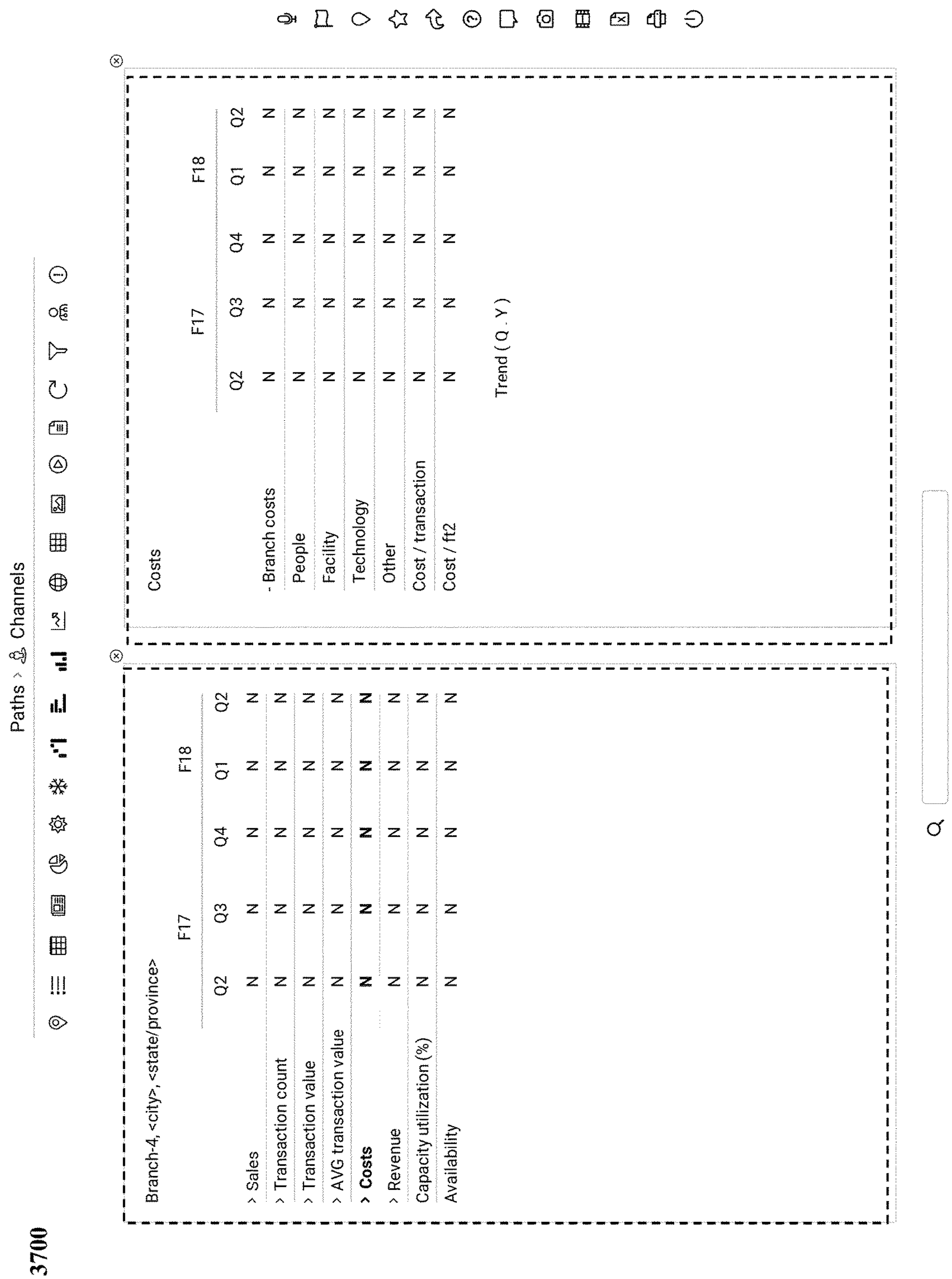
Figure 38:
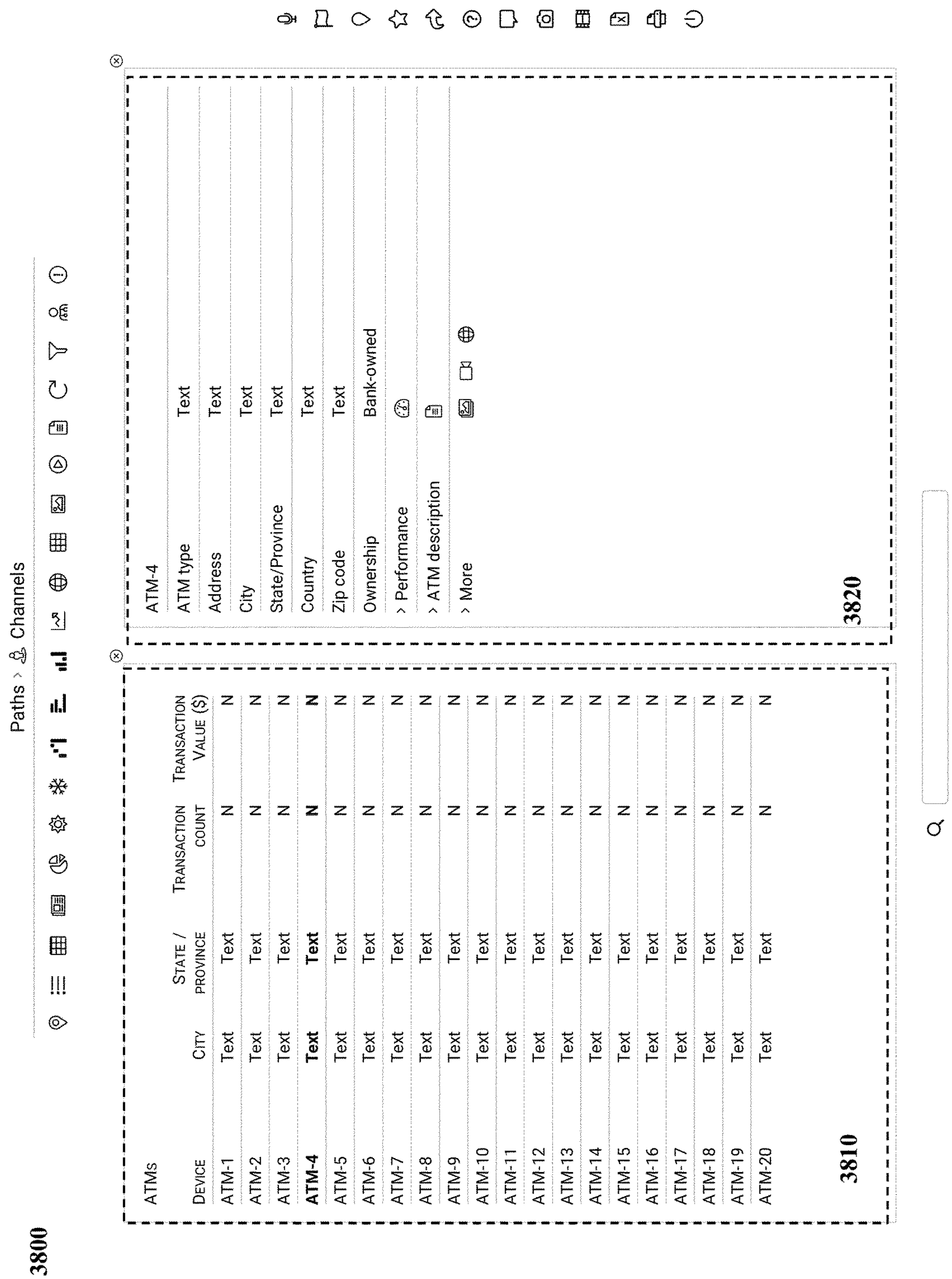
Figure 39:
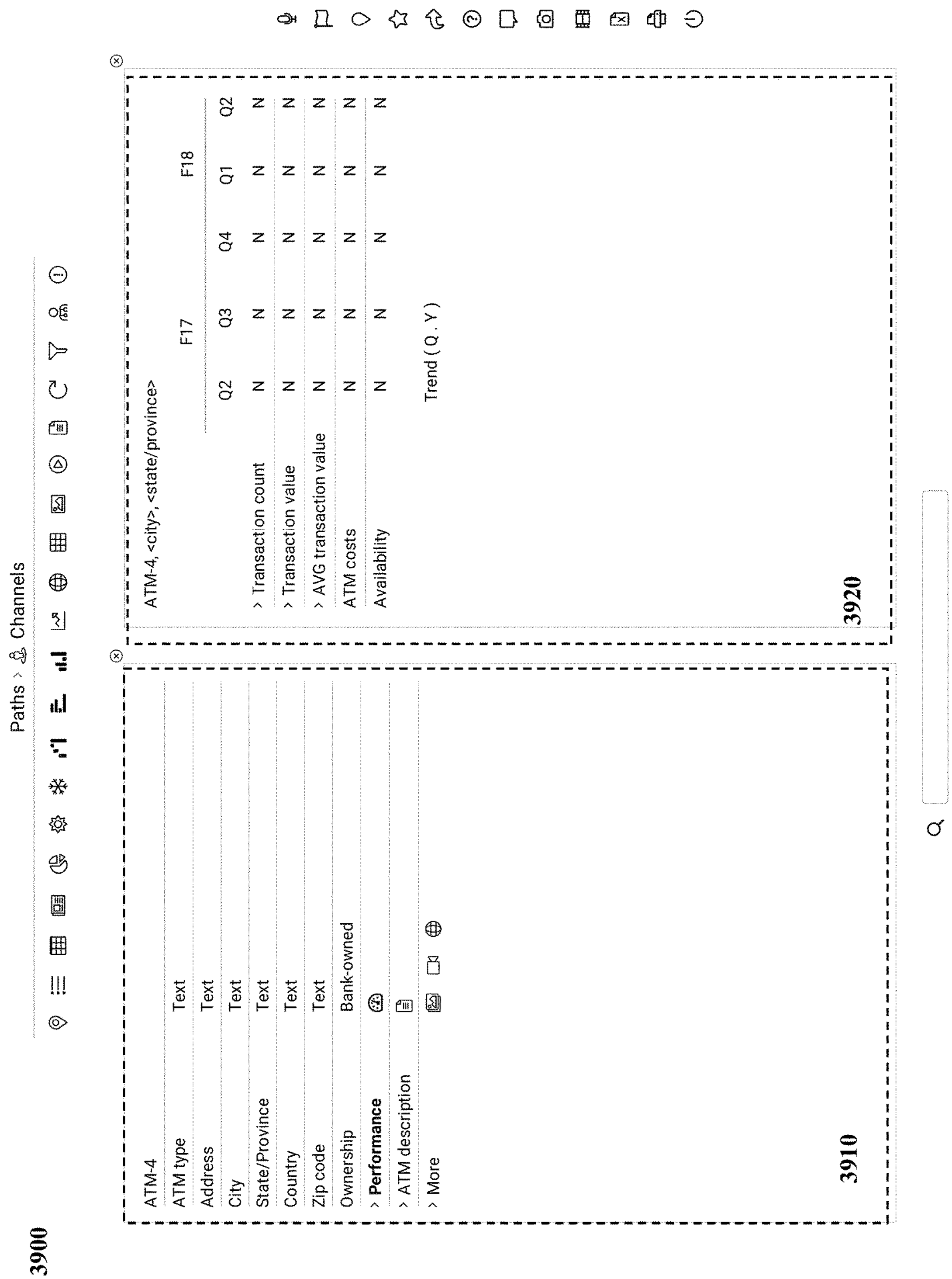
Figure 40:
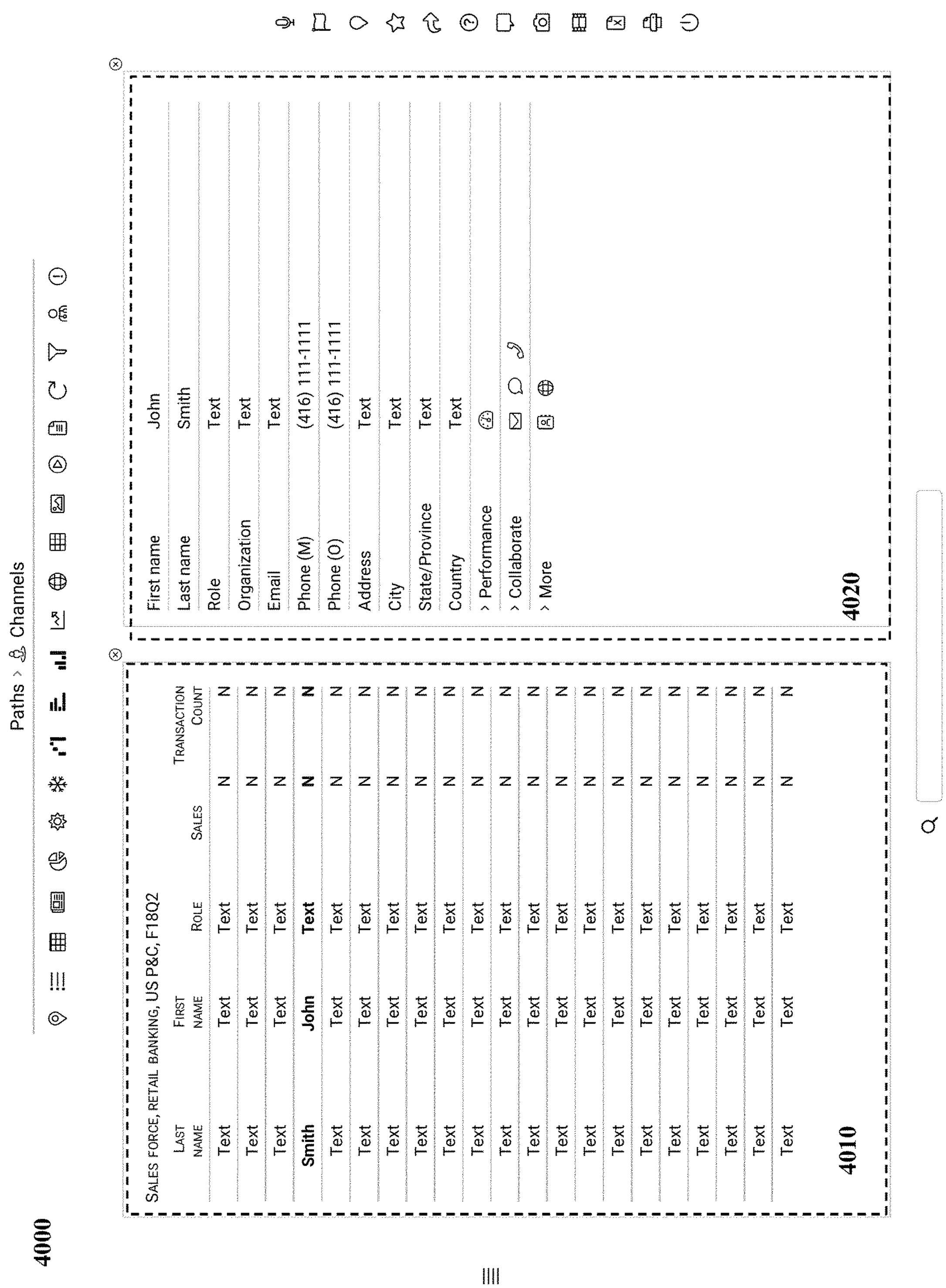
Figure 41:
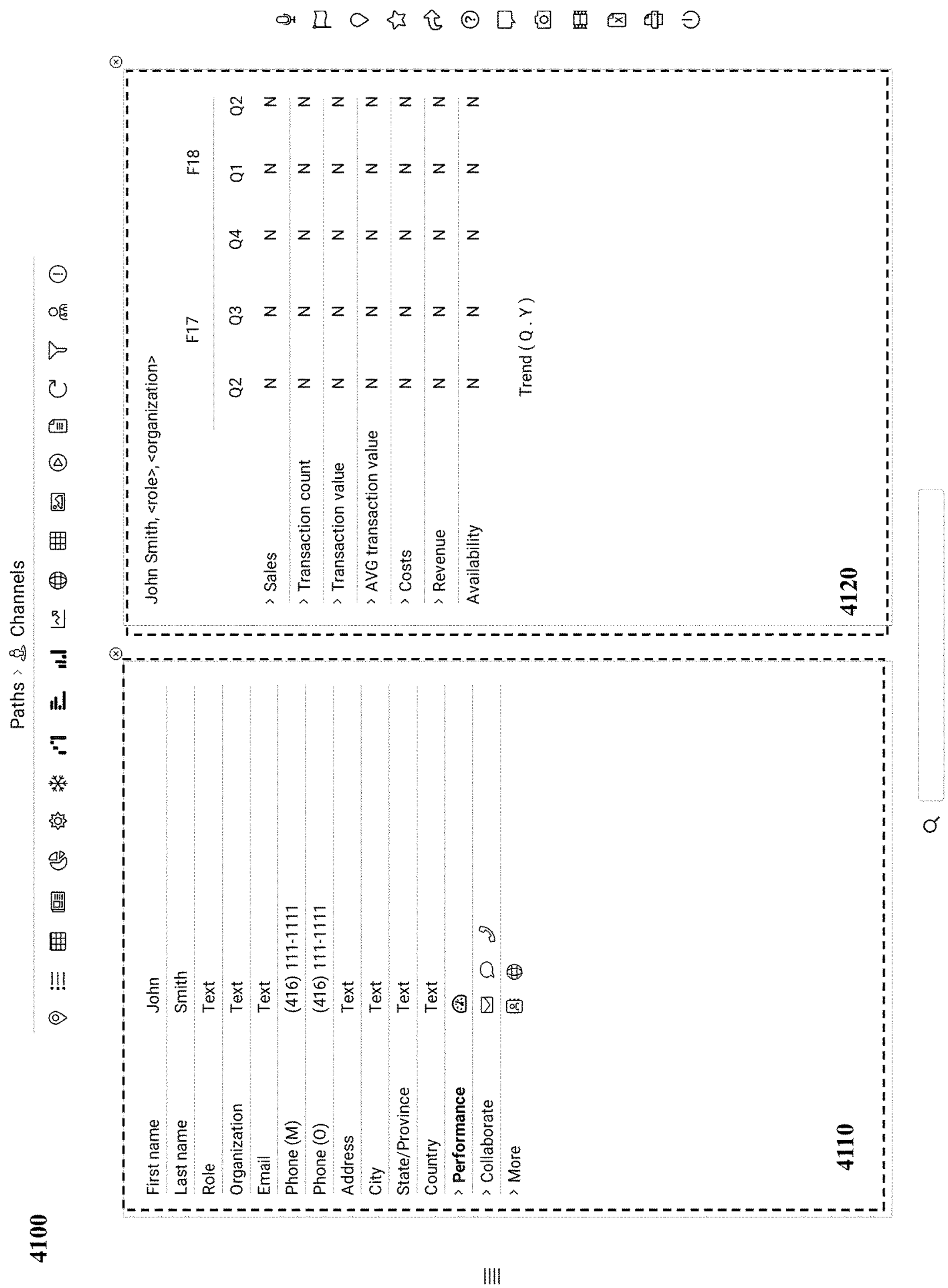

Referring now to FIG. 34, in the GUI 3400, when the user clicks on branch-4 in graphical component 3410, the analytics server dynamically populates graphical component 3420 with data associated with branch-4. Upon receiving an indication that the user has interacted with the icon 3421, the analytics server directs the user to the GUI 3500 where the data displayed in the graphical component 3420 is now dynamically relocated to graphical component 3510 and data corresponding to the icon 3421 (e.g., map) is displayed on the graphical component 3520.

In another example, in the GUI 3600, when the analytics server receives an indication that the user has interacted with icon 3611 (in the graphical component 3610), the analytics server dynamically populates the graphical component 3620. The GUI 3700 illustrates a similar concept where the analytics server dynamically populates the right side based on user interactions on the left side of the screen.

In another example, in the GUI 3800, when the analytics server receives an indication that the user has interacted with "ATM-4" on the graphical component 3810, the analytics server dynamically populates the graphical component 3820 with data corresponding to ATM-4. Furthermore, when the analytics server receives an indication that the user has interacted with "performance" hyperlink displayed on the graphical component 3820, the analytics server directs the user to GUI 3900 and dynamically populates graphical component 3910 with data previously displayed on the graphical component 3820. Furthermore when the analytics server dynamically populates the graphical component 3920 data corresponding to performance of ATM-4.

Users may also use the method described above to drill-down on personnel data. For instance, an administrator operating the administrative computer may drill-down from overall sales force/personnel (graphical components 4010 and 4020) to specific performance of John Smith (graphical components 4110 and 4120).

Figure 42:
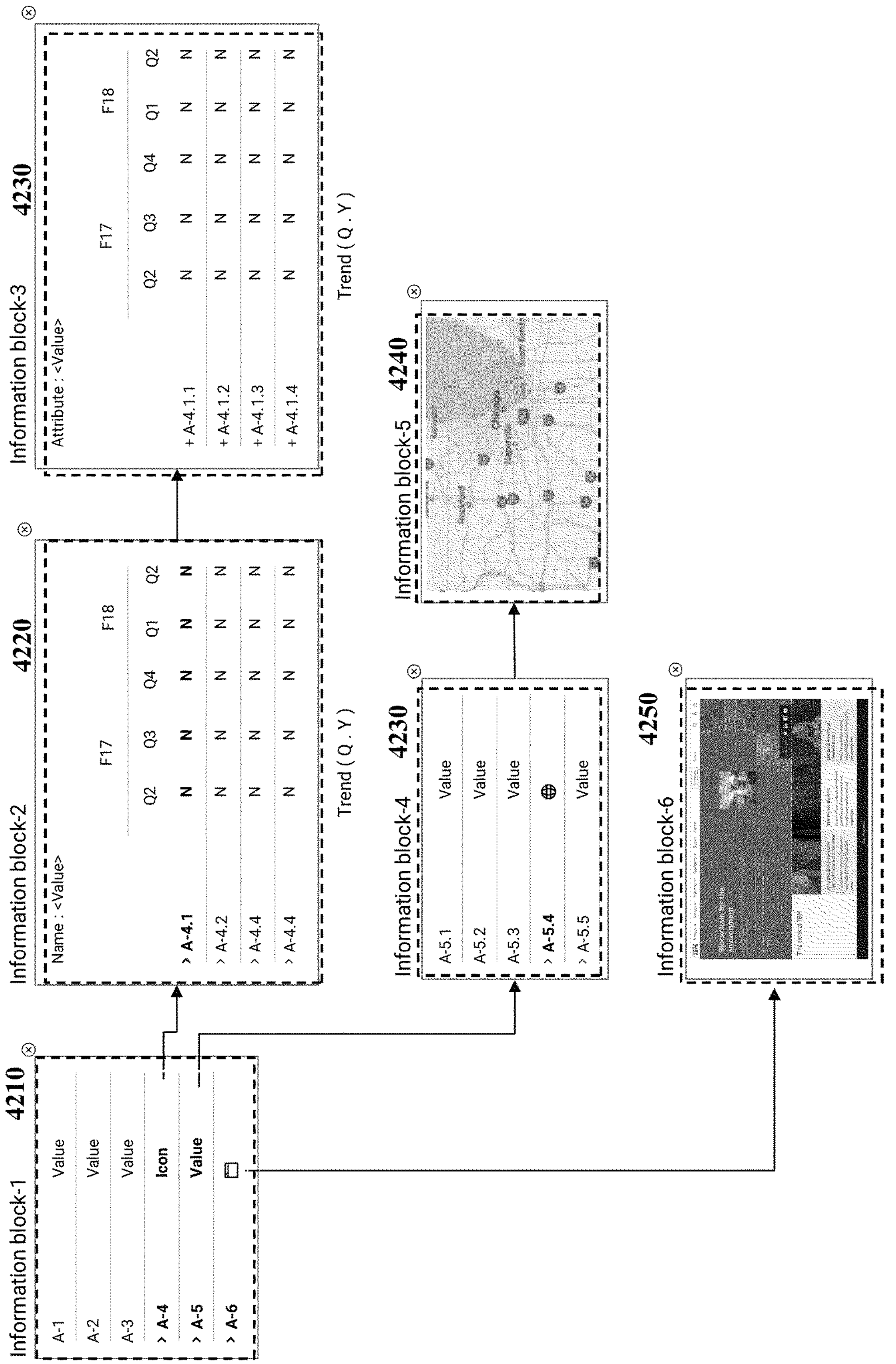

FIG. 42 is a schematic diagram illustrating operational steps of a drill-down, according to an embodiment. FIG. 42 illustrates that a user may efficiently move (e.g., command the analytics server to display information corresponding to) from data block 4210 to data block 4220, 4230, 4230, 4240, and/or 4250. Each data block may contain "N" attributes along with corresponding values (e.g., number, text string, icon, picture, and/or web page address). Each data block may also display the content of a URL (e.g., a web page generated and operated by the analytics server) or a graphical component dynamically populated by the analytics server. For example, data block 4240 displays a geo-map whereas data block 4250 displays a web page containing information on a company. The content of a data block may be displayed using any of the visualization widgets/icon displayed above (e.g., list, table, bar chart, pie chart, diagram, document, or video).

Figure 43:
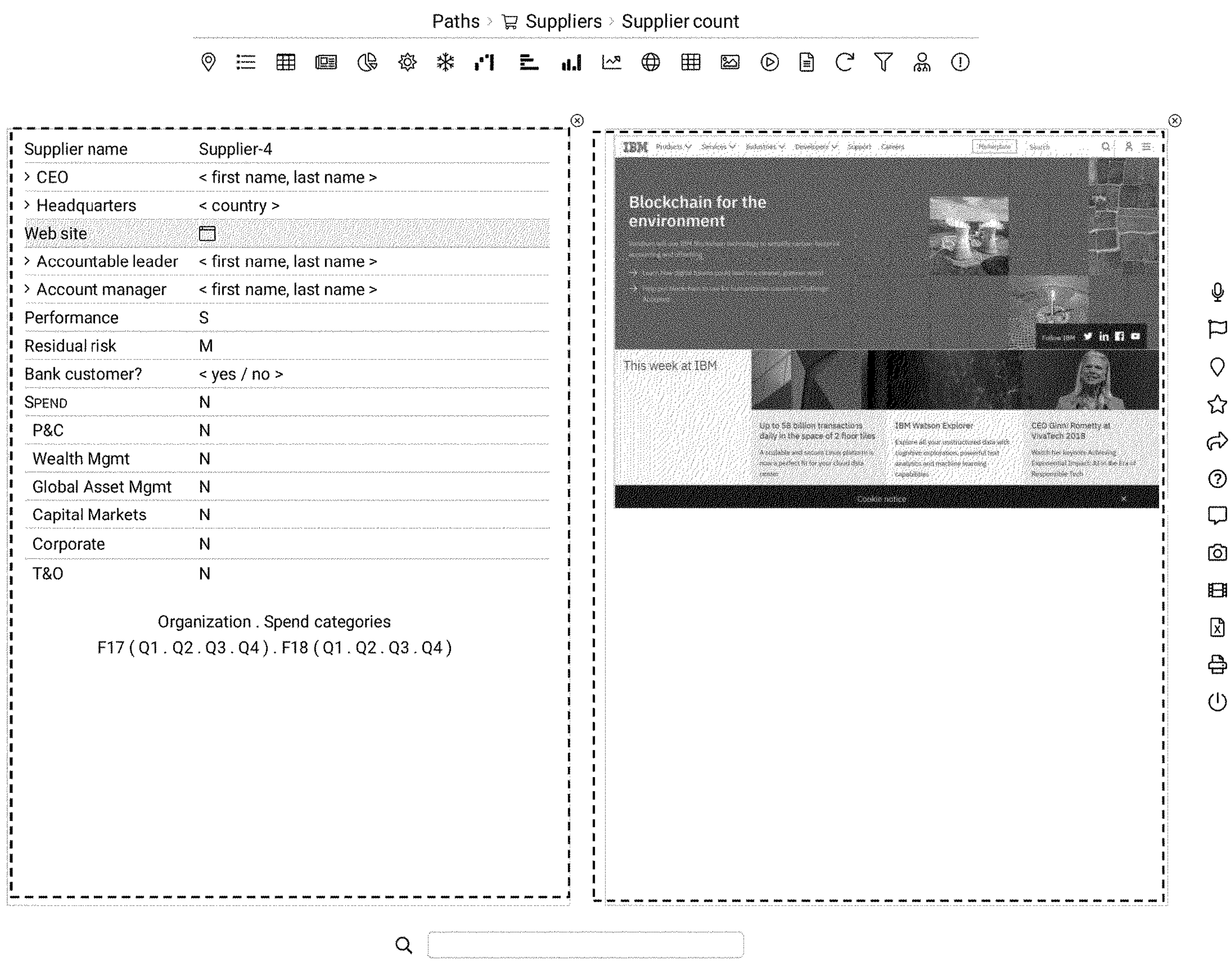
Figure 44:
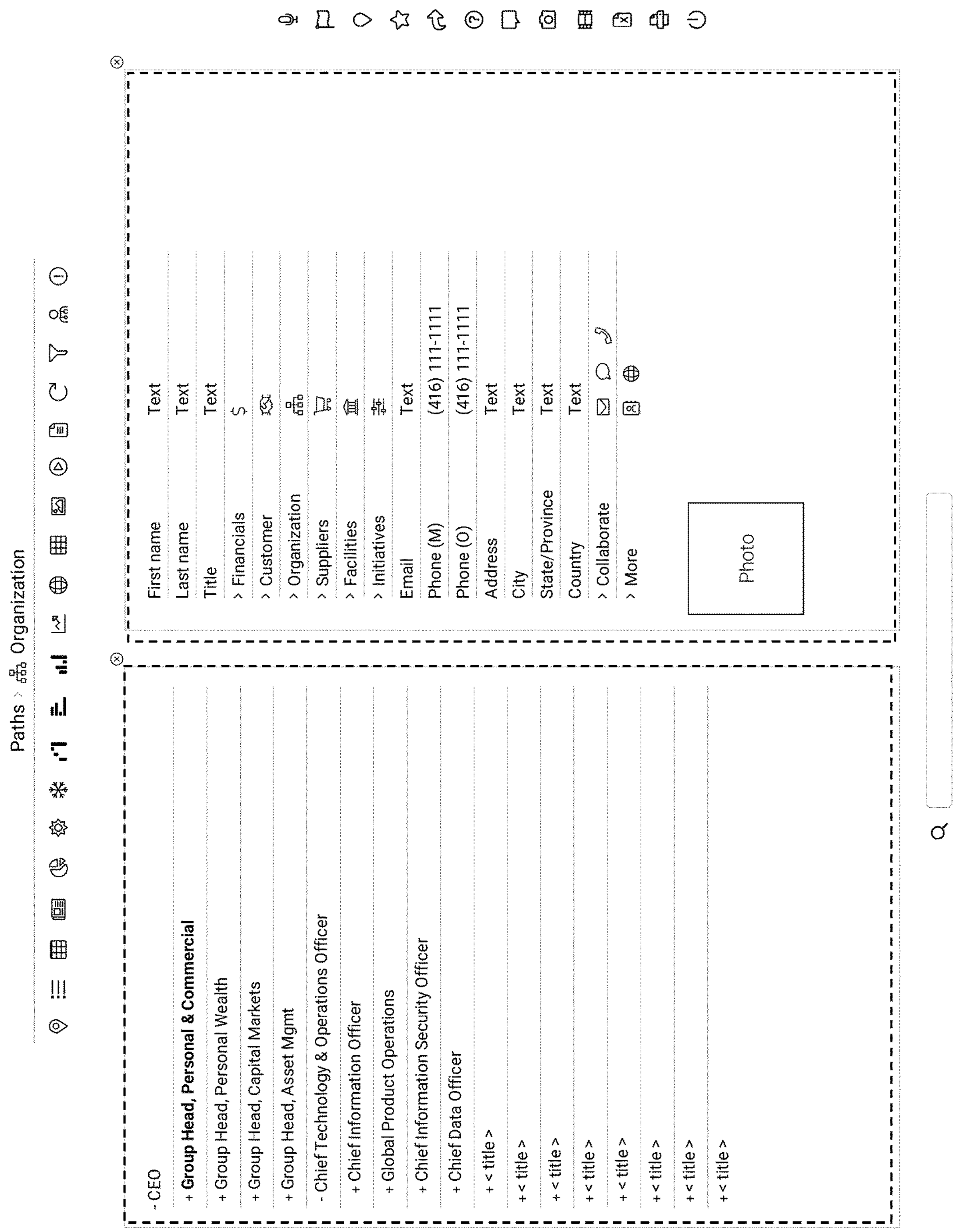
Figure 45:
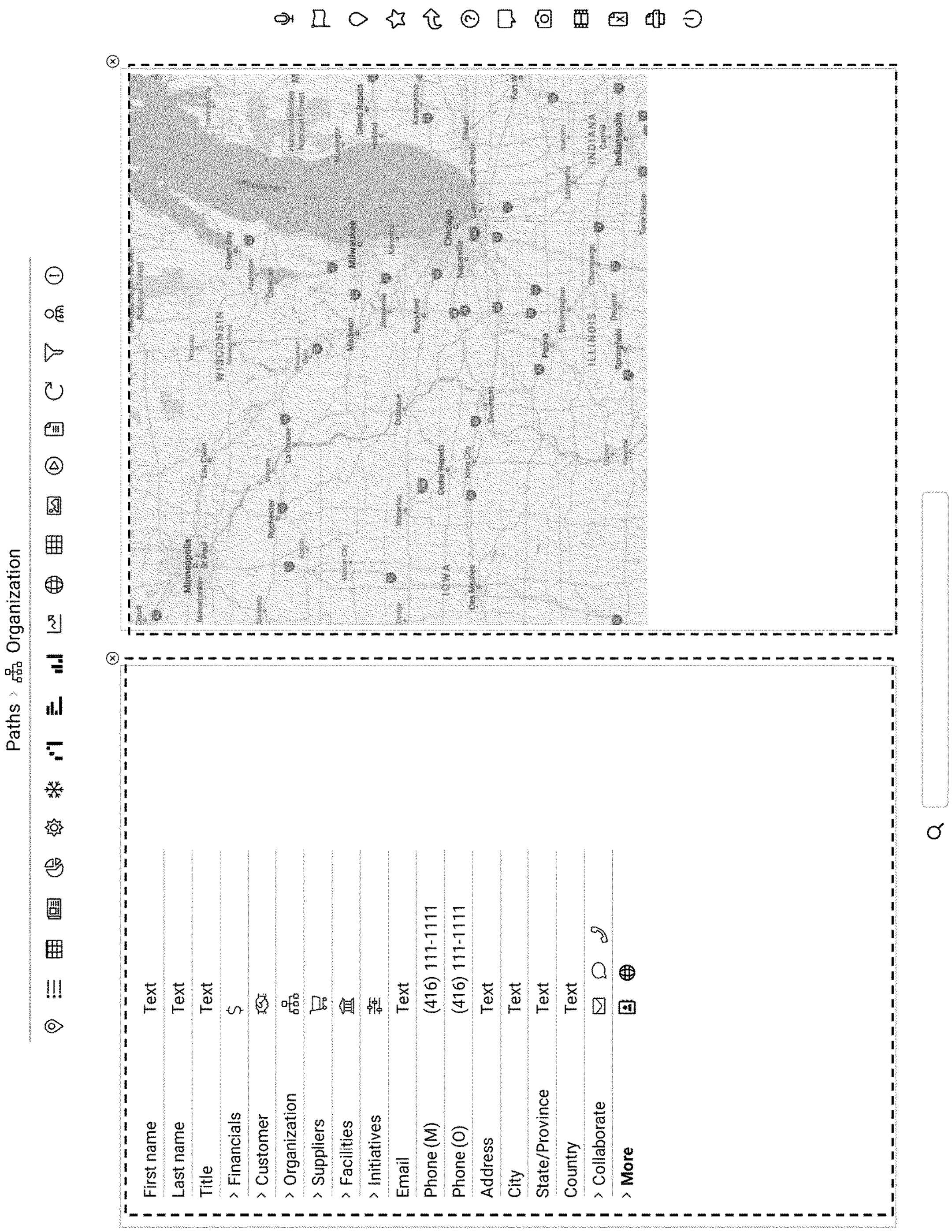

Referring now to FIG. 43, as depicted in GUI 4300, a user may drill-down to identify a supplier website. For instance, the analytics server may dynamically populate the right side of the screen with a supplier website when the user drills-down to the website level. Referring now to FIGS. 44-45, in another example, as depicted in GUIs 4400 and 4500, a user may drill-down to identify and locate an employee based on the employee's office location on a geo-map.

Figure 46:
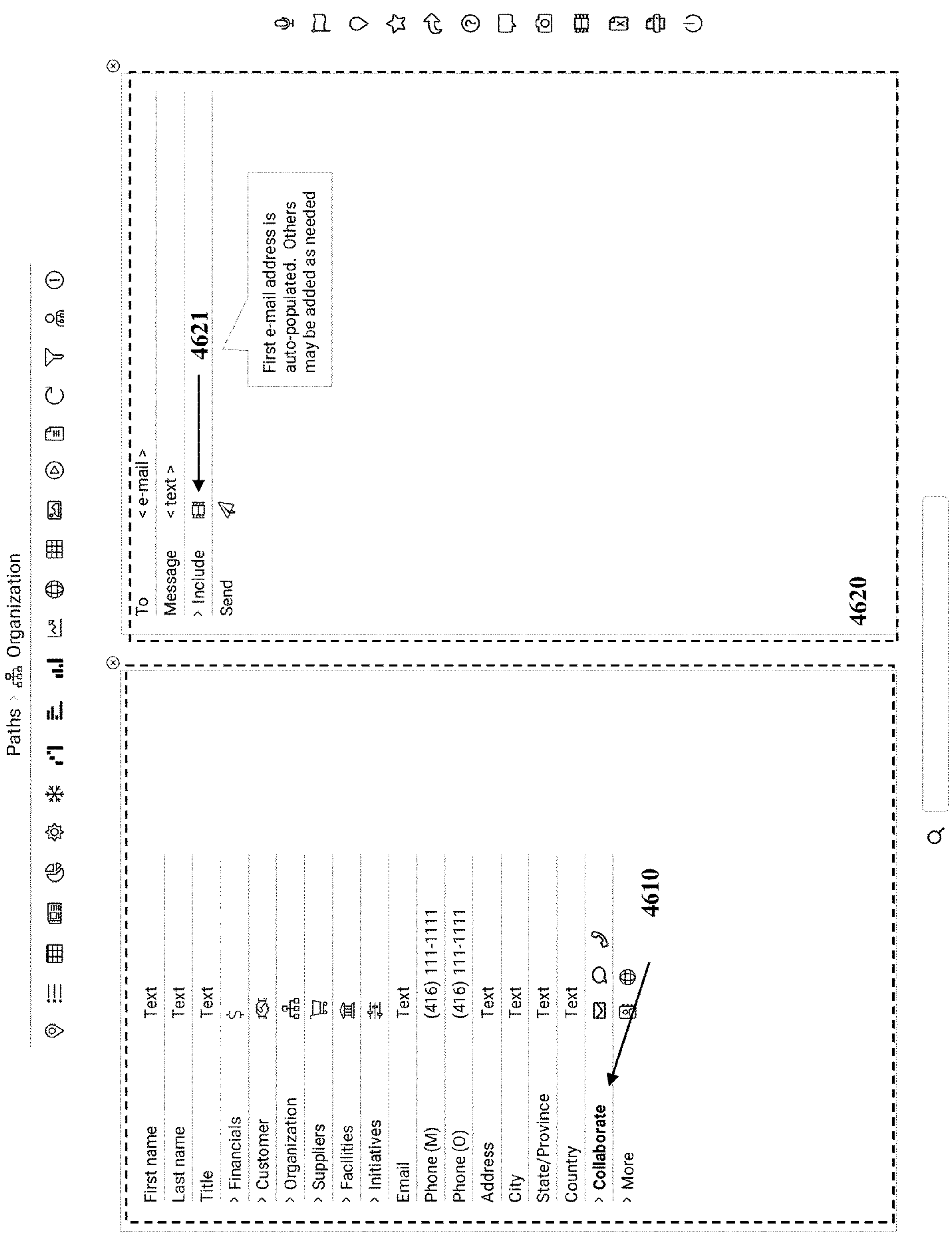
Figure 47:
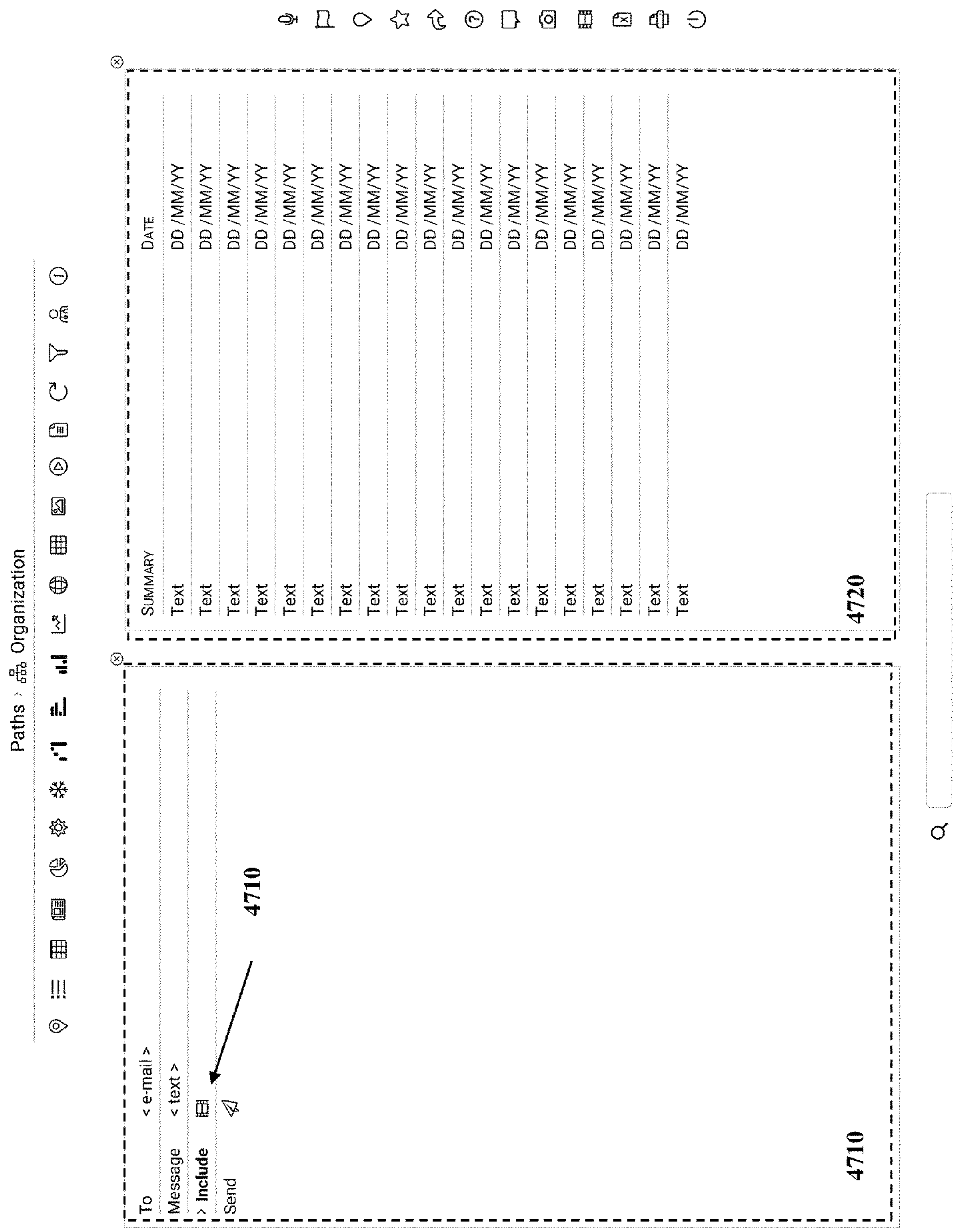

Referring now to FIGS. 46-47, in some embodiments, the drill-down feature may be used to efficiently collaborate with other employees or other users within an organization. For instance, as depicted in GUI 4600, a user may identify a second user using the methods described above (drilling-down to identify the second user). The analytics server may then display icon 4610 indicating that the second user can be reached via telephone, email, and a chat/messaging application. When the analytics server receives an indication that the user has interacted with icon 4610, the analytics server may dynamically populate the graphical component 4620 with multiple input components. For instance, the input components displayed in the graphical component 4620 enable the user to generate and transmit an electronic message to the second user.

When the analytics server identifies that the user has interacted with icon 4621, the analytics server may direct the user to GUI 4700 where the electronic content displayed on the graphical component 4620 is relocated to the graphical component 4710. The analytics server may also dynamically populate the graphical component 4720 having multiple input fields where the user can upload/share a movielike progression of the drill-down with the second user.

The drilling-down methods are not limited to the embodiments described herein. For instance, some embodiments described herein described the drill-down technique as having two screen portions being dynamically updated based on user interactions. However, in other embodiments the analytics server may create three or more portions where each portion is dynamically populated. Furthermore, instead of right side and left side example described above, the analytics server may use any other configuration (e.g., top half and bottom half or top ⅓ middle ⅓ and bottom ⅓). Moreover, even though the progression of drilling-down techniques are described as the analytics server displaying multiple graphical user interfaces, in some embodiments the analytics server may dynamically relocate data within a graphical component within the same graphical user interface. For instance, when a user drills-down on a component displayed on the right side of the screen, the analytics server may move the right side to the left side and dynamically populate the right side with new data.

Figure 59A:
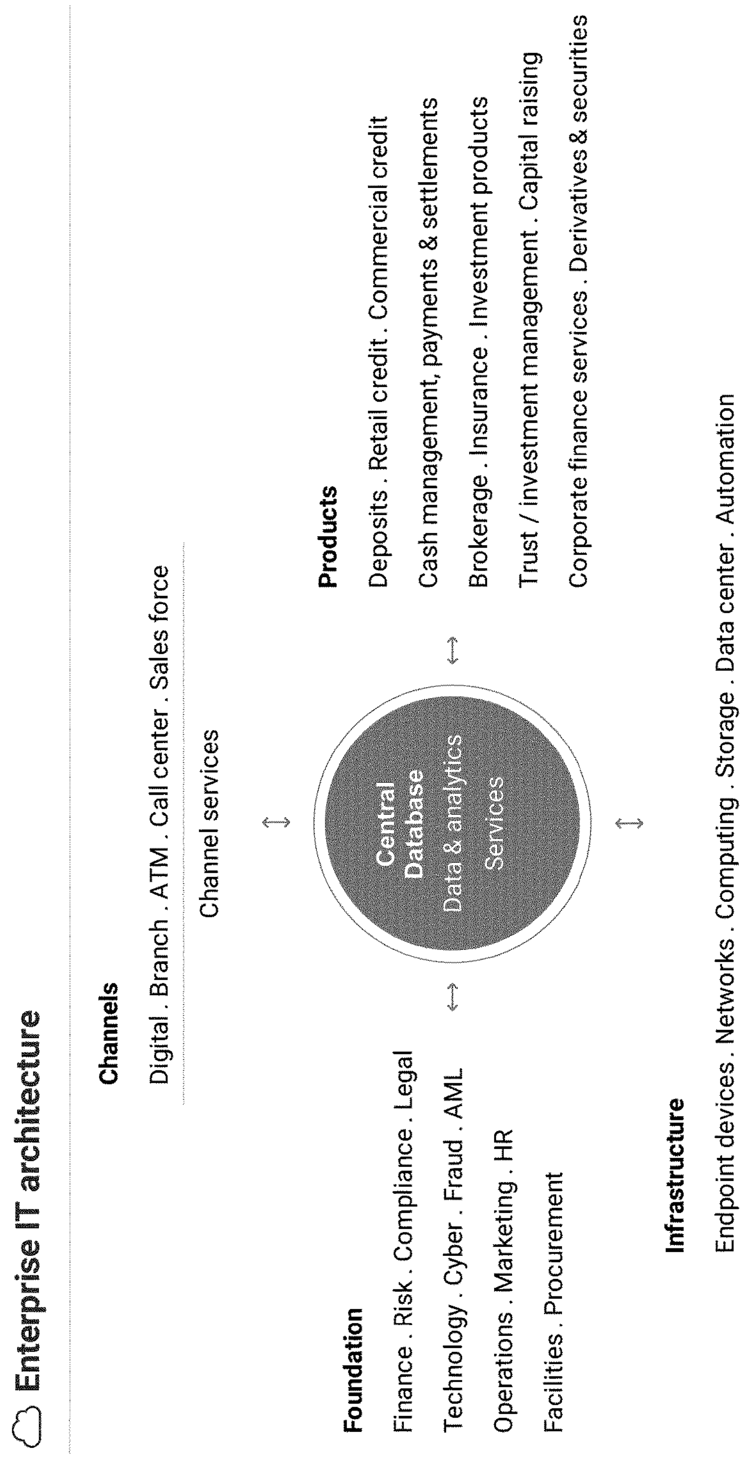
FIGS. 59A-E illustrate examples of freeform diagrams displayed by the intelligent data analysis system, according to an embodiment.
Figure 59B:
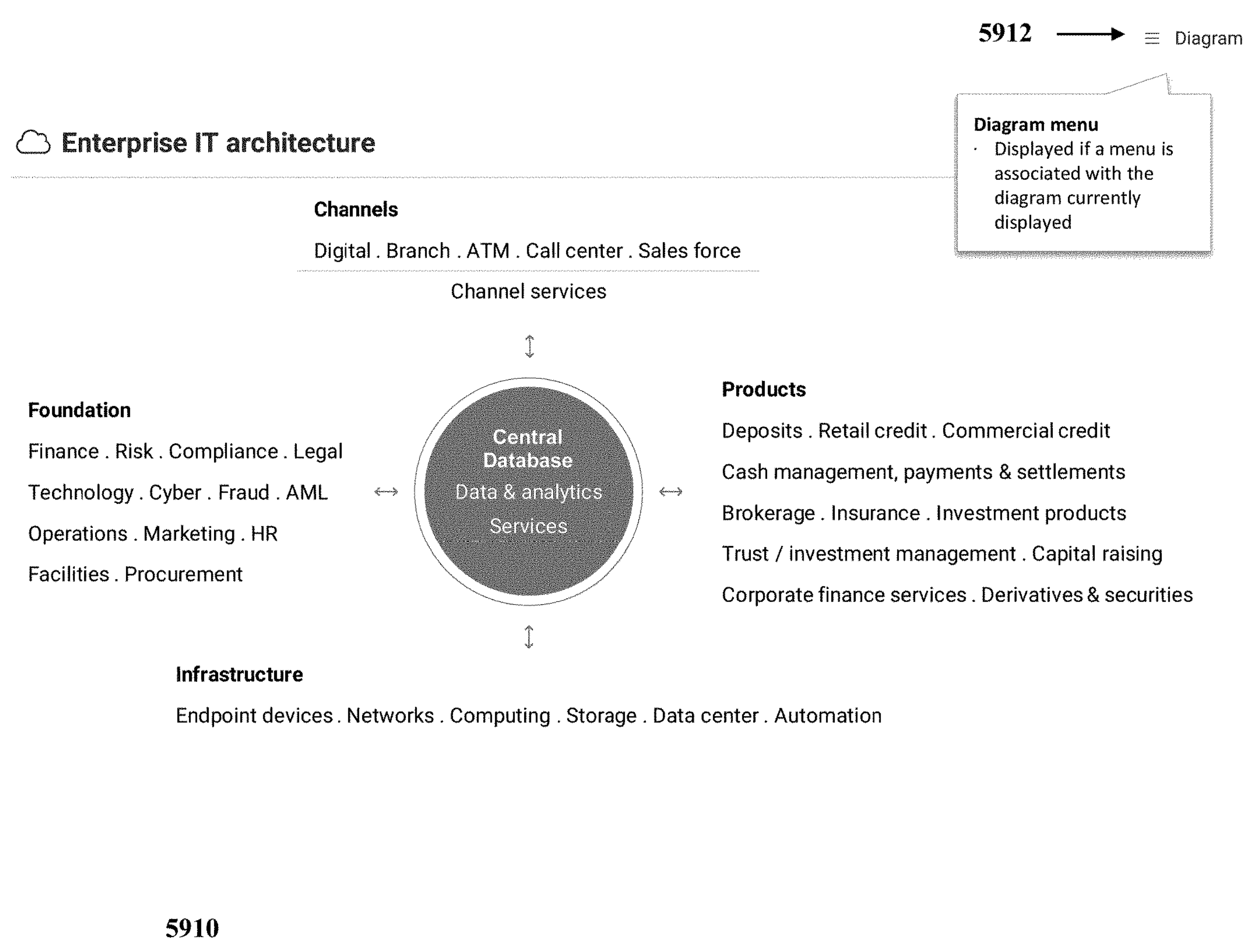
Figure 59C:
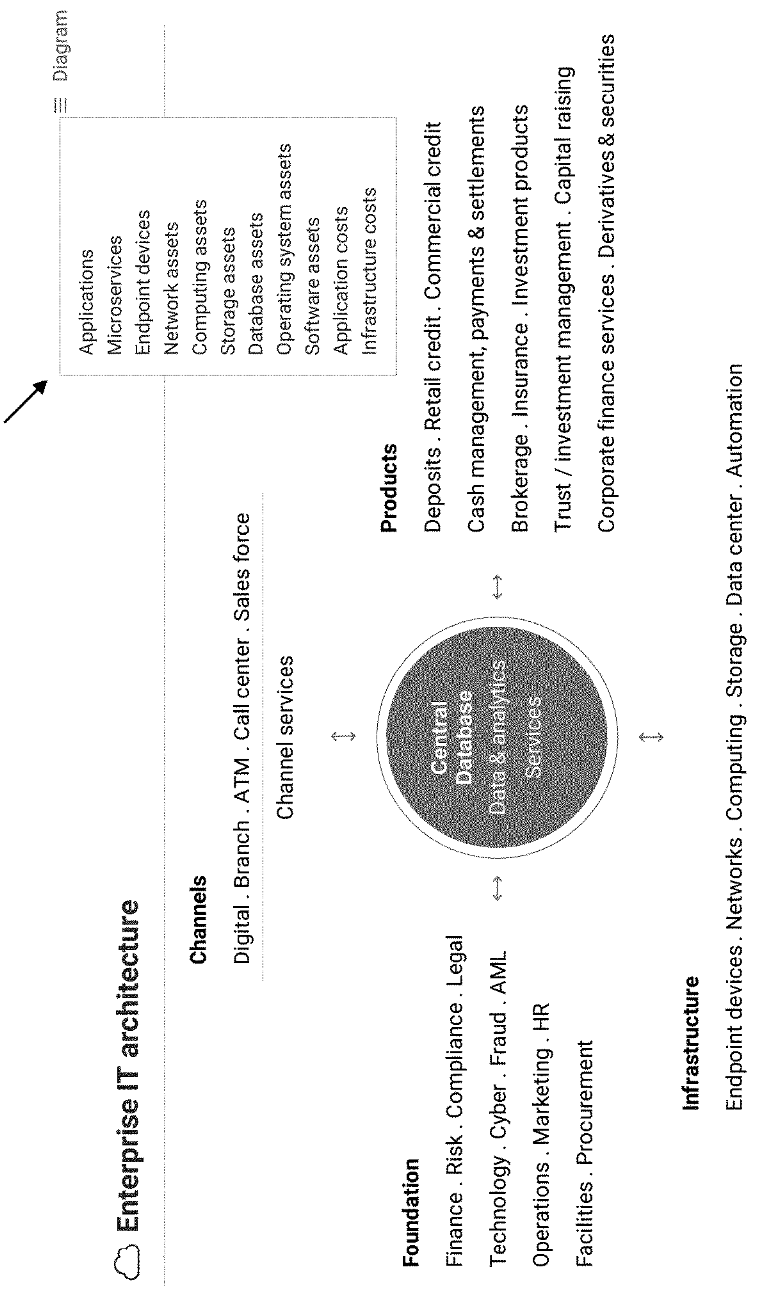
Figure 59D:
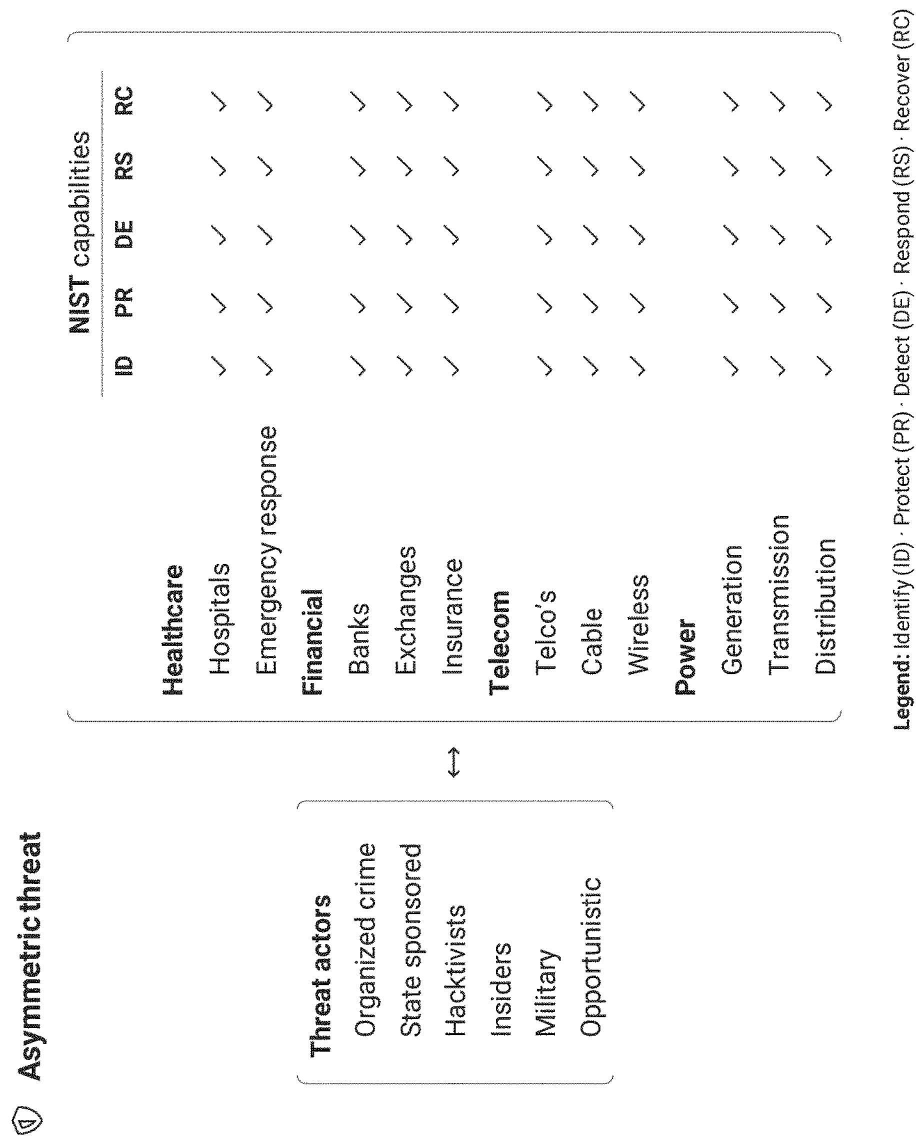
Figure 59E:
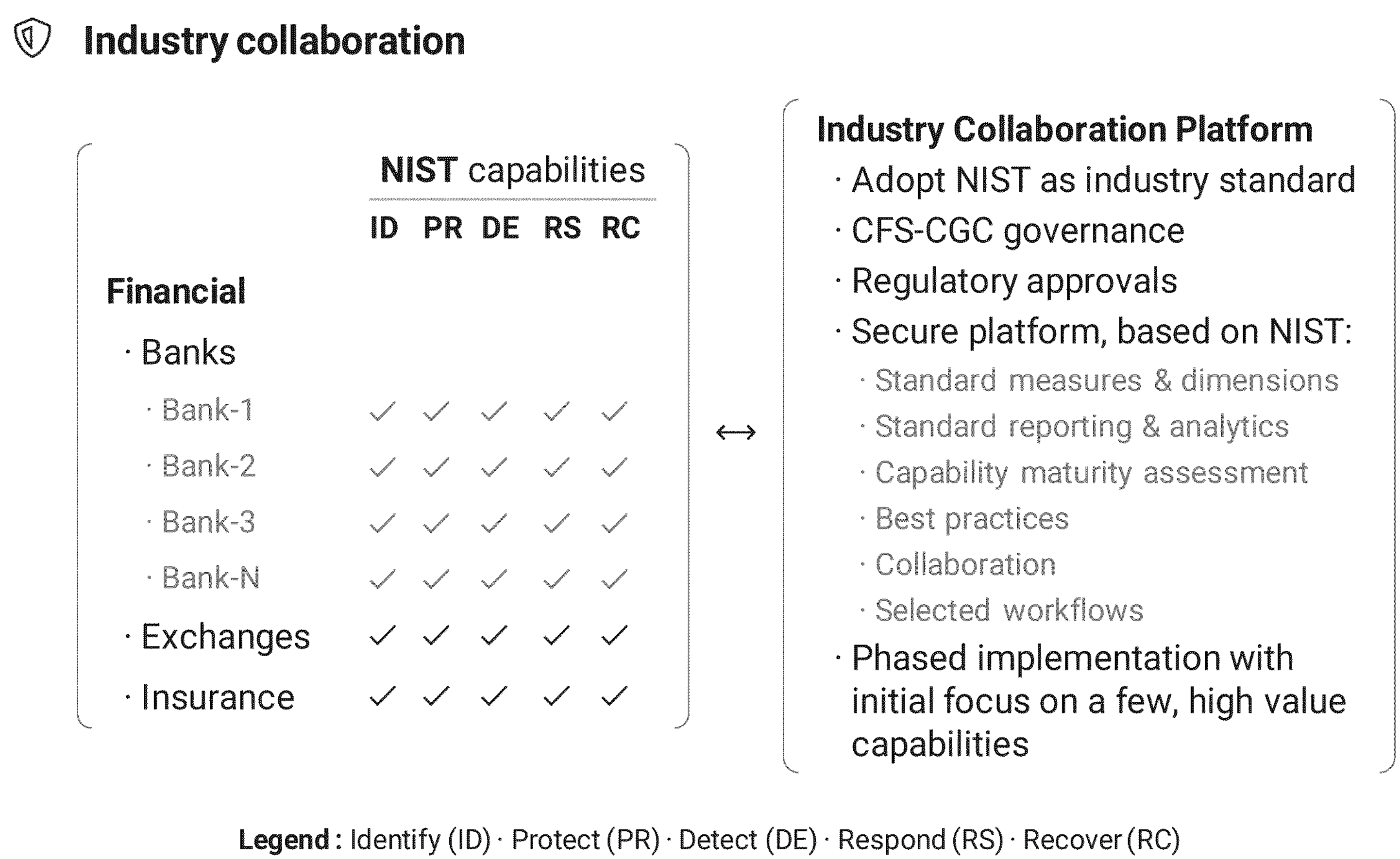

In some configurations, the analytics server may also generate and display free-form diagrams. The analytics server may display the free-form diagrams in addition to or as an alternative to the drill-down functionality described herein. For example, a user/administrator may desire to view a free-form diagram instead of drilling down data associated with different domains and other tables. Referring now to FIGS. 59A-E, different examples of free-form diagrams are illustrated. For instance, GUI 5900 (FIG. 59A) illustrates data stored under the technology and architecture domain. When the analytics server displays the GUI 5900, the user can select to view a drill-down option or a free-form diagram. For instance, a user may interact with the interactive component 5912 illustrated on GUI 5910 (FIG. 59B). As a result, the analytics server may display GUI 5920 including the graphical component 5922 that displays various categories of data available for display. For instance, the user may interact with "infrastructures" and the server will display data within the technology and architecture that is associated with infrastructure.

A free-form diagram may be any diagram or image that is included in the user interfaces described herein. Free-form diagrams may not be generated using widgets described above (e.g., table, chart, or diagram widget). This plane free-form diagrams is useful because some concepts require more complex images and diagrams for explanation purposes. The analytics server may create free-form diagrams with one of many software applications such as POWERPOINT, VISIO, and other visualization software. The analytics server may also generate a scalable vector graphics file using the visual file where the SVG can be repurposed and easily displayed in other graphical user interfaces described herein.

Upon generating the free-form diagrams, the analytics server may generate a menu associated with the free-form diagrams. For example, the analytics server may create an SVG based on a photo of a data center to create a free-form diagram. The analytics server may then create a menu to access information in the data grid (e.g., data center space, data center IT assets, data center network description). The analytics server may use the menu path configuration file to create this menu and may further link the free-form diagram to any other relevant content in the knowledge grid.

Referring now to GUI 5930 and GUI 5940, the analytics server may illustrate the contents of selected domains. For example the facilities domains may include information regarding concepts (and branch where the user can drill down or branch), measures (number of facilities and amount of space), dimensions (facility type, branch, office space, and data center), and unstructured data (photo and video).

Figure 48:
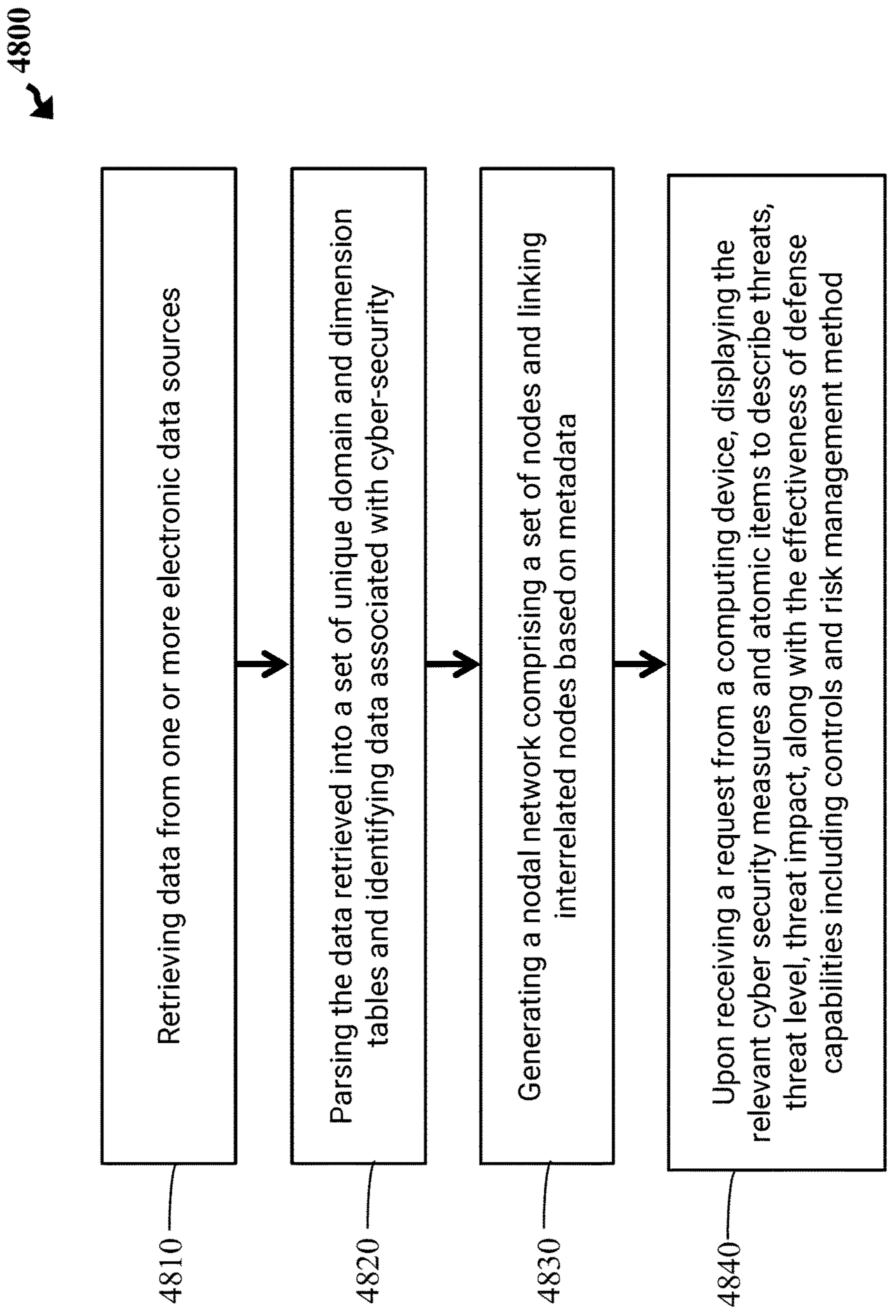
FIG. 48 illustrates a flow diagram of a process executed by an intelligent data analysis system, according to an embodiment.

Referring now to FIG. 48, an embodiment of the methods, systems, and graphical user interfaces described herein is illustrated. More specifically, method 4800 is a flow diagram of a process executed by the intelligent data analysis system, in an embodiment related to cybersecurity data. The method 4800 includes steps 4810-4840. However, other embodiments may include additional or alternative execution steps, or may omit one or more steps altogether. The method 4800 is described as being executed by a server, similar to the analytics server described in FIG. 1. However, in some embodiments, steps may be executed by any number of computing devices operating in the distributed computing system described in FIG. 1. For instance, part or all the steps described in FIG. 48 may be locally performed by one or more user computing devices or an administrative computing device.

Even though some aspects of the method 4800 are described in the context of collecting cybersecurity data associated with banking computing systems, it is expressly understood that method 4800 is applicable to collecting, structuring, analyzing, and visualizing any data.

At step 4810, the analytics server may retrieve data from one or more electronic data sources. As described above, the analytics server may continuously/periodically scan various electronic data sources and electronic data repositories to collect data. The analytics server may scan and/or crawl the electronic data sources to identify all files stored onto the electronic data sources and/or data repositories accessible to the electronic data sources. For instance, the analytics server may transmit an instruction to one or more ATMS where the instruction is configured to cause local databases of the ATMS to transmit all transaction data to the analytics server.

In another example, the analytics server may transmit an instruction to a database associated with a customer-facing website where the instruction is configured to cause the database to transmit all cybersecurity-related data associated with the website, such as all malware detected, a list/log of all failed login attempts, and the like. In another example, the analytic server may crawl one or more employee computers to identify all files accessible/stored onto the employee computers and/or data repositories accessible to such computers (e.g., third party database or a cloud storage system accessible to the employee computers).

In addition to the various examples of data collection described in FIG. 2, the analytics server may also generate a web application or a user-facing interface (e.g., website) allowing users to input data on an ongoing basis. For instance, a user operating a computer (e.g., administrative computer described in FIG. 1) may execute a web application generated by the analytics server to input data (e.g., upload files). The web application may include multiple graphical input components configured to receive data. For instance, the web application may have text input components, radio buttons, drop-down menus, and other input components that allow the user to upload and describe attributes of the data inputted. Upon completion of this task, the analytic server may receive the data and any attributes (if any inputted by the user).

The inputted data may correspond to a wide range of organization's data. For instance, the analytics server may receive data from a branch manager where the branch manager uploads all transactions for a predetermined amount of time (e.g., a day or a week) or a supplier/vendor inputting data associated with services rendered to an organization. For instance, a software vendor may input data associated with different software provided to an organization or a log of malware attacks detected.

The data received (via one or more users directly inputting the data or via the analytic server automatically collecting the data) may also correspond to different categories of data. For instance, data collected may range from project management data to account receivable data to cybersecurity data and other software diagnostics.

At step 4820, the analytics server may parse the collected data into a set of unique domain data tables, each domain data table corresponding to a predetermined domain having a first criterion, wherein the analytics server identifies data associated with cybersecurity activity and generates a unique data table for the cybersecurity domain.

As described above on the analytics server may parse the data and generate different unique data tables (also referred herein as data structures). Each unique data table may correspond to a domain (as described in FIGS. 2-3). Each domain may refer to a category of data. Therefore, each domain refers to a predetermined criterion/attribute of data (e.g., ATM, sales, risk). The analytics server may use a variety of techniques to identify a domain associated with data. For instance, when a user uploads a file, the analytics server may parse the file and identify a domain associated with the file based on the inputted attributes by the user when uploading the file. For instance, when uploading a file, a user may designate the file as associated with cybersecurity. Therefore, the analytics server may generate a unique data table for cybersecurity domain and may assign the file to the cybersecurity domain data table. The analytics server may use different tagging and/or indexing techniques to assign a file to a data structure.

In another example, the analytics server may identify a domain associated with an uploaded file based on the uploaded file's context data. As described above, when collecting data, the analytics server may also collect context data associated with the collected files. The context data may include historical data associated with files and other data collected. Examples of context data may include file title, mime type, file permissions, comments, date/time of creation, and the like. The metadata may also include a unique identifier (e.g., user ID, IP address, MAC address and the like) of the user and/or the computing device who created/revised/and or accessed the file. Using the context data, the analytics server may identify a domain associated with the collected data.

In a non-limiting example, the analytics server collects a file by crawling databases associated with an organization. The analytics server identifies that the file is associated with cybersecurity domain because the file was created by an employee who is associated with the information technology and/or technical support department. In another example, the analytics server determines that a file belongs to cybersecurity domain because the file title include the word cybersecurity.

In another example, the analytics server may transmit the collected data to a subject team of experts (e.g., integration team) where the experts can identify a domain associated with each file or other data collected. For instance, when the analytics server collects a file, the analytics server may transmit the file to a subject matter expert team by displaying the file on a computing device operated by a subject matter expert. Upon reviewing the file, the subject matter expert may use an application provided/generated by the analytics server to input different attributes associated with the file. For instance, the subject matter expert may designate a file as belonging to the cybersecurity domain.

Once the collected data is identified as being associated with a (or multiple) domains, the analytics server may generate a unique data table where data is organized based on each respective domain. The analytics server may generate one unique domain data table for each domain where the unique domain data table includes all collected data associated with a domain. Therefore, the analytics server may generate as many unique data tables as domains available. In some embodiments, all data associated with a domain may be tagged accordingly using various tagging/indexing techniques.

At step 4830, the analytics server may parse each unique domain data table into a set of unique dimension tables, each dimension data table corresponding to a predetermined dimension having a second criterion. As described above, the analytics server may further disaggregate each unique domain data table into multiple unique dimension data tables. For instance, at step 4820, the analytics server parses and disaggregates the collected data and generates multiple unique domain data tables.

At step 4830, the analytics server may further disaggregate each unique domain data table into multiple unique dimension data tables. The analytics server may identify a dimension associated with the collected data within a unique domain data table based on a predetermined set of dimensions. As described above, each dimension may be defined as having a particular criterion and/or category of data. Therefore, data identified as being associated with a particular dimension will share at least one criterion corresponding to the dimension. A list of different dimensions are provided in FIG. 3A (data structure table 330).

Figure 50:
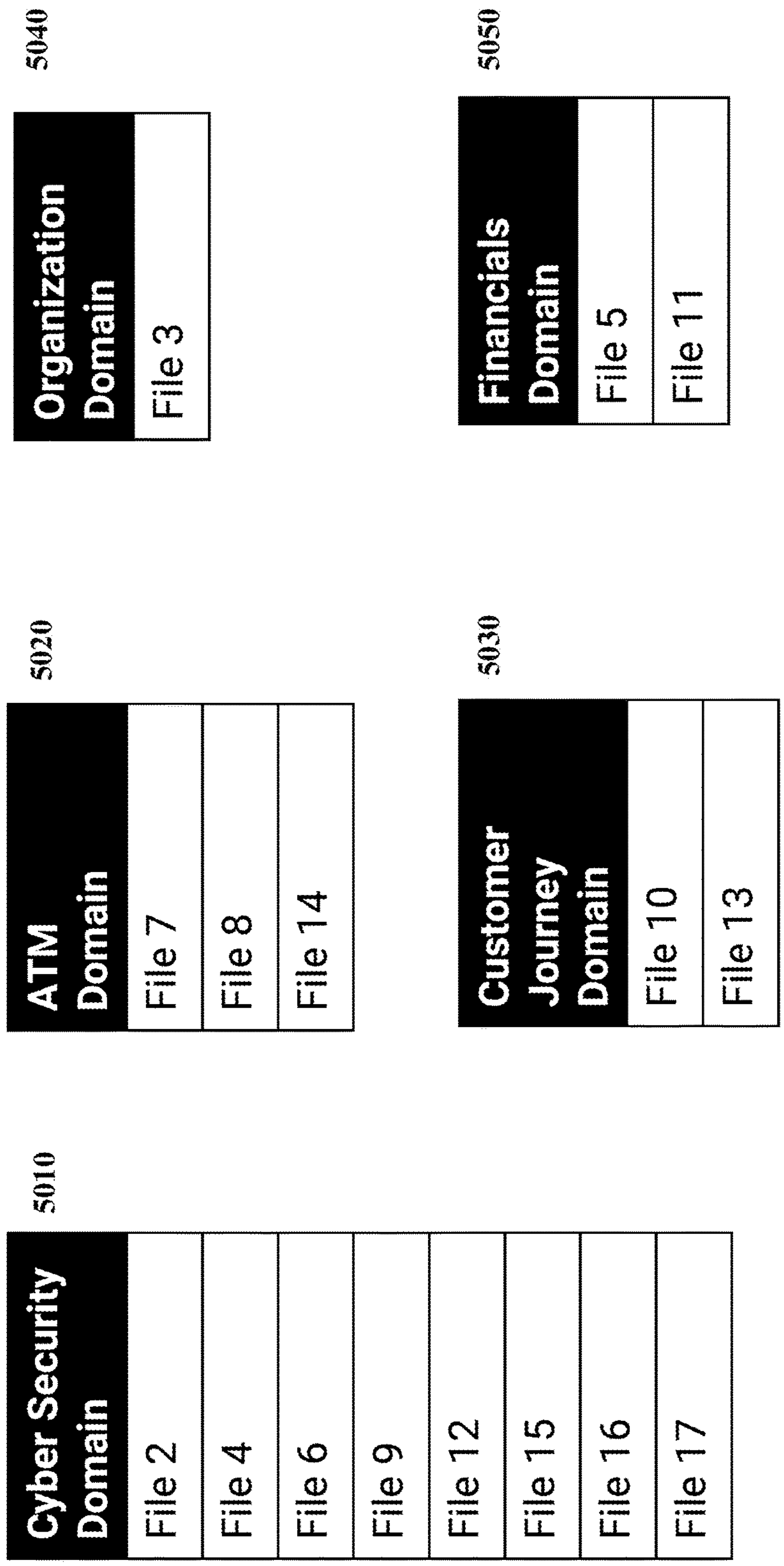
Figure 51:
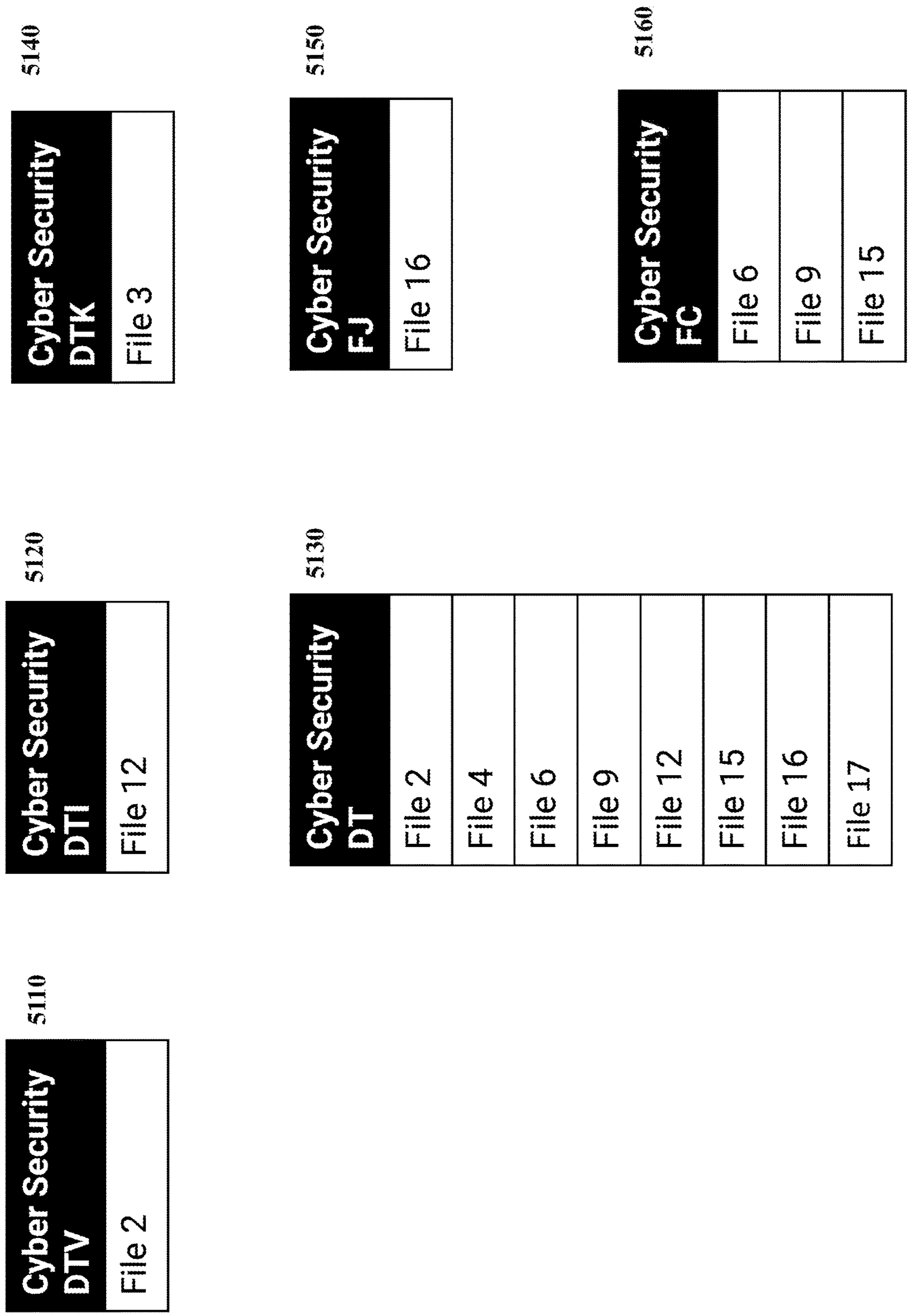

Referring now to FIGS. 49-51, uniquely generated data tables and data structures are illustrated, in accordance with an embodiment. Referring now to FIG. 49, chart 4900 represents a portion of the collected data. The chart 4900 includes 17 files that are collected via different methods described herein. For instance, a user uploaded file 4. However, file 11 was collected because of the analytics server scanning employee computers. Chart 4900 also describes the content of each file. For instance, file 10 contains information regarding customer satisfaction surveys and file 15 contains data regarding a recent data breach. As described above, the file content and/or categories may be uploaded by the user or may be automatically identified by the analytics server. For clarity and brevity purposes, the chart 4900 only illustrates 17 files collected. However, depending upon the size of an organization, the analytics server may periodically collect thousands or hundreds of thousands of files and/or other data.

Referring now to FIG. 50, different unique domain data tables are illustrated, in accordance with an embodiment. As depicted, the analytics server uses the above-described methodologies to generate five domain tables for the collected data described in FIG. 49. For instance, domain data table 5010 includes data collected that share attributes (e.g., are related to) cybersecurity domain. Similarly, the analytics server generates data table 5020 for ATM domain, data table 5030 for customer journey domain, data table 5040 for organization domain, and data table 5050 for financial domain. Each data table may include different files and may be stored separately from other data tables. For instance, the analytics server may store each domain table in accordance with a set of rules in order to maximize retrieval efficiency. In some embodiments, the analytic server may tag/index each file in accordance with an identified domain. For instance, the analytics server may tag file 6 in a manner that is unique to cybersecurity domain.

Referring now to FIG. 51, different unique dimension data tables are illustrated, in accordance with an embodiment. For brevity, FIG. 50 only illustrates dimension tables disaggregated from the cybersecurity domain. The analytics server generates six dimension tables (dimension tables 5110-5160) by disaggregating data within the domain table 5010. As illustrated, some collected data may belong to more than one dimension tables. For instance, file 6 may belong to cybersecurity FC and cybersecurity DT.

As mentioned above, for clarity and brevity, FIG. 51 only illustrates dimension tables generated based on the cybersecurity domain table 5010. However, as described throughout this disclosure, the analytics server may generate a domain table for each domain identified in FIG. 3A. Furthermore, the analytics server may generate a dimension table for each generated domain table. For instance, the analytics server may generate 33 domain tables for each of the 33 domains described in FIG. 3A. The analytics server may then generate six dimension tables for each of the 33 domain tables created. Therefore, the analytics server may generate 198 different data tables where each data table is a data structure uniquely designed to allow the analytics server to store and retrieve data in an efficient manner.

Referring back to FIG. 48, at step 4830, the analytics server may generate a nodal network comprising a set of nodes where each node represents at least a portion of the collected data, each node having metadata comprising a unique identifier corresponding to a unique domain table and a unique dimension table corresponding to the data associated with each node.

The analytics server may generate a nodal network where each node represents a portion of the collected data. For instance, each node may correspond to a file described in the chart 4900. Each node may also contain metadata including context data associated with the file. For instance, a node may include metadata indicating where the file is stored, which computer generated the file, which computer revised the file, a timestamp of the file, and other related information. The metadata may also include data associated with the dimension and domain tables associated with the file.

Each node may also be designated an address/path that corresponds to its respective dimension table and/or domain table. For instance, a node representing file 16 (in the chart 4900) may be designated with an address that is unique to file 16 (e.g., a designation for cybersecurity domain+a designation for cybersecurity FJ+a designation for cybersecurity DT). Using these uniquely created addresses and paths that correspond to the uniquely created data structures (domain tables and dimension tables), the analytics server may retrieve data more efficiently than conventional methods and systems. For instance, the analytics server may traverse the nodal network using the above-mentioned methods in a more efficient manner when displaying and/analyzing data.

Furthermore, as described above, the analytics server may link one or more related nodes using tagging/indexing or other linking methodologies. The analytics server may link all nodes representing the data within each domain table and/or dimension table. For instance, the analytic server may link files 2, 4, 6, 9, 12, 15, 16, and 17 as being related because the analytics server identifies these files as belonging to cybersecurity domain. Similarly, the analytics server may link files 7, 8, and 14 as being related to the ATM domain. Moreover, the analytics server may also link files 6, 9, and 15 as related to cybersecurity FC. Linking different nodes allows the analytics server to retrieve data in a more efficient manner. For example, when displaying data associated with a node that represents file 6, the analytics server may identify files 9 and 15 as related to the same dimension and may display data associated with files 9 and 15 along with file 6.

At step 4840, the analytics server, upon receiving an instruction from a user computing device to display cybersecurity data, identifying, by the server, a likelihood of occurrence of a cyber-attack based and an impact value of the cyber-attack based on an attribute in one or more nodes linked to each other. The analytics server may also display relevant cyber security measures and atomic items to describe threats, threat levels, threat impact, along with the effectiveness of defense capabilities including controls and risk management method.

The analytics server, upon receiving an instruction from a user-computing device, may parse the instruction to identify a node associated with the request. The request may be an instruction to display collected data associated with a certain category, domain, dimension, or an event. The analytics server may first parse the request to identify a node or a category of nodes to be displayed. For instance, a user may drill-down to the cybersecurity and request to view cybersecurity data associated with an organization or a branch (or any other customizable granular sub-section of an organization, such as a region or a selection of branches). Upon receiving the request from the user, the analytics server may identify one or more nodes related to the request using the methodologies described above.

For instance, when the analytics server identifies that the user has requested to view all cybersecurity threat data associated with branch X, the analytics server may then identify any node associated with "branch X" and "cybersecurity." The analytics server may also identify any related nodes by identifying one or more linked nodes. The analytics server may identify the following categories of data relating to cybersecurity and/or cyber-attacks that are also designated to be related to branch X: malware targeting customers, ransomware for workstations, denial of service attack, mobile malware, ransomware for network, malware targeting banks, physical ATM attacks, malware ATM attacks, information leak, data espionage, data sabotage, and data exfiltration.

Upon identifying the requested nodes and other related nodes, the analytics server may retrieve data associated with the identified nodes and may analyze the retrieved data using predefined rules/models. In some embodiments, the analytics server may also use additional (or third party) analytical modeling to analyze the retrieved data. The analytics server may also use pre-mapped relationships (e.g., knowledge from other branches and/or other domains) to identify a likelihood and an impact value for different cyber-attack protocols/methods for branch X. For instance, if branch Y has similar attributes (e.g., number of employees, amount of transactions, or amount of network activity), the analytics server may use pre-mapped relationships between cyber-activity related to branch Y to predict cybersecurity threats for branch X.

The analytics server may use various predetermined analytical models to calculate an impact value and a likelihood of occurrence value (sometimes referred to as the likelihood value) for different cyber-attack scenarios. For instance, the analytics server may use the methods and systems described herein to aggregate pertinent data by identifying one or more linked nodes within the nodal data structure. As described above, using the linked nodes instead of querying multiple data repositories increases efficiency of the analytics server.

The analytics server may then identify and/or retrieve one or more executable files to calculate the impact value and the likelihood of occurrence value for each possible cyber-attack scenario based on the data (e.g., various attributes corresponding to the data). For instance, the analytics server may retrieve a file that includes various predetermined rules and thresholds that correspond to a distributed denial of service (DDOS) cyber-attack scenario. The pre-determined rules and thresholds may be generated by a third party, such as the national institute of standards and technology (NIST), as depicted in FIGS. 54A-G. In some configurations, the analytics server may display one or more GUIs allowing one or more users to input/revise various thresholds to calculate the impact value and/or the likelihood value for each cyber-attack scenario.

Figure 52:
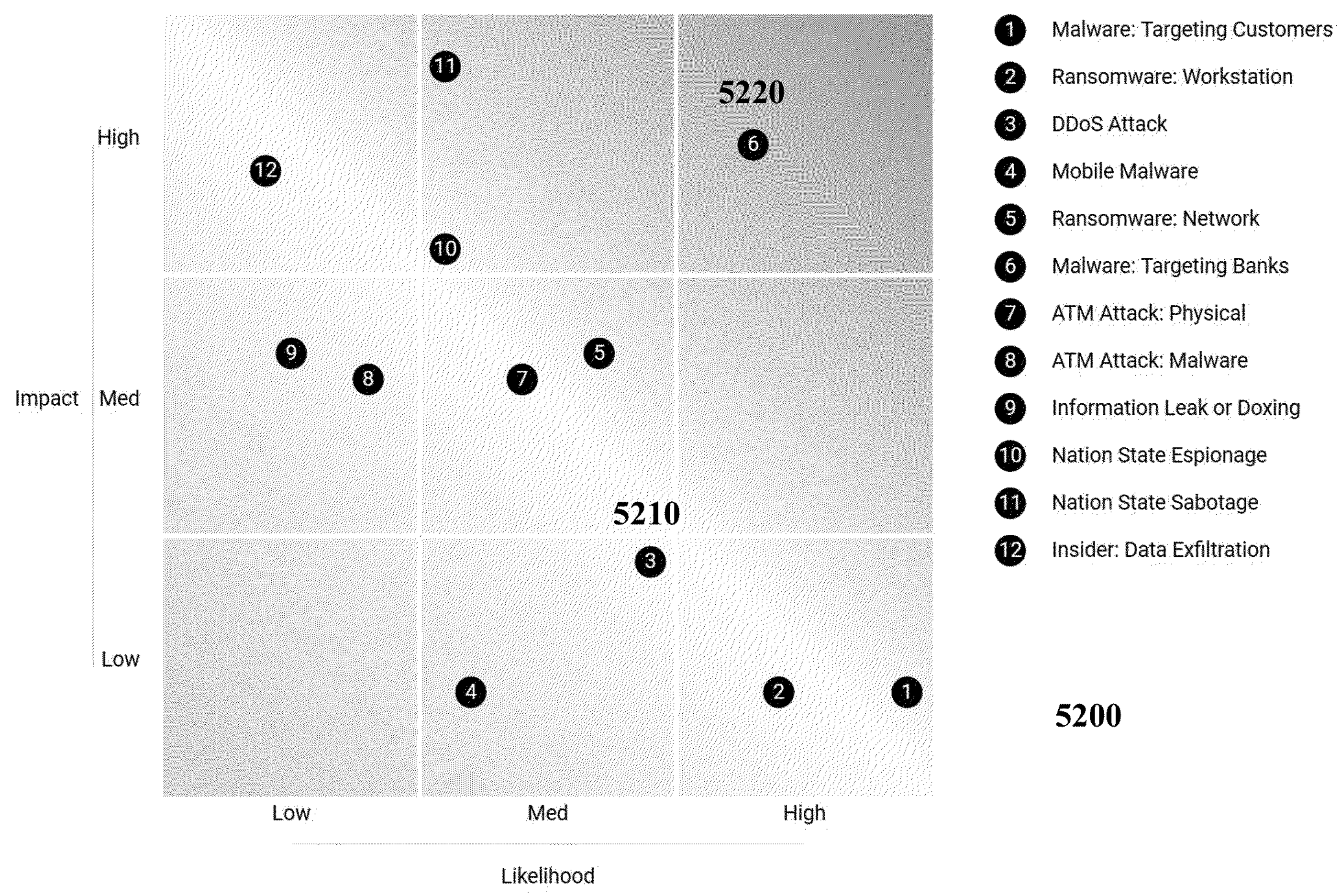
FIGS. 52-53 illustrate examples of different graphical user interfaces displayed by the intelligent data analysis system, according to an embodiment.

The analytics server may execute the set of rules/thresholds to calculate a likelihood of occurrence for each cyber-attack scenario. Moreover, the analytics server may calculate an impact value for each cyber-attack scenario. For instance, the analytics server may calculate a likelihood of occurrence of a DDOS cyber-attack. As depicted in FIG. 52, the analytics server may normalize and standardize the likelihood value for different cyber attack scenarios, thereby providing results that are easier to understand/compare. The analytics server may also calculate an impact value using the predetermined rules and threshold. The impact value may correspond to an estimated impact of the cyber-attack on the organization (e.g., a branch, a region, or the entire institution). For instance, a mobile malware cyber-attack scenario may not "impact" the network and the computer system of a branch. Therefore, the analytics server may assign a low impact value to the mobile malware cyber-attack. In contrast, an ATM malware attack may have a high "impact" on the branch's computer system.

Upon analyzing data associated with the retrieved nodes, the analytics server may generate a graphical representation associated with cyber-attack of branch X. For instance, the analytics server may generate a visual threat matrix and/or threat heat map associated with cybersecurity data. Referring now to FIG. 52, an example of a threat matrix is illustrated, according to an embodiment. The analytics server may identify that the user has inputted an instruction to view cybersecurity data. As a result, the analytics server may generate a multi-dimensional threat matrix.

As depicted, the threat matrix 5200 has two dimensions (impact and likelihood). The threat matrix 5200 further displays a set of different visual indicators numbered and positioned in accordance with different cybersecurity threats. For instance, indicator 5210 corresponds to a denial of service attack. By displaying the indicator 5210, the analytics server indicates that a threat of denial of service attacks has a medium likelihood of occurring and a relatively low impact on the branch identified by the user.

The threat matrix 5200 also identifies more serious threats, such as by displaying the indicator 5220. By displaying the indicator 5220, the analytics server indicates that a likelihood of occurrence of a malware attack for branch X is high and, if it occurs, a malware attack will have a high impact on branch X. Because of the threat matrix 5200, the user may identify critical cybersecurity threats in a speedy and efficient manner.

Even though the threat matrix 5200 is confined to cybersecurity data associated with branch X, in other embodiments, the user may customize the granularity of the data analyzed. For instance, a user can select a threat matrix to include multiple branches within a selected region.

In some embodiments, upon identifying a serious threat (a threat that satisfies a predetermined threshold, such as malware targeting banks represented by indicator 5220), the analytics server may automatically generate an electronic message and transmit the electronic message to one or more computing devices (e.g., computing devices for cybersecurity team at branch X). In some other configurations, the analytics server may also reconfigure one or more computers identified to be at a higher risk. For instance, when the analytics server identifies that a computer is at high risk of malware attack, the analytics server may transmit an electronic message identifying the computer to a technical support or a cybersecurity expert. Additionally or alternatively, the analytics server may also reconfigure the risky computer's cybersecurity protocols.

Figure 53:
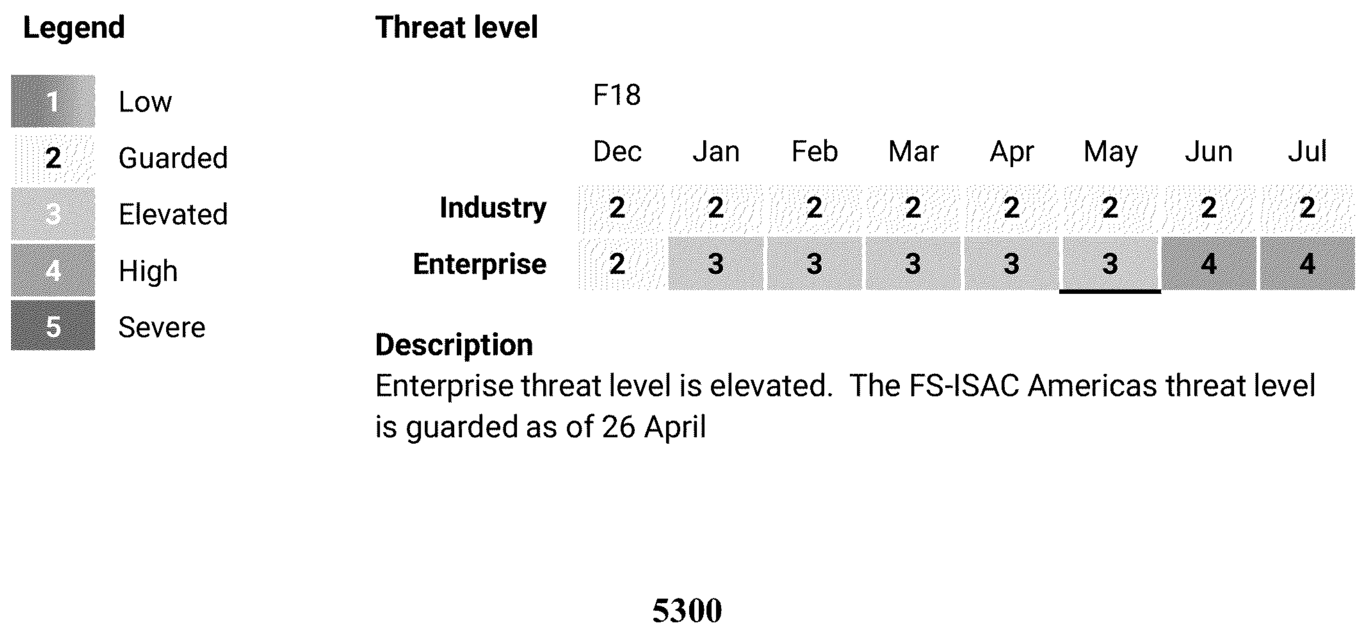
Figure 54A:
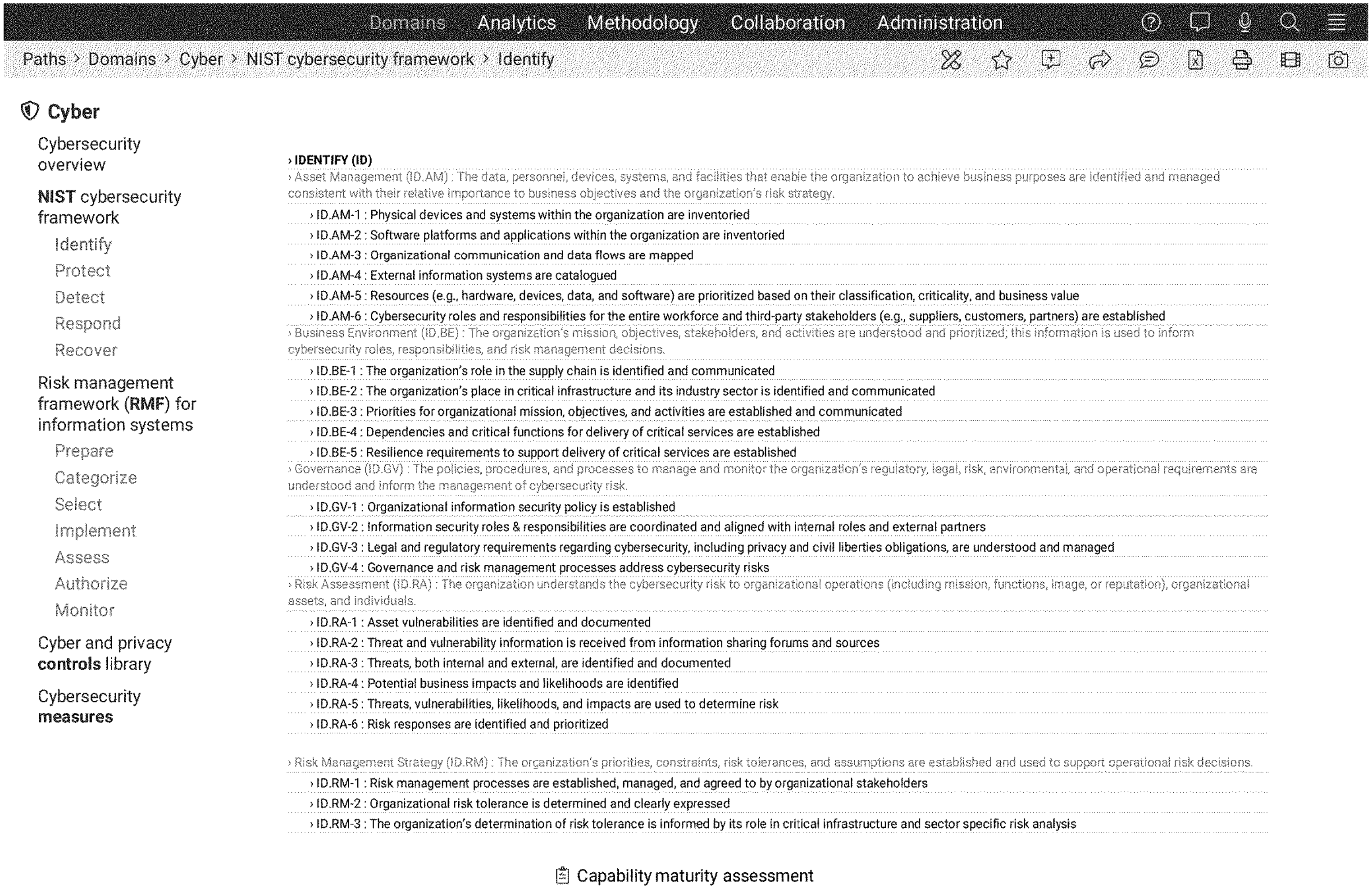
Figure 54C:
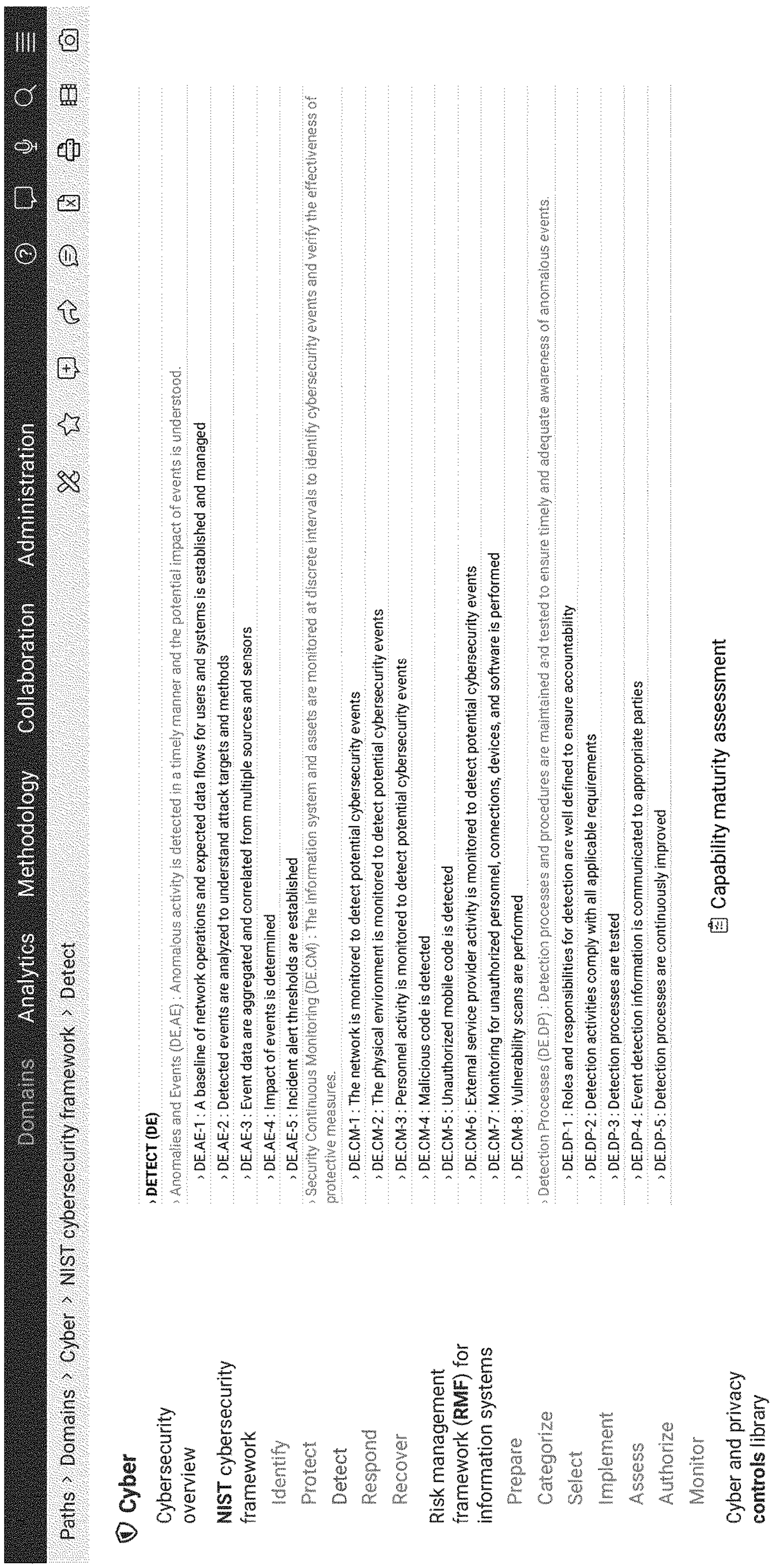
Figure 54E:
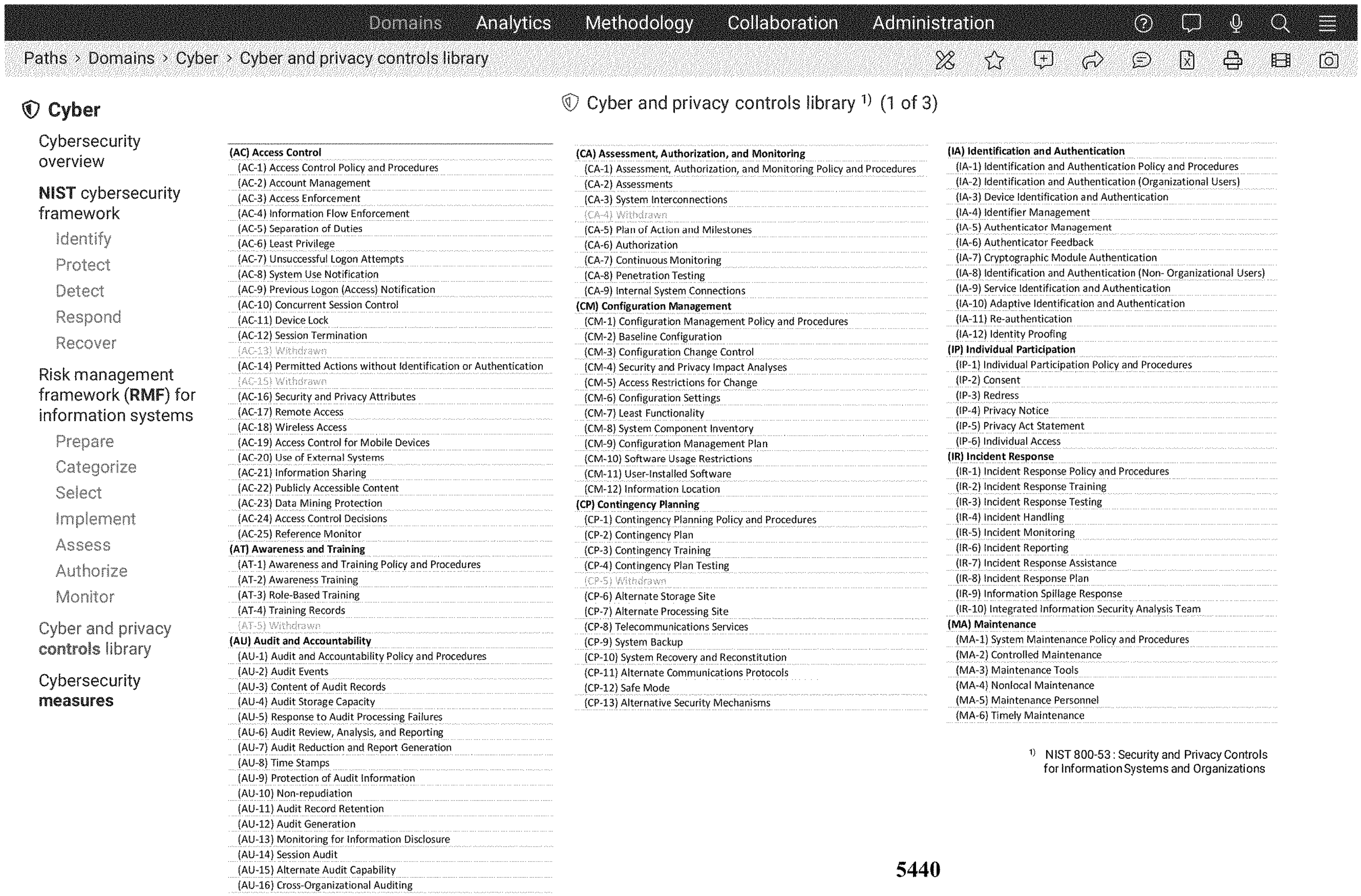
Figure 54F:
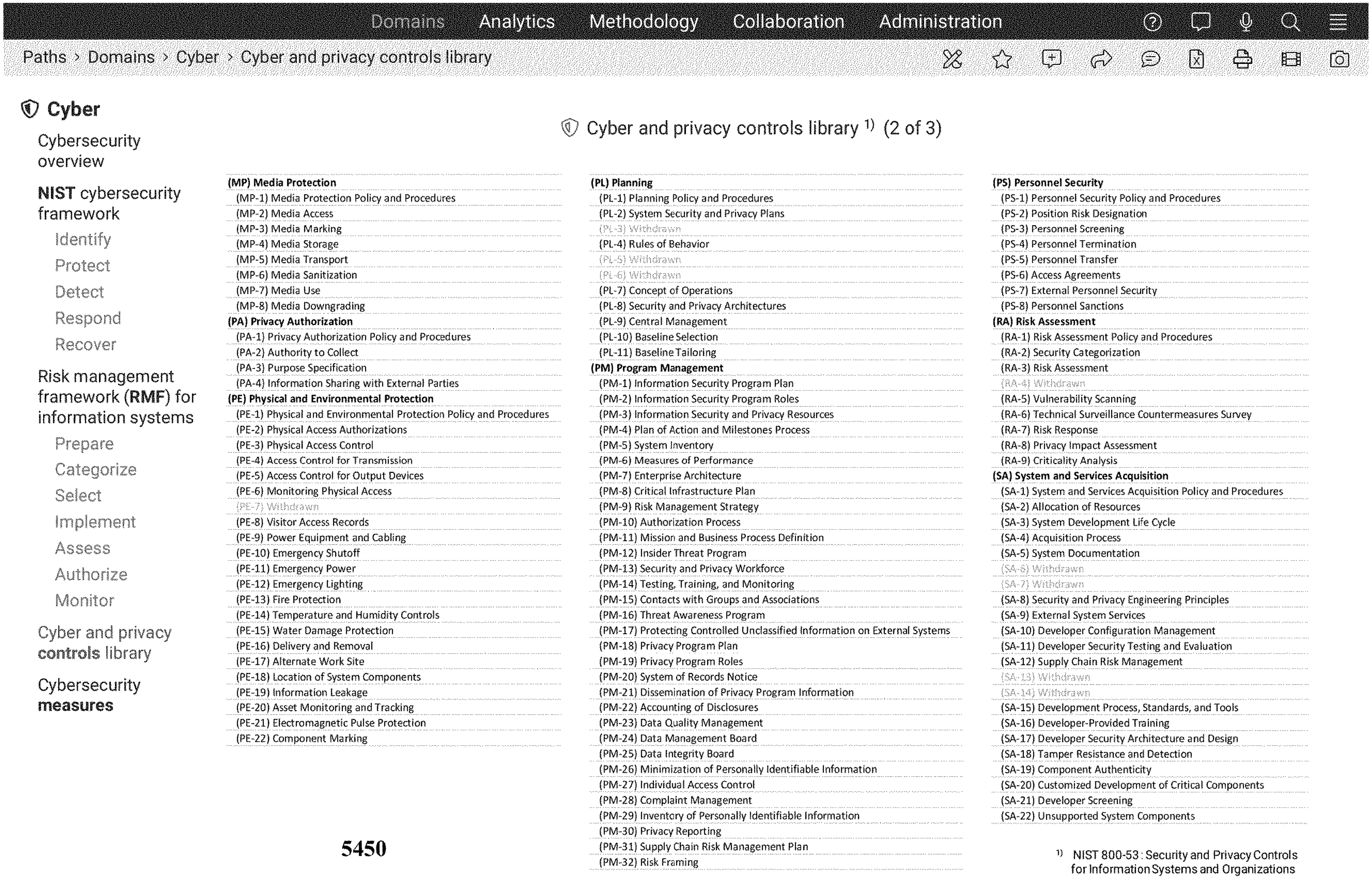
Figure 54G:
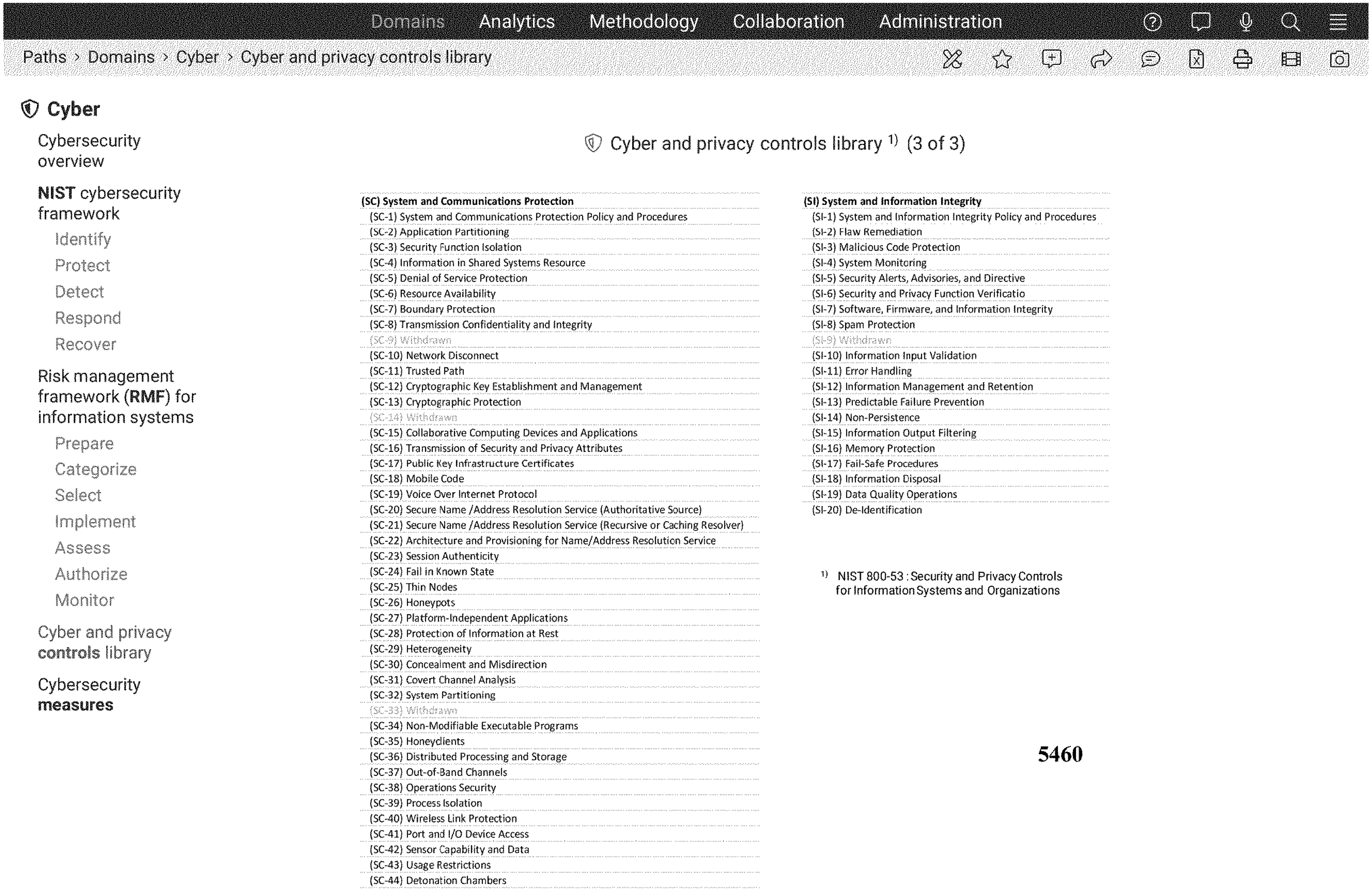
Figure 55:
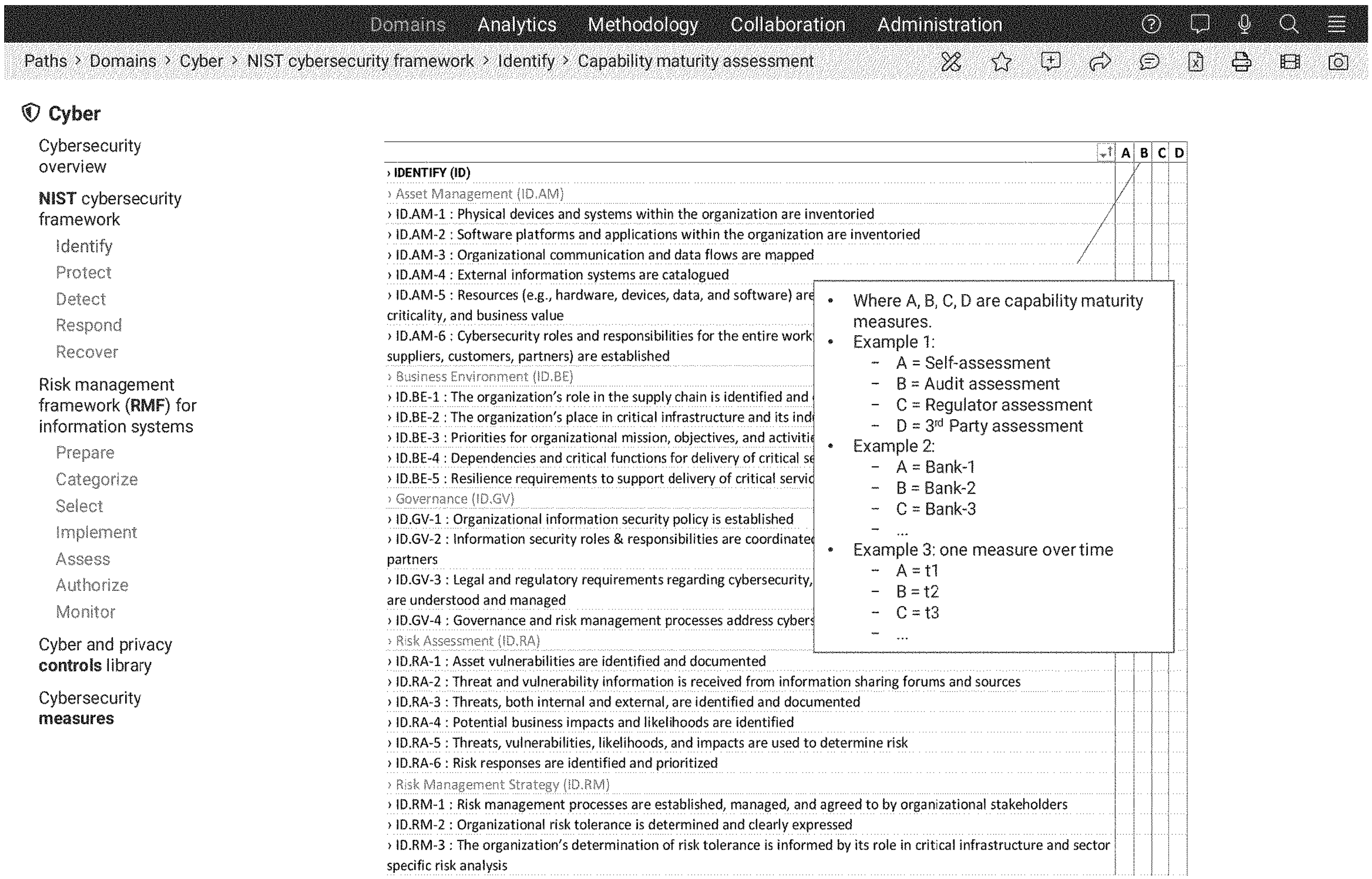
FIG. 55 illustrates a graphical user interface displayed by the intelligent data analysis system, according to an embodiment.

In some configurations, the analytics server may generate a heat map associated with cybersecurity data. For instance, the heat map 5300 (in FIG. 53) displays a color coded (or otherwise visually distinct) graphical component illustrating a threat level compared to similar industries at a broad organization level. For instance, heat map 5300 indicates that the cybersecurity threat level for the organization, compared to similar organizations, is higher in June and July.

In some embodiments, the analytics server may use a pre-existing algorithm to identify, protect, and detect various computing devices from cybersecurity issues. For instance, the analytics server may utilize standards implemented by the NIST to identify whether any computing device has been compromised. For instance, the analytics server may use the NIST publication 800-37 (Risk Management Framework) and 800-53 (cyber security and controls) to implement the methods described herein. The above-mentioned frameworks provide a rigorous methodology to manage cyber security and privacy risk. In some configurations, the analytics server may store (and periodically update) cyber security standards in a database. The analytics server may use the standards (e.g., 800-53) to identify cyber security and/or risk issues within the computer infrastructure described herein.

As depicted in FIGS. 54A-E, the analytics server may disaggregate the NIST categories as specified by the US government. NIST provides a rigorous standard that an enterprise or government should implement to protect critical data/IT assets. The analytics server may first retrieve the NIST categories from an electronic database (e.g., NIST website) and generate various dimension tables accordingly. GUI 5400 illustrates disaggregated categories associated with identifying a cybersecurity issue. GUI 5410 illustrates disaggregated categories associated with protecting data/IT assets. Furthermore, GUI 5420 illustrates disaggregated categories associated with detecting cybersecurity issues associated with computing devices within an enterprise. GUI 5430 illustrates NIST 800-37 standards analyzed and utilized by the analytics server. GUIs 2440-60 illustrate NIST 800-53 standards analyzed and utilized by the analytics server.

In a non-limiting example, the analytics server may use the above-described methodology to identify a response to each category depicted in GUI 5400. For instance, the analytics server may identify whether physical devices and systems within the organization are inventoried properly and may automatically populate a response to this category. The analytics server may then display GUI 5500 where an administrator can manually input a response to each category and/or an automated response is detected by the analytics server. For instance, columns A-D depict a self-assessment, audit assessment, regulator assessment, or third-party assessment of each cybersecurity category.

In some configurations, the analytics server may use the columns to illustrate differences between different entities or divisions. For instance, column A may display cybersecurity responses for entity 1 and column B may display cybersecurity responses for entity 2. The NIST framework may be used as a common language to help multiple entities collaborate to continuously improve cyber capabilities. For example, comparing the measures used by multiple banks next to each NIST category and subcategory can help chief information security officers identify gaps and opportunities to improve measures and overall capabilities for the given NIST category.

In yet a further embodiment, the analytics server may utilize the columns to display responses over time. For instance, each column may be designated to cybersecurity response within a certain time period.

Figure 56:
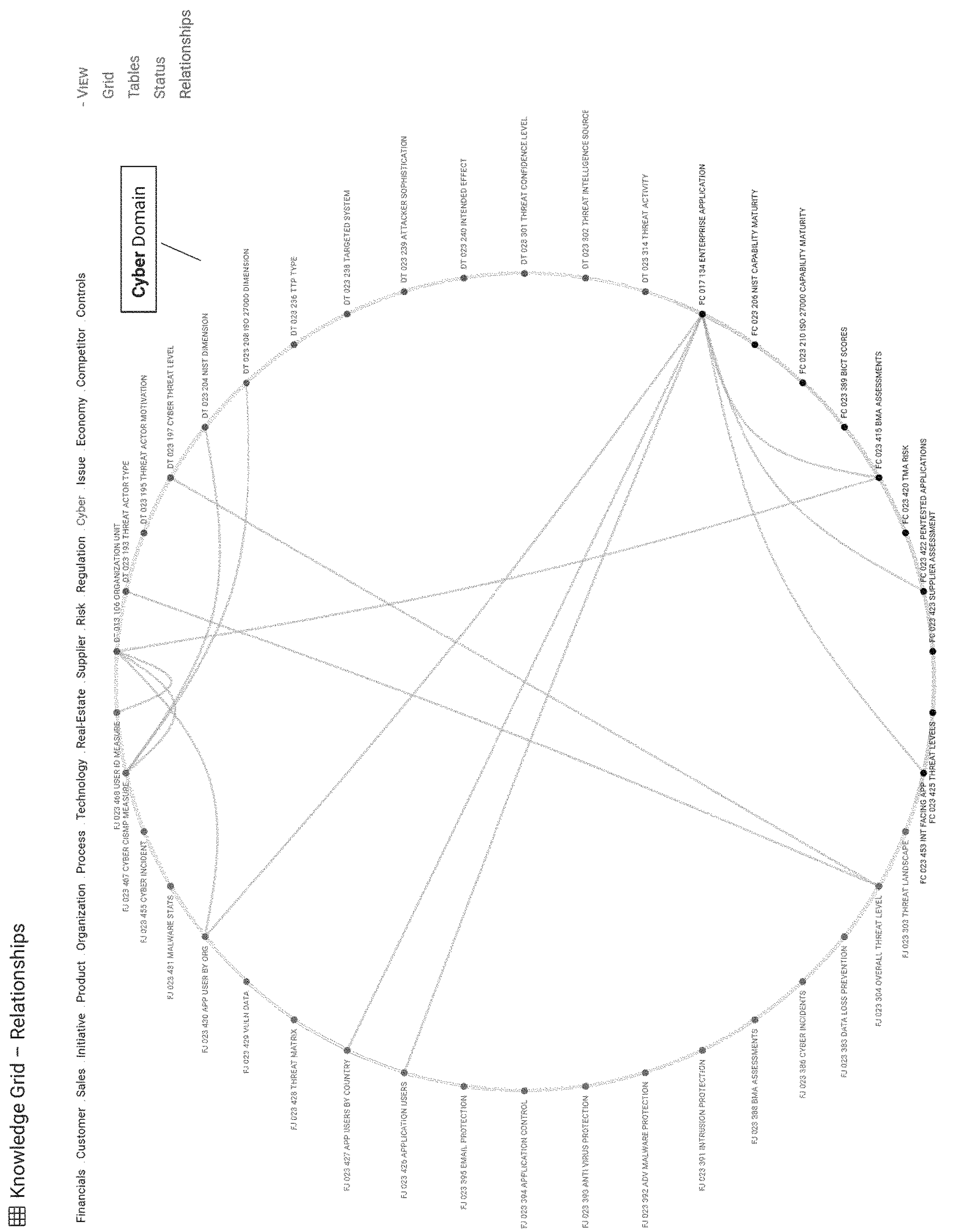
FIG. 56 illustrates a visual representation of interconnected data tables, according to an embodiment.

As described above, the analytics server may generate a relationship map for data stored within different data tables (e.g., domain and dimension tables, fact journals, fact catalogs). By identifying the relationship between these data tables, the analytics server may improve the efficiency for future cybersecurity analysis. Referring now to FIG. 56, diagram 5600 represents a relationship map between different data tables, fact catalogs, and fact journals associated with cybersecurity of an entity. Understanding these relationships enables the analytics server to understand the data model more quickly, efficiently, and easily. Each item on the periphery of the circle represents a table in the data model (nodal network). The lines from one item to another item describe the relationship in the data model. For example, the lines describe how a fact catalog (e.g., facilities) has a relationship to a dimension table (e.g., location). This means that each facility has an attribute specifying its location. As will be described below, the analytics server may generate a computer model that replicates these relationships.

Figure 57:
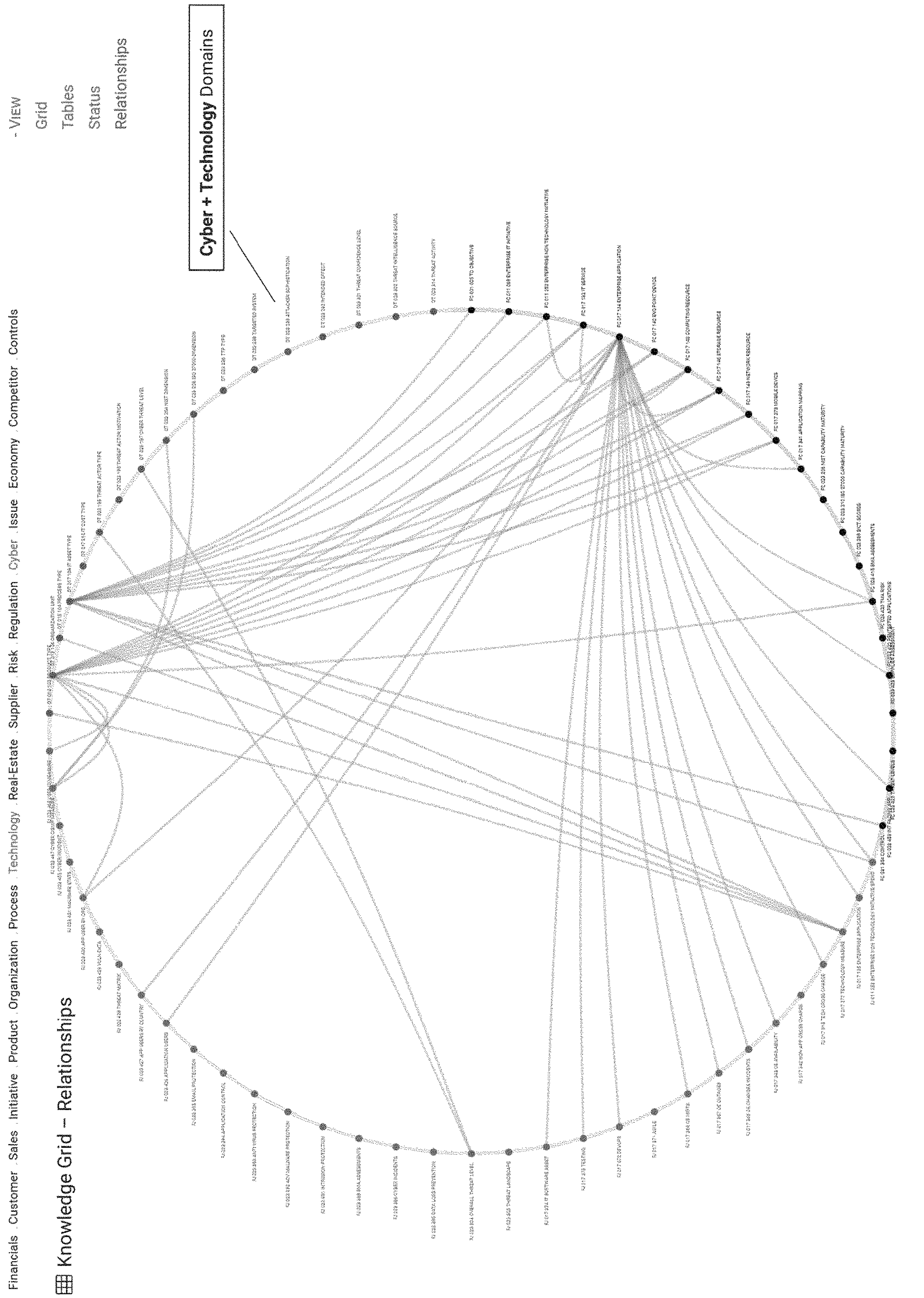
FIG. 57 illustrates a visual representation of interconnected data tables, according to an embodiment.
Figure 58:
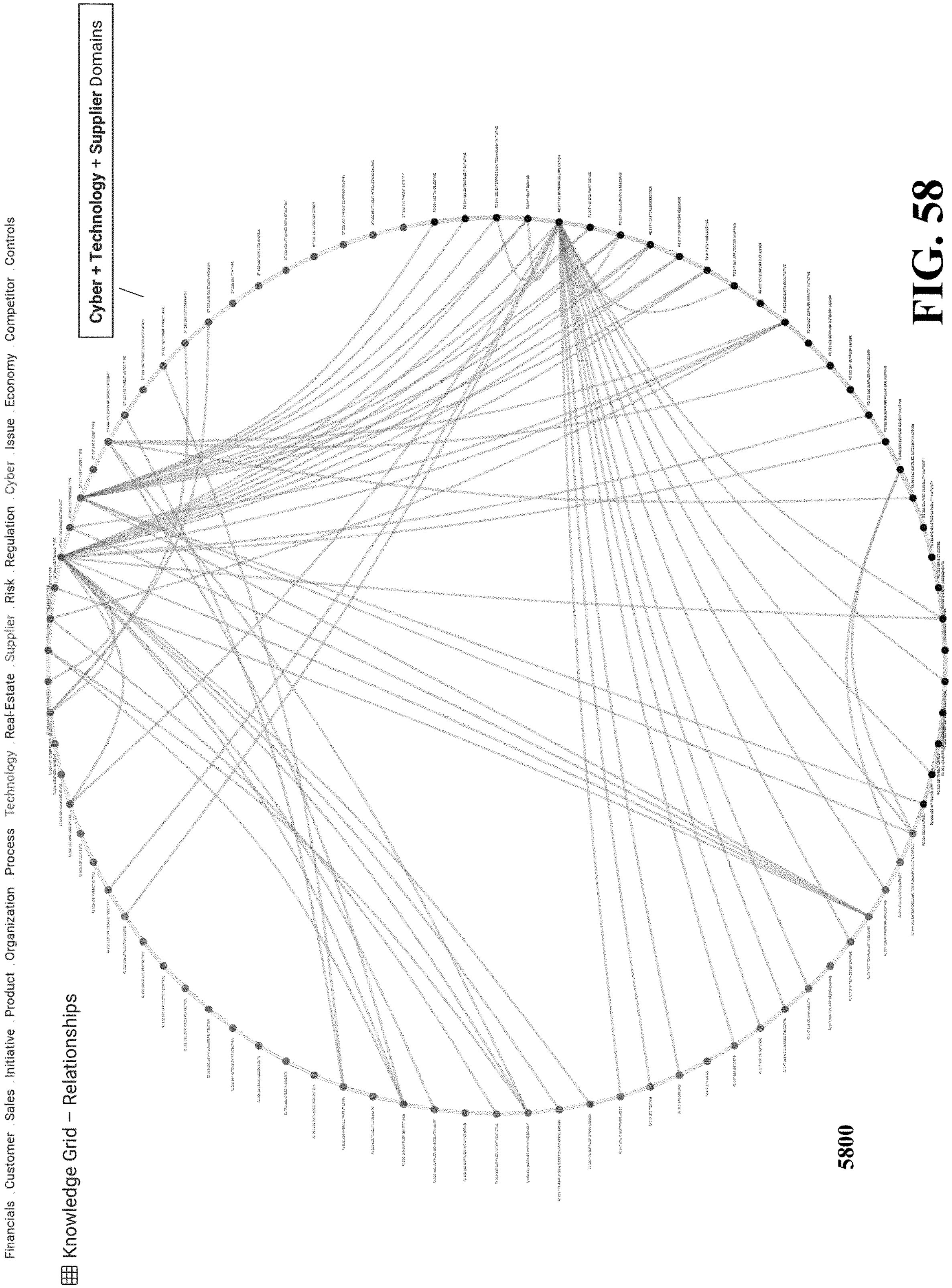
FIG. 58 illustrates a visual representation of interconnected data tables, according to an embodiment.

The analytics server may provide an administrator the option to modify (include or exclude) different domains from the above described relationship map. For instance, while diagram 5600 is directed only to the cyber domain, diagram 5700 (depicted in FIG. 57) includes cyber and technology domains. Furthermore, diagram 5800 (depicted in FIG. 58) includes cyber, technology, and supplier domains.

Figure 60:
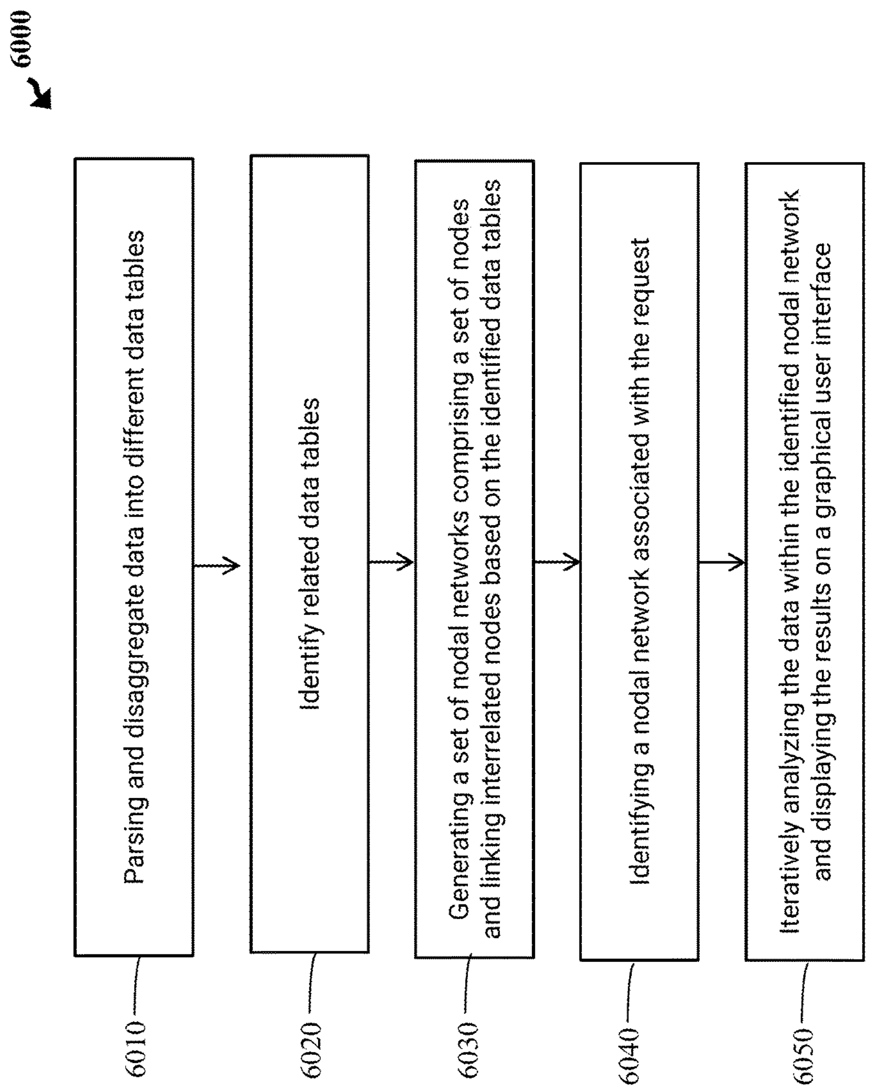
FIG. 60 illustrates a flow diagram of a process executed by the intelligent data analysis system, according to an embodiment.

Referring now to FIG. 60, a flow diagram of a process executed by the intelligent data analysis system is illustrated, according to an embodiment. The method 6000 includes steps 6010-6050. However, other embodiments may include additional or alternative execution steps, or may omit one or more steps altogether. The method 6000 is described as being executed by a server, similar to the analytics server described in FIG. 1. However, in some embodiments, steps may be executed by any number of computing devices operating in the distributed computing system described in FIG. 1. For instance, part or all the steps described in FIG. 60 may be locally performed by one or more user computing devices or an administrative computing device. Furthermore, even though some aspects of the method 6000 are described in the context of collecting and analyzing data associated with banking computing systems, it is expressly understood that method 6000 is applicable to collecting, structuring, and analyzing any data.

As described above, the analytics server may collect data from various computing devices and electronic data sources to generate a nodal network (knowledge grid). Having this nodal network and organizing the data according to the various data tables described herein (e.g., domain tables, dimension tables, and various fact journals described herein) allows the user to navigate vast structured and/or unstructured data in a more systematic and efficient manner than possible with conventional methods and systems. In addition to structuring the data and as described in method 6000, the analytics server may also create relationships and identify insights using the data structure described above. These insights may be generated in a systematic and standardized method and may be used cross entities and/or domains.

The analytics server may generate mental models and/or physical data models to better create insights and apply those insights to data. For instance, a user may request the analytics server to analyze how a marketing campaign has affected sales in a specific branch. The analytics server may implement the methods and systems described herein (e.g., method 6000) to analyze relevant portions of the nodal network and develop insights. The analytics server may also apply the mental models to other domains. For instance, the analytics server may generate a domain-specific mental model comprising related nodes and data tables that represent an analytic solution. The analytics server can execute analysis protocols to develop insights by using data corresponding to the mental model. Once the mental model is developed and iteratively refined, the analytics server may use this model to identify insights for other domains. The analytics server may also use the mental model to collect data more efficiently.

The nodal network is a logical data model that is created using various data structures described herein. On the other hand, the mental model is a framework to understand insights from the data stored within the nodal network. The mental models are illustrated using diagrams described herein (e.g., widgets or free form). In some configurations, the analytics server may link the nodal network (logical data model) to provide facts to support the understanding of the given mental model. The same approach may also be used for methods (e.g., steps to solve a problem). Finally, physical data models consist of the technical implementation of the logical data model using an existing software platform (relational database systems (RDMBS) or big data tools, such as HADOOP HIVE). A mental model is a data model (e.g., nodal structure) of a specific problem domain expressed independently of a particular database management product or storage technology but in terms of data structures such as relational tables and columns, object-oriented classes, or XML tags.

Even though this disclosure refers to different models as mental models, it is expressly understood that these models are computer-generated and are utilized by the analytics server to artificially replicate human understanding and intelligence. Therefore, these models are collections and subsets of data nodes described in FIGS. 1-4. The data models described herein comprise a set of tables populated with data collected and represented by the nodal network described in FIGS. 1-4.

At steps 6010-20, the analytics server may disaggregate the data into a set of data tables (e.g., domains). The analytics server may parse the data within the nodal network (e.g., retrieved from various electronic sources) or other collected data to generate a set of uniform data tables. The analytics server may parse and disaggregate the collected data into a set of unique domain data tables, each domain data table corresponding to a predetermined domain having a first criterion. Furthermore, the analytics server may also parse and disaggregate each unique domain table into a set of unique dimension tables, each dimension data table corresponding to a predetermined dimension having a second criterion.

Disaggregation of data into different data tables is described in FIGS. 3A-B. For instance, the analytic server may first determine one or more domains applicable to the collected data. A domain is a category of collected data or knowledge. The domain table in FIG. 3A illustrates different domains categories used to subdivide data into different domain tables. Once the data is distributed among one or more domain tables, the analytics server may further distribute the collected data among five building blocks. For instance, collected data that belong to ATM domain is further divided among information, dimensions, analytics, archive, and grid building blocks, as depicted in building blocks 320. Different domains described in the domain table 310 may represent different categories of data satisfying a specific predetermined criterion. For instance, the customer journeys domain may refer to all data related to user experiences of customer-facing applications (e.g., customer-facing website and/or other electronic applications). Therefore, all data within the data table corresponding to the customer journey will satisfy this criterion. In another example, ATM domain may refer to all collected data relevant/associated with ATMS. Therefore, all collected data parsed, by the analytics server, into the ATM domain table, will share at least that one criterion.

Figure 61:
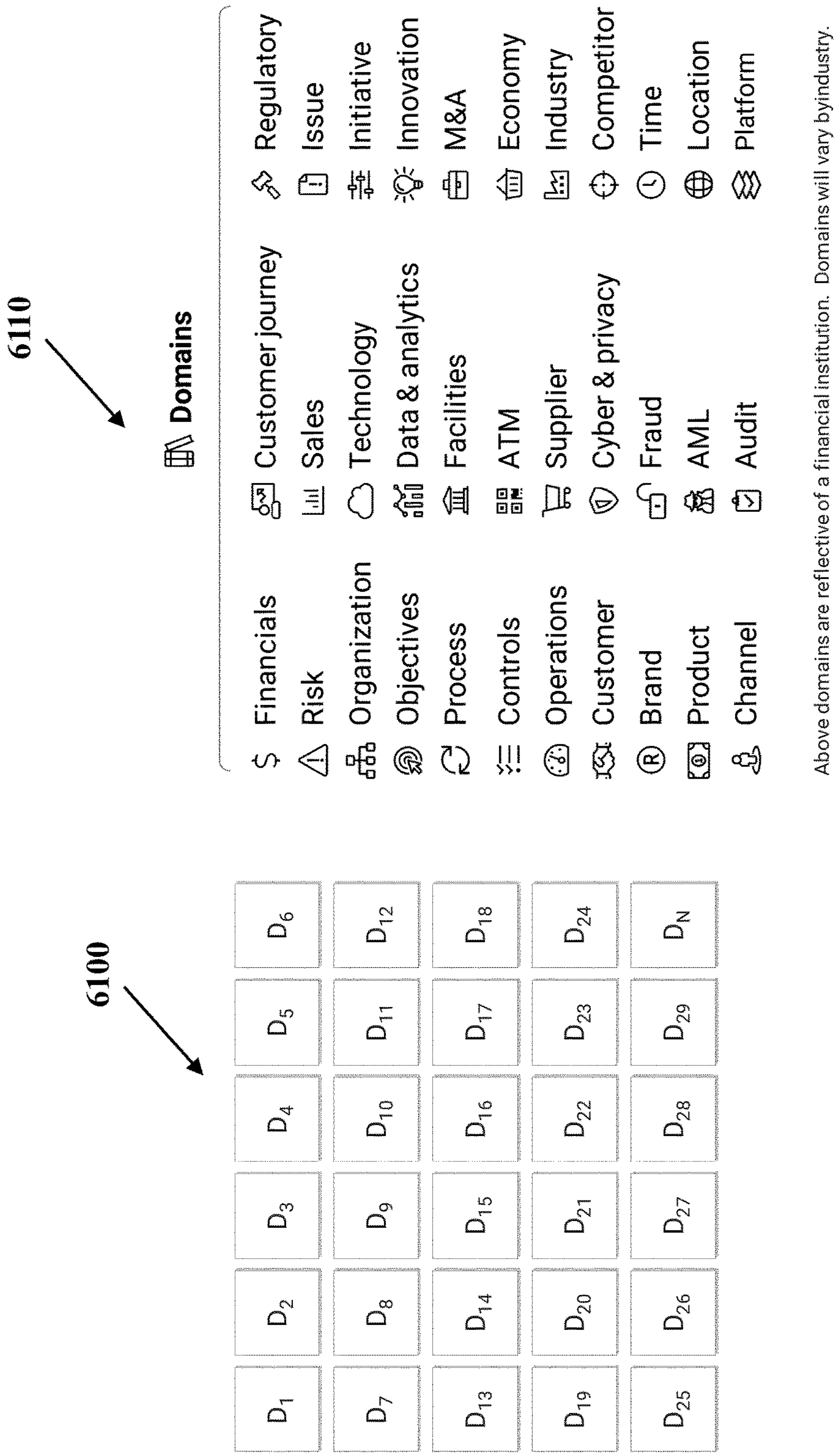
FIG. 61 illustrates a graphical representation of different data tables within a nodal network, according to an embodiment.

Referring now to FIG. 61, table 6100 includes a graphical representation of multiple domains. Table 6110 represents a non-limiting example of domains to which different files are assigned. The analytics server may assign a domain to the data collected/retrieved. Therefore, in some configurations, the analytics server may assign all data (e.g., each collected file) to a domain identified in table 6110. As described throughout this disclosure, the analytics server may continually/iteratively execute various protocols to divided and disaggregate data into different domains and domain tables. Therefore, the method described in step 6010 may be continuously executed by the analytics server.

The analytics server may also specify a measure catalog for each domain to organize measures into logical groupings. Upon identifying the relevant domains, the analytics server may also identify relevant measure catalogs (MCs) for each identified domain. A catalog of measure or measure catalog is implemented for each domain. MCs allow the analytics server to quantify the absolute and relative size of concepts. Non-limiting examples of MCs include revenue expenses net income, number of facilities, number of ATMs, gross loans and acceptance, write-offs, provisions for credit losses. For each domain, MCs may be implemented in a fact catalog. A fact catalog is associated with each MC to update the value of measures over time. MCs may also be associated with different dimension tables (DTs) to enable users to pivot, filter, and drill-down. For instance, MCs of Full time equivalents (FTEs that indicate the hours worked by one employee on a full time basis) is associated with the following dimensions: organization unit, job family, grade level, and location. In some configurations, an administrator may specify MCs. For instance, an administrator may assign various MCs for each domain or other data table.

FIG. 65 illustrates a non-limiting example of MCs identified by the analytics server, according to an embodiment. Table 6500 illustrates different MCs related to a domain. Table 6500 also describes attributes of each MC. For instance, the financials domain (key No. 1) may have a domain id, domain icon, table name (MC_financial_measures), table type (MC), table ID (MC_1), description (financial domain measures), attributes (name, overview, acronyms, units), and relationships (DT Financial Measure Type). The analytics server may use the description to tag the collected data accordingly and link them to different MCs. FIG. 66A illustrates another example of MCs where the analytics server uses the MCs to retrieve/compute the measure value. Additional examples of MCs are also illustrated in FIG. 66B. Referring now to FIGS. 67-68, tables 6700 and 6800 illustrates different domain tables to be selected by the analytics server, as described above.

Referring now to FIG. 69, table 6900 illustrates different fact catalogs related to different domains. As described above, the analytics server may further disaggregate the collected data to identify different fact catalogs related to each request. As depicted in table 6900, different fact catalogs may have different attributes and relationships. The analytics server may use these relationships to efficiently retrieve data and to create a mental model by identifying related data (e.g., related data tagged as associated with other fact journals, DT, and other data tables). For instance, employee fact catalog (table ID FC_3) is related to organization domain (DT_ID 3 and Table name FC Employee). The employee fact catalog may also be related to other dimension tables and their corresponding fact catalogs, such as DT_Grade-Level.

Referring now to FIG. 70, table 7000 illustrates different fact journals related to different domains. As described above, the analytics server may further disaggregate the data (e.g., data corresponding to the nodal network and/or the request) to identify different fact journals related to the collected data. As depicted in table 7000, different fact journals may have different attributes and relationships. The analytics server may use these relationships to efficiently retrieve data and create a mental model by identifying related data (e.g., related data tagged as associated with other fact journals, DT, and other data tables). For instance, capital liquidity fact journal (table ID FJ_8) is related to the risk domain. The capital liquidity fact journal may also be related to other dimension tables and their corresponding fact catalogs, such as DT_Risk_Measure and (DT_Period).

Referring back to FIG. 60, at step 6030, the analytics server may generate an analytics solution model (mental model) using the identified related data tables. The analytics server may generate a set of nodal networks comprising a set of nodes where each node represents at least a portion of the retrieved data, each node having metadata comprising a unique identifier corresponding to a unique domain table and a unique dimension table corresponding to data associated with each node, wherein the one or more nodes within each nodal network is linked based on its respective metadata. The analytics server may generate an analytical solution for different categories by linking different nodes representing data within the identified data tables (steps 6010-6020). Accordingly, a mental model is a computer model comprising a subset of nodes that are linked together for a common purpose (e.g., analyzing a specific domain or satisfying a request/category). For instance, a mental model may be tailored towards identifying how money spent on marketing has affected sales. Another mental model may be directed to identifying cybersecurity shortcomings. As described above, the analytics server may store context data (e.g., a related data table) as metadata to a collected file.

The analytics server may translate the related data tables into a mental model using SQL tables that define indexes, attributes, and relationships between the collected data. The analytics server may generate multiple SQL tables that define the mental model by describing how various data tables (e.g., DTs, FCs, FJs, and their corresponding data nodes) are related. Referring now to FIG. 71, SQL table 7100 illustrates an example of an SQL table that identifies how different data tables are related. SQL Table 7100 is a formulaic representation of a mental model because it identifies how various data tables can be analyzed.

Figure 72A:
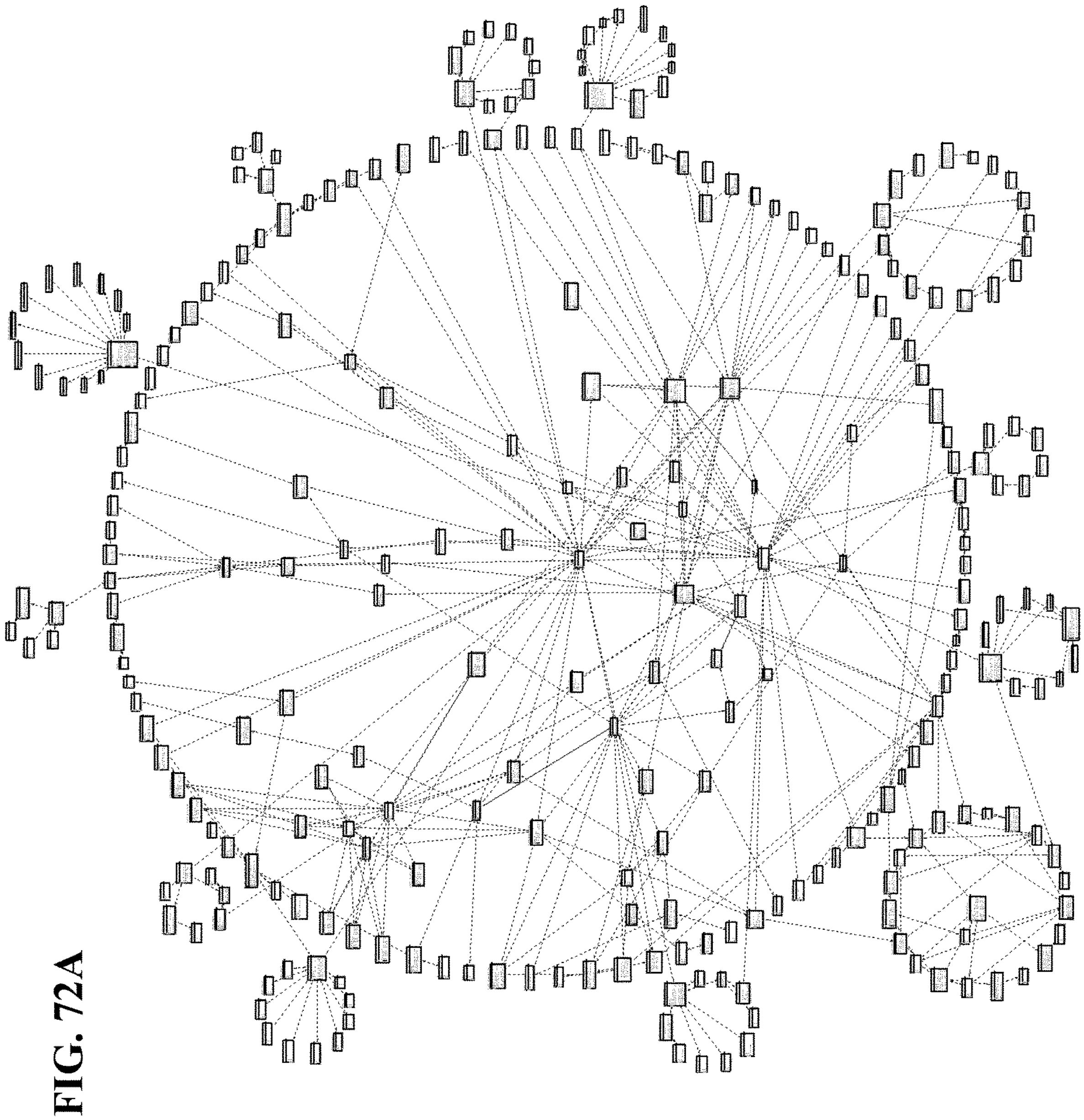
FIG. 72A-B illustrate a visual representation of a mental model, according to an embodiment.

Referring now to FIG. 72A, a graphic representation of a mental model is illustrated. Mental model 7200 represent how different dimension tables, fact catalogs, fact journals, measure catalogs, and unstructured data catalogs are interconnected. For instance, every rectangle represents a dimension table, every circle represents a fact journal and every triangle represents a fact catalog or measure catalog. Upon identifying relevant data tables to an analytical request/problem, the analytics server may generate a nodal structure specific to that analytical request/problem. The mental model 7200 is a representation of how different data tables relevant to a request are connected. Therefore, the mental model 7200 is a nodal structure (similar to the nodal structure described in FIGS. 2 and 3A-B and referred to as the knowledge grid) that is specific to a request, category, or problem.

Figure 72B:
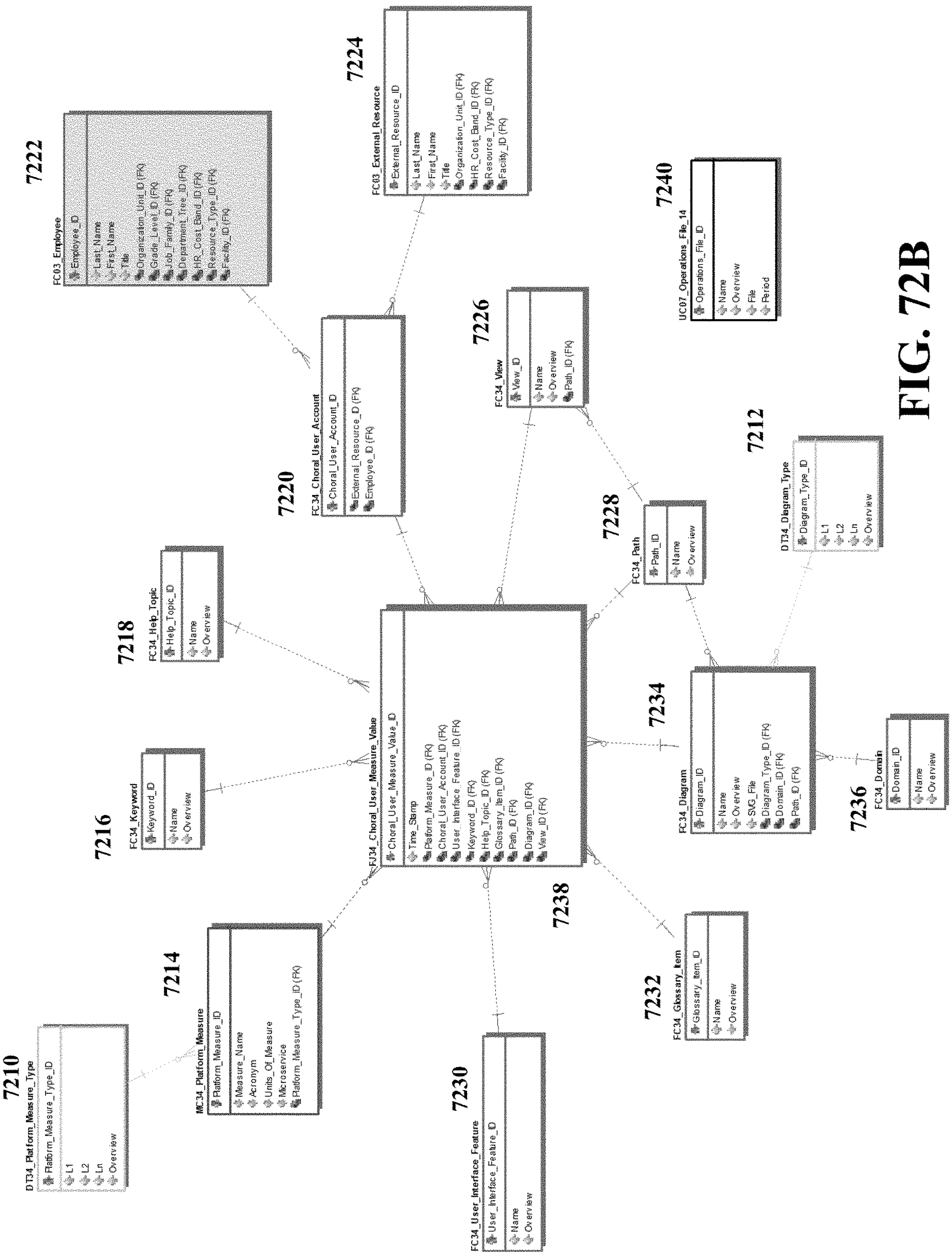

FIG. 72B is another graphical representation of how the analytics server connects different data tables in order to generate the mental model or the analytical solution. To clarify the mental model 7200, a limited number of interconnected data tables are illustrated in FIG. 72B. However, it is expressly understood that data tables illustrated in FIG. 72B are only a small and limited portion of the mental model 7200. Upon identifying relevant data tables, the analytics server may use tagging/indexing or other methodologies to create relationships between different nodes that represent data within each data table. For example, the analytics server may generate various SQL tables that designate and define relationships between the identified tables. FIG. 72B visually illustrates these connections and relationships. For instance, domain tables 7210 and 7212, measure catalog 7214, fact catalogs 7216-7236, unstructured data tables 7240, and fact Journal 7238 are interconnected as part of a mental model.

As illustrated, not all data tables are connected to each other. For instance, domain table 7210 is only connected to measure catalog 7214, which is connected only to fact Journal 7238. However, domain tables 7210 is not connected to other fact journals or data tables. On the other hand, fact catalog 7228 is connected to fact catalog 7234, fact catalog 7226, and fact Journal 7238. By minimizing the number of connections, the analytics server may increase efficiency of data retrieval and/or analysis.

In some configurations, the analytics server may generate one or more mental models for various requests, problems, and/or categories. For instance, the analytics server may generate a mental model specific to understanding how sales affects productivity and another mental model specific to understanding levels and types of fraudulent cyber activity. Upon receiving a request from a user, the analytics server may retrieve a mental model associated with the request and analyze the data according to the data tables/relationships described within the retrieved mental model. For instance, if the analytics server receives a request regarding analyzing the effects of marketing on sales, the analytics server may retrieve a mental model specific to marketing and sales and may analyze the data represented by the nodes within the retrieved model. In this way, the analytics server can efficiently analyze data only specific to the requested category, which allows the analytics server to provide responses faster, more efficiently, and using less computing power.

Data tables identified within mental models may also define how data is to be collected, extracted, analyzed, and/or verified. For instance, a data table may define one or more data adapters that define how and from where data is to be collected. The analytics server may use the data adapters (e.g., application programming interfaces) to extract data from various data sources (both internal and external). The data adapters may connect to the data sources (e.g., database, application, and/or micro service data sources). For example, when an entity has multiple databases of different types (e.g., ORACLE, MICROSOFT, or IBM), a large amount of data is available externally through micro services, external APIs, and electronic listeners. A data table within the nodal structure and/or a mental model may identify and describe the micro services connected to those external data sources, whereby the analytics server may efficiently collect data from the identified micro services. The analytics server may also use the data adapters to efficiently load the collected data onto the nodal structure and/or the mental model. When the analytics server collects data using a defined data adapter, the analytics server may load data in accordance with descriptions of the data adapter.

In a non-limiting example, a domain table may define one or more data adapters. The data table may define an application-programming interface connected to an internal database configured to monitor sales figures for a branch. The data table may also include a micro service configured to monitor FTEs in an external accounting database. The data table may also designate a related data table (e.g., FC or FJ) associated with the data collected from each data adaptor. The analytics server may then automatically collect the data using the defined adaptors and tag/index the data accordingly (e.g., translate the data).

The analytics server may also use the adapters to validate data. For instance, each data table may define a set of validation rules to determine if the data collected via an adapter is valid. For example, if certain required fields in a table are missing for several items (rows), the adapter may generate a message in the administrative console to inform an administrator of the analytics server that the data collected via a particular adapter is not valid or needs to be reviewed. The analytics server may also generate an automatic message and transmit the collected data (that is purportedly not valid) to the administrator's computer and display a prompt to the administrator requesting a second level review of the collected data.

As depicted in FIG. 72B, the mental model may also define how to translate the collected data into different data tables. For instance, a DT may include a set of adapters and identify how, from where, and when to collect data. The DT may also identify how to translate data into related data tables (e.g., FCs and/or FJs). Translation of data refers to mapping data and its attributes to different tables. For instance, the analytic server may translate the data and map the data to the appropriate data table based on pre-configurations and set of rules received from each data table. As described above, these translation rules can be populated within the mental model. For instance, the SQL table corresponding to a mental model may include a set of translation rules.

The analytics server may use the translation rules to assign a data table (e.g., FC, FJ, and/or MC) to the collected data. For instance, the analytics server may retrieve attributes of each fact catalog (e.g., table 6900 in FIG. 69). The analytics server may use these attributes to populate each row of the SQL data table (e.g., the SQL file that represents the mental model) when data is collected. For instance, facilities data, data on applications, data on IT infrastructure assets may be designated to a particular fact catalog because of their attributes (e.g., content, source, and timestamp). When the analytics server identifies that a file or other collected data has an attribute consistent with the translation rules, the analytics server may designate the file accordingly. In another example, the analytics server may retrieve attributes of each fact journal (e.g., table 7000 in FIG. 70). The analytics server may also use these attributes to populate each FJ row of the SQL data table.

At step 6040, the analytics server may parse the request to identify one or more nodes and/or domains tables associated with the request. Upon receiving a request from a user-computing device, the analytics server may parse the request to identify a nodal network associated with the request. The analytics server may receive a request from the user to identify insights by analyzing the data collected from an entity. The analytics server may use a variety of technologies to identify different nodes (or categories) associate with the request. For instance, the analytics server may execute a natural language processing protocol to identify words and phrases used in the request. In some configurations, the analytics server may receive the categories of the request from the user. For instance, an administrator may select one or more domain tables, FJs, FCs, and/or MCs as related to a request. In some configurations, the analytics server may automatically identify these data tables.

Figure 62:
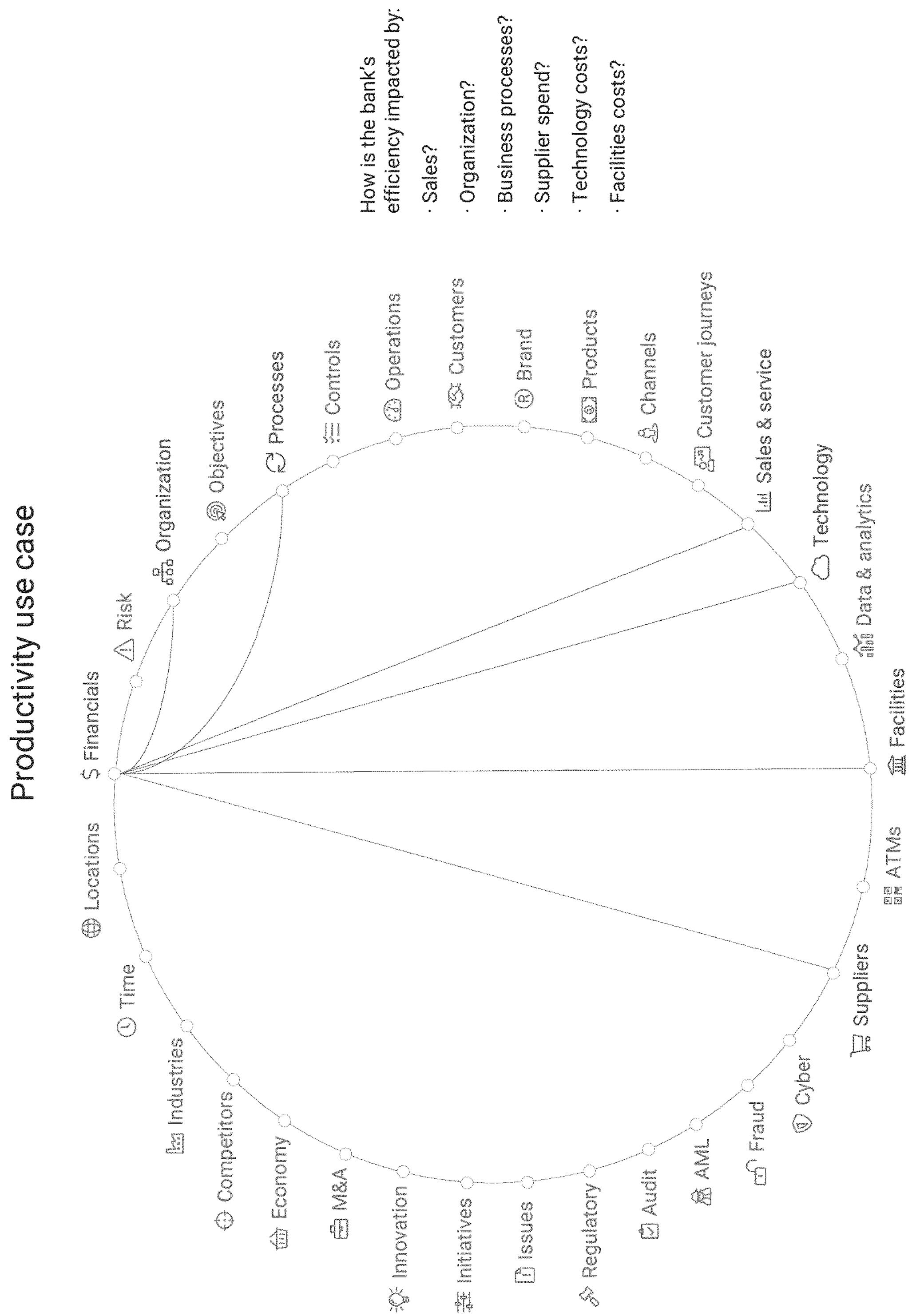
FIG. 62 illustrates examples of identifying the relationships between request and different domains, according to an embodiment.
Figure 63:
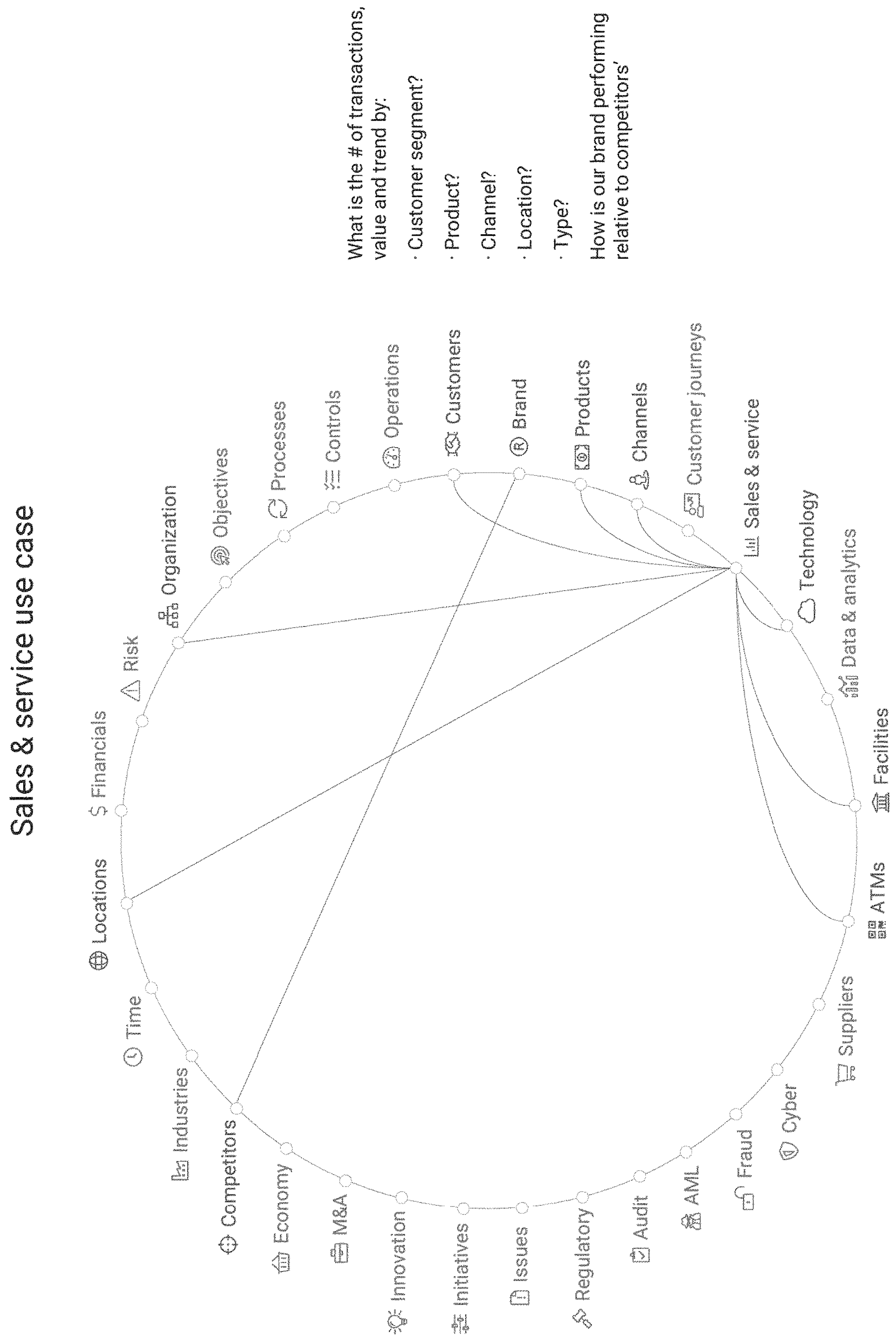
FIG. 63 illustrates examples of identifying the relationships between request and different domains, according to an embodiment.
Figure 64:
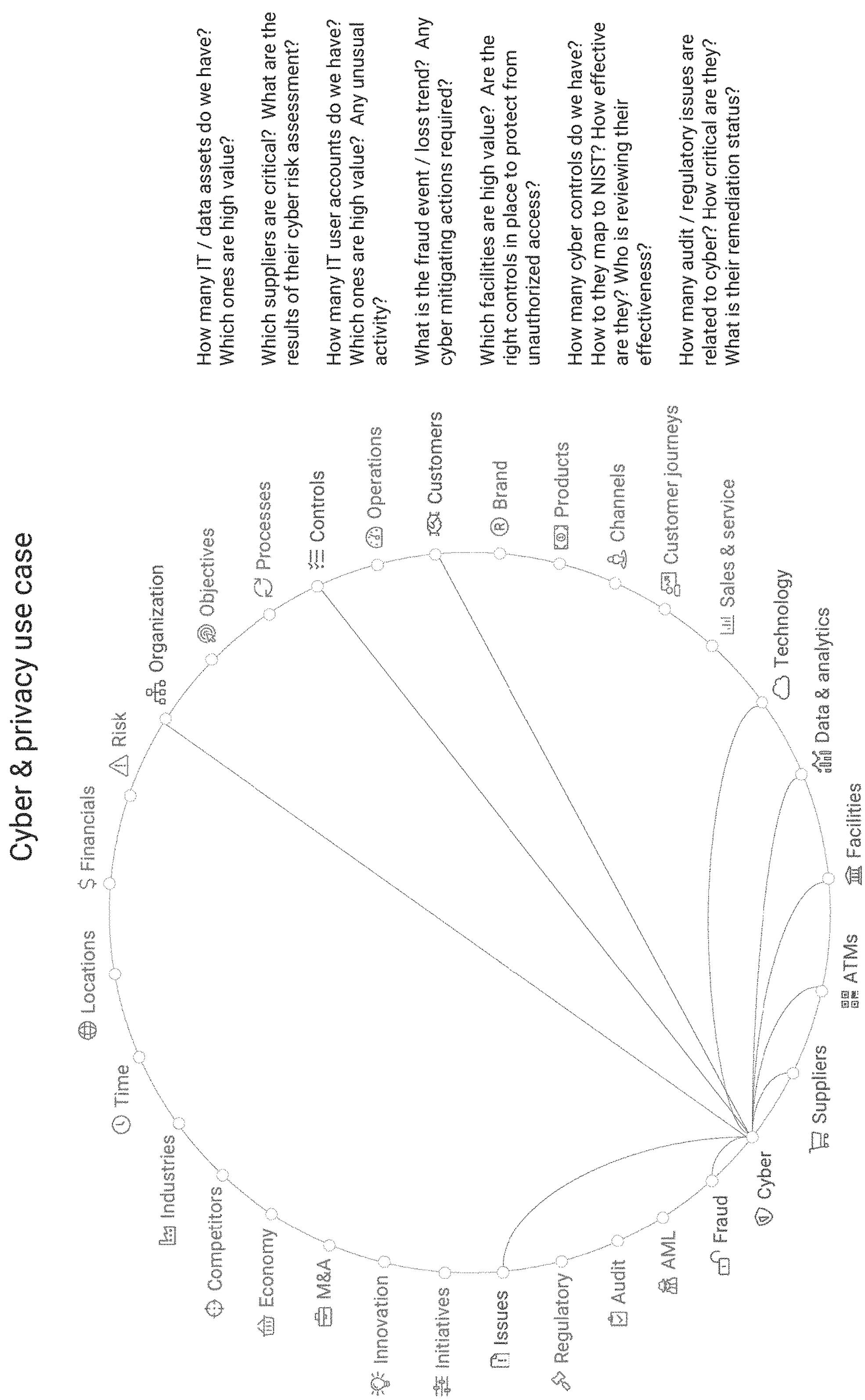
FIG. 64 illustrates examples of identifying the relationships between request and different domains, according to an embodiment.

Referring now to FIGS. 62-64, examples of the analytics server identifying the relationships between request and different domains are illustrated. While these non-limiting examples illustrate how the analytics server identifies related domains, each figure illustrates requests pertaining to a different category. For instance, FIG. 62 illustrates domains related to "productivity," FIG. 63 illustrates domains related to "sales and customer experience," and FIG. 64 illustrates domains related to "cybersecurity and financial crimes."

As depicted in FIG. 62, when the analytics server receives a request ("how is the bank's efficiency impacted by technology cost"), the analytics server identifies that the request is related to the "technology" and "financial" domains. In another example and depicted in FIG. 63, when the user requests "how is our brand performing relative to competitors' brands?" the analytics server identifies the "competitors" and "brand" domains to be relevant to the user's request. In some configurations, the analytics server may also identify "sales" as a relevant domain. In yet another example and as depicted in FIG. 64, when the analytics server receives the depicted request ("How many IT/data assets do we have? Which ones are high value?"), the analytics server identifies "technology," "data & analytics," and "ATMs" domains as related to the user's request.

Figure 73A:
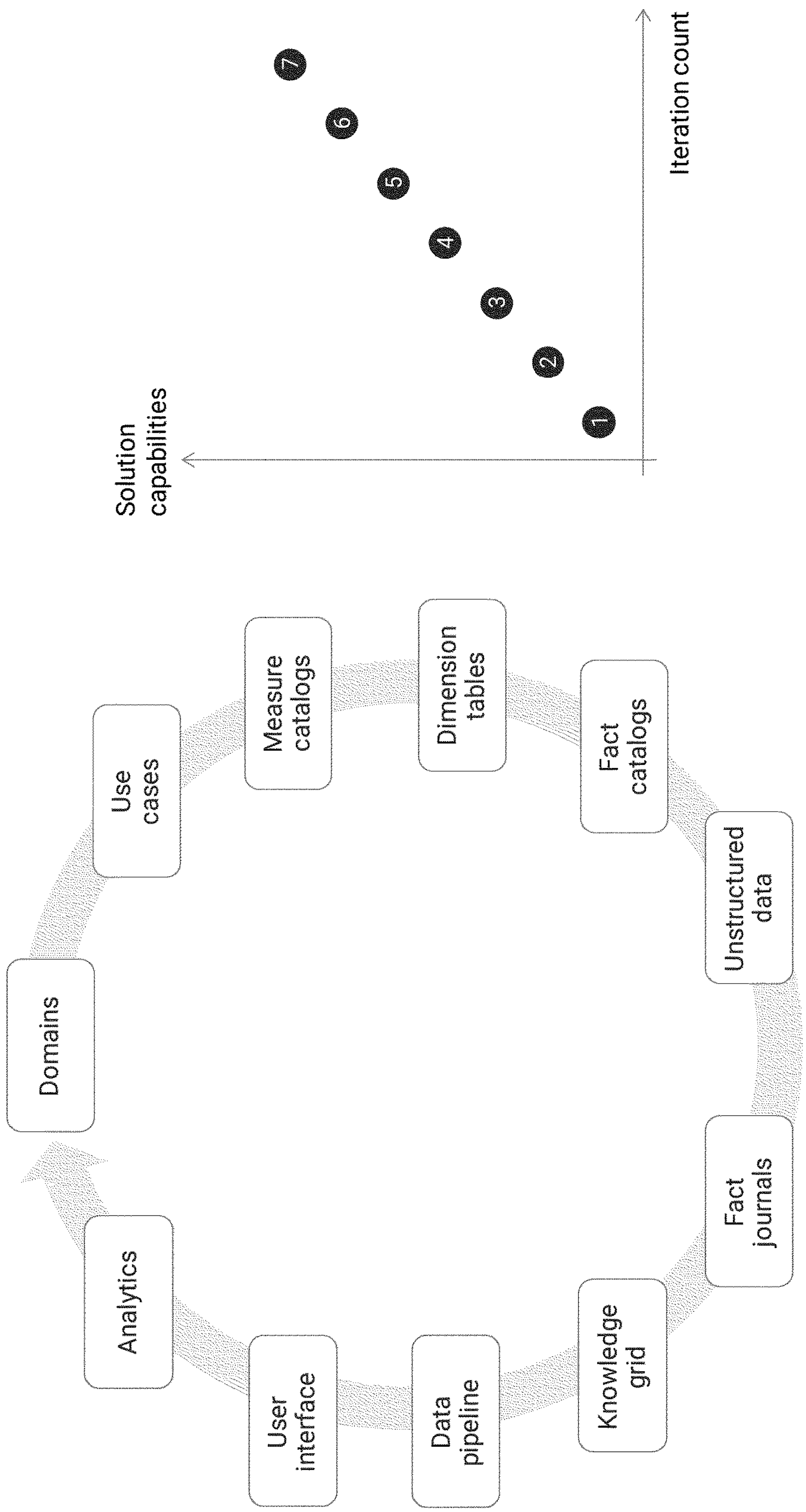
Figure 73C:
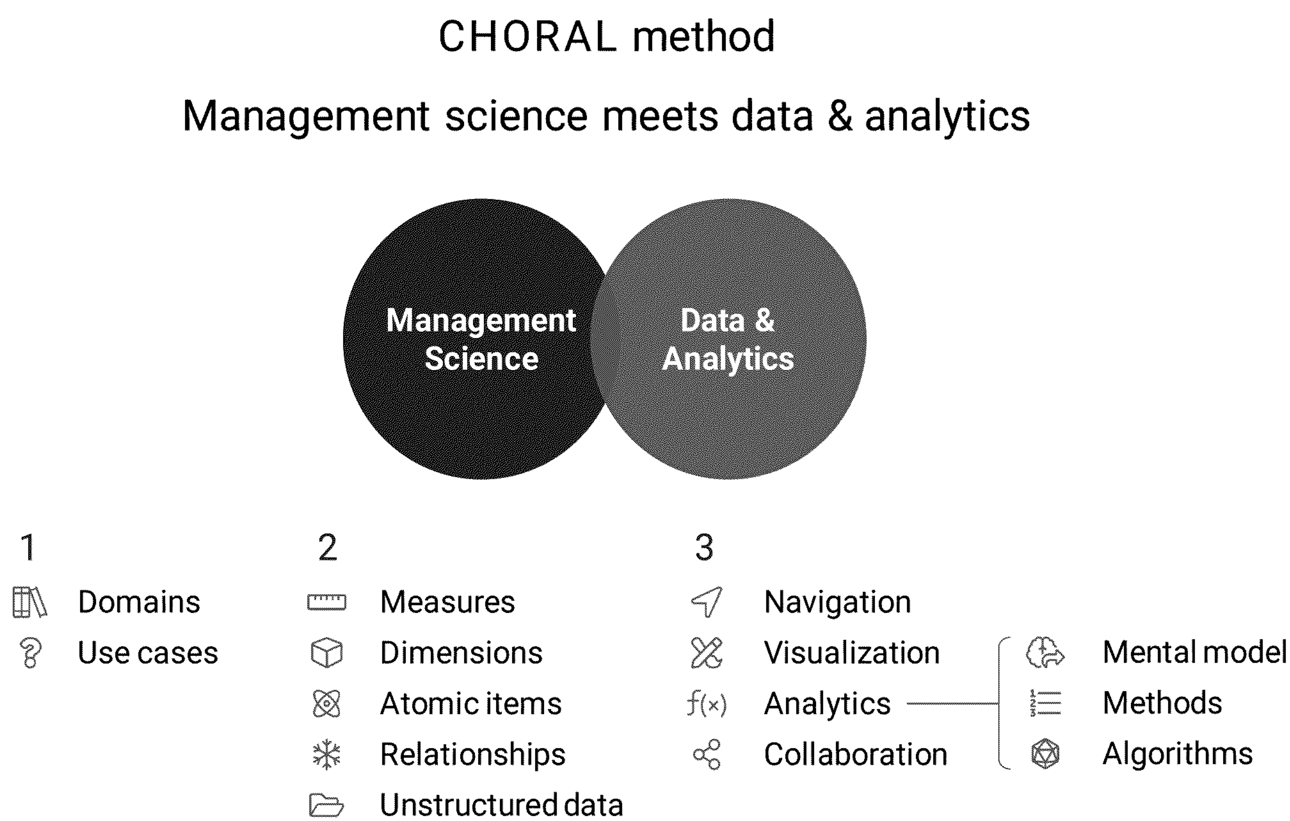
Figure 73D:
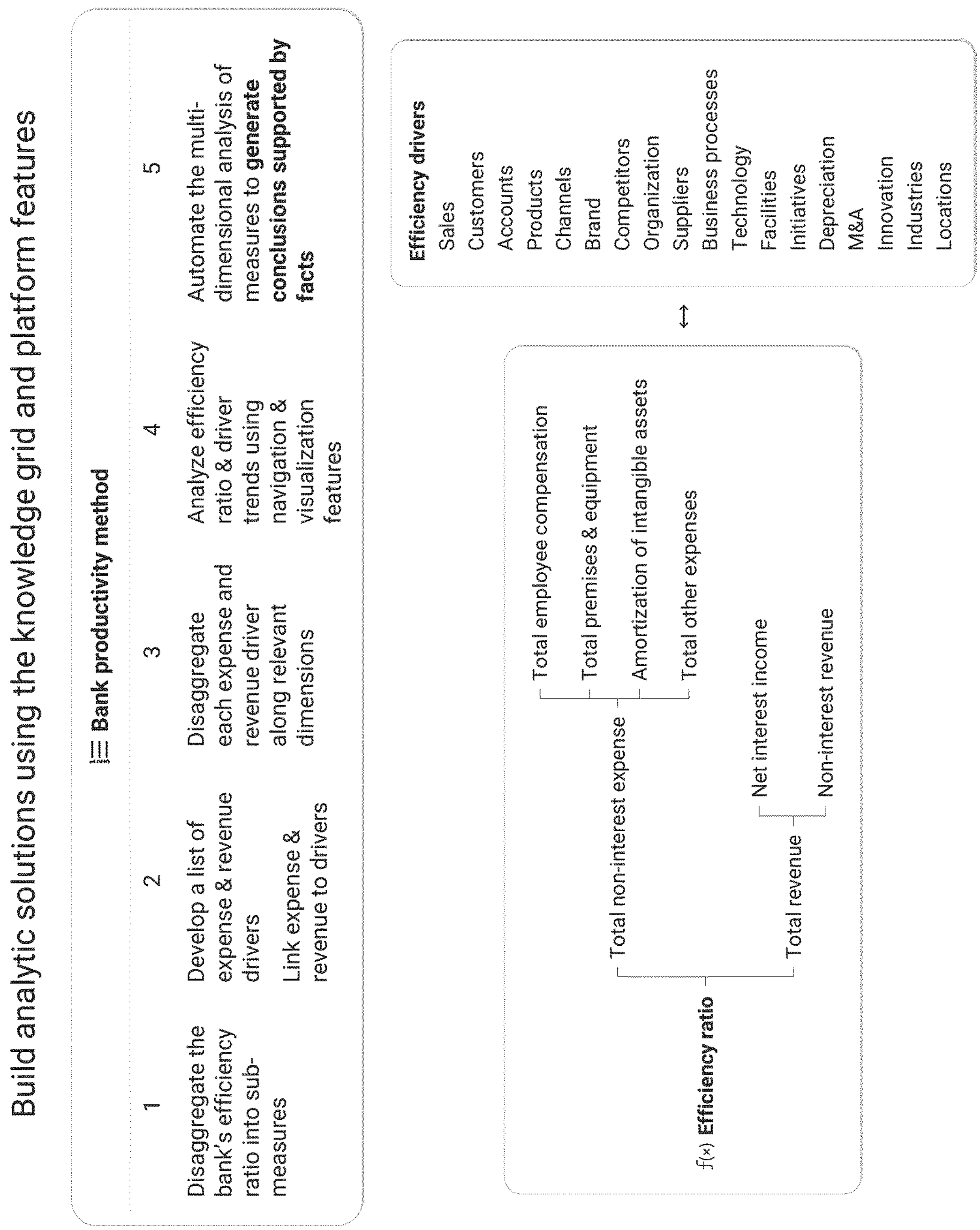

Referring back to FIG. 60, at step 6050 and as depicted in FIGS. 73A-D, the analytics server may iteratively analyze the data in accordance with the mental model and refine the solution by repeating the above-described steps. The analytics server may iteratively execute an analysis protocol on the data corresponding to the nodes within the identified nodal network. The analytics server may also display, on a graphical user interface of the user-computing device, data associated with the execution of the analysis protocol. FIGS. 73B-D illustrate an overall flowchart of how the method 6000 (also referred to as the method) operates and how the analytics server generates the analytic solution (e.g., analytics model or the mental model).

Given the complexity of the request, volume of data collected from disparate data sources, and different attributes of collected data, conventional software solutions have failed to provide efficient results. For instance, query-and-analyze methods utilized by conventional software solutions have faced great technical challenges because they attempt to satisfy user requests in a single step. The systems and methods disclosed herein use an iterative approach to solve complex problems/request more efficiently (using a multi-step approach where value is created at each step).

The analytics server may implement the methods and systems described herein through a series of steps. For instance, the analytics server may execute an analysis protocol that review the data corresponding to the identified mental model(s) to calculate results. At each step, one or more parts of the intelligent data analysis system are enhanced to make the system more powerful. In a non-limiting example, with each iteration the analytics server may add measures and measure groups to different data tables. This enhances the scope of analysis.

The analytics server may also add a dimension with each iteration, which enables analysis of the existing knowledge grid with additional pivots, filters, and drill downs, enabling further insights into the data. With each iteration, the information captured in journals may be enhanced. For example, the analytics server may generate and capture additional fields in the journal of transactions or events. Moreover, additional journals may be added to collect new types of transactions and events. With each iteration, the analytics server may enhanced the information attached to each atomic item (e.g., attributes for each customer and/or attributes for each employee). With each iteration, additional views, diagrams, mental models and/or methods may be added. Furthermore, the analytics server may update the navigation system (Path) with each iteration to provide users with additional ways to traverse the knowledge grid or the nodal structure. In a non-limiting example, the analytics server may iteratively assign the collected to different data tables where with each iteration, the analytics server assigns the collected data to an additional data table. For instance, during the first iteration, the analytics server may assign a file to a dimension, during the second iteration, the analytics server may assign the same file to a FC.

In some configurations, an atomic item refers to an FC. Atomic item catalogs are catalogs that contain concepts of the following types:

people: employees, contractors, global resources, customers, and individuals;

entities: customer-entities, suppliers, regulators, and competitors;

things: facilities, and ATMs;

abstract concepts: risks, regulations, applications, controls, and processes;

atomic items enable the analytics server to drill-down features (e.g., domains) to the most granular level. For instance, the analytics server may drill-down measures number of FTE by first reducing the number of FTEs as follows:

number of FTE by type: employees and contractors reduced by DT (resource type)

number of FTE by location: FTEs in a specific locations reduced by DT (locations)

number of FTE by job family: FTE reduced by DT (job family)

Once the analytics server reduces the total number of FTEs to a specific number of FTEs is a specific dimension (using the method illustrated by the examples above), the analytics server may further drill down to any granular level desired by the user.

Because all parts of the nodal structure are standardized, a large number of users can work in parallel on the above improvements and a single integration team can create the logical linkage across domains in the user interface described above. The resulting system provides a unified navigation, visualization, analytics, and collaboration tool. This iterative approach may be used to systematically improve the knowledge grid.

Upon executing the analysis protocol, the analytics server may display the results as described in FIGS. 5-47.

In an example, the analytics server collects data from disparate electronic data sources including entity computers, different branches, and other internal and external data sources. The analytics server parses and disaggregates the collected data into different data tables (e.g., domains, DT, FC, FJ, and MC). The analytics server systematically organizes the data by storing the data into different data tables. The data within the data tables share one or more attributes and each data tables defines the attribute common among its data, related data tables, and one or more adaptors. The adaptors define how, when, and where the data is to be collected. The analytics server then generates a nodal structure where each node represents a file (or other collected data). The nodal structure (knowledge grid) represents all the collected data. The analytics server also links different nodes in accordance with their respective data tables and attributes. Therefore, the knowledge grid replicates how all the collected data is stored within different data tables. The analytics server may automatically and/or iteratively collect data and assign the data to different data tables in accordance with adaptors, related data tables, and translations rules.

The analytics server may also generate a set of mental models. A mental model is a set of related and linked nodes (within the nodal structure or the knowledge grid) that represent an analytical solution to a problem or a request. For instance, to identify how sales impacts productivity, the analytics server generates a mental model that comprises data corresponding to financial sales and service domains. The mental model also comprises all the related data tables (FC, FJ, and other data tables). The analytics server may generate multiple mental models where each mental model is tailored towards a specific category, problem to be solved, and/or request to be satisfied. Each mental model comprises a subset of nodes (e.g., a portion of nodes within the knowledge grid) that are inter-connected based on their respective data tables.

When the analytics server receives a request from a user, the analytics server parses the request to identify a corresponding mental model. For instance, if the user requests the analytics server to identify how sales have affected productivity, the analytics server retrieves the mental model corresponding to sales affecting productivity. The analytics server then analyzes the collected data in accordance with the mental model and displays results accordingly. Because mental models are standardized, the analytics server may use the same mental model for different domains.

Figure 74A:
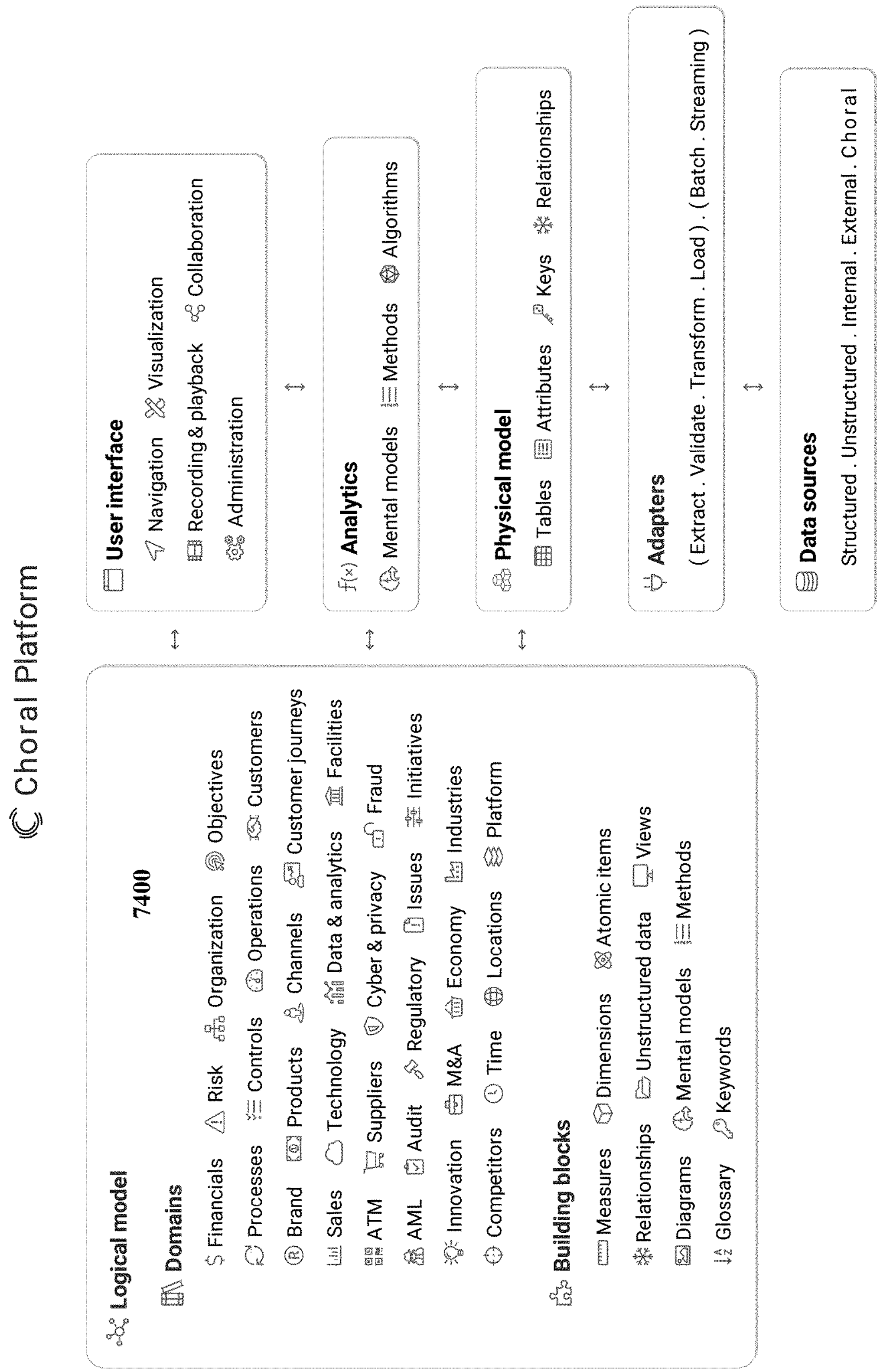
FIGS. 74A-B illustrates an overall diagram describing the disclosed platform (the platform generated, updated, and displayed by the analytics server), according to an embodiment.
Figure 74B:
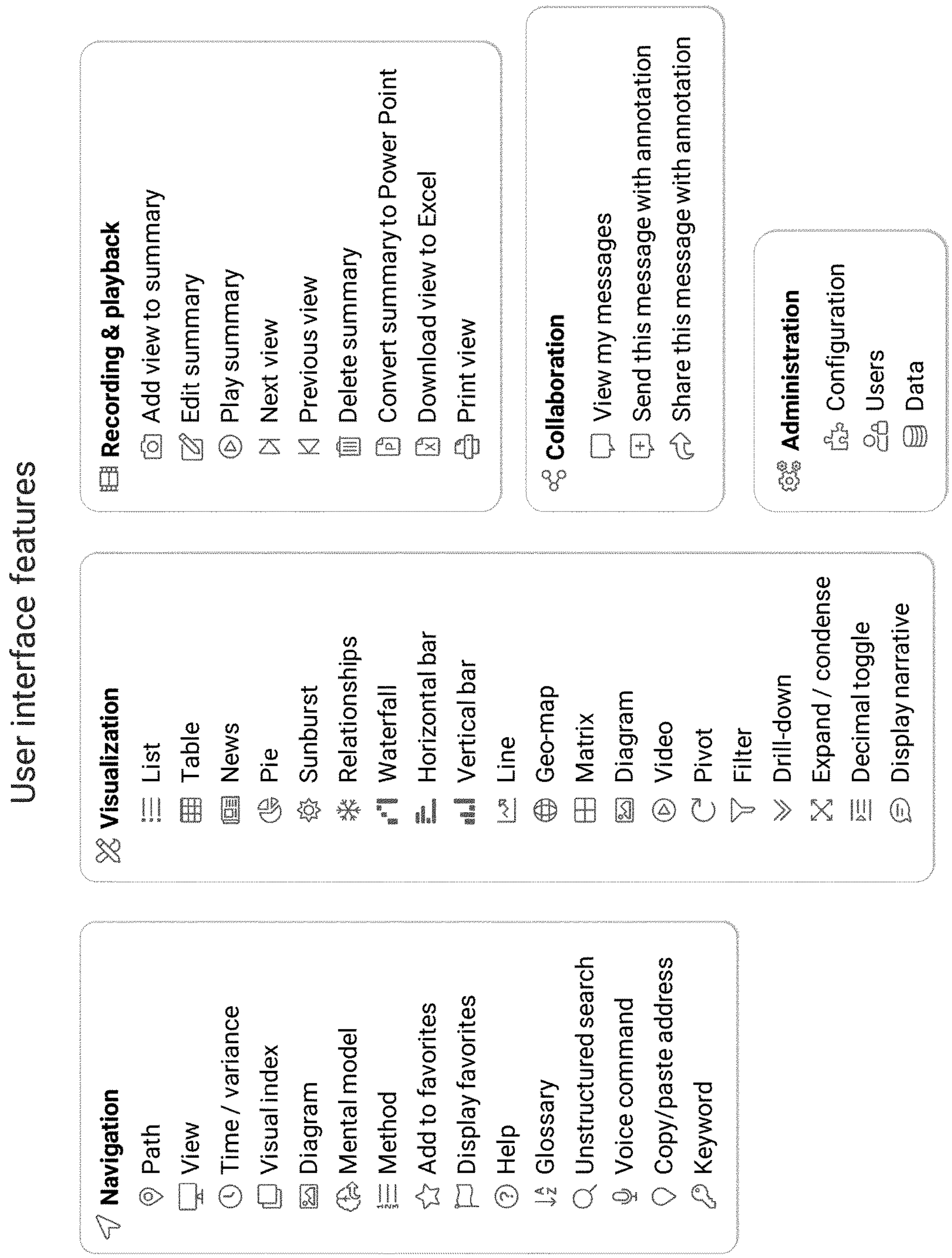
Figure 75A:
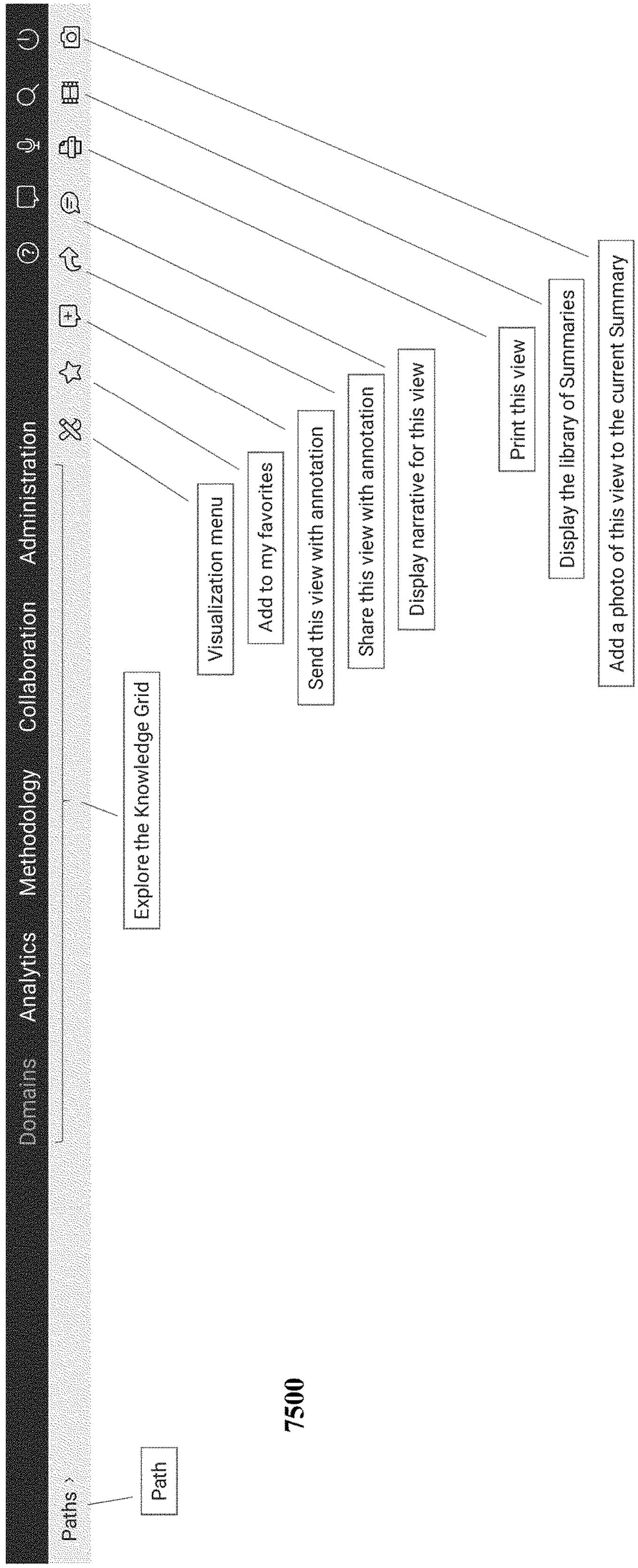
FIGS. 75A-F illustrate an example of traversing (analyzing and viewing) the data associated with the nodal data structure, according to an embodiment.
Figure 75B:
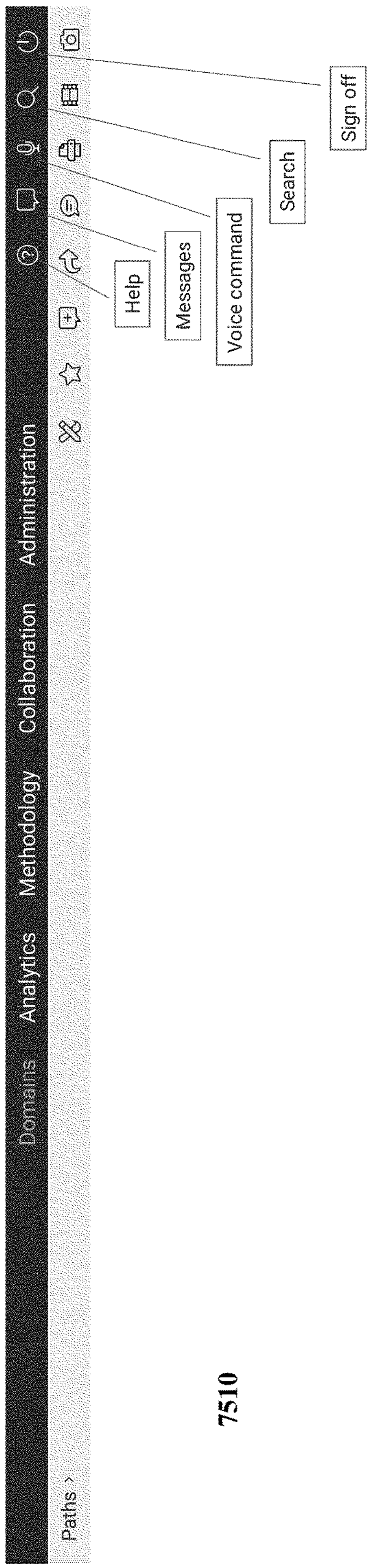
Figure 75C:
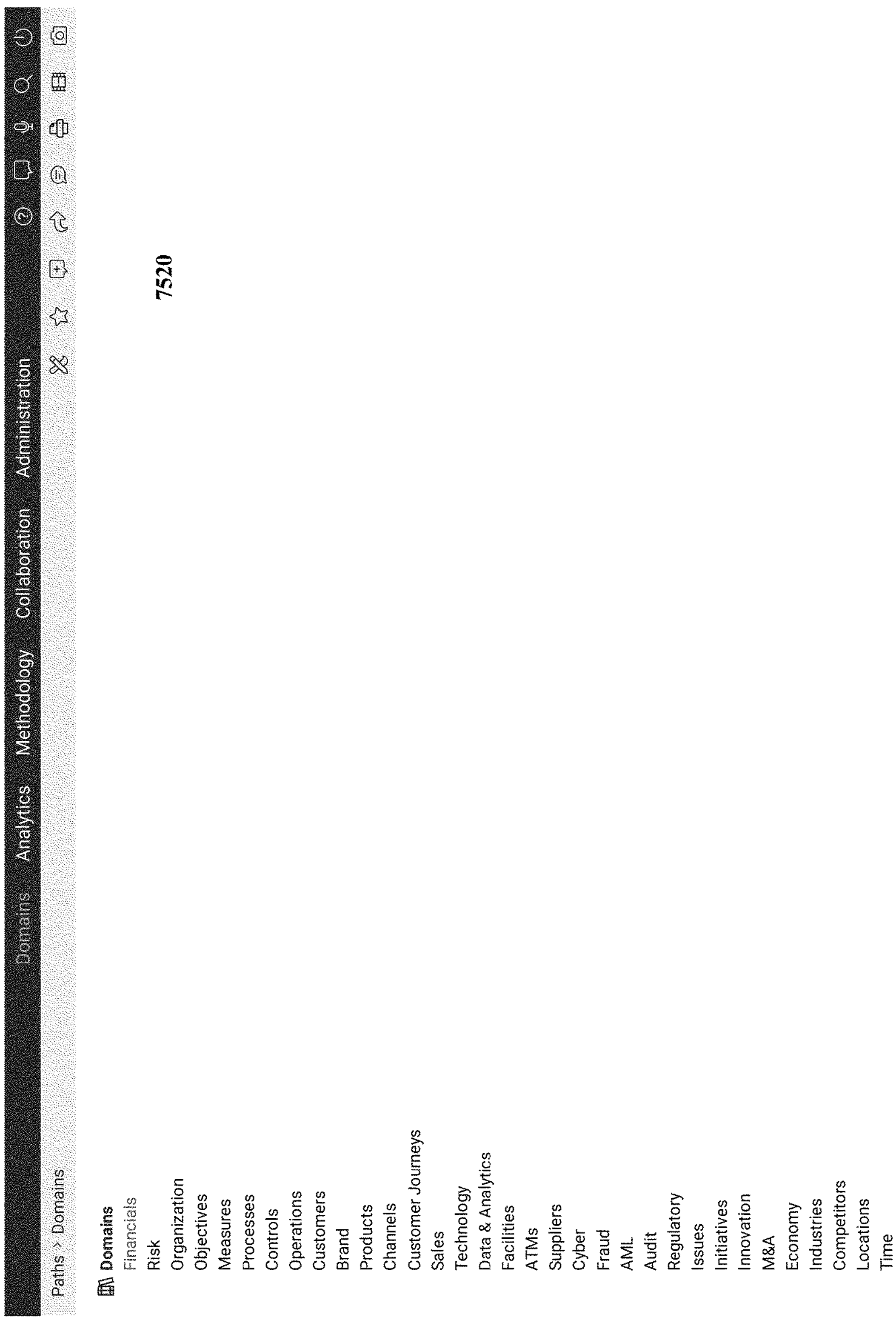
Figure 75D:
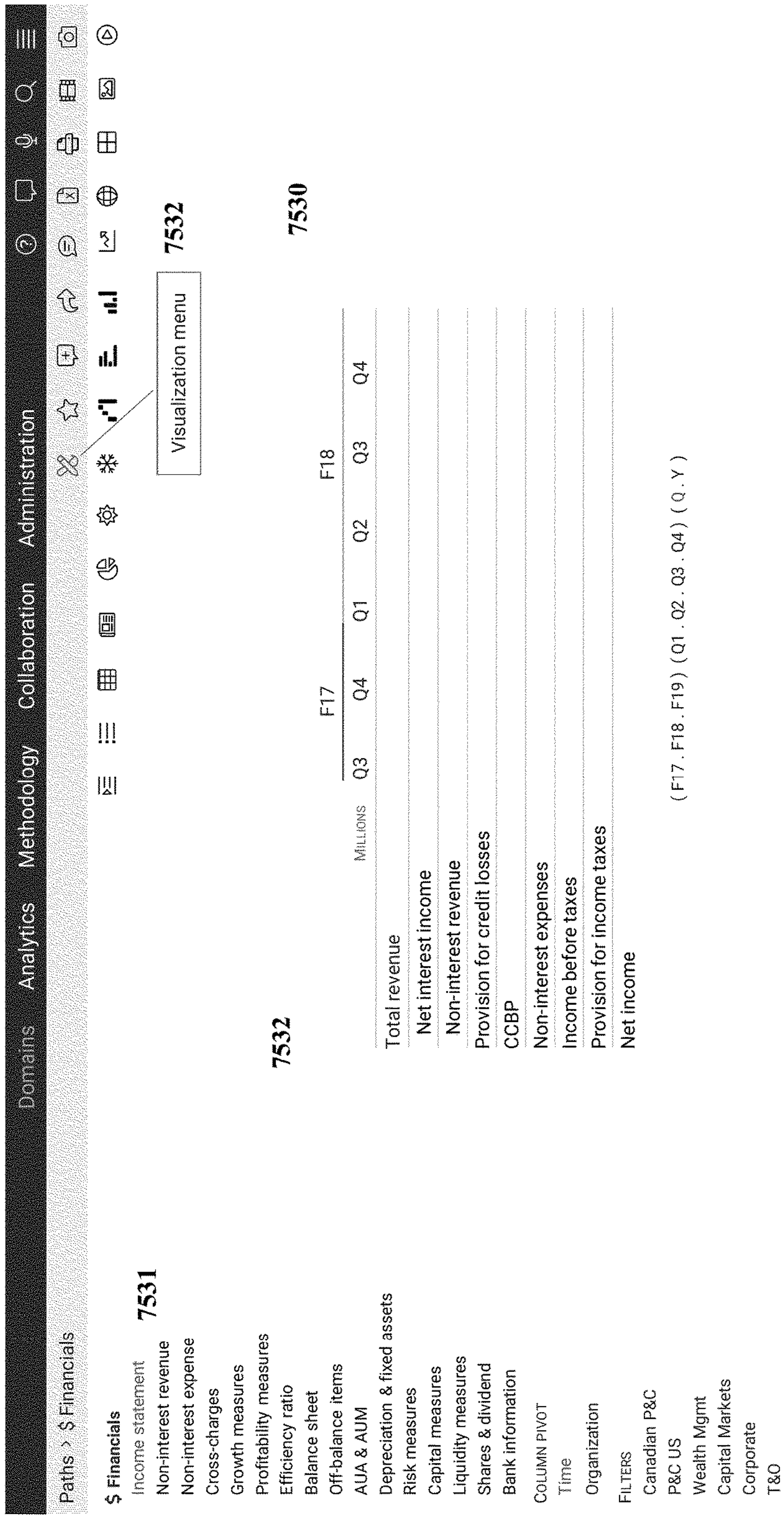
Figure 75E:
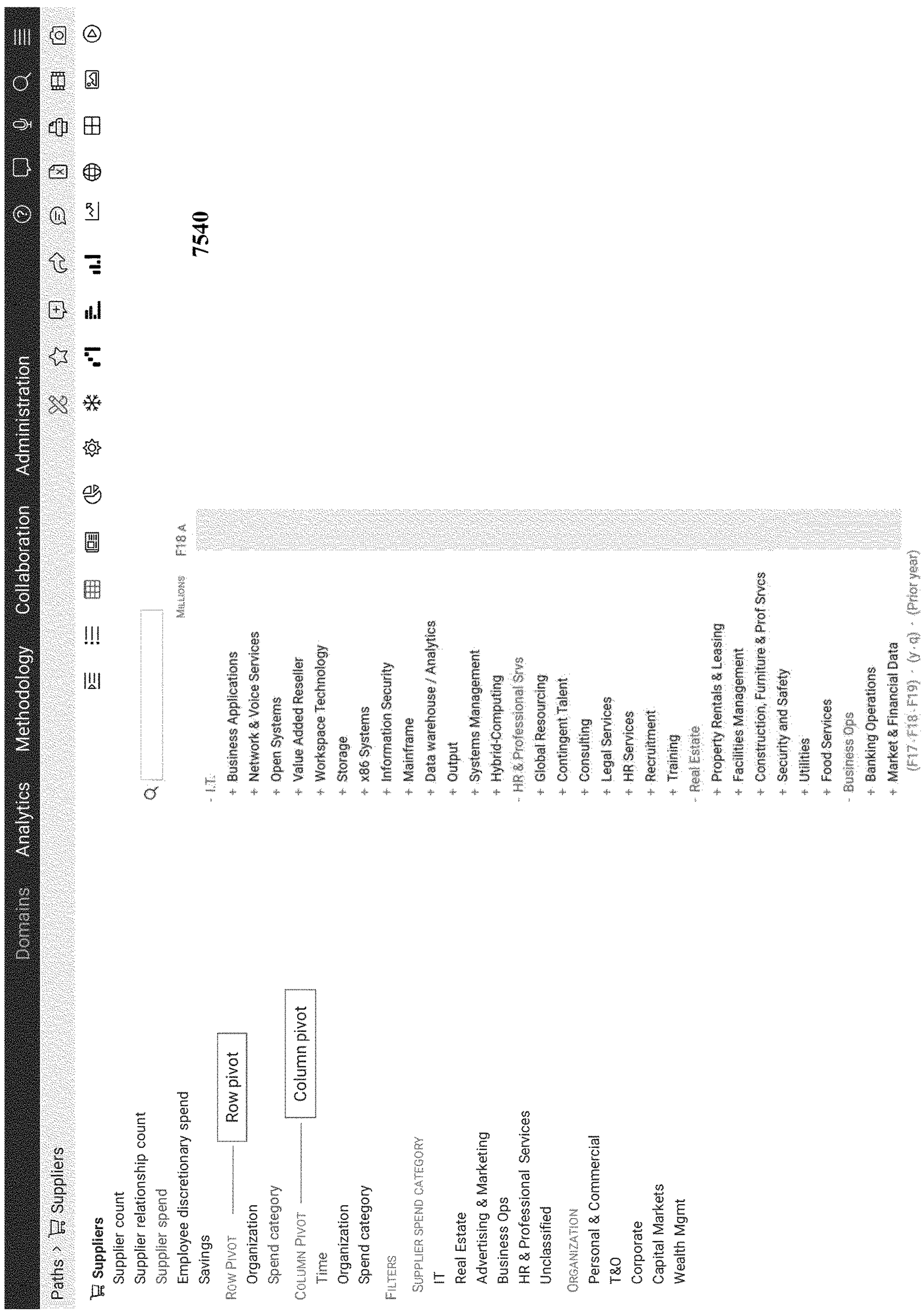
Figure 75F:
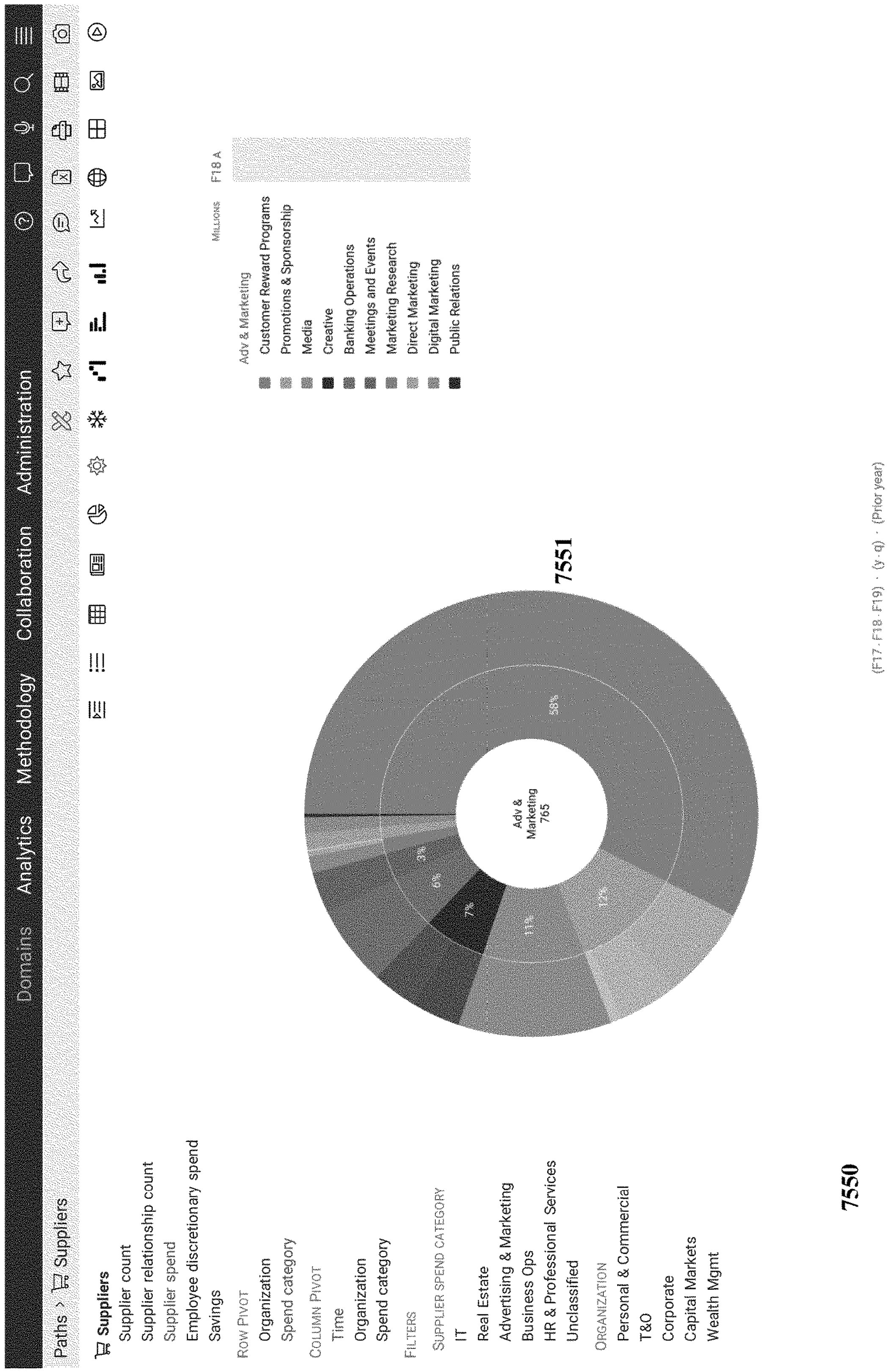

Referring now to FIGS. 74A-B, an overall diagram describing the disclosed platform (the platform generated, updated, and displayed by the analytics server) is illustrated. For instance, the analytics server generates the logical model 7400 (i.e., nodal structure) using various building blocks (e.g., various data tables and data structures) described above. The analytics server may continuously update the logical model using different adaptors collecting data from various data sources. The analytics server also displays the above-described user interfaces to allow users to view and interact with the data stored within the logical model in a more efficient manner. These features are also reiterated in FIG. 74B. Also as described above, the analytics server may provide data insights and analytics using various methods, such as by generating mental models defining relationship between various nodes representing the collected data. In this figure, the physical model represents the technical implantation of the logical model.

Figure 76:
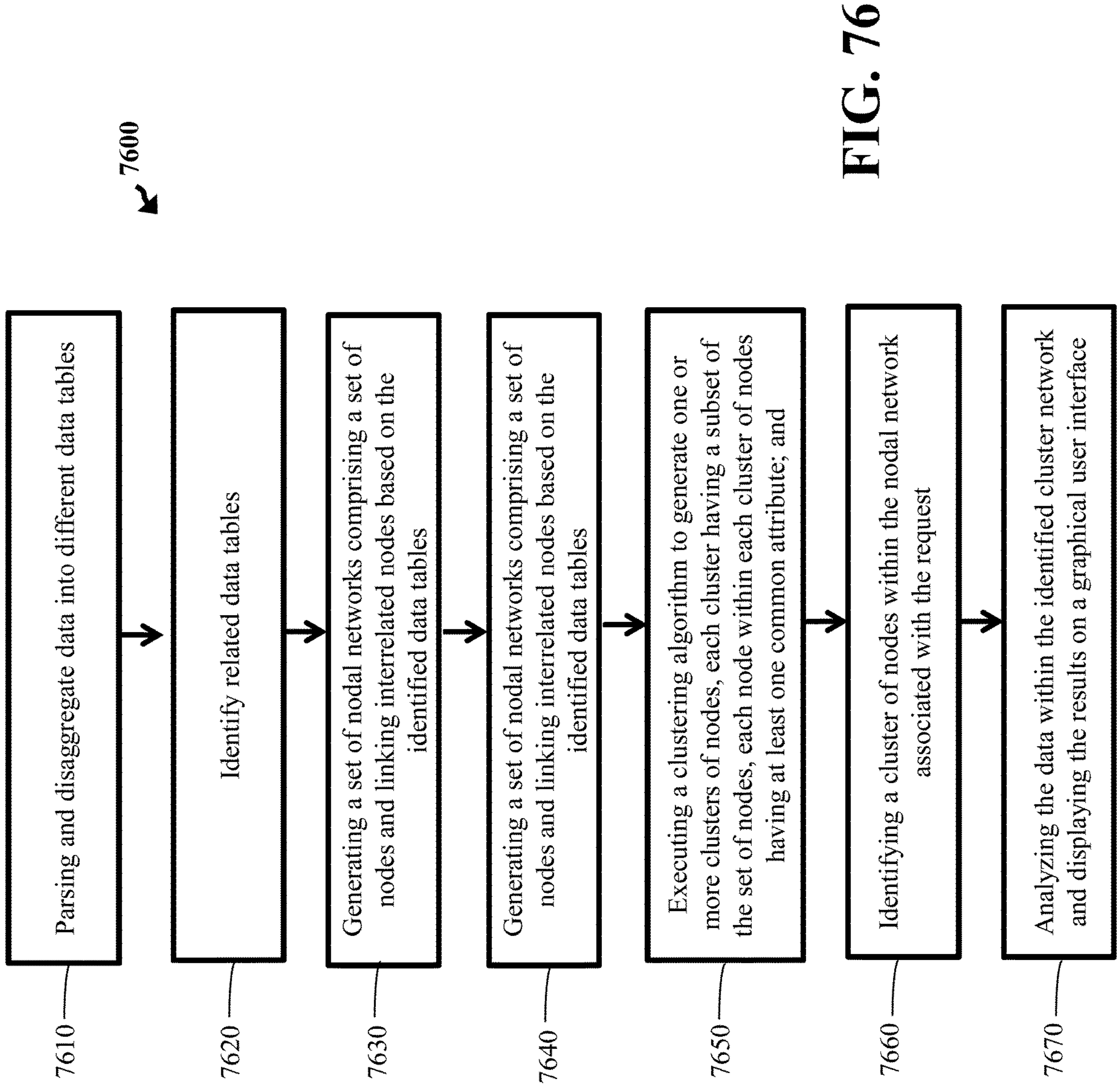
FIG. 76 illustrates a flow diagram of a process executed by an intelligent data analysis system, according to an embodiment.

FIG. 76 illustrates a flow diagram of a process executed by the intelligent data analysis system, according to an embodiment. The method 7600 includes steps 7610-7670. However, other embodiments may include additional or alternative execution steps, or may omit one or more steps altogether. The method 7600 is described as being executed by a server, similar to the analytics server described in FIG. 1. However, in some embodiments, steps may be executed by any number of computing devices operating in the distributed computing system described in FIG. 1. For instance, part or all the steps described in FIG. 76 may be locally performed by one or more user computing devices or an administrative computing device. Furthermore, even though some aspects of the method 7600 are described in the context of collecting and analyzing data associated with banking computing systems, it is expressly understood that method 7600 is applicable to collecting, structuring, and analyzing any data.

As described above, the analytics server may collect data from various computing devices and electronic data sources to generate a nodal network (knowledge grid). Having this nodal network and organizing the data according to the various data tables described herein (e.g., domain tables, dimension tables, and various fact journals described herein) allows the user to navigate vast structured and/or unstructured data in a more systematic and efficient manner than possible with conventional methods and systems. In addition to structuring the data and as described in method 7600, the analytics server may also create relationships and identify insights using the data structure described above. These insights may be generated in a systematic and standardized method and may be used cross entities and/or domains.

The analytics server may generate mental models and/or physical data models to better create insights and apply those insights to data (e.g., analyze the data). For instance, a user may request the analytics server to analyze how a marketing campaign has affected sales in a specific branch. The analytics server may implement the methods and systems described herein (e.g., method 6000) to analyze relevant portions of the nodal network and develop insights. The analytics server may also apply the mental models to other domains. For instance, the analytics server may generate a domain-specific mental model comprising related nodes and data tables that represent an analytic solution. The analytics server can execute analysis protocols to develop insights by using data corresponding to the mental model. Once the mental model is developed and iteratively refined, the analytics server may use this model to identify insights for other domains. The analytics server may also use the mental model to collect data more efficiently.

Methods and systems of parsing data, generating various data tables, and generating a nodal network have been described above (e.g., FIGS. 1-4 and FIG. 60). In method 7600, the analytics server may cluster the nodes into various clusters and only analyze nodes that are relevant to the cluster of nodes. In this way, the analytics server is not required to analyze all related nodes, which may lead to a more efficient analysis of data (e.g., less computing resources needed and less time to analyze relevant data). At steps 7610-7640, the analytics server may parse and/or disaggregate data and generate a nodal network associated with the data.

At step 7650, the analytics server may receive a request from a user computing device and may parse the request to identify a cluster of nodes associated with the request. The analytics server may receive a request from the end user to perform various analytical protocols regarding attributes associated with the nodal network. The end user may transmit a request to the analytics server to run a predetermined protocol on the data stored within the nodal network. For instance, the end user may request the analytics server to perform profitability analysis for an entity where the entity's data is organized using the methods and systems described above (e.g., within a nodal network). The predetermined protocol (e.g., profitability analysis) may refer to one or more predetermined protocols (e.g., analytical models, artificial intelligence models, and analytical algorithms). In some configurations, the analytics server may receive the predetermined protocol from a different server (e.g., third-party server) or the end user. In some configurations, the analytic server may generate the protocol itself or retrieve it from a database.

In some configurations, the analytics server may retrieve the predetermined protocol and apply the analytical protocols (e.g., models) to the data stored within the nodal network. However, analyzing the data within the entire nodal network may require high processing power and processing time. In order to reduce the processing power needed and/or the processing time, the analytics server may utilize the method 7600 to prioritize various nodes (and their respective data). As described herein, the analytics server may then analyze the data associated with the prioritized nodes.

Figure 77:
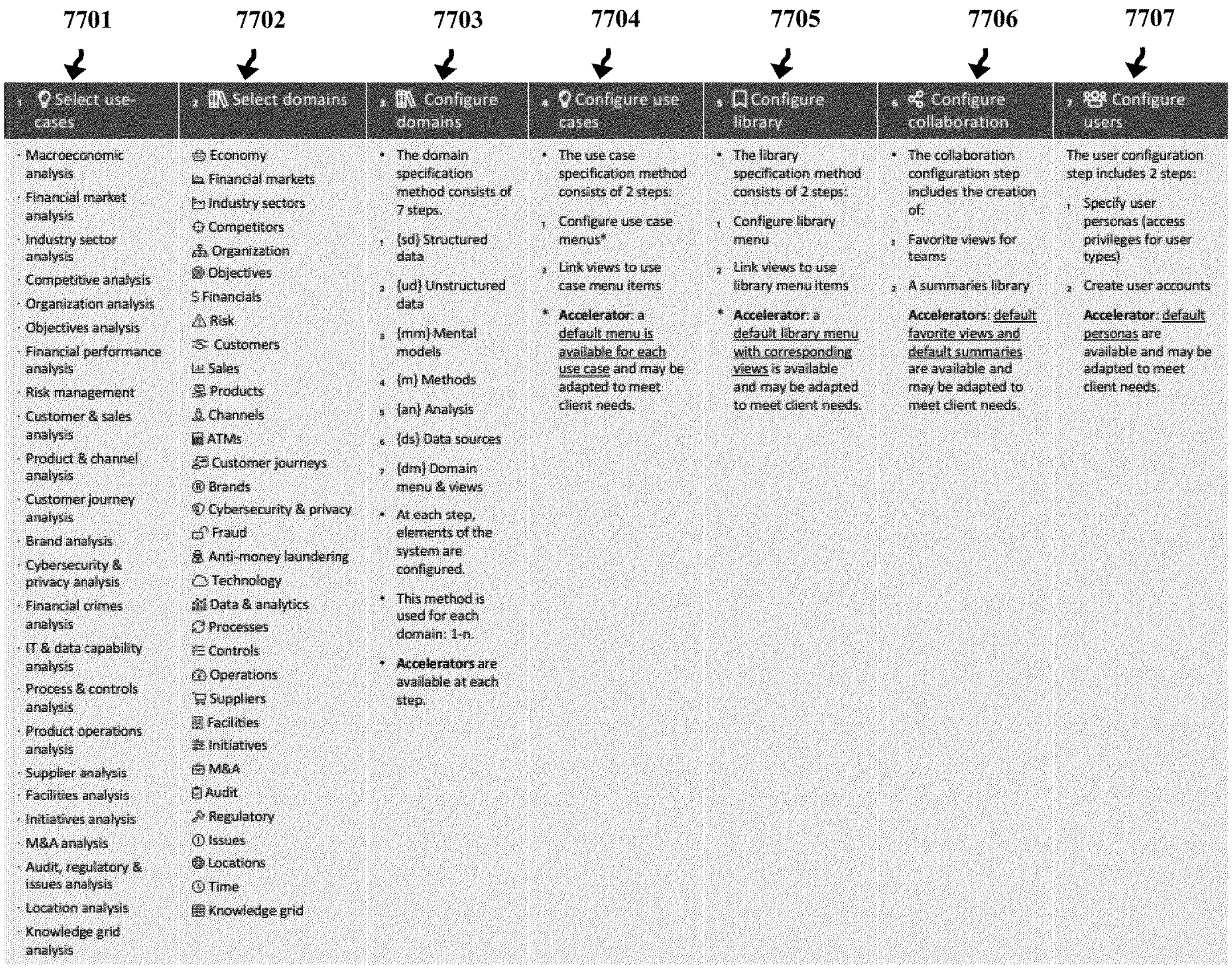
FIG. 77 illustrates a visual representation of a non-limiting example of data prioritization, according to an embodiment.

The analytics server may also parse the end user's request to further identify the prioritized nodes and the predetermined protocol. For instance, as will be described in FIG. 77, the end user may utilize a graphical user interface to input various data attributes and protocols.

At step 7660, the analytics server may execute a clustering algorithm to generate one or more clusters of nodes, each cluster having a subset of the set of nodes within the nodal network, each node within each cluster of nodes having at least one common attribute.

The analytics server may execute one or more clustering algorithms to cluster the nodes based on the attributes received within the request (e.g., step 7650). Each cluster may comprise at least one node within the set of nodes of the nodal network. To generate a number of clusters, the analytics server may calculate a multidimensional distance value between each node within the nodal network. Each distance may correspond to an attribute of (e.g., data stored within) each node. The analytics server may assign a cluster to each node based on its respective distance to other nodes, and iteratively repeat calculating the distance value and assigning each node to a cluster until the distance values of nodes within each cluster satisfy a distance threshold. For example, the analytics server may execute a clustering computer model using the data for each node that corresponds to an attribute received within the request or otherwise inputted by the end user. The analytics server may cluster the nodes based on one or more attributes (e.g., single dimension clustering or multi dimension clustering). For clarity, the clustering is described in the context of a single dimension. However, a skilled artisan will recognize that the analytics server can execute multi-dimension clustering algorithms.

The analytics server may generate a number of clusters with each cluster including one or more nodes with similar attributes. By executing the clustering computer model, the analytics server may group the nodes into a number of clusters. Nodes in the same cluster may be more similar (e.g., having attributes with less distance) to each other than to those in other clusters.

In some embodiments, the analytic server may divide the set of nodes into a predetermined number of clusters (e.g., five or ten clusters). For example, the analytics server may receive a parameter for the number of clusters from an end user. The analytics server may iteratively execute the clustering computer model and only stop until the analytics server has reached the predetermined number of clusters and the nodes are assigned to at least one cluster. In some other embodiments, the analytics server may iteratively execute the clustering computer model and only stop until the distance values of nodes within each cluster satisfying a distance threshold. Alternatively, the analytics server may iteratively execute the clustering computer model until the distance values decreasing is less than a threshold or the distance values stop decreasing.

The distance between two nodes may represent a difference of two nodes with respect to one or more attributes. For example, a "spending distance" between two nodes representing two branches represents how similar the two nodes are with respect to spending (e.g., overhead). As described herein, the analytic server may utilize this distance to identify similar nodes and cluster nodes accordingly. Furthermore, because the analytics server considers more than one attribute when assigning nodes to different clusters, the analytics server may generate the distance representing more than one attribute. The analytics server may utilize any distance calculating technique, such as the Euclidean distance or any other distance calculation method, to generate the multidimensional distance value for each node. The Euclidean distance, as described and used herein, may be a "straight-line" distance between two nodes.

In some embodiments, the analytics server may use a non-hierarchical clustering method, such as K-means clustering algorithm, to generate a predetermined number of clusters. For example, the analytics server may generate 10 clusters. The analytics server may start with an initial set of cluster centers. The initial set of cluster centers may be 10 nodes randomly chosen from the set of nodes. The analytics server may calculate the Euclidean distance between each node to each of the centers. The analytics server may minimize the within-cluster scatter, which is the average distance for every node to its cluster center.

In Euclidean space, the within-cluster scatter is the sum of squared distances of each node to the cluster centers. Specifically, the analytics server may minimize the within-cluster scatter with the following two-step iterative process. In the first step, the analytics server may assign each node to its closest cluster center. In the second step, the analytics server may calculate the average location of all the nodes assigned to each cluster and move the cluster center to the average location (e.g., readjust the data point). By repeating this process, the analytics server may iteratively reassign the nodes to more appropriate clusters until either the algorithm converges (the assignment of each node stops changing) or the within-cluster scatter reaches a minimum distance value (e.g., stops decreasing).

In some configurations, the clustering algorithm implemented in the clustering computer model may be K-means clustering, mean-shift clustering, density-based spatial clustering of applications with noise, expectation-maximization clustering, hierarchical clustering, and any other clustering algorithms.

The analytics server may execute the above-described clustering protocols to identify a predetermined number/proportion of nodes that contain (e.g., or otherwise associated with) a predetermined proportion of the data. In some embodiments, the predetermined numbers may be received from the end user. For instance, the end user may require the analytics server to analyze the top 20 percent of nodes that contain 80% of the data.

Upon identifying the nodes, the analytics server may retrieve data associated with the identified nodes. For instance, the analytics server may use the data retrieved to apply and execute the predetermined analytical protocol requested by the end user (step 7650).

At step 7670, the analytics server may display, on a graphical user interface of the user computing device, data associated with the nodes within the identified cluster of nodes. The analytics server may display the results of the execution of the analytical protocols on the graphical user interface. As described above, the analytical server may display various GUIs displaying the results requested by the end user.

Non-Limiting Example

In a non-limiting example, a user accesses a software generated by the analytics server that utilizes the methods and systems described herein to analyze various attributes of an entity. In this non-limiting example, the user requests the analytics server to execute profitability analysis and identify profitable areas within the entity. However, in other embodiments and examples, the user may request the analytics server to execute any analytical protocol.

As described above, the analytics server has generated a nodal network having nodes where the nodal network contains all relevant data associated with the entity. Furthermore, the nodal network may be organized in accordance with the above-described data tables.

The user may access a graphical user interface generated/updated by the analytics server. The user may then select a use case (step 7701). For instance, the user may select macroeconomic analysis, competitive analysis, or other options displayed on the GUI. In this non-limiting example, the user selects profitability analysis. Each analysis option displayed in the step 7701 represents an analytical protocol to be executed on a portion of the nodes within the nodal structure.

At steps 7702-3, the user may select and configure one or more domains within the nodal network. As depicted, the user may first select one or more domains of data (e.g., facilities, ATMs, sales, and financials). The user also selects structured and unstructured data. Simply put, the user may select these domains to view profitability analysis of all ATMs and branches.

After the user identifies the domains and use cases, the analytics server may execute various clustering algorithms to identify a subset of the nodes that contain a predetermined portion of the nodes. For instance, the analytics server first identifies nodes that correspond to attributes received in steps 7701-7703. The analytics server then clusters the identified nodes to identify the top 20% of the nodes that contain 80% of the data. Once the analytics server identifies these nodes, the analytics server retrieves the data associated with the identified nodes. The analytics server then executes one or more analytical protocols identified in step 7701 onto the data retrieved and displays the results.

The displayed results can then configured and customized by the user (steps 7704-7707). For instance, the user can customize the views, data summarization, and select permissions and display preferences.

Figure 78:
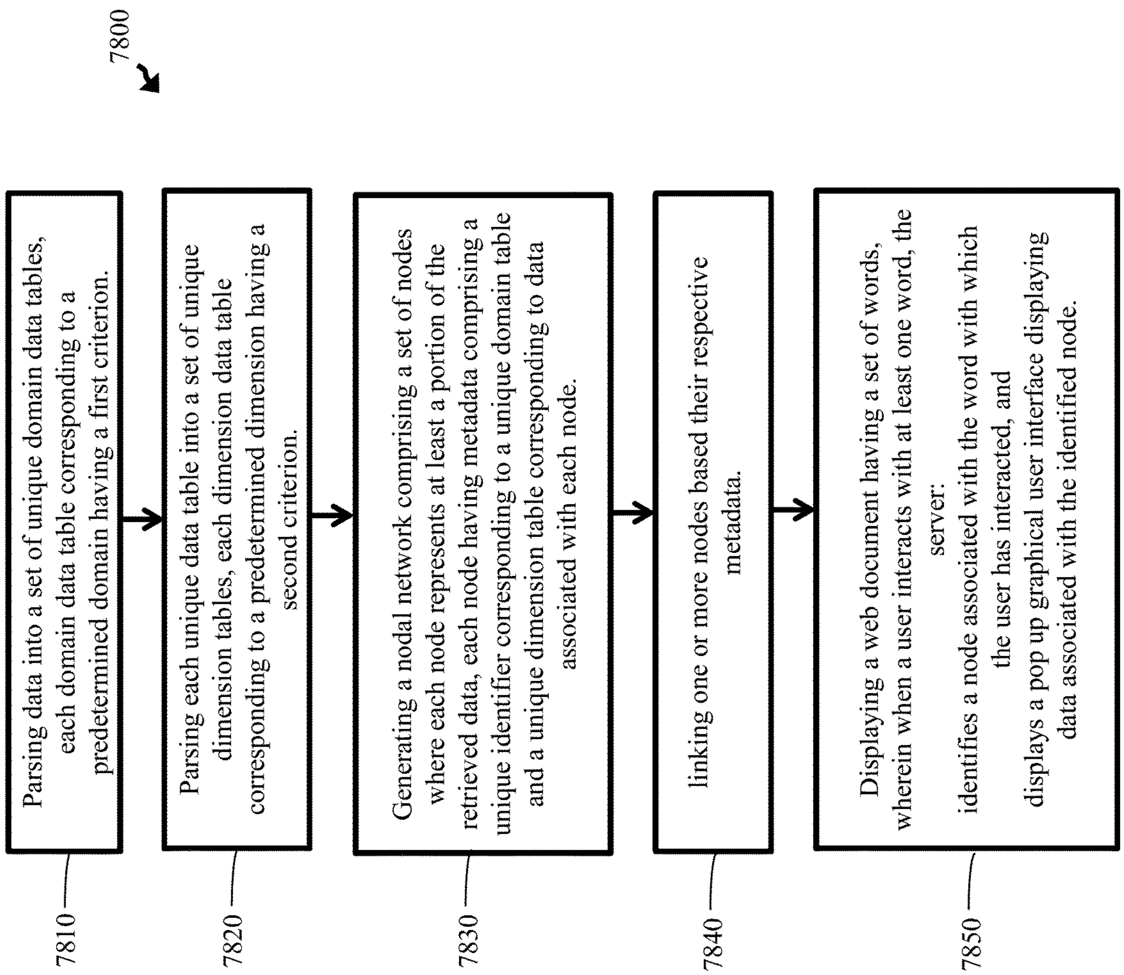
FIG. 78 illustrates a flow diagram of a process executed by an intelligent data analysis system, according to an embodiment.
Figure 79:
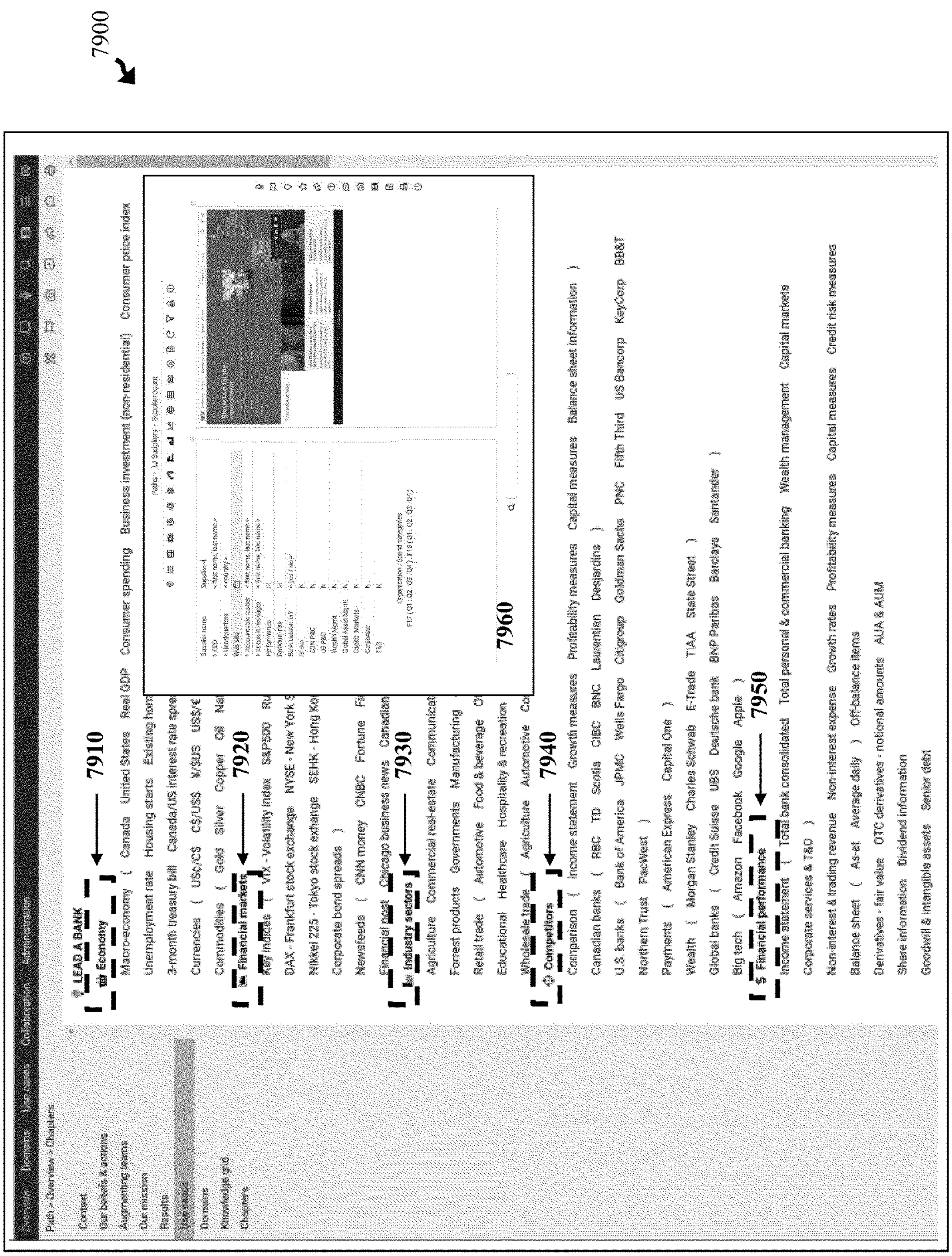
FIG. 79 illustrates a visual representation of a non-limiting example of data prioritization, according to an embodiment.

FIG. 78 illustrates a flow diagram of a process executed by the intelligent data analysis system, according to an embodiment. The method 7800 includes steps 7810-7850. However, other embodiments may include additional or alternative execution steps, or may omit one or more steps altogether. The method 7800 is described as being executed by a server, similar to the analytics server described in FIG. 1. However, in some embodiments, steps may be executed by any number of computing devices operating in the distributed computing system described in FIG. 1. For instance, part or all the steps described in FIG. 78 may be locally performed by one or more user computing devices or an administrative computing device. Furthermore, even though some aspects of the method 7800 are described in the context of collecting and analyzing data associated with banking computing systems, it is expressly understood that method 7800 is applicable to collecting, structuring, and analyzing any data.

As described above, the analytics server may collect data from various computing devices and electronic data sources to generate a nodal network (knowledge grid). Having this nodal network and organizing the data according to the various data tables described herein (e.g., domain tables, dimension tables, and various fact journals described herein) allows the user to navigate vast structured and/or unstructured data in a more systematic and efficient manner than possible with conventional methods and systems. In addition to structuring the data and as described in method 7800, the analytics server may also create relationships and identify insights using the data structure described above. These insights may be generated in a systematic and standardized method and may be used cross entities and/or domains.

The analytics server may generate mental models and/or physical data models to better create insights and apply those insights to data. For instance, a user may request the analytics server to analyze how a marketing campaign has affected sales in a specific branch. The analytics server may implement the methods and systems described herein (e.g., method 6000) to analyze relevant portions of the nodal network and develop insights. The analytics server may also apply the mental models to other domains. For instance, the analytics server may generate a domain-specific mental model comprising related nodes and data tables that represent an analytic solution. The analytics server can execute analysis protocols to develop insights by using data corresponding to the mental model. Once the mental model is developed and iteratively refined, the analytics server may use this model to identify insights for other domains. The analytics server may also use the mental model to collect data more efficiently.

Methods and systems of parsing data, generating various data tables, and generating a nodal network has been described above (e.g., FIGS. 1-4 and FIG. 60). In method 7800, the analytics server may cluster the nodes into various clusters and only analyze nodes that are relevant to the cluster of nodes. In this way, the analytics server is not required to analyze all related nodes, which may lead to a more efficient analysis of data (e.g., less computing resources needed and less time to analyze relevant data). At steps 7810-7840, the analytics server may parse and/or disaggregate data and generate a nodal network associated with the data.

At step 7850, the analytics server may display a web document having a set of words, wherein when a user interacts with at least one word, the server: identifies a node associated with the word with which the user has interacted, and displays a pop up graphical user interface displaying data associated with the identified node. The analytics server may first identify one or more nodes associated with the word with which the user has interacted. As described above, the analytics server may query the nodal network and display a word corresponding to a predetermine subset of the data. For instance, the analytics server, may execute the clustering algorithms described above and display words corresponding to the prioritized clusters (e.g., data tables).

The analytics server may display a web document on a graphical user interface (as illustrated and discussed above). The GUI may include various words where each word corresponds to one or more nodes (e.g., a cluster of nodes). In some embodiments, each word may correspond to a data table described above. For instance, each word may represent a dimension table, domain table, or other attributes of one or more data tables (e.g., different measures and/or atomic levels). The analytics server may display each word within the web document displayed on the GUI, such that enables the users viewing the GUI to interact with one or more words. For instance, the user may interact with (e.g., click, tap, or hover) each word.

When the user interacts with a word displayed within the web document, the analytics server may display a pop up graphical user interface (e.g., pop up window) displaying data associated with the identified node. In some configurations, the analytics server may generate a graphical user interface with the results of the analysis provided because of analyzing at least a portion of the nodal network. For instance, the analytics server may display a web page on the client computing device where one or more words are displayed in a visually distinct manner. When the analytics server identifies that the user has interacted with a word, the analytics server displays data (e.g., data generated as a result of executing one or more analytical protocols) on the web page.

Non-Limiting Example

The following example describes how multiple methods and systems described herein can store large volume of data associated with an entity and present the data without requiring high processing power. This non-limiting example described how a server could traverse and display data stored within the nodal network in an efficient manner.

In this example, all the entity data is stored within a conventional data repository (e.g., data lake). The analytics server first divides the data lake a predetermined number of domains. The analytics server may then model every domain uniformly to maintain consistency. Specifically, for each domain, the analytics server divides the data into different dimension tables. The dimension tables may describe the dimension for each segment of the data (e.g., file).

The analytics server may then decompose the data into various data tables (e.g., L1-LN structure). Once the analytics server identifies the corresponding dimensions, the analytics server creates the atomic items, which are the fact catalogues, or the FCs (as described above). For instance, the analytics server may divide the employees into different catalog data tables where each table will convey information associated with the employees (e.g., location, resource type, and/or organization of each employee). The analytics server may then generate journal data tables. Each journal data table includes transactional information and is associated either with just dimensions or with atomic items. The analytics server may then generate a nodal network (as described above) that represents the data lake.

Once the analytics server generates the nodal network, the analytics server may traverse, analyze, and display the data in a more efficient manner than possible with conventional querying systems. For instance, as described above, the analytics server can analyze a portion of the data in order to increase efficiency.

In this non-limiting example, the analytics server analyzes the data (or a portion of the data) using one or more analytical protocols. The analytics server then displays GUI 7900 that includes many interactive elements (e.g., words) displayed. The words may be organized based on their corresponding dimensions (or any other attribute within the nodal network). For instance, the words may be organized based on dimension indicators 7910-7950. In other configurations, the word can be organized based on their corresponding DT, FC, or any other data table. The words may also have corresponding detailed attributes. For instance, the analytics server may display macro economy, which is associated with the "economy" domain. The analytics server may display detailed words that focus on different attributes of macro economy, such as macro-economy in Canada, United States or macro economy associated with consumer spending.

When the user clicks on any of the words (or hovers over any of the words), the analytics server may identify data (within the nodal network) associated with the word and display the data (using various display methodologies described above) on a pop up window. In some embodiments, the analytics server may direct the user to a second GUI that displays one or more data visualization techniques described above. In some configurations, the analytics server may direct the user to a third-party website. In some configurations, the analytics server may provide "drill down" functionality in the pop up window (as depicted in pop up window 7960).

Figure 80:
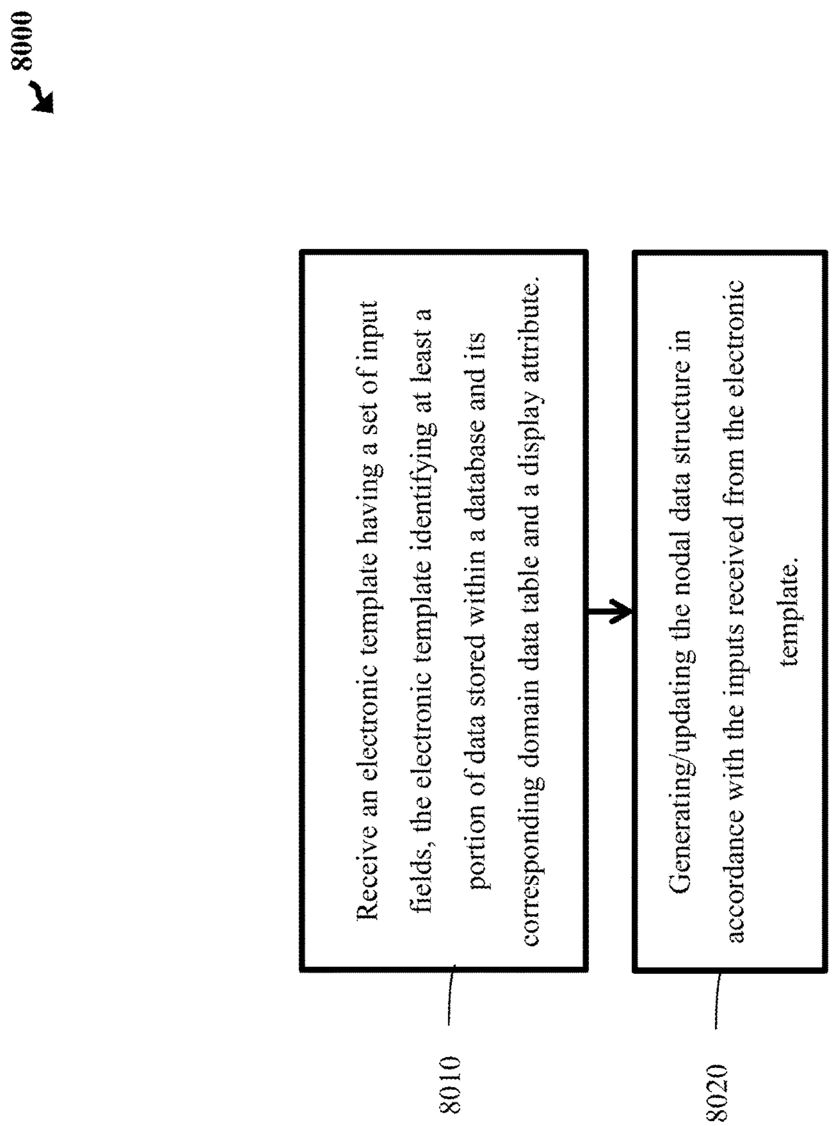
FIG. 80 illustrates a flow diagram of a process executed by the intelligent data analysis system, according to an embodiment.

FIG. 80 illustrates a flow diagram of a process executed by the intelligent data analysis system, according to an embodiment. The method 8000 includes steps 8010-8020. However, other embodiments may include additional or alternative execution steps, or may omit one or more steps altogether. The method 8000 is described as being executed by a server, similar to the analytics server described in FIG. 1. However, in some embodiments, steps may be executed by any number of computing devices operating in the distributed computing system described in FIG. 1. For instance, part or all the steps described in FIG. 80 may be locally performed by one or more user computing devices or an administrative computing device. Furthermore, even though some aspects of the method 8000 are described in the context of collecting and analyzing data associated with banking computing systems, it is expressly understood that method 8000 is applicable to collecting, structuring, and analyzing any data.

The method 8000 describes an embodiment where the methods and systems described herein can be implemented, such that the analytics server can access data, analyze the data, and display the results using the disclosed platform. At step 8010, the analytics server may receive an electronic template having a set of input fields, the electronic template identifying at least a portion of data stored within a database and its corresponding domain data table and a display attribute.

In order to utilize the analytical methods/systems described herein, the disclosed platform must manifest itself within a data lake (e.g., data stored within one or more data repositories). The platform must also be set up, such that it can identify data and generate the nodal data structure accordingly by arranging the data in various data tables described herein. Once the disclosed platform is set up (e.g., using the method 8000), the platform can automatically retrieve data, update the nodal data structure, analyze data in accordance with the methods and systems described herein, and display/visualize the results using the techniques described herein.

Conventional analytical platforms use a general-purpose analytical model, which suffers from various technical shortcomings. For instance, a "one solution fits all" approach does not account for data variances or data designations particular to each institution. In contrast, the disclosed platform engineers a solution using data models and analytical techniques that are customized by the end user (e.g., administrator customizing the platform for each institution).

The method 8000 may utilize the following components that are depicted in FIG. 81A, a solution library component, a user interface component, a data grid components (also referred to herein as the nodal data structure), and an authoring tool. The solution library itself may have the following components, as depicted in FIG. 81B: use cases, domains, and elements. The elements may be defined as the building blocks of domains, and the domains may be defined as the building blocks of the use cases.

Figure 82A:
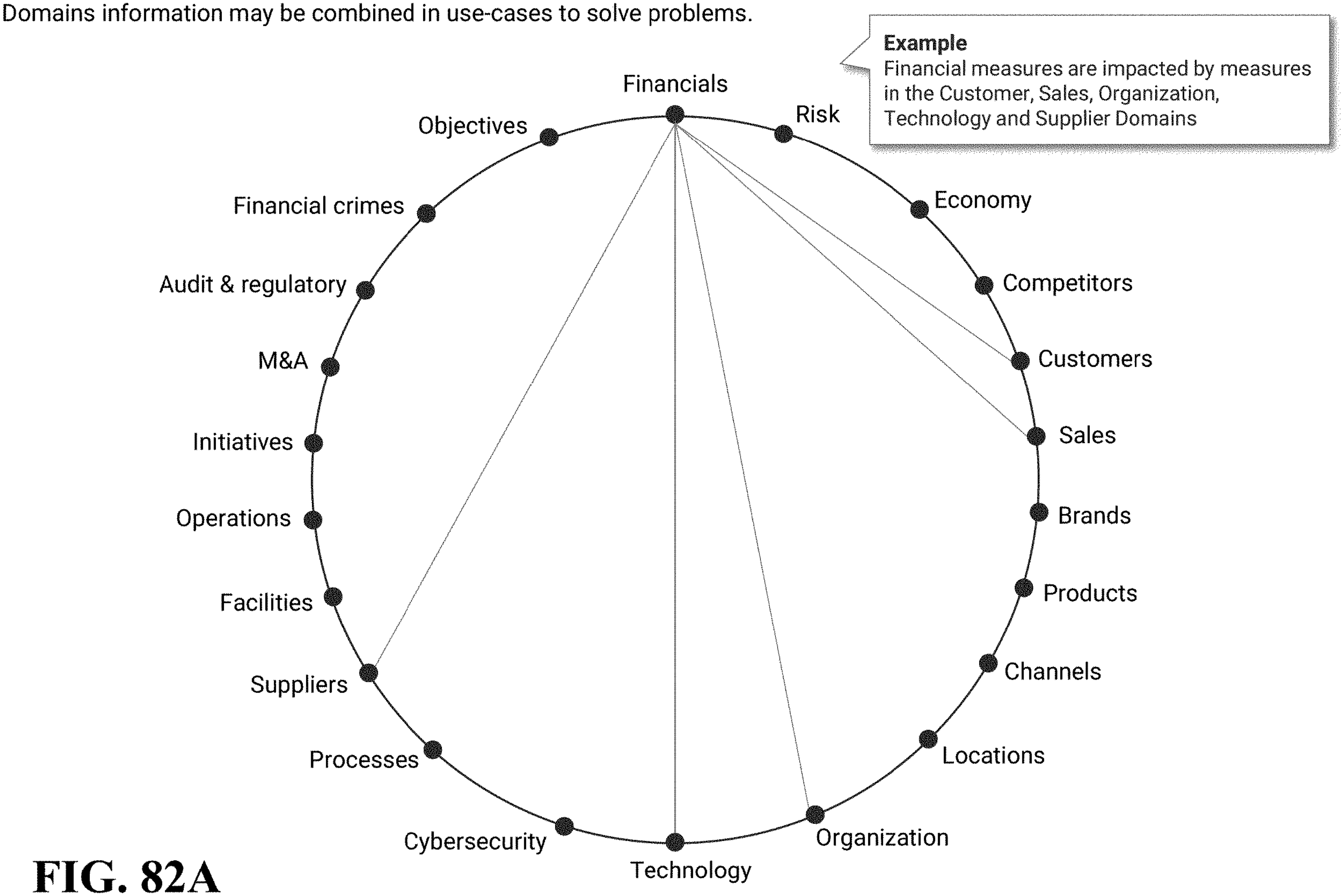
Figure 83C:
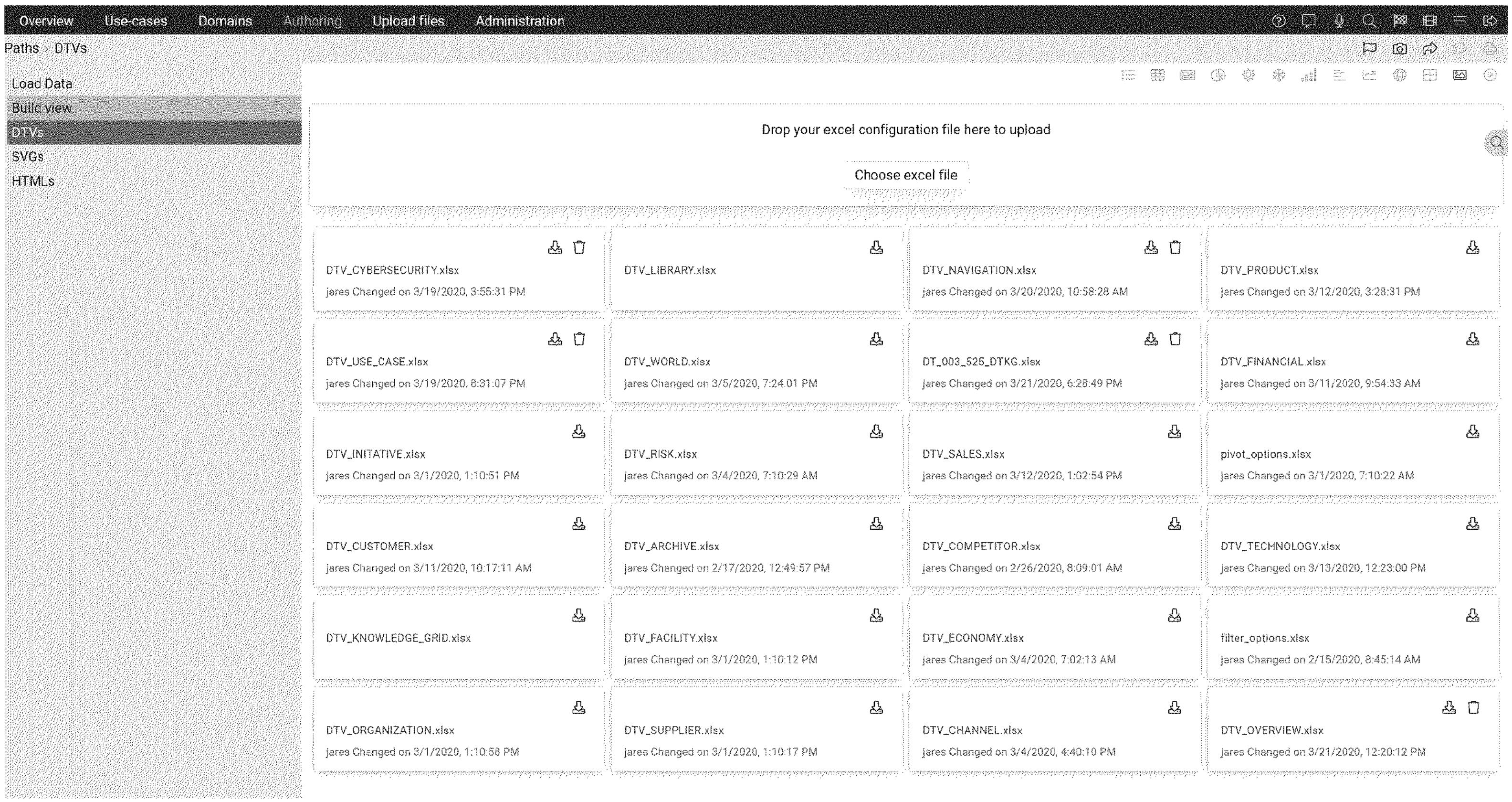
Figure 83D:
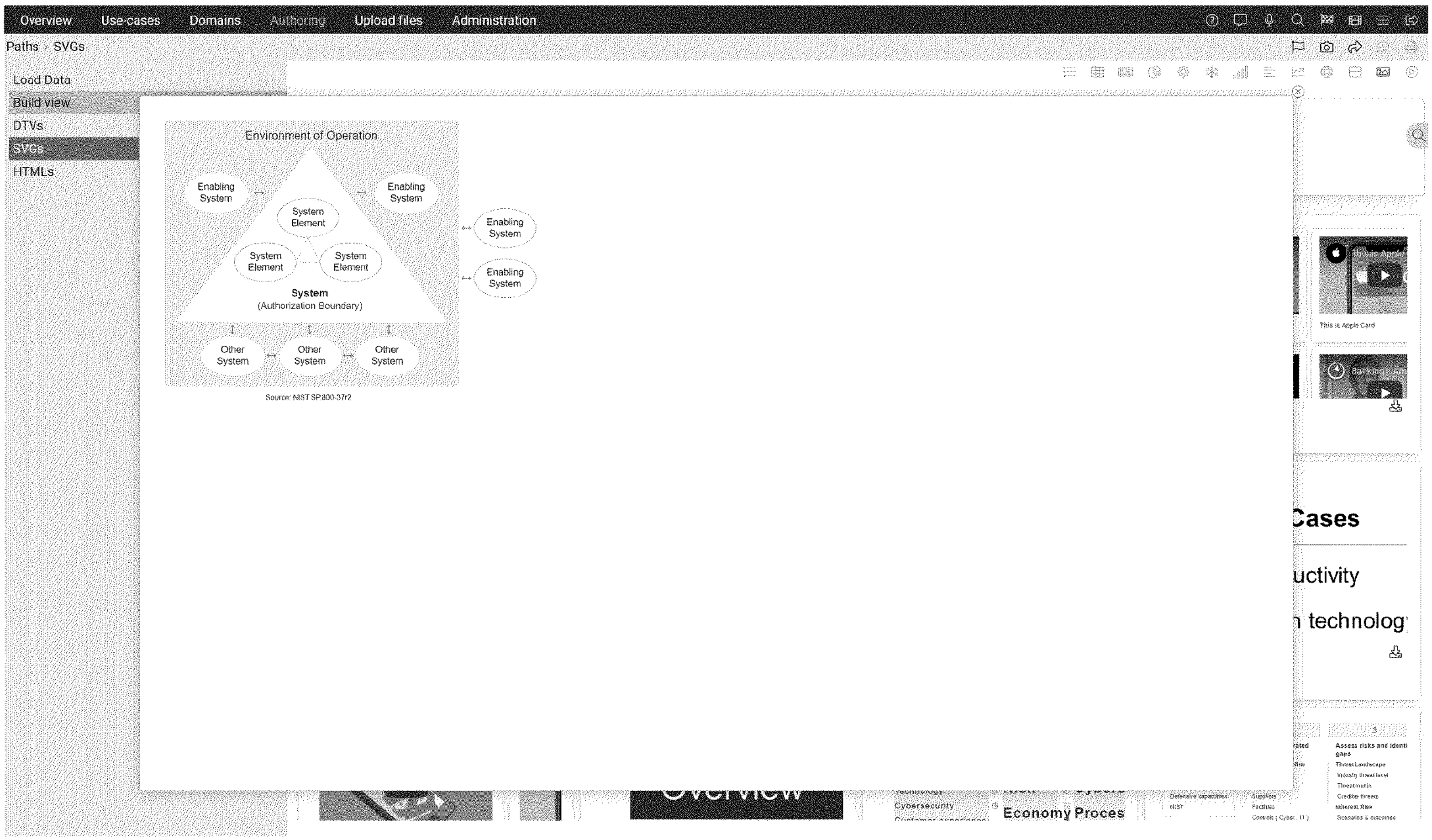
Figure 83E:
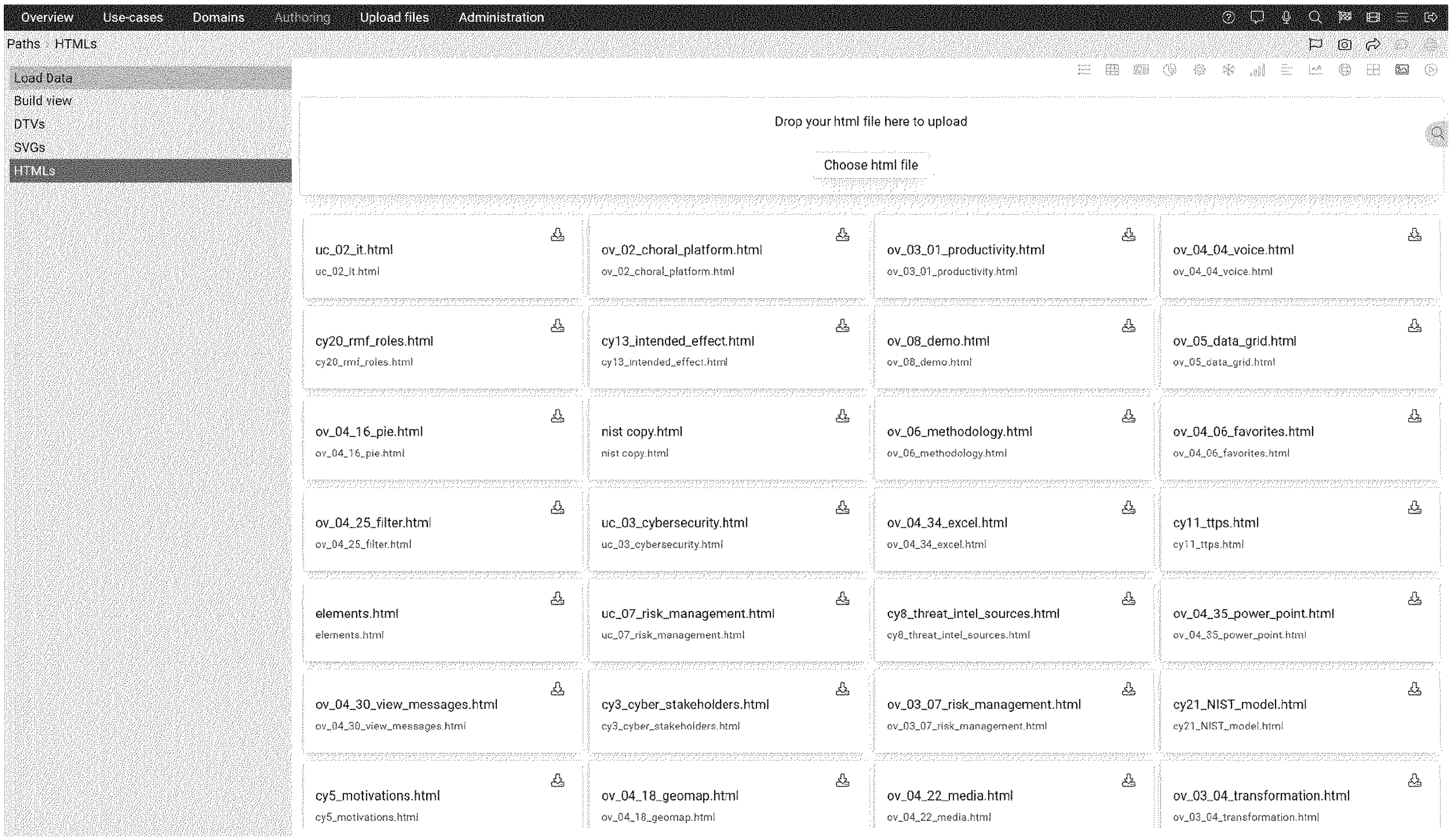
Figure 85A:
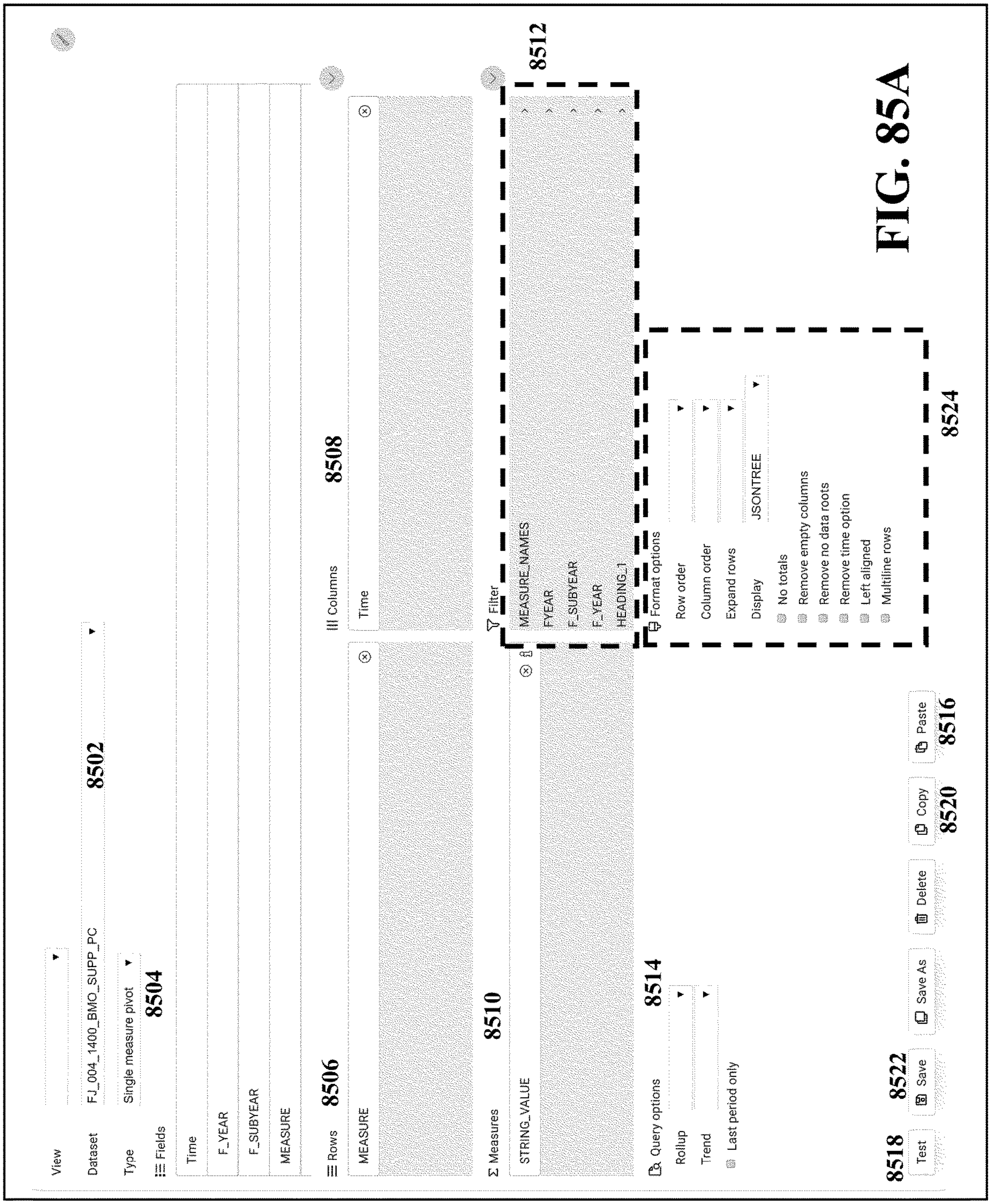
Figure 85B:
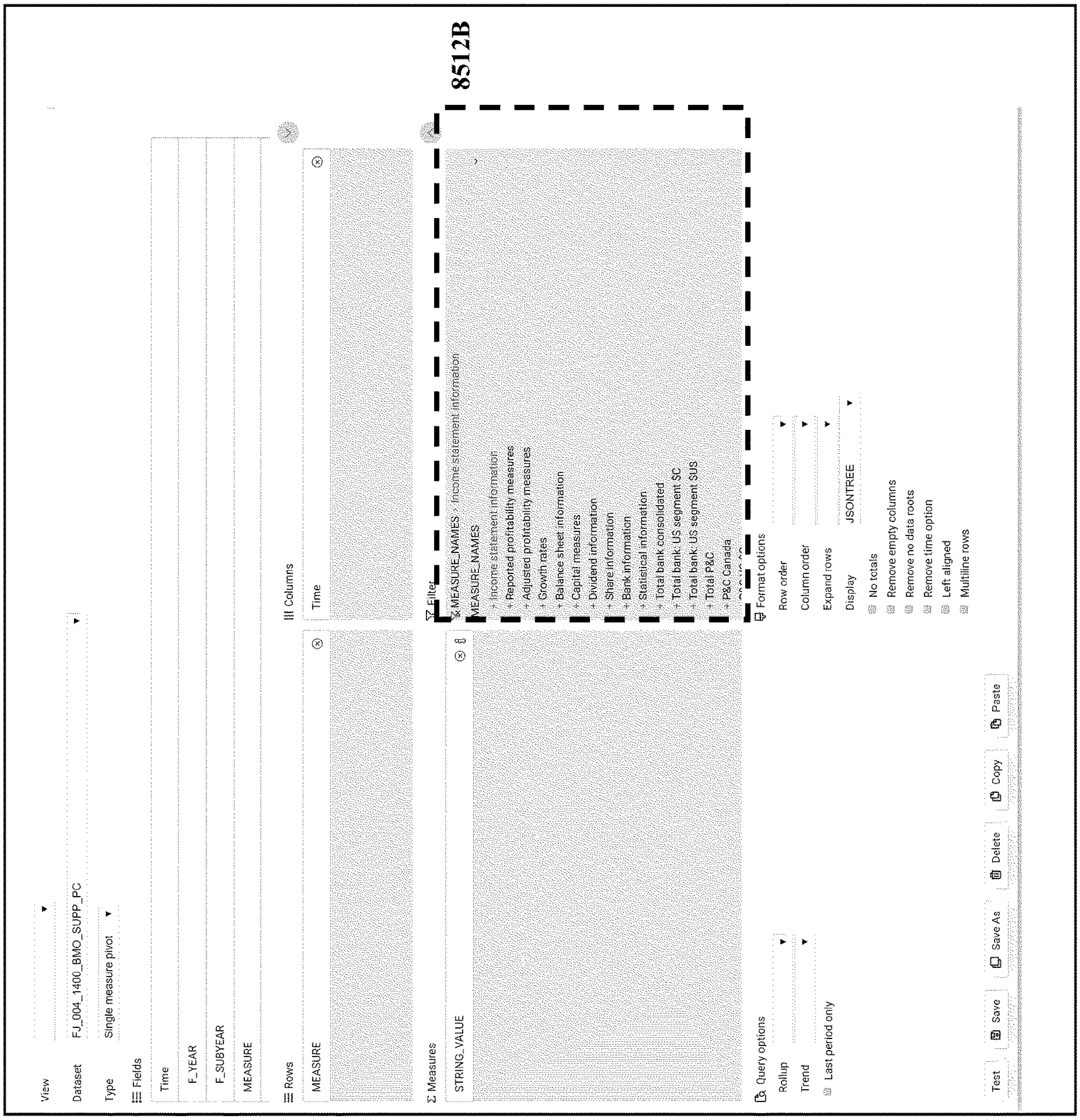
Figure 85D:
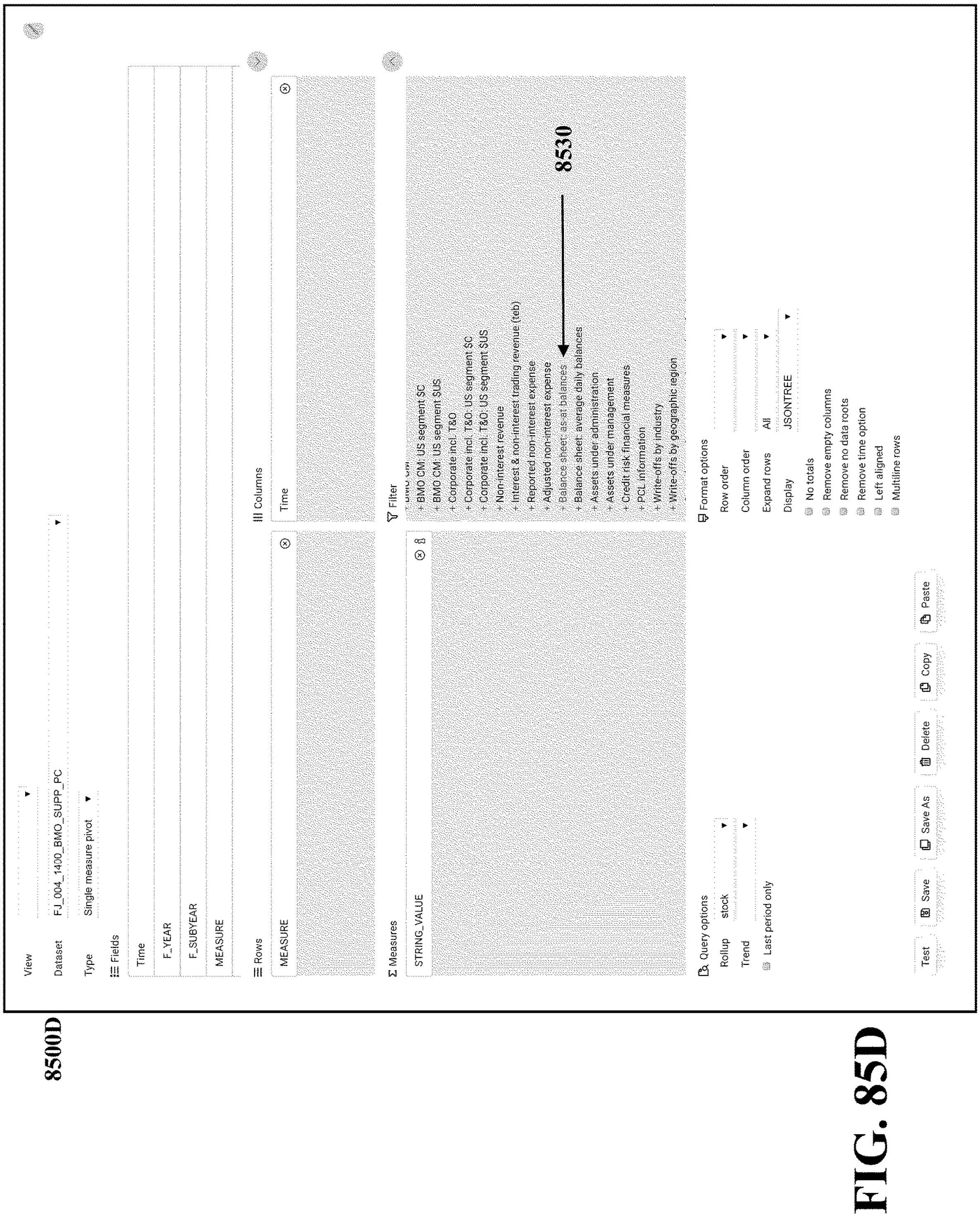
Figure 85F:
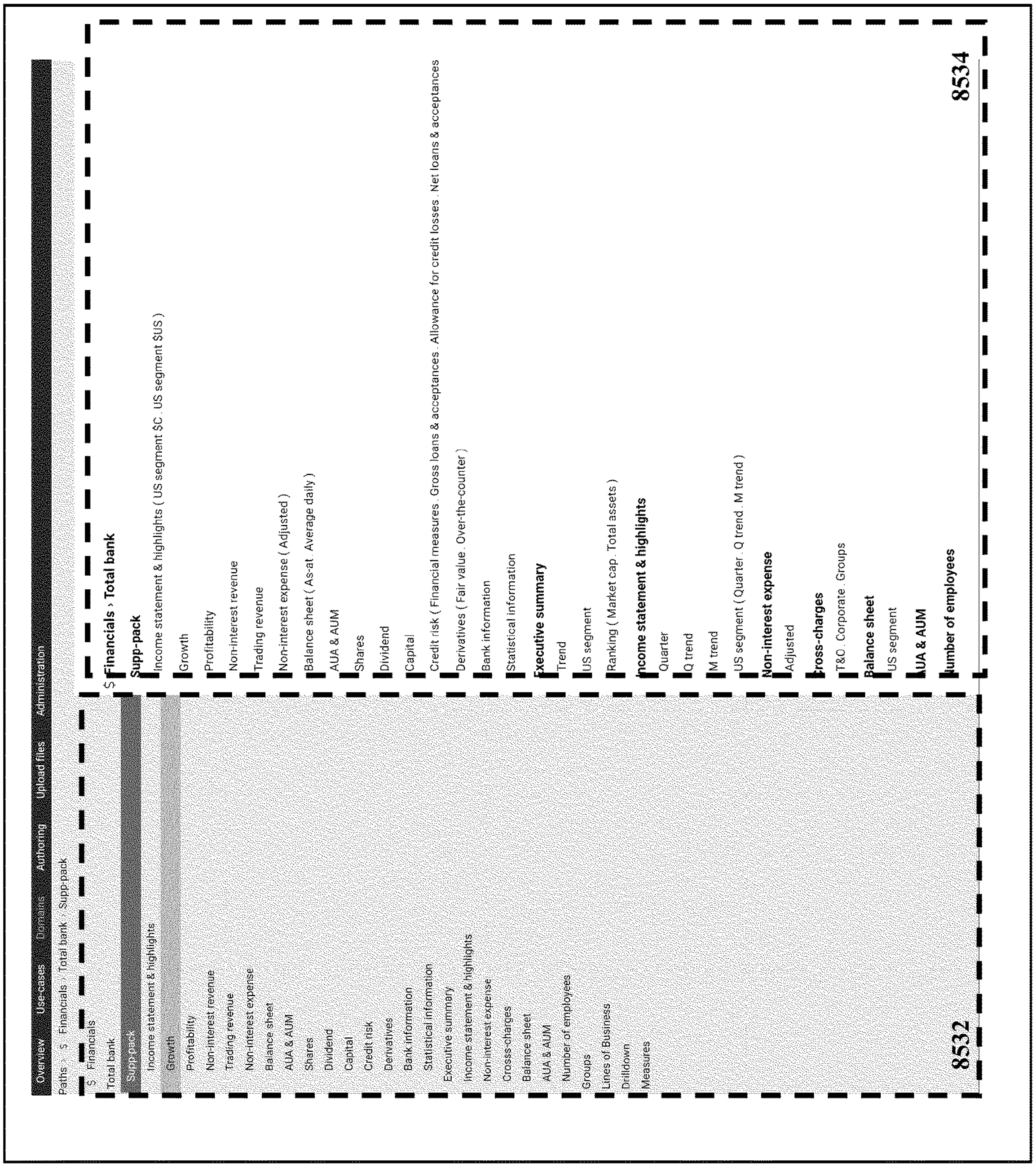
Figure 85G:
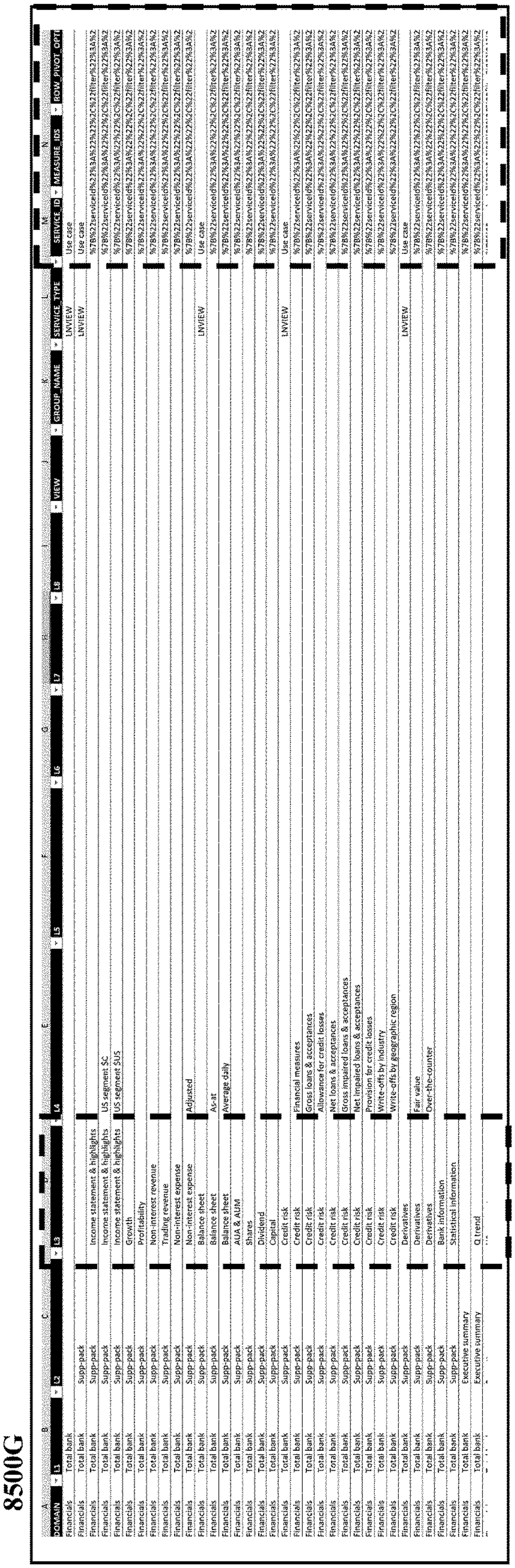

Use cases may be preconfigured models that used for different problems, such as bank productivity, technology, cybersecurity, and the like. To implement the disclosed platform and to customize the platform to a new environment, the end user must identify domains and elements of the institution's data stored onto one or more databases. As described above, domains define the data type. Example of different domains are provided in FIGS. 81C-D and FIGS. 82A-L. As illustrated in FIG. 82A, one or more domains may be related to each other. For instance, as will be described below, a data record may correspond to one or more domains. Each illustrated domain within the FIGS. 82A-L provides a general description of the domain, information regarding the data corresponding the each domain, organization units associated with each domain, and configurations and data files associated with each domain. Each figure illustrating a domain also includes at least a non-limiting example of a view provided by the platform. Every domain may be assembled the same way using the different elements, as illustrated in FIG. 81E. As will be described below, the method 8000 (also illustrated in FIG. 8111) allows the user to implement the platform by using electronic templates to identify data and different views (illustrated in FIG. 81F) to generate and revise the nodal data structure (illustrated in FIG. 81G).

For brevity, this disclosure does not describe every domain in detail. As illustrated in FIG. 82J, the supplier domain contains the supplier's spending, employee discretionary spending, characterized supplier risks, and the like. In order to generate a supplier domain, the end user may first identify a dimension table that identifies different spend categories. The dimension table for spend category would indicate that the organization spends a certain amount on information technology, marketing, advertising, target professional services, real estate, and various sub-categories. Examples of a sub-category may include travel and entertainment, airfare, hotels, and the like. Therefore, the end user may input various categories of spends defining the categories of resources spent within the institution.

In a non-limiting example, a bank may add a dimension table (DT) named "spend category" that describes all the different categories of money spent by a particular branch of the bank. The end user may also add another DT (organizational unit) that identifies the bank's organization (e.g., personnel, commercial, wealth management, capital market, corporate and then Corporate, and the like. In some configurations, the analytics server may identify the organizational information from a file indicating the structure of the bank. As a results, the analytics server now can identify a DT describing the spend categories and a DT describing the organization of the bank.

The end user then specifies a catalog of all the suppliers for the bank. For example, the end user may identify that the bank has twenty thousand suppliers. Therefore, the analytics server generates a fact catalog (FC) of twenty thousand suppliers. For instance, the FC data table may include twenty thousand data records where each data record corresponds to a particular supplier. The end user then identifies a fact journal (FJ) corresponding to different transaction amounts. For instance, for the analytics server can use the information described above to determine corresponding data for each transaction (e.g., $10,000 transaction for buying PC from supplier A for a branch in Canada). Therefore, the analytics server may store the data within the node representing the transaction. Therefore, the analytics server may create four inter-related data tables (2 DTs, 1 FC, and 1 FJ).

The end user may modify/revise the data tables. In some configurations, the end user may add additional data tables. For instance, the end user may also generate another FC corresponding to employees because the end user may desire to attribute certain transactions to different employees. The second FC (e.g., employee FC) may be a separate data table that includes different employees' names. The analytics server may also tag each transaction to the second FC. The end user may also generate a second FJ that categorizes the transactions by their category (e.g., hotel, airfare, or discretionary).

As describe above, the analytics server may tag each transaction in accordance with its corresponding data table(s). For instance, a $1000 transaction (FJ) may point to the organization unit (e.g., an employee from Canada), a first spend category (e.g., airline ticket) and a second spend category (e.g., travel and entertainment), and supplier (e.g., airline A). The transaction will also point to a fourth data table (e.g., FC organization indicating that John Smith spent that $1000).

The analytics server may generate standardized templates to receive data and their corresponding data table designations. Therefore, an end user can configure and customize the platform for a particular institution. This process is generally referred to herein as "authorship." As illustrated in FIGS. 83A-E, a user may use electronic templates to load data, build customize visualization methods (views), and revise the nodal data structure.

Referring now to FIG. 84, an example of an electronic template (e.g., a data intake template) is illustrated. The template 8400 illustrates how views for a financials domain (e.g., transaction data) is inputted to the platform. For instance, section 8410 (column H-O and corresponding rows 7-22) illustrates how financial data is inputted by an end user. In some configurations, the user can directly input the data into the cells provided by the electronic template 8400. In some configurations, the user may provide an electronic address or identification of the data. The analytics server may then scan/crawl various databases to find the data referred to within the electronic template 8400. As illustrated the electronic template may be any file including Excel files having multiples cells.

In the electronic template 8400, row 1 indicates the domain table corresponding to the data. The end user may also indicate a table name (row 2). These rows provide instructions to the analytics server regarding how and where to upload the data. These rows further instruct the analytics server regarding how to generate/update the nodal data structure. For instance, row 1, indicates that the end user desires the data to be uploaded into the nodal data structure under the financials domain. The end user may also name the table (row 2). The user may designate the data type (e.g., the data type, illustrated in row 3, can be either string or numeric).

In row 4, the user may identify a time associated with the data. In row 5, the user may identify the source type associated with the data (actual, planned, forecasted, and the like). "C" in row 6, column A signifies a column and indicates what the column identifies.

The end user may indicate the order of display of the data in column C. Therefore, when the platform displays the data associated with the template 8400 (e.g., drill down views) in the order indicated in column C. The user may also indicate the analysis order (row 6, columns E-G). The end user can also insert notes (rows 25-27), which may be displayed within the platform. The end user can also indicate that a row belongs to "notes" by inputting "N" in column A (rows 25-27). The end user may input "D" for data that must be inputted into the platform (e.g., nodal data structure). In some embodiments, analytics server may display the data inputted/designated as a note when a user of the platform hovers (or otherwise interacts) with a particular section of the data.

In row 6, the end user may display different FJs associated with the data. The end user may use columns E-G to describe the data. The end user may specify the hierarchy of data navigation (e.g., how the analytics sever calls the data when navigating through the nodal data structure). Therefore rows 14-22 designate what the data includes (rows 14-22, columns H-O).

When the analytics server receives the template 8400, the analytics server may upload the data within the nodal data structure accordingly. The analytics server may also normalize the names and description of data, such that different domains are consistently uploaded into the nodal data structure. The analytics server may then use a view configurator to generate different views according to the data received via the electronic template 8400.

In some configurations, the analytics server may display a GUI having multiple input elements where the end user can input the data and generate one or more templates, such as template 8400. Referring now to FIGS. 85A-G, non-limiting example of GUIs to generate one or more templates are illustrated.

As depicted, the end user may interact with the GUI 8500A to generate a template, such as template 8400. The end user may interact with the input elements 8502 to select a data table from a list or otherwise input an identification of the data table. The end user may also interact with the drop down menu 8504 to identify the type of data. The end user may input table attributes using input elements 8506-8512, such as row data, column data, measure (FJs), and filters. The user may use these input elements to directly enter the data or input an electronic address associated with the data. The end user may then identify query options for the data inputted. When the data inputted, the user may use input elements 8524 to format the view associated with the inputted data.

The GUI 8500A may also display input element 8518 allowing the user to preview the configured view of the inputted data. The GUI 8500A may also display the save button 8522 allowing the user to save the inputted data onto an electronic template. The user may also utilize the button 8520 to copy all or part of the inputs provided for another template or button 8516 to paste data from another template.

In a non-limiting example, as illustrated in GUI 8500B, the user may interact with the input element 8512B and select income statement information. As a result, the analytics server displays GUI 8500C (GUI element 8526) illustrating a view of the inputted data. The analytics server may also generate a link 8528 upon the user interacting with the button 8520. The user may use link 8528 to recreate the view 8526 for other dimension tables.

In a second example, as illustrated in GUI 8500D, the user may select the balance sheet 8530 to be viewed. As a result, the analytics server may generate GUI 8500E displaying a balance sheet view. The user may customize this view by interacting/revising the inputs on GUIs 8500D-F. In GUI 8500F, the GUI element 8532 corresponds to the inputted data within the template (section 8538 referring to column D of the template 8500G). The user can similarly customize the GUI element 8534 (e.g., using the template and/or the domain content specified within the nodal data structure). Furthermore, as depicted in GUI element 8536, the analytics server may generate a link for each row of the template representing different views.

At step 8020, the analytics server may generate/update the nodal data structure in accordance with the inputs received from the electronic template. The analytics server can generate/update the nodal data structure according to the electronic template received. For instance, when a transaction is identified (within the electronic template) as belonging to domain table having a particular view, the analytics server may revise the metadata of one or more nodes corresponding to the transaction and include the domain table and the particular view.

The analytics server may also set up (e.g., generate via implementing executable code) one or more application programming interfaces (APIs) to retrieve data and update the nodal data structure accordingly. For instance, the analytics server may use the electronic template as a set of rules to identify data stored within one or more data repository of an institution. For instance, when the electronic template indicates that transaction data from branch A corresponds to a particular DT, the analytics server may implement one or more APIs to retrieve transaction data associated with other branches and designates the retrieved data similar to the set of rules received within the electronic template.

Foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:

parsing, by a server, data into a set of unique domain data tables, each domain data table corresponding to a predetermined domain having a first criterion, wherein the server identifies data associated with cybersecurity activity and generates a unique data table for a cybersecurity domain;

parsing, by the server, each unique domain data table into a set of unique dimension tables, each dimension table corresponding to a predetermined dimension having a second criterion;

generating, by the server, a nodal network comprising a set of nodes where each node represents at least a portion of the data stored within a database, each node having metadata comprising a unique identifier corresponding to a unique domain table and a unique dimension table corresponding to the each respective node;

linking, by the server, one or more nodes based on each of the one or more nodes' respective metadata;

upon receiving an instruction from a user computing device to display cybersecurity data:

parsing, by the server, the request to identify one or more linked nodes associated with the request;

identifying, by the server, a likelihood of occurrence of a cyber-attack based and an impact value of the cyber-attack based on the data corresponding to the one or more linked nodes, the impact value corresponding to impact of the cyber-attack on an organization associated with the user computing device;

displaying, by the server on a graphical user interface of the user computing device, a multi-dimensional cybersecurity matrix indicating the likelihood of a cyber-attack and the impact value of the cyber-attack; and displaying, by the server on the multi-dimensional cybersecurity matrix, a graphical indicator for the cyber-attack, the graphical indicator having a position that corresponds to the impact value within a range of impact values arranged within a first axis of the multi-dimensional cybersecurity matrix and the likelihood of occurrence within a range of likelihoods of occurrences arranged within a second axis of the multi-dimensional cybersecurity matrix.

2. The method of claim 1, wherein the cybersecurity matrix comprises a set of indicators for a set of cybersecurity attack procedures.

3. The method of claim 1, further comprising:

displaying, by the server, a heat map representing a likelihood of occurrence for one or more cyber-attacks.

4. The method of claim 3, wherein the heat map indicates the likelihood of cyber-attack associated with a time period.

5. The method of claim 4, wherein the time period is pre-determined.

6. The method of claim 4, wherein the time period is inputted by a user.

7. The method of claim 3, wherein the heat map indicates the likelihood of cyber-attack in relation to a similar organization.

8. The method of claim 1, further comprising:

receiving, by a server, an electronic template having a set of input fields, the electronic template identifying at least a portion of data stored within a database and its corresponding domain and a display attribute.

9. The method of claim 8, wherein the display attribute defines the multi-dimensional cybersecurity matrix.

10. A computer system comprising:

a user computing device having a display screen; and a server in communication with the user computing device, the server configured to:

parse data into a set of unique domain data tables, each domain data table corresponding to a predetermined domain having a first criterion, wherein the server identifies data associated with cybersecurity activity and generates a unique data table for a cybersecurity domain;

parse each unique domain data table into a set of unique dimension tables, each dimension table corresponding to a predetermined dimension having a second criterion;

generate a nodal network comprising a set of nodes where each node represents at least a portion of the data stored within a database, each node having metadata comprising a unique identifier corresponding to a unique domain table and a unique dimension table corresponding to the each respective node;

link one or more nodes based on each of the one or more nodes' respective metadata;

upon receiving an instruction from a user computing device to display cybersecurity data:

parse the request to identify one or more linked nodes associated with the request;

identify a likelihood of occurrence of a cyber-attack based and an impact value of the cyber-attack based on the data corresponding to the one or more linked nodes, the impact value corresponding to impact of the cyber-attack on an organization associated with the user computing device;

display, on a graphical user interface of the user computing device, a multi-dimensional cybersecurity matrix indicating the likelihood of a cyber-attack and the impact value of the cyber-attack; and displaying, on the multi-dimensional cybersecurity matrix, a graphical indicator for the cyber-attack, the graphical indicator having a position that corresponds to the impact value within a range of impact values arranged within a first axis of the multi-dimensional cybersecurity matrix and the likelihood of occurrence within a range of likelihoods of occurrences arranged within a second axis of the multi-dimensional cybersecurity matrix.

11. The system of claim 10, wherein the cybersecurity matrix comprises a set of indicators for a set of cybersecurity attack procedures.

12. The system of claim 10, wherein the server is further configured to:

display a heat map representing a likelihood of occurrence for one or more cyber-attacks.

13. The system of claim 12, wherein the heat map indicates the likelihood of cyber-attack associated with a time period.

14. The system of claim 13, wherein the time period is pre-determined.

15. The system of claim 13, wherein the time period is inputted by a user.

16. The system of claim 12, wherein the heat map indicates the likelihood of cyber-attack in relation to a similar organization.

17. The system of claim 10, wherein the server is further configured to:

receive an electronic template having a set of input fields, the electronic template identifying at least a portion of data stored within a database and its corresponding domain and a display attribute.

18. The system of claim 17, wherein the display attribute defines the multi-dimensional cybersecurity matrix.

* * * * *